US012647397B2

(12) United States Patent
Kaciulis et al.

(10) Patent No.: US 12,647,397 B2
(45) Date of Patent: Jun. 2, 2026

(54) HIERARCHICAL-CONTEXT AREA NETWORK AS A VIRTUAL PRIVATE NETWORK INFRASTRUCTURE SYSTEM

(71) Applicant: Netflow, UAB, Vilnius (LT)

(72) Inventors: Karolis Kaciulis, Kaisiadorys (LT);
Nikodemas Zaliauskas, Vilnius (LT);
Donatas Budvytis, Vilnius (LT)

(73) Assignee: Netflow, UAB, Vilnius (LT)

( * ) Notice: Subject to any disclaimer, the term of this patent is extended or adjusted under 35 U.S.C. 154(b) by 286 days.

(21) Appl. No.: 18/191,315

(22) Filed: Mar. 28, 2023

(65) Prior Publication Data

US 2024/0333686 A1      Oct. 3, 2024

(51) Int. Cl.
*H04L 9/40*              (2022.01)
(52) U.S. Cl.
CPC ................................ H04L 63/0272 (2013.01)
(58) Field of Classification Search
CPC .................................................... H04L 63/0272
USPC ............................................................ 726/15
See application file for complete search history.

(56) References Cited

U.S. PATENT DOCUMENTS

| | | | | |
|---|---|---|---|---|
| 7,752,486 B2 * | 7/2010 | Satran | ................. | G06F 11/2033 |
| | | | | 709/227 |
| 8,442,030 B2 | 5/2013 | Dennison | | |
| 8,750,288 B2 | 6/2014 | Nakil et al. | | |
| 9,094,285 B2 | 7/2015 | Gorkemli et al. | | |
| 9,319,300 B2 | 4/2016 | Huynh Van et al. | | |

| | | |
|---|---|---|
| 9,722,935 B2 | 8/2017 | Bouanen et al. |
| 9,900,250 B2 | 2/2018 | Dong et al. |
| 9,912,614 B2 | 3/2018 | Koganti |
| 10,097,372 B2 | 10/2018 | Bhattacharya et al. |
| 10,148,506 B1 | 12/2018 | Anburose et al. |
| 10,200,274 B1 | 2/2019 | Suryanarayana et al. |
| 10,326,532 B2 | 6/2019 | Ashrafi |
| 10,361,972 B2 | 7/2019 | Biruduraju |
| 10,397,189 B1 | 8/2019 | Hashmi |

(Continued)

OTHER PUBLICATIONS

Virtual eXetensible Local Area Network (VXLAN): A Framework for Overlaying Virtualized Layer 2 Networks over Layer 3 Networks, M. Mahalingam Storvisor et al., <https://www.rfc-editor.org/rfc/rfc7348.html>, Aug. 2014, 22 pages.

(Continued)

*Primary Examiner* — Kaylee J Huang
(74) *Attorney, Agent, or Firm* — Young Basile Hanlon & MacFarlane, P.C.

(57)              ABSTRACT

A hierarchical-context area network includes a first, level-one, context area network, a second, level-one, context area network, and a third, level-two, context area network, wherein the first context area network is allocated a first shared IP address in a first range, the first context area network includes a first VPN server having a second IP address in the first range, the second context area network is allocated a second shared IP address in a second range, the second context area network includes a second VPN server having a fourth IP address in the second range, communication between the first VPN server and the second VPN server is unavailable via context area networks other than via a data link layer network established between the first VPN server and the second VPN server via the third context area network.

20 Claims, 25 Drawing Sheets

(56)　　　　　References Cited

U.S. PATENT DOCUMENTS

| | | | |
|---|---|---|---|
| 10,705,808 B2 | 7/2020 | Chiosi et al. | |
| 10,749,796 B2 | 8/2020 | Dowlatkhah et al. | |
| 10,757,576 B2 | 8/2020 | Ashrafi | |
| 10,819,629 B2 | 10/2020 | Dowlatkhah et al. | |
| 10,972,386 B2 | 4/2021 | Mackie et al. | |
| 10,999,197 B2 | 5/2021 | Tooda et al. | |
| 11,025,483 B1 | 6/2021 | Hashmi | |
| 11,134,010 B2 | 9/2021 | Mehmedagic et al. | |
| 11,310,146 B1 | 4/2022 | Kaciulis et al. | |
| 12,218,822 B2 | 2/2025 | Kaciulis et al. | |
| 12,341,696 B2 | 6/2025 | Kaciulis et al. | |
| 2004/0057439 A1 | 3/2004 | Ould-Brahim | |
| 2005/0165834 A1 | 7/2005 | Nadeau et al. | |
| 2006/0075083 A1* | 4/2006 | Liu | H04L 63/0428 |
| | | | 709/223 |
| 2009/0228466 A1* | 9/2009 | Peters | G06F 16/48 |
| | | | 707/999.005 |
| 2010/0154050 A1* | 6/2010 | Mukkara | H04L 67/104 |
| | | | 726/15 |
| 2010/0165832 A1 | 7/2010 | Kini et al. | |
| 2011/0194404 A1 | 8/2011 | Kluger et al. | |
| 2014/0101325 A1* | 4/2014 | Young | H04L 12/4658 |
| | | | 709/228 |
| 2017/0026417 A1 | 1/2017 | Ermagan et al. | |
| 2017/0317919 A1 | 11/2017 | Fernando et al. | |
| 2017/0366395 A1 | 12/2017 | Goldfarb et al. | |
| 2018/0062992 A1 | 3/2018 | Cohn et al. | |
| 2018/0167457 A1* | 6/2018 | Soderlund | H04L 41/20 |
| 2018/0262498 A1 | 9/2018 | Be'ery et al. | |
| 2018/0302321 A1 | 10/2018 | Manthiramoorthy et al. | |
| 2019/0081930 A1 | 3/2019 | Hunt | |
| 2019/0280964 A1 | 9/2019 | Michael et al. | |
| 2019/0319847 A1 | 10/2019 | Nahar et al. | |
| 2020/0099659 A1 | 3/2020 | Cometto et al. | |
| 2020/0403970 A1 | 12/2020 | Chastain et al. | |
| 2021/0029195 A1 | 1/2021 | Kolbe et al. | |
| 2021/0111998 A1 | 4/2021 | Saavedra | |
| 2021/0399920 A1 | 12/2021 | Sundararajan et al. | |
| 2022/0103523 A1 | 3/2022 | Starr et al. | |
| 2022/0224623 A1 | 7/2022 | Kamath et al. | |
| 2023/0006972 A1 | 1/2023 | Kolaitis et al. | |
| 2023/0052050 A1 | 2/2023 | Budvytis et al. | |
| 2024/0187380 A1 | 6/2024 | Funka et al. | |
| 2024/0251017 A1 | 7/2024 | Byard et al. | |
| 2024/0333628 A1 | 10/2024 | Kaciulis et al. | |
| 2024/0333646 A1 | 10/2024 | Kaciulis et al. | |
| 2024/0333686 A1 | 10/2024 | Kaciulis et al. | |
| 2024/0333687 A1 | 10/2024 | Kaciulis et al. | |
| 2024/0333688 A1 | 10/2024 | Kaciulis et al. | |
| 2025/0071065 A1 | 2/2025 | Lal | |

OTHER PUBLICATIONS

Wikipedia, Software-defined networking, https://en.wikipedia.org/wiki/Software-defined_networking, Apr. 10, 2023, 15 pages.

RFC 4271: A Border Gateway Protocol 4 (BGP-4), Y. Rekhter, et al., https://www.rfc-editor.org/rfc/rfc4271, Jan. 2006, 104 pages.

WireGuard: Next Generation Kemmel Network Tunnel, Jason A. Donenfeld ,https://www.wireguard.com/papers/wireguard.pdf <https://nam10.safelinks.protection.outlook.com/?url=https%3A%2F%2Fwww.wireguard.com%2Fpapers%2Fwireguard.pdf&data=05%7C01%7Cjtumblin%40youngbasile.com%7Ca590e1b13ceb40178cf208db346e506d%7Cf9236c16f5cb456793af9bfc7b0b907f%7C1%7C0%7C638161420643654250%7CUnknown%7CTWFpbGZsb3d8eyJWljoiMC4wLjAwMDAiLCJQIjoiV2luMziLCJBTil6Ik1haWwiLCJXVCI6Mn0%3D%7C3000%7C%7C%7C&sdata=w2PrT7GxL32naQDlQ8ZqvX%2FGlOflclJbTH5Chqp1xbc%3D&reserved=0> Jun. 1, 2020, 20 pages.

Wikipedia, OSI model, <https://en.wikipedia.org/wiki/OSI_model>, Apr. 10, 2023, 8 pages.

Veth(4)—Linux manual page, Linux/UNIX system programming training, Michael Kerrisk, https://man7.org/linux/man-pages/man4/veth.4.html <https://nam10.safelinks.protection.outlook.com/?url=https%3A%2F%2Fman7.org%2Flinux%2Fman-pages%2Fman4%2Fveth.4.html&data=05%7C01%7Cjtumblin%40youngbasile.com%7Ca590e1b13ceb40178cf208db346e506d%7Cf9236c16f5cb456793af9bfc7b0b907f%7C1%7C0%7C638161420643654250%7CUnknown%%7CTWFpbGZsb3d8eyJWljoiMC4wLjAwMDAiLCJQIjoiV2luMztiLCJBTit6Ik1haWwilCJXVCI6Mn0%3D%7C3000%7C%7C%7C&sdata=7yhZ%2Bc%2FGRxJIBPhqyXDp%2BJa7wouwtolSy347JpY2Pw%3D&reserved=0>, Dec. 18, 2022, 2 pages.

Ip-netns(8)—Linux manual page, Linux/UNIX system programming training, Michael Kerrisk, https://man7.org/linux/man-pages/man8/ip-netns.8.html <https://nam10.safelinks.protection.outlook.com/?url=https%3A%2F%2Fman7.org%2Flinux%2Fman-pages%2Fman8%2Fip-netns.8.html&data=05%7C01%7Cjtumblin%40youngbasile.com%7Ca590e1b13ceb40178cf208db346e506d%7Cf9236c16f5cb456793af9bfc7b0b907f%7C1%7C0%7C638161420643654250%7CUnknown%%7CTWFpbGZsb3d8eyJWljoiMC4wLjAwMDAiLCJQIjolV2luMzlil.CJBTll6lk1haWwiLCJXCI6Mn0%3D%7C%7C%7C&sdata=OmS5w1IUUSIMuR2UK5eQjiMBP9CCeV3Yn2cbA4OZcqk%3D&reserved=0>, Dec. 18, 2022, 6 Pages.

Introduction to Linux interfaces for virtual networking, Hangbin Liu, https://developers.redhat.com/blog/2018/10/22/introduction-to-linux-interfaces-for-virtual-networking <https://nam10.safelinks.protection.outlook.com/?url=https%3A%2F%2Fdevelopers.redhat.com%2Fblog%2F2018%2F10%2F22%2Fintroduction-to-linux-interfaces-for-virtual-networking&data=05%7C01%7Cjtumblin%40youngbasile.com%7Ca590e1b13ceb40178cf208db346e506d%7Cf9236c16f5cb456793af9bfc7b0b907f%7C1%7C0%7C638161420643654250%7CUnknown%7CTWFpbGZsb3d8eyJWljolMC4wLjAwMSAiLCJQIjolV2luMzliLCJBTll6lk1haWwlLCJXVCI6Mn0%3D%7C3000%7C%7C%7C&sdata=CG0evkONECYXEUygB7lwtiZhB6VbJDsqlDVwNADaLOs%3D&reserved=0>, Oct. 22, 2018, 25 pages.

Wikipedia, Open Shortest Path First, https://en.wikipedia.org/wiki/Open_Shortest_Path_First <https://nam10.safelinks.protection.outlook.com/?url=https%3A%2F%2Fen.wikipedia.org%2Fwiki%2FOpen_Shortest_Path_First&data=05%7C01%7Cjtumblin%40youngbasile.com%7Ca590e1b13ceb40178cf208db346e506d%7Cf9236c16f5cb456793af9bfc7b0b907f%7C1%7C0%7C638161420643654250%7CUnknown%7CTWFpbGZsb3d8eyJWljoiMC4wLjAwMDAiLCJQIjoiV2luMzliLCJBTil6Ik1haWwiLCJXVCI6Mn0%3D%7C3000%7C%7C%7C&sdata=uHlb%2FafrGMMXBMvllBvCgELjedP9PlEMQZjvt%2FEa3hs%3D&reserved=0>, Apr. 10, 2023, 23 pages.

Wikipedia, Border Gateway Protocol, https://en.wikipedia.org/wiki/Border_Gateway_Protocol<https://nam10.safelinks.protection.outlook.com/?url=https%3A%2F%2Fen.wikipedia.org%2Fwiki%2FBorder_Gateway_Protocol&data=05%7C01%7Cjtumblin%40youngbasile.com%7Ca590e1b13ceb40178cf208db346e506d%7Cf9236c16f5cb456793af9bfc7b0b907f%7C1%7C0%7C638161420643654250%7CUnknown%7CTWFpbGZsb3d8eyJWljoiMC4wLjAwMDAiLCJQIjoiV2luMzliLCJBTil6Ik1haWwiLCJXVCI6Mn0%3D%7C3000%7C%7C%7C&sdata=Zme%2FCG2x4vwjBcWXCvjuvo%2F3gsOeXd33Nu7LrV%2Fa08k%3D&reserved=0>, Apr. 10, 2023, 25 pages.

Wikipedia, Transport Layer Security, https://en.wikipedia.org/wiki/Transport_Layer_Security<https://nam10.safelinks.protection.outlook.com/?url=https%3A%2F%2Fen.wikipedia.org%2Fwiki%2FTransport_Layer_Security&data=05%7C01%7Cjtumblin%40youngbasile.com%7Ca590e1b13ceb40178cf208db346e506d%7Cf9236c16f5cb456793af9bfc7b0b907f%7C1%7C0%7C638161420643654250%7CUnknown%7CTWFpbGZsb3d8eyJWljoiMC4wLjAwMDAiLCJQIjoiV2luMzliLCJBTil6Ik1haWwiLCJXVCI6Mn0%3D%7C3000%7C%7C%7C&sdata=48LRPPdKfg2hXlaPn1CYY0q%2FEP45GUhHrOqUm5MwoXE%3D&reserved=0>, Apr. 10, 2023, 41 pages.

* cited by examiner

1000

HIERARCHICAL-CONTEXT AREA NETWORK AS A VIRTUAL PRIVATE NETWORK INFRASTRUCTURE SYSTEM

BACKGROUND

Computing devices, and users thereof, use virtual private network (VPN) services for privacy, to circumvent censorship, to access geo-filtered content, or a combination thereof. Originally developed as a technology to privately send and receive data across public networks, virtual private networks are now used broadly as a privacy-preserving technology that allows Internet users to obscure not only the communicated data but also personal information such as, for example, web browsing history from third parties including Internet service providers (ISPs), Spywares, or the like. A virtual private network service provider may offer a secure private networking environment within a publicly shared, insecure infrastructure through encapsulation and encryption of the data communicated between a virtual private network client application (or VPN application) installed on a user device and a remote virtual private network server.

SUMMARY

Disclosed herein are implementations of a hierarchical-context area network as a virtual private network infrastructure system.

An aspect of the disclosure is a method for operating a hierarchical-context area network as a virtual private network infrastructure system. Operating the hierarchical-context area network as the virtual private network infrastructure system includes operating the hierarchical-context area network wherein the hierarchical-context area network includes a hierarchy of context areas, wherein the hierarchy of context areas includes a first context level, wherein the hierarchical-context area network includes a first context area network in the first context level and a second context area network in the first context level. Operating the hierarchical-context area network as the virtual private network infrastructure system includes operating the hierarchical-context area network wherein the hierarchical-context area network includes a second context level that includes the first context level, wherein the hierarchical-context area network includes a third context area network in the second context level. Operating the hierarchical-context area network as the virtual private network infrastructure system includes operating the hierarchical-context area network wherein the first context area network is allocated, in the hierarchical-context area network, a first range of Internet Protocol addresses, wherein the first range of Internet Protocol addresses includes a first Internet Protocol address allocated as a first shared Internet Protocol address for the first context area network. Operating the hierarchical-context area network as the virtual private network infrastructure system includes operating the hierarchical-context area network wherein the first context area network includes a first virtual private network server having a second Internet Protocol address in the first range of Internet Protocol addresses, other than the first shared Internet Protocol address. Operating the hierarchical-context area network as the virtual private network infrastructure system includes operating the hierarchical-context area network wherein the second context area network is allocated, in the hierarchical-context area network, a second range of Internet Protocol addresses, wherein the second range of Internet Protocol addresses includes a third Internet Protocol address allocated as a second shared Internet Protocol address for the second context area network. Operating the hierarchical-context area network as the virtual private network infrastructure system includes operating the hierarchical-context area network wherein the second context area network includes a second virtual private network server having a fourth Internet Protocol address in the second range of Internet Protocol addresses, other than the second shared Internet Protocol address. Operating the hierarchical-context area network as the virtual private network infrastructure system includes operating the hierarchical-context area network wherein communication between the first virtual private network server and the second virtual private network server is unavailable via the first context area network. Operating the hierarchical-context area network as the virtual private network infrastructure system includes operating the hierarchical-context area network wherein communication between the first virtual private network server and the second virtual private network server is unavailable via the second context area network. Operating the hierarchical-context area network as the virtual private network infrastructure system includes operating the hierarchical-context area network wherein communication between the first virtual private network server and the second virtual private network server is available via a data link layer network established between the first virtual private network server and the second virtual private network server via the third context area network.

In the aspects described herein, operating the hierarchical-context area network includes operating a hierarchical-context area network manager at a virtual private network infrastructure administration server for managing the hierarchical-context area network, the hierarchical-context area network manager configured in accordance the hierarchical-context area network manager configuration data obtained from a virtual private network control infrastructure device, operating the hierarchical-context area network includes operating a virtual private network operating system of a first virtual private network server, the virtual private network operating system configured in accordance with virtual private network server configuration data obtained from the virtual private network control infrastructure device, operating the hierarchical-context area network manager includes registering the first virtual private network server as a component of the hierarchical-context area network in accordance with virtual private network server registration data identifying the first virtual private network server obtained by the hierarchical-context area network manager from the virtual private network control infrastructure device, operating the virtual private network operating system includes sending, by the first virtual private network server, a peering data request, to the hierarchical-context area network manager, operating the hierarchical-context area network manager includes the hierarchical-context area network manager receiving the peering data request, obtaining, responsive to the peering data request, peering data that identifies a second virtual private network server of the hierarchical-context area network as a peer of the first virtual private network server, and sending a peering data response indicating the peering data to the first virtual private network server, operating the virtual private network operating system includes receiving the peering data response, and configuring the second virtual private network server as a virtual private network infrastructure peer in the hierarchical-context area network.

Another aspect of the disclosure is a virtual private network infrastructure system operating a hierarchical-context area network as a virtual private network infrastructure network, wherein the hierarchical-context area network includes a hierarchy of context areas. The virtual private network infrastructure system comprising a virtual private network infrastructure administration server, a virtual private network control infrastructure device, and a virtual private network server. The hierarchy of context areas includes a first context level, wherein the hierarchical-context area network includes a first context area network in the first context level and a second context area network in the first context level, and a second context level that includes the first context level, wherein the hierarchical-context area network includes a third context area network in the second context level. The first context area network is allocated, in the hierarchical-context area network, a first range of Internet Protocol addresses, wherein the first range of Internet Protocol addresses includes a first Internet Protocol address allocated as a first shared Internet Protocol address for the first context area network. The first context area network includes the first virtual private network server, the first virtual private network server having a second Internet Protocol address in the first range of Internet Protocol addresses, other than the first shared Internet Protocol address. The second context area network is allocated, in the hierarchical-context area network, a second range of Internet Protocol addresses, wherein the second range of Internet Protocol addresses includes a third Internet Protocol address allocated as a second shared Internet Protocol address for the second context area network. The second context area network includes a second virtual private network server having a fourth Internet Protocol address in the second range of Internet Protocol addresses, other than the second shared Internet Protocol address. Communication between the first virtual private network server and the second virtual private network server is unavailable via the first context area network. Communication between the first virtual private network server and the second virtual private network server is unavailable via the second context area network. Communication between the first virtual private network server and the second virtual private network server is available via a data link layer network established between the first virtual private network server and the second virtual private network server via the third context area network.

In the aspects described herein, operating the hierarchical-context area network includes operating a hierarchical-context area network manager at a virtual private network infrastructure administration server for managing the hierarchical-context area network, the hierarchical-context area network manager configured in accordance the hierarchical-context area network manager configuration data obtained from a virtual private network control infrastructure device, operating the hierarchical-context area network includes operating a virtual private network operating system of a first virtual private network server, the virtual private network operating system configured in accordance with virtual private network server configuration data obtained from the virtual private network control infrastructure device, operating the hierarchical-context area network manager includes registering the first virtual private network server as a component of the hierarchical-context area network in accordance with virtual private network server registration data identifying the first virtual private network server obtained by the hierarchical-context area network manager from the virtual private network control infrastructure device, operating the virtual private network operating system includes sending, by the first virtual private network server, a peering data request, to the hierarchical-context area network manager, operating the hierarchical-context area network manager includes the hierarchical-context area network manager receiving the peering data request, obtaining, responsive to the peering data request, peering data that identifies a second virtual private network server of the hierarchical-context area network as a peer of the first virtual private network server, and sending a peering data response indicating the peering data to the first virtual private network server, operating the virtual private network operating system includes receiving the peering data response, and configuring the second virtual private network server as a virtual private network infrastructure peer in the hierarchical-context area network.

Another aspect of the disclosure is a non-transitory computer-readable storage medium, comprising processor-executable instructions for operating, in response to the instructions, a hierarchical-context area network as a virtual private network infrastructure network, wherein the hierarchical-context area network includes a hierarchy of context areas. The hierarchy of context areas includes a first context level, wherein the hierarchical-context area network includes a first context area network in the first context level and a second context area network in the first context level, and a second context level that includes the first context level, wherein the hierarchical-context area network includes a third context area network in the second context level. The first context area network is allocated, in the hierarchical-context area network, a first range of Internet Protocol addresses, wherein the first range of Internet Protocol addresses includes a first Internet Protocol address allocated as a first shared Internet Protocol address for the first context area network. The first context area network includes a first virtual private network server having a second Internet Protocol address in the first range of Internet Protocol addresses, other than the first shared Internet Protocol address. The second context area network is allocated, in the hierarchical-context area network, a second range of Internet Protocol addresses, wherein the second range of Internet Protocol addresses includes a third Internet Protocol address allocated as a second shared Internet Protocol address for the second context area network. The second context area network includes a second virtual private network server having a fourth Internet Protocol address in the second range of Internet Protocol addresses, other than the second shared Internet Protocol address. Communication between the first virtual private network server and the second virtual private network server is unavailable via the first context area network. Communication between the first virtual private network server and the second virtual private network server is unavailable via the second context area network. Communication between the first virtual private network server and the second virtual private network server is available via a data link layer network established between the first virtual private network server and the second virtual private network server via the third context area network.

In the aspects described herein, operating the hierarchical-context area network includes operating a hierarchical-context area network manager at a virtual private network infrastructure administration server for managing the hierarchical-context area network, the hierarchical-context area network manager configured in accordance the hierarchical-context area network manager configuration data obtained from a virtual private network control infrastructure device, operating the hierarchical-context area network includes operating a virtual private network operating system of a first virtual private network server, the virtual private network operating system configured in accordance with virtual private network server configuration data obtained from the virtual private network control infrastructure device, operating the hierarchical-context area network manager includes registering the first virtual private network server as a component of the hierarchical-context area network in accordance with virtual private network server registration data identifying the first virtual private network server obtained by the hierarchical-context area network manager from the virtual private network control infrastructure device, operating the virtual private network operating system includes sending, by the first virtual private network server, a peering data request, to the hierarchical-context area network manager, operating the hierarchical-context area network manager includes the hierarchical-context area network manager receiving the peering data request, obtaining, responsive to the peering data request, peering data that identifies a second virtual private network server of the hierarchical-context area network as a peer of the first virtual private network server, and sending a peering data response indicating the peering data to the first virtual private network server, operating the virtual private network operating system includes receiving the peering data response, and configuring the second virtual private network server as a virtual private network infrastructure peer in the hierarchical-context area network.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

7

Figure 24:
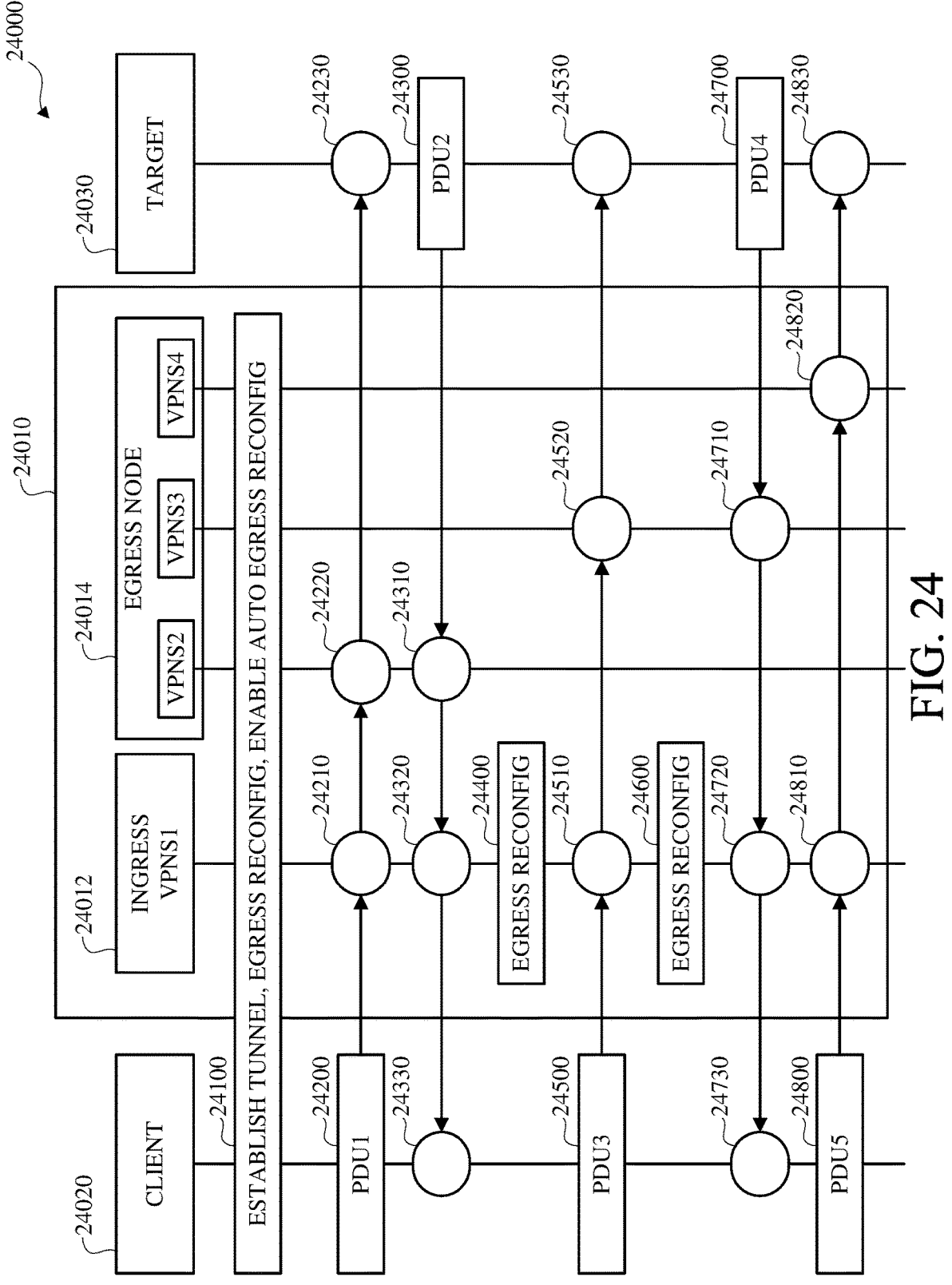

FIG. 24 is a flow diagram of an example of a method of automatic egress reconfiguration in a virtual private network infrastructure system that implements a hierarchical-context area network as a virtual private network infrastructure network.

Figure 25:
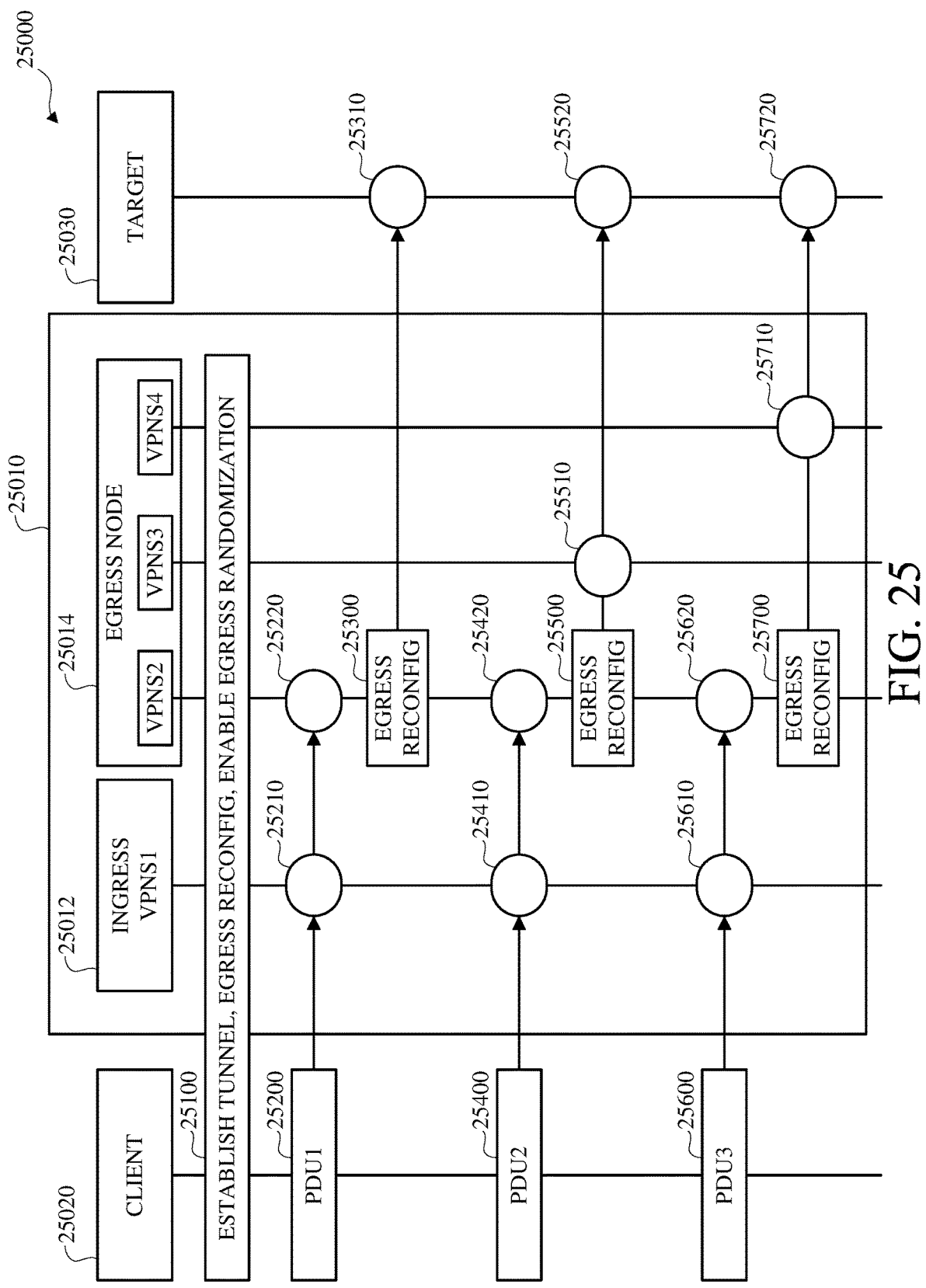

FIG. 25 is a flow diagram of an example of a method of automatic egress randomization in a virtual private network infrastructure system that implements a hierarchical-context area network as a virtual private network infrastructure network.

DETAILED DESCRIPTION

Computing communications networks, the systems and devices that use computing communications networks, and applications, services, or microservices implemented by the systems and devices that use computing communications networks may include, or implement, system features, which may include logical system features, such as applications, or application programming interfaces (APIs), services, micro-services, logical servers, such as web servers, or hardware resources, such as processing resources, memory resources, communications bandwidth resources, or any other discern-able logical or physical features, or combinations thereof. Communications transported using computing communica-tions networks may be transported via various data transport pathways, or communications paths. Service provider infra-structure systems, such as internet service providers and virtual private network providers, may identify and config-ure data transport pathways for transporting communica-tions. For example, a data transport pathway may be used to transport data sent by a client device to a target destination, which may include sending the data to the target destination, which may be an external system or an entry node thereof, via an egress, or exit, node of the service provider infra-structure system.

Some virtual private network systems may be inefficient, inflexible, unbalanced, such as with respect to resource utilization, slow, or a combination thereof. For example, in some virtual private network systems, establishing a virtual private network tunnel, or connection, with the client, or end user, device includes determining the point of ingress, at which data from the client, or end user, device enters the virtual private network system, and the point of egress, at which data from the client, or end user, device exits the virtual private network system, such that the virtual private network system has little, or no, control over the data transport pathway, which may result in sub-optimal, such as slow, data transport pathways. Changing the point of ingress or egress, to improve resource utilization in the virtual private network system, to modify data transport pathways, to improve throughput for the virtual private network tunnel, or otherwise, may be unavailable, except by disconnecting the virtual private network tunnel and connecting another virtual private network tunnel with a different point of ingress, egress, or both. The resource utilization of such systems may be relatively high, the maintenance and opera-tion of such systems may be relatively inefficient, and such systems may be inflexible, such as with respect to modifying the virtual private network system to include different or additional features or services.

In the service provider infrastructure systems described herein, to improve the performance and reliability of the service provider infrastructure systems, the service provider infrastructure system operates a hierarchical-context area network as a virtual private network infrastructure network, wherein the hierarchical-context area network includes a hierarchy of context areas. The hierarchical-context area network uses dynamic ad-hoc paths, in the absence of preconfigured paths, for transporting, or routing, data within the virtual private network infrastructure network. Using the virtual private network infrastructure network described herein increases the probability of transport via fast data-center connections, which improves communication speed, relative to other service provider infrastructure systems that have a lower probably of routing data within a data center such that the transport of such data includes relatively slow pathways. In another example, data communicated via an internet service provider, in the absence of the virtual private network infrastructure network described herein, may be routed via one or more nodes that have relatively high concurrent utilization, corresponding to relatively slow per-formance, whereas data communicated via an internet ser-vice provider and using a virtual private network infrastruc-ture network as described herein may be routed via nodes of the virtual private network infrastructure network, thereby improving communication performance.

Using the virtual private network infrastructure network described herein reduces resource utilization, such as the utilization of IP addresses by reusing IP addresses. Using the virtual private network infrastructure network described herein reduces network configuration communication resource utilization by omitting the exchange of the IP addresses of VPN servers wherein multiple VPN servers use a shared IP address. Using the virtual private network infrastructure network described herein increases resource allocation control by controlling the prioritization of traffic within the network in accordance with predefined routing, or forwarding, rules. Using the virtual private network infra-structure network described herein reduces the number, or cardinality, of VPN servers by providing for dynamic, ad-hoc, connection between disparate, such as geographi-cally, disparate, VPN serves. Using the virtual private net-work infrastructure network described herein improves the manageability of the VPN service provider network. Using the virtual private network infrastructure network described herein increases end-to-end throughput for end user devices communicating with a target device external to the VPN service provider network via the VPN service provider network by dynamically, such as ad-hoc, reconfiguring the point of egress to a relatively fast node, or group of nodes, in the VPN service provider network, without interruption, or reconnection, of the VPN tunnel connecting the end user device and the VPN service provider network.

Figure 1:
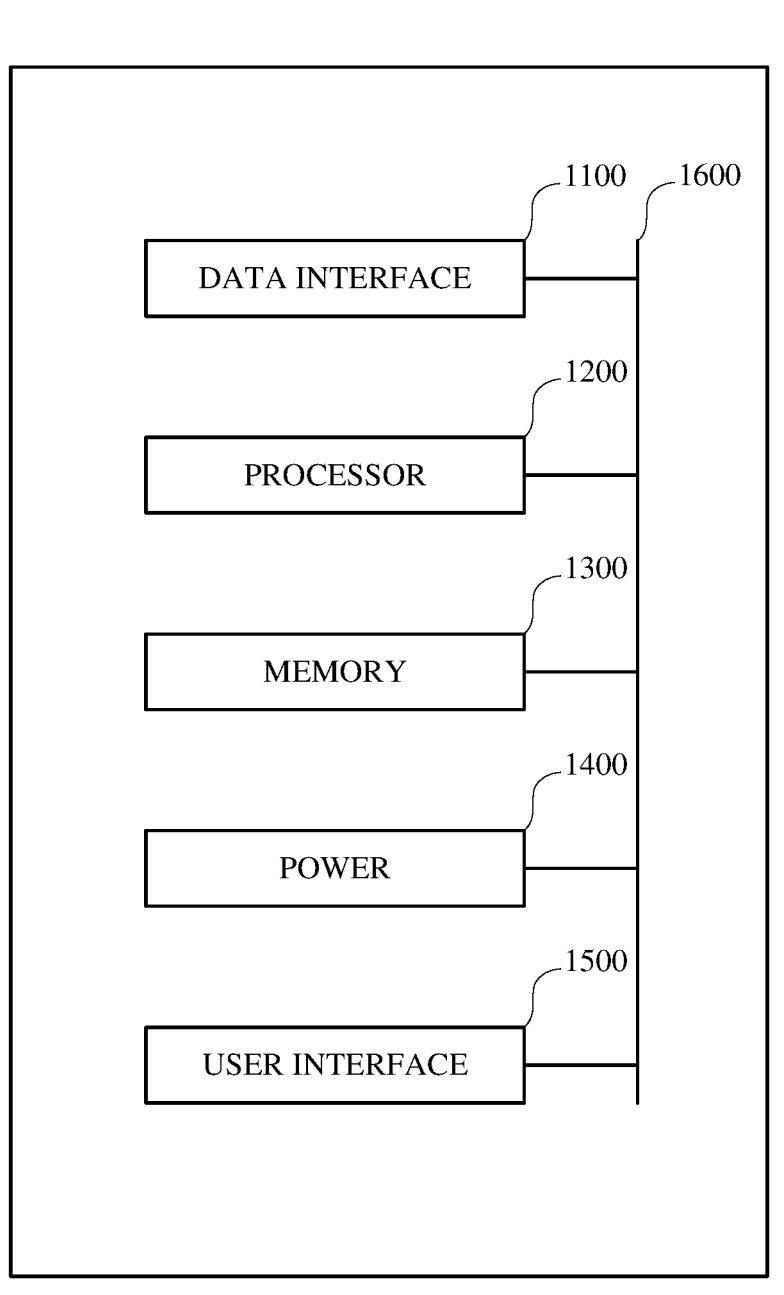
FIG. 1 is a block diagram of an example of a computing device.

FIG. 1 is a block diagram of an example of a computing device 1000. The computing device 1000 may implement, execute, or perform, one or more aspects of the methods and techniques described herein. The computing device 1000 includes a data interface 1100, a processor 1200, memory 1300, a power component 1400, a user interface 1500, and a bus 1600 (collectively, components of the computing device 1000). Although shown as a distinct unit, one or more of the components of the computing device 1000 may be integrated into respective distinct physical units. For example, the processor 1200 may be integrated in a first physical unit and the user interface 1500 may be integrated in a second physical unit. The computing device 1000 may include aspects or components not expressly shown in FIG. 1, such as an enclosure or one or more sensors.

In some implementations, the computing device 1000 is a stationary device, such as a personal computer (PC), a router, a network-attached storage (NAS) device, an Inter-net-of-Things device, a printer, a scanner, a server, a work-station, a minicomputer, or a mainframe computer. In some implementations, the computing device 1000 is a mobile device, such as a mobile telephone, a personal digital assistant (PDA), a laptop, or a tablet computer. In some implementations, the computing device 1000 may be a smart device, such as a smart home appliance, a smart home security system device, an autonomous vehicle, a smart health monitor, a smart factory equipment device, or a wireless inventory tracker.

The data interface 1100 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 1100 may include, or may be, a transceiver. Although not shown separately in FIG. 1, the data interface 1100 may include, or may be operatively coupled with, an antenna for wireless electronic communication. Although not shown separately in FIG. 1, the data interface 1100 may include, or may be operatively coupled with, a wired electronic communication port, such as an Ethernet port, a serial port, or another wired port, that may interface with, or may be operatively coupled to, a wired electronic communication medium. In some implementations, the data interface 1100 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 1000, or one or more of the components thereof, and one or more external electronic or computing devices. Although shown as one unit in FIG. 1, the data interface 1100 may include multiple physical components, such as a wired data interface and a wireless data interface.

For example, the computing device 1000 may electronically communicate, such as transmit, receive, or exchange computer accessible data, with one or more other computing devices via one or more wired or wireless communication links, or connections, such as via a network, using the data interface 1100, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 1200 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 1200 is implemented as a central processing unit (CPU), such as a microprocessor. In some implementations, the processor 1200 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 1200 includes one or more processing units. A processing unit may include one or more processing cores. The computing device 1000 may include multiple physical or virtual processing units (collectively, the processor 1200), which may be interconnected, such as via wired, or hardwired, connections, via wireless connections, or via a combination of wired and wireless connections. In some implementations, the processor 1200 is implemented in a distributed configuration including multiple physical devices or units that may be coupled directly or across a network. The processor 1200 includes internal memory (not expressly shown), such as a cache, a buffer, a register, or a combination thereof, for internal storage of data, such as operative data, instructions, or both. For example, the processor 1200 may read data from the memory 1300 into the internal memory (not shown) for processing.

The memory 1300 is a non-transitory computer-usable or computer-readable medium, implemented as a tangible device or component of a device. The memory 1300 contains, stores, communicates, transports, or a combination thereof, data, such as operative data, instructions, or both. For example, the memory 1300 stores an operating system of the computing device 1000, or a portion thereof. The memory 1300 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 1300 may include non-volatile memory, such as a disk drive, or another form of non-volatile memory capable of persistent electronic data storage, such as in the absence of an active power supply. The memory 1300 may include, or may be implemented as, one or more physical or logical units.

The memory 1300 stores executable (processor-executable) instructions or data, such as application data, an operating system, or a combination thereof, for access, such as read access, write access, or both, by the other components of the computing device 1000, such as by the processor 1200. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 1300 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 1400 obtains, stores, or both, power, or energy, used by the components of the computing device 1000 to operate. The power component 1400 may be implemented as a general-purpose alternating-current (AC) electric power supply, or as a power supply interface, such as an interface to a household power source or other external power distribution system. In some implementations, the power component 1400 may be implemented as a single use battery or a rechargeable battery such that the computing device 1000 operates, or partially operates, independently of an external power distribution system. For example, the power component 1400 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 1000.

The user interface 1500 includes one or more units or devices for interfacing with an operator of the computing device 1000, such as a human user. In some implementations, the user interface 1500 obtains, receives, captures, detects, or otherwise accesses, data representing user input to the computing device, such as via physical interaction with the computing device 1000. In some implementations, the user interface 1500 outputs, presents, displays, or otherwise makes available, information, such as to an operator of the computing device 1000, such as a human user.

The user interface 1500 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, the physical user interface 1500 may be omitted, or absent, from the computing device 1000.

The bus 1600 distributes or transports data, power, or both among the components of the computing device 1000 such that the components of the computing device are operatively connected. Although the bus 1600 is shown as one component in FIG. 1, the computing device 1000 may include multiple busses, which may be connected, such as via bridges, controllers, or adapters. For example, the bus 1600 may be implemented as, or may include, a data bus and a power bus. The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 1000.

Although not shown separately in FIG. 1, data interface 1100, the power component 1400, or the user interface 1500 may include internal memory, such as an internal buffer or register.

Although an example of a configuration of the computing device 1000 is shown in FIG. 1, other configurations may be used. One or more of the components of the computing device 1000 may be omitted, or absent, from the computing device 1000 or may be combined or integrated. For example, the memory 1300, or a portion thereof, and the processor 1200 may be combined, such as by using a system on a chip design.

Figure 2:
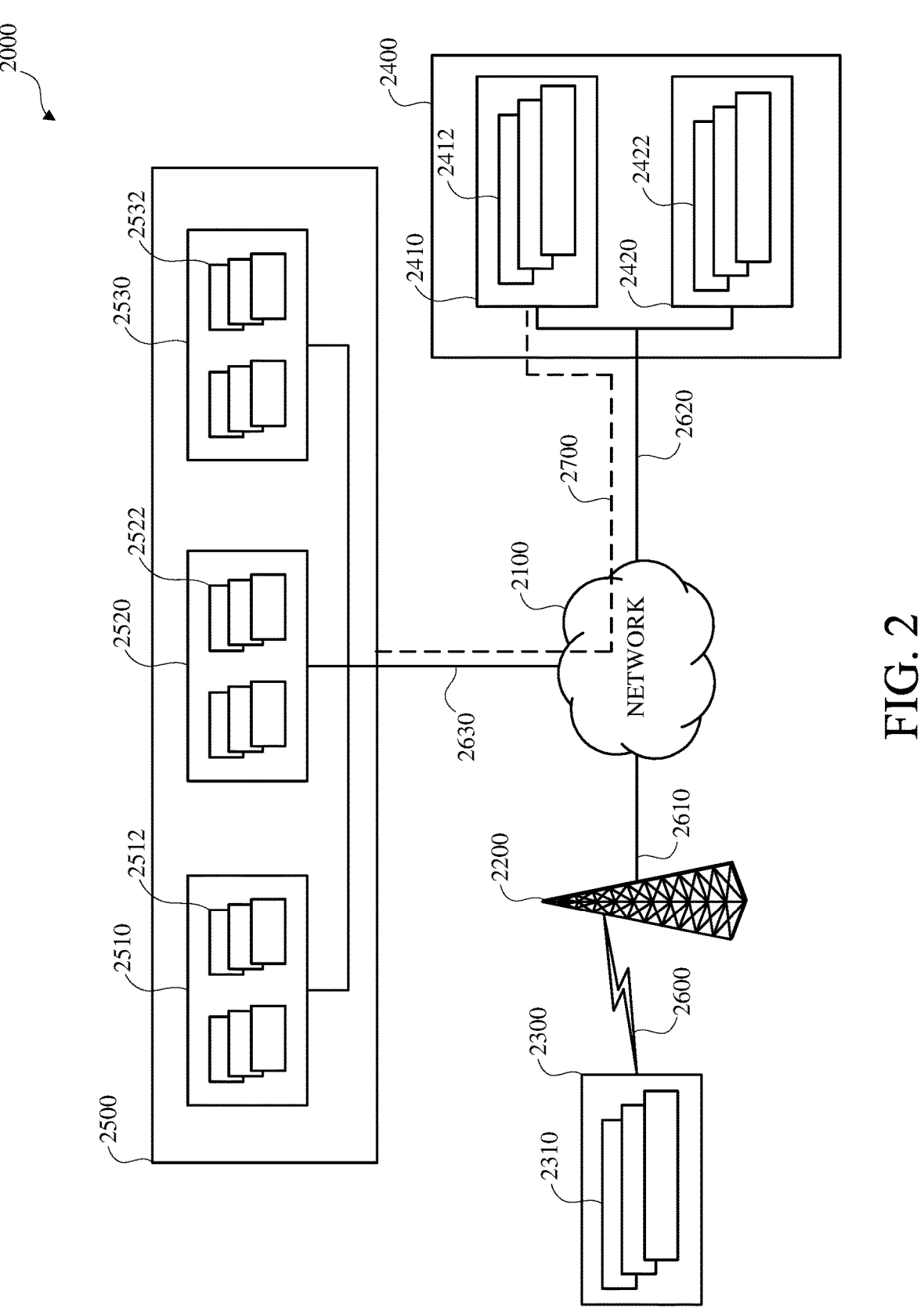
FIG. 2 is a block diagram of an example of a computing and communications system.

FIG. 2 is a block diagram of an example of a computing and communications system 2000. The computing and communications system 2000 includes a first network 2100, an access point 2200, a first computing and communications device 2300, a second network 2400, and a third network 2500. The second network 2400 includes a second computing and communications device 2410 and a third computing and communications device 2420. The third network 2500 includes a fourth computing and communications device 2510, a fifth computing and communications device 2520, and a sixth computing and communications device 2530. Other configurations, including fewer or more computing and communications devices, fewer or more networks, and fewer or more access points, may be used.

One or more of the networks 2100, 2400, 2500 may be, or may include, a local area network (LAN), wide area network (WAN), virtual private network (VPN), a mobile or cellular telephone network, the Internet, or any other means of electronic communication. The networks 2100, 2400, 2500 respectively transmit, receive, convey, carry, or exchange wired or wireless electronic communications using one or more communications protocols, or combinations of communications protocols, the transmission control protocol (TCP), the user datagram protocol (UDP), the internet protocol (IP), the real-time transport protocol (RTP), the HyperText Transport Protocol (HTTP), or a combination thereof. For example, a respective network 2100, 2400, 2500, or respective portions thereof, may be, or may include a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 2200 may be implemented as, or may include, a base station, a base transceiver station (BTS), a Node-B, an enhanced Node-B (eNode-B), a Home Node-B (HNode-B), a wireless router, a wired router, a hub, a relay, a switch, a bridge, or any similar wired or wireless device. Although the access point 2200 is shown as a single unit, an access point can include any number of interconnected elements. Although one access point 2200 is shown, fewer or more access points may be used. The access point 2200 may communicate with other communicating devices via wired or wireless electronic communications links or via a sequence of such links.

As shown, the access point 2200 communicates via a first communications link 2600 with the first computing and communications device 2300. Although the first communications link 2600 is shown as wireless, the first communications link 2600 may be implemented as, or may include, one or more wired or wireless electronic communications links or a sequence of such links, which may include parallel communications links for multipath communications.

As shown, the access point 2200 communicates via a second communications link 2610 with the first network 2100. Although the second communications link 2610 is shown as wired, the second communications link 2610 may be implemented as, or may include, one or more wired or wireless electronic communications links or a sequence of such links, which may include parallel communications links for multipath communications.

As shown, the first network 2100 communicates with the second network 2400 via a third communications link 2620. Although the third communications link 2620 is shown as wired, the third communications link 2620 may be implemented as, or may include, one or more wired or wireless electronic communications links or a sequence of such links, which may include parallel communications links for multipath communications.

As shown, the first network 2100 communicates with the third network 2500 via a fourth communications link 2630. Although the fourth communications link 2630 is shown as wired, the fourth communications link 2630 may be implemented as, or may include, one or more wired or wireless electronic communications links or a sequence of such links, which may include parallel communications links for multipath communications.

The computing and communications devices 2300, 2410, 2420, 2510, 2520, 2530 are, respectively, computing devices, such as the computing device 1000 shown in FIG. 1. For example, the first computing and communications device 2300 may be a user device, such as a mobile computing device or a smartphone, the second computing and communications device 2410 may be a user device, such as a laptop, the third computing and communications device 2420 may be a user device, such as a desktop, the fourth computing and communications device 2510 may be a server, such as a database server, the fifth computing and communications device 2530 may be a server, such as a cluster or a mainframe, and the sixth computing and communications device 2530 may be a server, such as a web server.

The computing and communications devices 2300, 2410, 2420, 2510, 2520, 2530 communicate, or exchange data, such as voice communications, audio communications, data communications, video communications, messaging communications, broadcast communications, or a combination thereof, with one or more of the other computing and communications devices 2300, 2410, 2420, 2510, 2520, 2530 respectively using one or more of the networks 2100, 2400, 2500, which may include communicating using the access point 2200, via one or more of the communication links 2600, 2610, 2620, 2630.

For example, the first computing and communications device 2300 may communicate with the second computing and communications device 2410, the third computing and communications device 2420, or both, via the first communications link 2600, the access point 2200, the second communications link 2610, the network 2100, the third communications link 2620, and the second network 2400. The first computing and communications device 2300 may communicate with one or more of the third computing and communications device 2510, the fourth computing and communications device 2520, the fifth computing and communications device 2530, via the first communications link 2600, the access point 2200, the second communications link 2610, the network 2100, the fourth communications link 2630, and the third network 2500.

For simplicity and clarity, the sequence of communications links, access points, networks, and other communications devices between a sending communicating device and a receiving communicating device may be referred to herein as a communications path or a data transport pathway. For example, the first computing and communications device 2300 may send data to the second computing and communications device 2410 via a first communications path, or via a combination of communications paths including the first communications path, and the second computing and communications device 2410 may send data to the first computing and communications device 2300 via the first communications path, via a second communications path, or via a combination of communications paths, which may include the first communications path.

The first computing and communications device 2300 includes, such as executes, performs, or operates, one or more applications, or services, 2310. The second computing and communications device 2410 includes, such as executes, performs, or operates, one or more applications, or services, 2412. The third computing and communications device 2420 includes, such as executes, performs, or operates, one or more applications, or services, 2422. The fourth computing and communications device 2510 includes, such as stores, hosts, executes, performs, or operates, one or more documents, applications, or services, 2512. The fifth computing and communications device 2520 includes, such as stores, hosts, executes, performs, or operates, one or more documents, applications, or services, 2522. The sixth computing and communications device 2530 includes, such as stores, hosts, executes, performs, or operates, one or more documents, applications, or services, 2532.

In some implementations, one or more of the computing and communications devices 2300, 2410, 2420, 2510, 2520, 2530 may communicate with one or more other computing and communications devices 2300, 2410, 2420, 2510, 2520, 2530, or with one or more of the networks 2400, 2500, via a virtual private network. For example, the second computing and communications device 2410 is shown as communicating with the third network 2500, and therefore with one or more of the computing and communications devices 2510, 2520, 2530 in the third network 2500, via a virtual private network 2700, which is shown using a broken line to indicate that the virtual private network 2700 uses the first network 2100, the third communications link 2620, and the fourth communications link 2630.

In some implementations, two or more of the computing and communications devices 2300, 2410, 2420, 2510, 2520, 2530 may be in a distributed, or clustered, configuration. For example, the third computing and communications device 2510, the fourth computing and communications device 2520, and the fifth computing and communications device 2530 may, respectively, be elements, or nodes, in a distributed configuration.

In some implementations, one or more of the computing and communications devices 2300, 2410, 2420, 2510, 2520, 2530 may be a virtual device. For example, the third computing and communications device 2510, the fourth computing and communications device 2520, and the fifth computing and communications device 2530 may, respectively, be virtual devices operating on shared physical resources.

Figure 3:
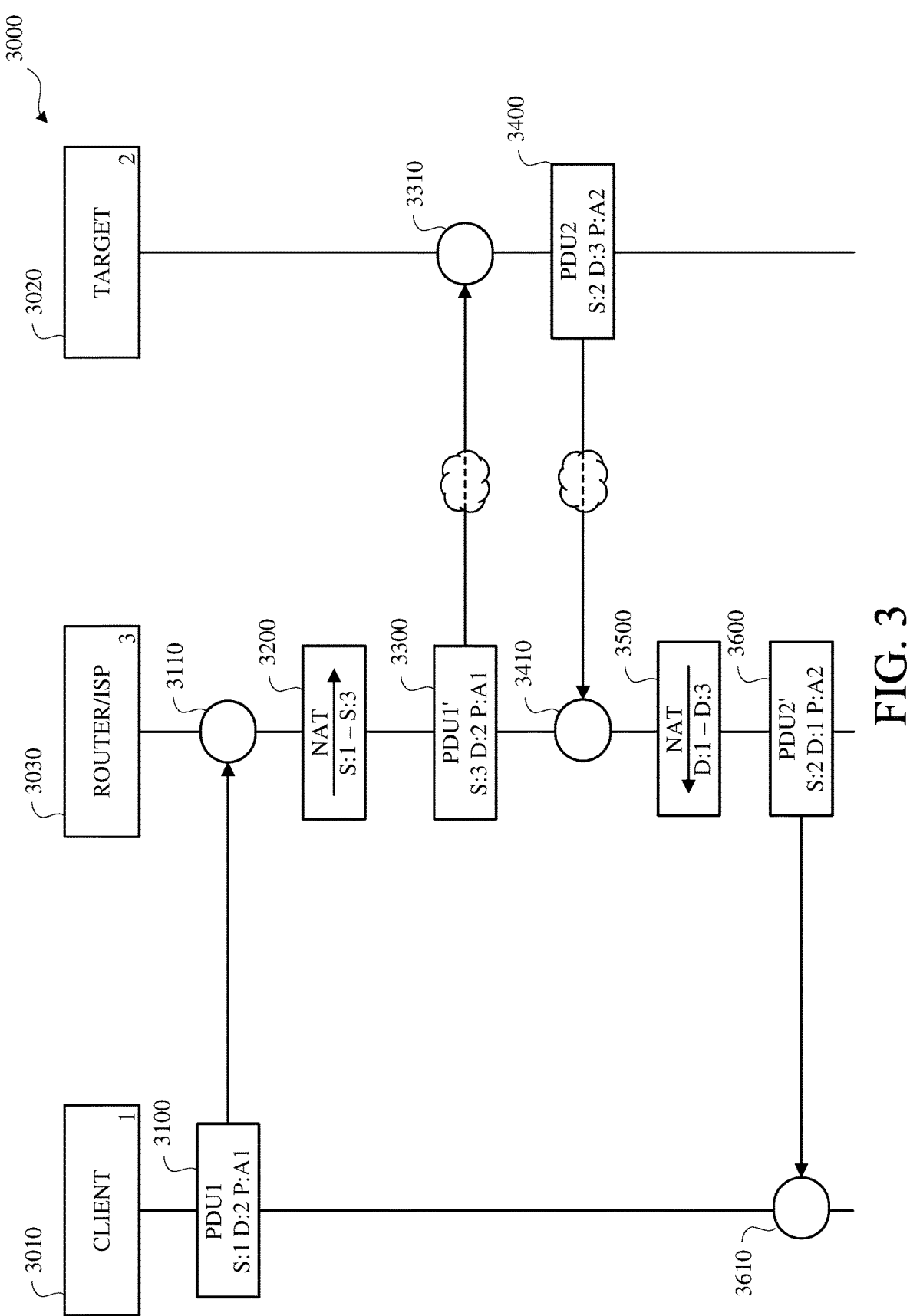
FIG. 3 is a flow diagram of an example of protocol data unit routing.

FIG. 3 is a flow diagram of an example of protocol data unit routing 3000. Protocol data unit routing 3000 includes routing of protocol data units between a client device of a client system 3010 and a target system 3020 via an Internet service provider system 3030 including a router (ROUTER/ISP).

The client device of the client system 3010 is a computing device, such as the computing device 1000 shown in FIG. 1, or the computing and communications device 2300 shown in FIG. 2. The client device of the client system 3010 has, or is identifiable by, an assigned, or allocated, such as by the Internet service provider (ISP) system 3030, IP address, which is represented in FIG. 3 by the number one (1) for simplicity. The IP address associated with the client system 3010 (1) may be a private, or local, IP address.

The target system 3020 is, or includes, one or more components, such as a target device, which are computing devices, such as the computing device 1000 shown in FIG. 1, or one or more of the computing and communications devices 2410, 2420 shown in FIG. 2. The target system 3020, or a component thereof, has, or is identifiable by, an assigned, or allocated, IP address, which is represented in FIG. 3 by the number two (2) for simplicity. The IP address associated with the target system 3020 (2) may be a public, or globally unique, IP address.

The ISP system 3030 is, or includes, one or more components, which are computing devices, such as the computing device 1000 shown in FIG. 1. The ISP system 3030 includes a router. A component of the ISP system 3030, such as the router, has, or is identifiable by, an assigned, or allocated, IP address, which is represented in FIG. 3 by the number three (3) for simplicity. The IP address associated with the ISP system 3030 (3) may be a public, or globally unique, IP address.

The ISP system 3030, or a component thereof, such as the router, is assigned, identified, or configured, at, or in, the client system 3010, such as at, or in, the client device, as a next-hop for communicating with remote, or external, devices, or systems, outside the client system 3010, such as the target system 3020, or a component thereof, such as via the Internet. The ISP system 3030, or a component thereof, such as the router, is assigned, identified, or configured, at, or in, the client system 3010, such as at, or in, the client device, as a default gateway for communicating with remote, or external, devices, or systems, outside the client system 3010, such as the target system 3020, or a component thereof, such as via the Internet.

The client device of the client system 3010, or a component thereof, generates, writes, or otherwise obtains, a first protocol data unit (at 3100). The first protocol data unit (PDU1) includes source identification data identifying the client device of the client system 3010 as the source (S) of the first protocol data unit using, or including, the IP address of the client device of the client system 3010 (1) as a source IP address (S:1). In some implementations, the source identification data may include port data, such as a port identifier. The first protocol data unit includes destination identification data identifying the target system 3020, or a component thereof, as the destination (D) of the first protocol data unit using, or including, the IP address of the target system 3020 as a destination IP address (D:2). The first protocol data unit includes payload data (P) including data, which may be application layer data (A1), communicated in, or by, the first protocol data unit (P:A1). In some implementations, the destination identification data may include port data, such as a port identifier.

The term "application layer" is used herein for simplicity to refer to the open system interconnection model application layer, the open system interconnection model presentation layer, the open system interconnection model session layer, the transmission control protocol/internet protocol (TCP/IP) suite application layer, comparable layers in other communications protocols, or a combination thereof, as is described herein or as is otherwise clear from context.

The client device of the client system 3010, or a component thereof, sends, transmits, or otherwise makes available, the first protocol data unit to the target system 3020, or a component thereof, via the Internet by sending, transmitting, or otherwise making available, the first protocol data unit to the ISP system 3030, such as to the router, (at 3100).

The ISP system 3030 receives, reads, or otherwise accesses, the first protocol data unit (at 3110).

The ISP system 3030, or a component thereof, implements, or performs, Network Address Translation (NAT).

Network Address Translation includes storing, recording, or otherwise saving, network address translation data, or network address translation mapping data, such as table data, including pairs, or tuples, of local IP addresses and globally unique addresses, which may be IP addresses. In some implementations, the network address translation data may include port data associated with the respective addresses. A pair, or tuple, in the network address translation data maps the local IP address of the pair, or tuple, to the globally unique address of the pair, or tuple. The network address translation data may include, or may be, data associating a respective pair, or tuple, of addresses with data identifying a connection, or active connection, between a device, or system, identifiable by the local IP address of the pair and a device, or system, identifiably by the globally unique address of the pair. A respective active connection may be unambiguously identifiable using, or in accordance with, the network address translation data.

Network Address Translation includes modifying, or replacing, IP address data, such as a source IP address or a destination IP address, of a protocol data unit, such as in response to receiving the protocol data unit and prior to forwarding, sending, or transmitting the protocol data unit.

For an outgoing protocol data unit that includes a local IP address as the source IP address, Network Address Translation (outgoing, or outbound, Network Address Translation) includes replacing the source IP address of the protocol data unit with a globally unique address, such as a globally unique address associated with the system, or device, implementing, or performing, Network Address Translation.

For an incoming, inbound, or reply, protocol data unit that includes the globally unique address associated with the system, or device, implementing Network Address Translation as the destination IP address, Network Address Translation (incoming, or inbound, Network Address Translation) includes replacing the destination IP address of the protocol data unit with a local IP address. The system, or device, implementing, or performing, Network Address Translation identifies, determines, or otherwise obtains, the local IP address, to use as the destination IP address, from the network address translation data.

The ISP system 3030, or a component thereof, implements, or performs, outbound, or outgoing, Network Address Translation (NAT) for the first protocol data unit (at 3200) to obtain a modified first protocol data unit, such as in response to receiving the first protocol data unit (at 3110). The ISP system 3030, or the component thereof that implements, or performs, Network Address Translation (NAT), stores, records, or otherwise saves, network address translation data including a pair, or tuple, of the IP address (1) of the client system (3010) and the IP address of the target system 3020 (2), which may include storing corresponding port data. The ISP system 3030, or the component thereof that implements, or performs, Network Address Translation (NAT), modifies, replaces, alters, or otherwise changes, the source IP address (S) of the first protocol data unit from the IP address (1) of the client system (3010) to the globally unique address (3) of the ISP system 3030.

Subsequent to performing outgoing, or outbound, Network Address Translation (at 3200), the ISP system 3030, or a component thereof, such as the router, sends, transmits, or otherwise makes available, the modified first protocol data unit (PDU1') to the target system 3020 (at 3300), such as via the Internet.

The target system 3020, or a component thereof, receives, reads, obtains, or otherwise accesses, the modified first protocol data unit (at 3310).

Subsequent to receiving the modified first protocol data unit (at 3310), the target system 3020, or a component thereof, generates, writes, or otherwise obtains, a second protocol data unit (at 3400). The second protocol data unit includes source identification data identifying the target system 3020 as the source (S) of the second protocol data unit using, or including, the IP address of the target system 3020 (2) as a source IP address (S:2). In some implementations, the source identification data may include port data, such as a port identifier. The second protocol data unit includes destination identification data identifying the ISP system 3030, or a component thereof, such as the router, as the destination (D) of the second protocol data unit using, or including, the IP address of the ISP system 3030, or a component thereof, such as the router, as the destination IP address (D:3). The second protocol data unit includes payload data (P) including data, which may be application layer data (A2), communicated in, or by, the second protocol data unit (P:A2). In some implementations, the destination identification data may include port data, such as a port identifier.

The target system 3020, or a component thereof, sends, transmits, or otherwise makes available, the second protocol data unit (PDU2) to the ISP system 3030 (at 3400), such as via the Internet.

The ISP system 3030, or a component thereof, such as the router, receives, reads, obtains, or otherwise accesses, the second protocol data unit (at 3410).

Subsequent to receiving the second protocol data unit (at 3410), the ISP system 3030, or a component thereof, such as the router, performs inbound, or incoming, Network Address Translation for the second protocol data unit (at 3500) to obtain a modified second protocol data unit. The ISP system 3030, or a component thereof, such as the router, identifies, determines, or otherwise obtains, the IP address of the client system 3010 (1) from the Network Address Translation data corresponding to the active connection between the client system 3010 and the target system 3020, including the pair, or tuple, associating, or mapping, the IP address of the client system 3010 (1) to the IP address of the target system (2). The ISP system 3030, or a component thereof, such as the router, modifies, replaces, alters, or otherwise changes, the destination IP address (D) of the second protocol data unit from the IP address of the ISP system 3030 (3) to the IP address of the client system 3010 (1).

Subsequent to modifying the second protocol data unit (at 3500), the ISP system 3030, or a component thereof, such as the router, sends, transmits, or otherwise makes available, the modified second protocol data unit (PDU2') to the client system 3010 (at 3600).

The client system 3010, or a component thereof, receives, reads, obtains, or otherwise accesses, the modified second protocol data unit (at 3610). The client system 3010, or a component thereof, reads, extracts, or otherwise accesses, the payload data (A2) from the second protocol data unit.

Figure 4:
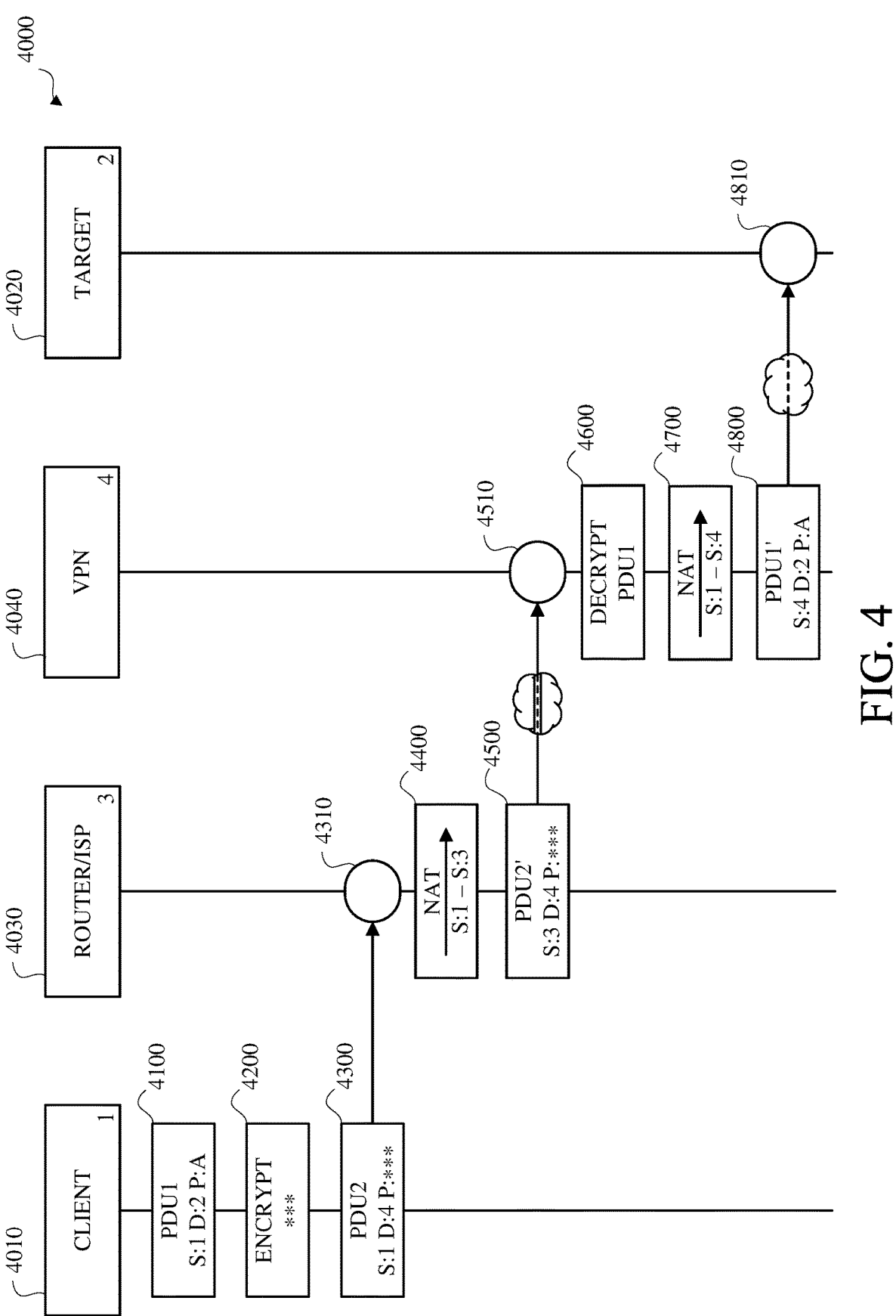
FIG. 4 is a flow diagram of an example of an outbound portion of protocol data unit routing using a virtual private network.
Figure 5:
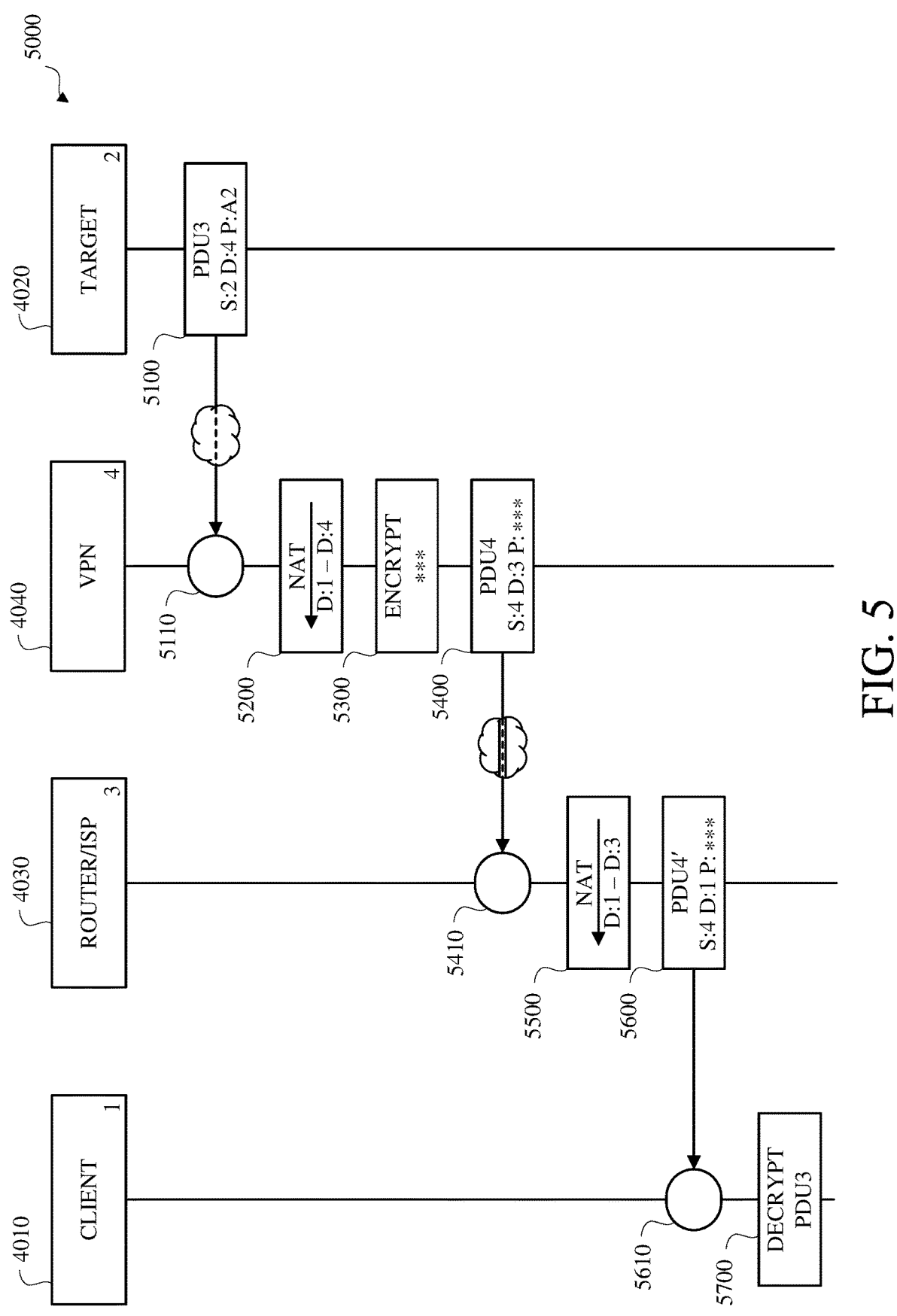
FIG. 5 is a flow diagram of an example of an inbound portion of protocol data unit routing using a virtual private network.

FIGS. 4-5 show a flow diagram of an example of protocol data unit routing using a virtual private network. Protocol data unit routing using a virtual private network includes an outbound portion shown in FIG. 4 and an inbound portion shown in FIG. 5. Protocol data unit routing as shown in FIGS. 4-5 is similar to the protocol data unit routing 3000 shown in FIG. 3, except as is described herein or as is otherwise clear from context. For example, the protocol data unit routing shown in FIGS. 4-5 includes using a virtual private network.

FIG. 4 is a flow diagram of an example of an outbound portion 4000 of protocol data unit routing using a virtual private network. The outbound portion 4000 of protocol data unit routing includes routing of one or more protocol data units between a client device of a client system 4010 and a target system 4020 via an ISP system 4030 including a router (ROUTER/ISP) using a virtual private network implemented by a VPN system 4040. Although shown separately, in some implementations, the client device of the client system 4010 may be implemented on a physical, such as hardware, device that implements the router.

The client device of the client system 4010 is a computing device, or a computing and communications device, such as the computing device 1000 shown in FIG. 1, or the computing and communications device 2300 shown in FIG. 2. The client device of the client system 4010 has, or is identifiable by, an assigned, or allocated, such as by the ISP system 4030, IP address, which is represented in FIG. 4 by the number one (1) for simplicity. The IP address associated with the client system 4010 (1) may be a private, or local, IP address. The client device of the client system 4010 is similar to the client device of the client system 3010 shown in FIG. 3, except as is described herein or as is otherwise clear from context. For example, the client device of the client system 4010 includes, implements, or operates, a VPN client component.

The target system 4020 is, or includes, one or more components, such as a target device, which are computing devices, or computing and communications devices, such as the computing device 1000 shown in FIG. 1, or one or more of the computing and communications devices 2410, 2420 shown in FIG. 2. The target system 4020, or a component thereof, has, or is identifiable by, an assigned, or allocated, IP address, which is represented in FIG. 4 by the number two (2) for simplicity. The IP address associated with the target system 4020 (2) may be a public, or globally unique, IP address. The target system 4020 is similar to the target system 3020 shown in FIG. 3, except as is described herein or as is otherwise clear from context.

The ISP system 4030 is, or includes, one or more components, which are computing devices, or computing and communications devices, such as the computing device 1000 shown in FIG. 1. The ISP system 4030 includes a router. A component of the ISP system 4030, such as the router, has, or is identifiable by, an assigned, or allocated, IP address, which is represented in FIG. 4 by the number three (3) for simplicity. The IP address associated with the ISP system 4030 (3) may be a public, or globally unique, IP address. The ISP system 4030 is similar to the ISP system 3030 shown in FIG. 3, except as is described herein or as is otherwise clear from context.

The VPN system 4040 is, or includes, one or more components, which are computing devices, or computing and communications devices, such as the computing device 1000 shown in FIG. 1, or one or more of the computing and communications devices 2300, 2410, 2420, 2510, 2520, 2530 shown in FIG. 2. A component of the VPN system 4040 is a VPN server that has, or is identifiable by, an assigned, or allocated, IP address, which is represented in FIG. 4 by the number four (4) for simplicity.

Although not shown in FIGS. 4-5, prior to the portions of protocol data unit routing shown in FIGS. 4-5, the client device of the client system 4010, or a component thereof, such as the VPN client component, establishes, operates, or otherwise obtains, an active VPN tunnel, or connection, with the VPN server of the VPN system 4040, via the network connection implemented, operated, or otherwise provided, by the ISP system 4030.

The VPN server of the VPN system 4040 is the ingress, or entry, server for the VPN tunnel, indicating that the VPN server of the VPN system 4040 is the first component of the VPN system 4040, other than the VPN client component of the client device of the client system 4010, to receive, process, obtain, or otherwise access, data, such as protocol data units, sent from the client system 4010 via the VPN system 4040, the last component of the VPN system 4040, other than the VPN client component of the client device of the client system 4010, to receive, process, obtain, or otherwise access, data, such as protocol data units, sent to the client system 4010 via the VPN system 4040, or both.

In some implementations, descriptions of a VPN server obtaining, receiving, or otherwise accessing, a protocol data unit, such as a packet, from a device, such as an end user device, via a VPN tunnel between the VPN server and the device may include the VPN server obtaining, receiving, or otherwise accessing, the protocol data unit via another VPN server of the VPNI system operating as the ingress, edge, or entry node with respect to the VPN tunnel, except as is described herein or as is otherwise clear from context. In some implementations, descriptions of a VPN server sending, transmitting, or otherwise making available, a protocol data unit, such as a packet, to a device, such as an end user device, via a VPN tunnel between the VPN server and the device may include the VPN server sending, transmitting, or otherwise making available, the protocol data unit to the device via another VPN server of the VPNI system operating as the ingress, edge, or entry node with respect to the VPN tunnel, except as is described herein or as is otherwise clear from context. Although a protocol data unit is described as received, obtained, or otherwise accessed, by a VPN server from a device, such as an end user device, via a VPN tunnel, for simplicity, the protocol data unit may be received, obtained, or otherwise accessed, by the VPN server from a component of the VPNI system wherein the protocol data unit is associated with the VPN tunnel, the device, or both.

The VPN server of the VPN system 4040 is the egress, or exit, server (point of egress) for the VPN tunnel, indicating that the VPN server of the VPN system 4040 is the first component of the VPN system 4040 to receive, process, obtain, or otherwise access, data, such as protocol data units, sent to the client system 4010 via the VPN system 4040, the last component of the VPN system 4040, other than the VPN client component of the client device of the client system 4010, to receive, process, obtain, or otherwise access, data, such as protocol data units, sent from the client system 4010 via the VPN system 4040, or both.

The VPN tunnel may be referred to as a proxy tunnel, wherein the VPN server of the VPN system 4040 operates a proxy for the client system 4010, or a component thereof.

The client device of the client system 4010, or a component thereof, generates, writes, or otherwise obtains, a first protocol data unit (at 4100). The first protocol data unit (PDU1) includes source identification data identifying the client device of the client system 4010 as the source (S) of the first protocol data unit using, or including, the IP address of the client device of the client system 4010 (1) as a source IP address (S:1). In some implementations, the source identification data may include port data, such as a port identifier. The first protocol data unit includes destination identification data identifying the target system 4020, or a component thereof, as the destination (D) of the first protocol data unit using, or including, the IP address of the target system 4020 as a destination IP address (D:2). The first protocol data unit includes payload data (P) including data, which may be application layer data (A), communicated in, or by, the first protocol data unit (P:A). In some implementations, the destination identification data may include port data, such as a port identifier.

The client device of the client system 4010, or a component thereof, such as the VPN client component, generates, creates, or otherwise obtains, first encrypted data (* or encrypted first protocol data unit) by encrypting the first protocol data unit (at 4200). Encrypting the first protocol data unit may include encrypting the first protocol data unit using a cryptographic key, such as a public key of a cryptographic key pair of the VPN system 4040. A corresponding private key of the cryptographic key pair of the VPN system 4040 is accessible, available, or usable, by the VPN system 4040**, or one or more components thereof, and is otherwise unavailable, inaccessible, or unusable.

The client device of the client system 4010, or a component thereof, such as the VPN client component, generates, writes, or otherwise obtains, a second protocol data unit encapsulating the encrypted first protocol data unit (at 4300). The second protocol data unit (PDU2) includes source identification data identifying the client device of the client system 4010 as the source (S) of the second protocol data unit using, or including, the IP address of the client device of the client system 4010 (1) as a source IP address (S:1). In some implementations, the source identification data may include port data, such as a port identifier. The second protocol data unit includes destination identification data identifying the VPN server of the VPN system 4040, or a component thereof, as the destination (D) of the second protocol data unit using, or including, the IP address of the VPN server of the VPN system 4040 as a destination IP address (D:4). The second protocol data unit includes payload data (P) including the encrypted data (*), communicated in, or by, the second protocol data unit (P:*). In some implementations, the destination identification data may include port data, such as a port identifier. In some implementations, encryption (at 4200) may be omitted, and the first protocol data unit may be included, or encapsulated, as the payload in the second protocol data unit.

The client device of the client system 4010, or a component thereof, such as the VPN client component, sends, transmits, or otherwise makes available, the second protocol data unit to the VPN server of the VPN system 4040, or a component thereof, by sending, transmitting, or otherwise making available, the second protocol data unit to the ISP system 4030, such as to the router, via the VPN tunnel (at 4300).

The ISP system 4030 receives, reads, or otherwise accesses, the second protocol data unit (at 4310).

The ISP system 4030, or a component thereof, implements, or performs, Network Address Translation (NAT) for the second protocol data unit (at 4400) to obtain a modified second protocol data unit, such as in response to receiving the second protocol data unit (at 4310). The ISP system 4030, or the component thereof that implements, or performs, Network Address Translation (NAT), stores, records, or otherwise saves, network address translation data including a pair, or tuple, of the IP address (1) of the client system (3010) and the IP address (4) of the VPN system 4040, or a component thereof, such as the VPN server, which may include storing corresponding port data. The ISP system 4030, or the component thereof that implements, or performs, Network Address Translation (NAT), modifies, replaces, alters, or otherwise changes, the source IP address (S) of the second protocol data unit from the IP address (1) of the client system 4010 to the globally unique address (3) of the ISP system 4030.

Subsequent to performing outbound, or outgoing, Network Address Translation (at 4400), the ISP system 4030, or a component thereof, such as the router, sends, transmits, or otherwise makes available, the modified second protocol data unit (PDU2') to the VPN server of the VPN system 4040 (at 4500), such as via the Internet. In some implementations, Network Address Translation (at 4400) may be omitted and the ISP system 4030, or a component thereof, such as the router, sends, transmits, or otherwise makes available, the second protocol data unit (PDU2) to the VPN server of the VPN system 4040 (at 4500), such as via the Internet.

The VPN server of the VPN system 4040, or a component thereof, receives, reads, obtains, or otherwise accesses, the modified second protocol data unit (at 4510).

The VPN server of the VPN system 4040, or a component thereof, retrieves, extracts, or otherwise obtains the first protocol data unit (PDU1) by decrypting the payload (P:*) from the second protocol data unit (at 4600) using the private key of the cryptographic key pair of the VPN system 4040**.

The VPN system 4040, or a component thereof, such as the VPN server, implements, or performs, outbound, or outgoing, Network Address Translation for the first protocol data unit (at 4700) to obtain a modified first protocol data unit, such as in response to obtaining the first protocol data unit. The VPN system 4040, or the component thereof, such as the VPN server, that implements, or performs, Network Address Translation, stores, records, or otherwise saves, network address translation data including a pair, or tuple, of the IP address (1) of the client system (3010) and the IP address (2) of the target system 4020, which may include storing corresponding port data. The VPN system 4040, or the component thereof, such as the VPN server, that implements, or performs, Network Address Translation, modifies, replaces, alters, or otherwise changes, the source IP address (S) of the first protocol data unit from the IP address (1) of the client system 4010 to the globally unique address (4) of the VPN server of the VPN system 4040.

Subsequent to performing outbound, or outgoing, Network Address Translation (at 4700), the VPN system 4040, or a component thereof, such as the VPN server, sends, transmits, or otherwise makes available, the modified first protocol data unit (PDU1') to the target system 4020 (at 4800), such as via the Internet.

The target system 4020, or a component thereof, receives, reads, obtains, or otherwise accesses, the modified first protocol data unit (at 4810).

FIG. 5 is a flow diagram of an example of an inbound portion 5000 of protocol data unit routing using a virtual private network. The inbound, or incoming, portion 5000 of protocol data unit routing includes routing of one or more protocol data units to the client device of the client system 4010 from the target system 4020 via the ISP system 4030 including the router (ROUTER/ISP) using the virtual private network implemented by the VPN system 4040.

Subsequent to receiving the modified first protocol data unit (shown at 4810 in FIG. 4), the target system 4020, or a component thereof, generates, writes, or otherwise obtains, a third protocol data unit (at 5100). The third protocol data unit includes source identification data identifying the target system 4020 as the source (S) of the third protocol data unit using, or including, the IP address of the target system 4020 (2) as a source IP address (S:2). In some implementations, the source identification data may include port data, such as a port identifier. The third protocol data unit includes destination identification data identifying the VPN system 4040, or a component thereof, such as the VPN server, as the destination (D) of the third protocol data unit using, or including, the IP address of the VPN system 4040, or a component thereof, such as the VPN server, as the destination IP address (D:4). The third protocol data unit includes payload data (P) including data, which may be application layer data (A2), communicated in, or by, the third protocol data unit (P:A2). In some implementations, the destination identification data may include port data, such as a port identifier. The target system 4020, or a component thereof, sends, transmits, or otherwise makes available, the third protocol data unit (PDU3) to the VPN system 4040, or a component thereof, such as the VPN server, (at 5100), such as via the Internet.

The VPN system 4040, or a component thereof, such as the VPN server, receives, reads, obtains, or otherwise accesses, the third protocol data unit (at 5110).

The VPN system 4040, or a component thereof, such as the VPN server, implements, or performs, inbound, or incoming, Network Address Translation for the third protocol data unit (at 5200) to obtain a modified third protocol data unit, such as in response to obtaining the third protocol data unit. The VPN system 4040, or the component thereof, such as the VPN server, that implements, or performs, inbound, or incoming, Network Address Translation, identifies, determines, or otherwise accesses, the IP address (1) of the client system (3010) from the network address translation data stored therein (such as shown at 4700 in FIG. 4) including the pair, or tuple, of the IP address (1) of the client system (3010) and the IP address (2) of the target system 4020, such as by using the source IP address from the third protocol data unit, which is the IP address (2) of the target system 4020, as an index value, which may include using port data. The VPN system 4040, or the component thereof, such as the VPN server, that implements, or performs, inbound, or incoming, Network Address Translation, modifies, replaces, alters, or otherwise changes, the destination IP address (D) of the third protocol data unit from the globally unique address (4) of the VPN server of the VPN system 4040 to the IP address (1) of the client system 4010.

The VPN system 4040, or a component thereof, such as the VPN server, generates, creates, or otherwise obtains, second encrypted data (* or encrypted modified third protocol data unit) by encrypting the modified third protocol data unit (at 5300). Encrypting the modified third protocol data unit may include encrypting the modified third protocol data unit using a cryptographic key, such as a public key of a cryptographic key pair of the client system 4010. A corresponding private key of the cryptographic key pair of the client system 4010 is accessible, available, or usable, by the client system 4010**, or one or more components thereof, and is otherwise unavailable, inaccessible, or unusable.

The VPN system 4040, or a component thereof, such as the VPN server, generates, writes, or otherwise obtains, a fourth protocol data unit encapsulating the encrypted modified third protocol data unit (at 5400). The fourth protocol data unit (PDU4) includes source identification data identifying the VPN system 4040, or a component thereof, such as the VPN server, as the source (S) of the fourth protocol data unit using, or including, the IP address of the VPN system 4040, or a component thereof, such as the VPN server, (4) as a source IP address (S:4). In some implementations, the source identification data may include port data, such as a port identifier. The fourth protocol data unit includes destination identification data identifying the ISP system 4030, or a component thereof, such as the router, as the destination (D) of the fourth protocol data unit using, or including, the IP address (3) of the ISP system 4030, or a component thereof, such as the router, as a destination IP address (D:3). The fourth protocol data unit includes payload data (P) including the encrypted data (*), communicated in, or by, the fourth protocol data unit (P:*). In some implementations, the destination identification data may include port data, such as a port identifier. In some implementations, encryption (at 5300) may be omitted, and the modified third protocol data unit may be included, or encapsulated, as the payload in the fourth protocol data unit.

The VPN system 4040, or a component thereof, such as the VPN server, sends, transmits, or otherwise makes available, the fourth protocol data unit to the client device of the client system 4010, or a component thereof, such as the VPN client component, by sending, transmitting, or otherwise making available, the fourth protocol data unit to the ISP system 4030, such as to the router, via the VPN tunnel (at 5400).

The ISP system 4030, or a component thereof, such as the router, receives, reads, obtains, or otherwise accesses, the fourth protocol data unit (at 5410).

Subsequent to receiving the fourth protocol data unit (at 5410), the ISP system 4030, or a component thereof, such as the router, performs inbound, or incoming, Network Address Translation for the fourth protocol data unit (at 5500). The ISP system 4030, or a component thereof, such as the router, identifies, determines, or otherwise obtains, the IP address of the client system 4010 (1) from the Network Address Translation data corresponding to the active connection between the client system 4010 and the target system 4020, including the pair, or tuple, associating, or mapping, the IP address of the client system 4010 (1) to the IP address of the target system (2). The ISP system 4030, or a component thereof, such as the router, modifies, replaces, alters, or otherwise changes, the destination IP address (D) of the fourth protocol data unit from the IP address of the ISP system 4030 (3) to the IP address of the client system 4010 (1).

Subsequent to modifying the fourth protocol data unit (at 5500), the ISP system 4030, or a component thereof, such as the router, sends, transmits, or otherwise makes available, the modified fourth protocol data unit (PDU4') to the client system 4010 (at 5600).

The client system 4010, or a component thereof, receives, reads, obtains, or otherwise accesses, the modified fourth protocol data unit (at 5610).

The client system 4010, or a component thereof, reads, extracts, or otherwise accesses, the payload data (*) from the modified fourth protocol data unit (at 5700). The client system 4010, or a component thereof, retrieves, extracts, or otherwise obtains, the third protocol data unit (PDU3) by decrypting the payload (P:*) from the modified fourth protocol data unit (at 5700) using the private key of the cryptographic key pair of the client system 4010. The client system 4010, or a component thereof, reads, extracts, or otherwise accesses, the payload data (A2) from the third protocol data unit (at 5700).

Figure 6:
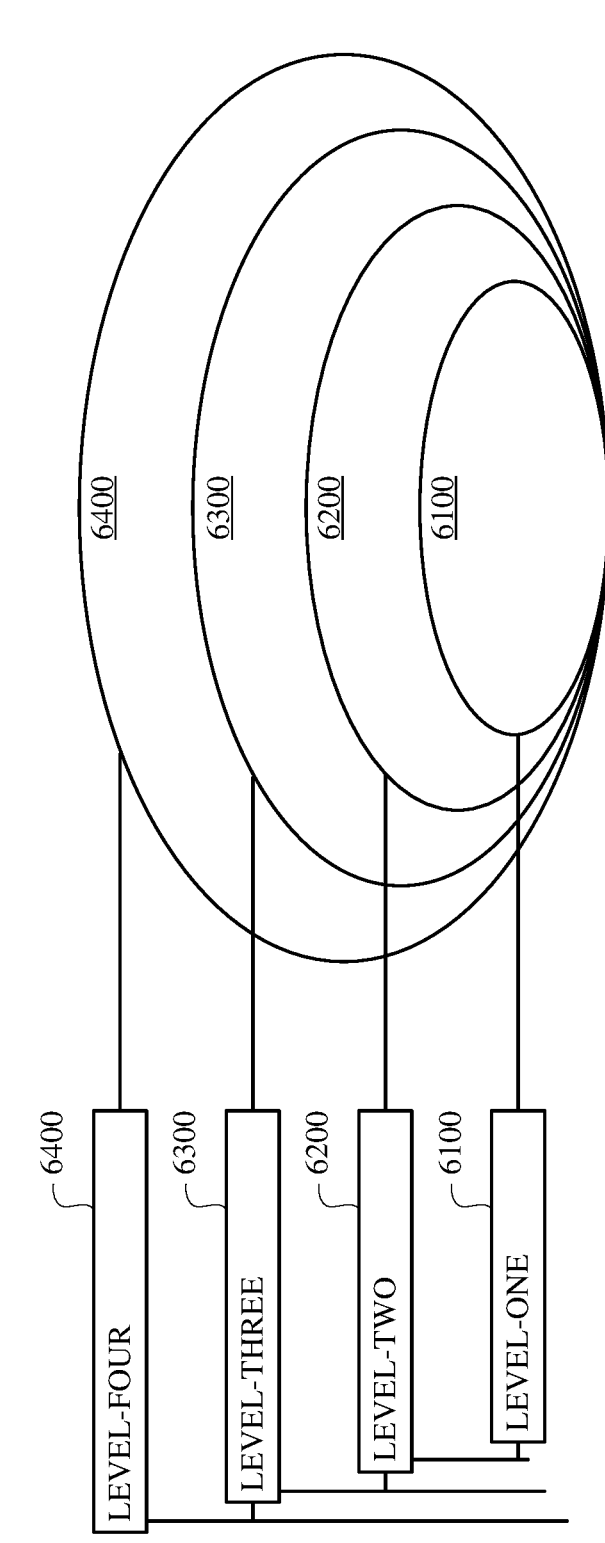
FIG. 6 is a diagram of an example of a hierarchy of virtual private network infrastructure context levels of a hierarchical-context area network.

FIG. 6 is a diagram of an example of a hierarchy of virtual private network infrastructure context levels 6000 of a hierarchical-context area network. The hierarchy of virtual private network infrastructure (VPNI) context levels 6000 is shown as a tree view diagram on the left and as a nested sets diagram on the right.

The hierarchy of VPNI context levels 6000 includes a first VPNI context level 6100 (level-one), a second VPNI context level 6200 (level-two), a third VPNI context level 6300 (level-three), and a fourth VPNI context level 6400 (level-four). Other numbers, or cardinalities, of VPNI context levels may be used.

The fourth, highest, widest, or maximum, VPNI context level 6400 (level-four) includes the third VPNI context level 6300 (level-three), which includes the second VPNI context level 6200 (level-two), which includes the first VPNI context level 6100 (level-one).

The hierarchy of VPNI context levels 6000 may be implemented, such as defined, with a defined organizing characteristic, or context. For example, the defined organizing characteristic for the hierarchy of VPNI context levels 6000 may be geographic, or geopolitical, location, wherein the hierarchy of VPNI context levels 6000 is defined in accordance with geographic, or geopolitical, location. For example, the first VPNI context level 6100 (level-one), which is the lowest, bottom, or leaf, VPNI context level of the hierarchy of VPNI context levels 6000, may correspond with relatively small geographic, or geopolitical, locations or areas, such as a city, a town, a metropolitan area, or a similar location or area. The second VPNI context level 6200 (level-two) may correspond with geographic, or geopolitical, locations, or areas, which are larger than the areas corresponding to the first VPNI context level 6100 (level-one), such as a country or region. The third VPNI context level 6300 (level-three) may correspond with geographic, or geopolitical, locations or areas, which are larger than the areas corresponding to the second VPNI context level 6200 (level-two), such as a continent or sub-continent. The fourth, highest, widest, top, or maximum, VPNI context level 6400 (level-four) may correspond with geographic, or geopolitical, locations or areas, which are larger than the areas corresponding to the third VPNI context level 6300 (level-three), such as a planet.

Figure 7:
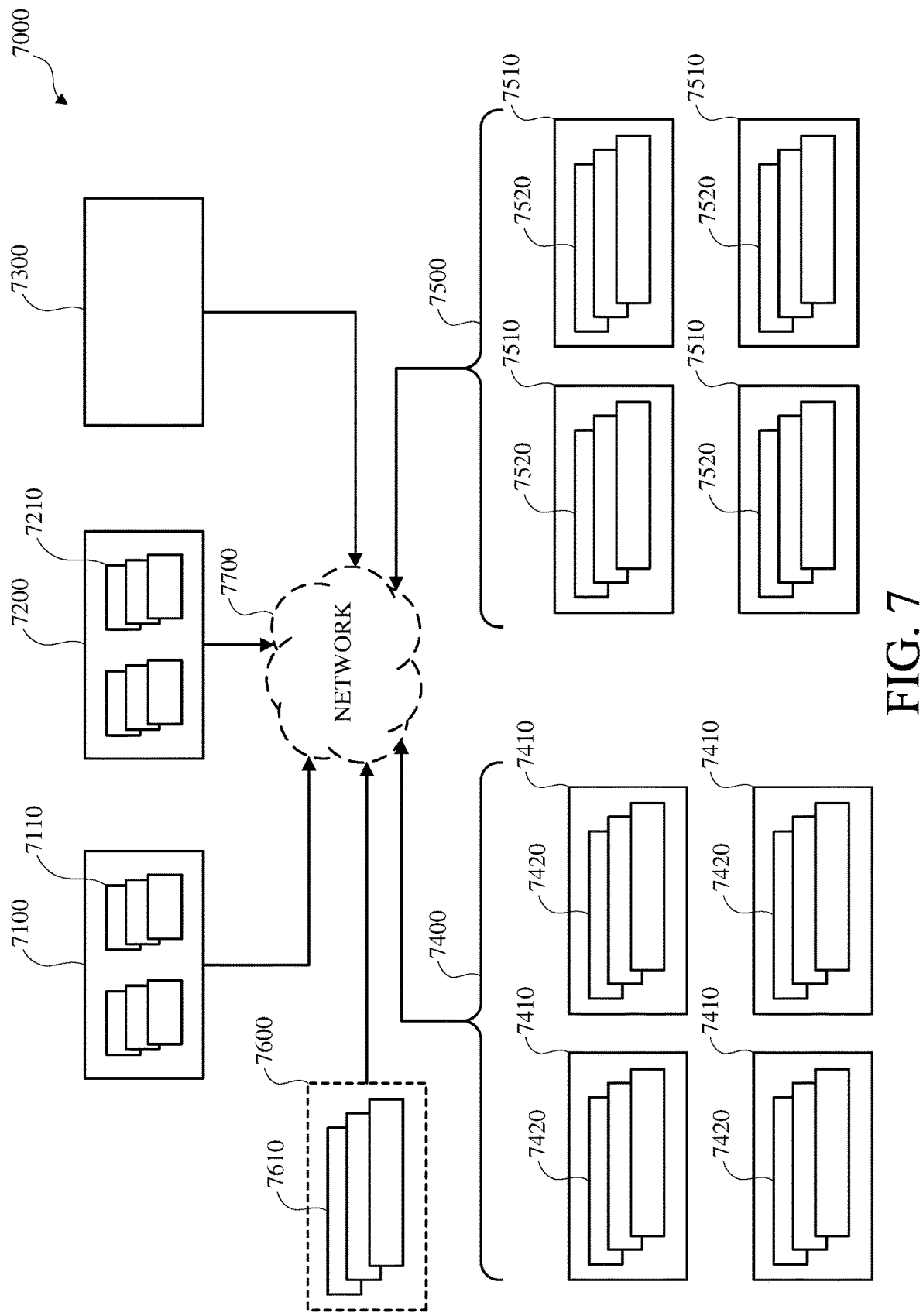
FIG. 7 is a diagram of an example of a virtual private network infrastructure system that implements a hierarchical-context area network as a virtual private network infrastructure network.

FIG. 7 is a diagram of an example of a virtual private network infrastructure system 7000 that implements a hierarchical-context area network as a virtual private network infrastructure network. The VPNI system 7000 includes a VPNI administration server 7100, a VPNI application programming interface device (VPNI-API) 7200, a VPNI control device 7300, a first VPNI context area 7400, and a second VPNI context area 7500. Although shown separately in FIG. 7, the VPNI administration server 7100, the VPNI-API device 7200, and the VPNI control device 7300, may be implemented by a combined device. A user device 7600 is shown using a broken line border to indicate that the user device 7600 electronically communicates with the VPNI system 7000. A network 7700 is shown using a broken line border to indicate that the VPNI system 7000, or the components thereof, communicates via the network 7700. Other configurations may be used.

The VPNI system 7000 implements a hierarchical-context area network, or a multi-hierarchical-context area network, as a VPNI network. In some implementations, the VPNI network may be a software-defined network (SDN) with dynamically, or on-demand, such as for an active VPN tunnel, configurable default routing.

The hierarchical-context area network is associated with a defined organizing characteristic. For example, the defined organizing characteristic for the hierarchical-context area network may be geographic, geospatial, or geopolitical, location, or area, wherein the hierarchy of the hierarchical-context area network is defined in accordance with geographic, geospatial, or geopolitical, location. In another example, the defined organizing characteristic for the hierarchical-context area network may be service type, wherein the hierarchy of the hierarchical-context area network is defined in accordance with types of services. In another example, the defined organizing characteristic for the hierarchical-context area network may correspond with an external hierarchical structure, such as an enterprise structure. Other defined organizing characteristics, or combinations thereof, may be used.

The hierarchical-context area network of the VPNI system 7000 defines, implements, or operates, a hierarchy of VPNI context levels (not expressly shown in FIG. 7), such as the hierarchy of VPNI context levels 6000 shown in FIG. 6. For example, the hierarchical-context area network may include a first VPNI context level (level-one) that is included in a second VPNI context level (level-two) that is included in a third VPNI context level (level-three) that is included in a fourth VPNI context level (level-four). Although described as including four VPNI context levels, other numbers, or cardinalities, of VPNI context levels may be used.

A respective VPNI context level of the hierarchy of VPNI context levels of the hierarchical-context area network includes one or more VPNI context areas, such as the first VPNI context area 7400, the second VPNI context area 7500, or both. For simplicity, a VPNI context area may be referred to with reference to the corresponding VPNI context level. For example, a VPNI context area of, or in, the first VPNI context level may be referred to as a first level, or level-one, VPNI context area.

The first VPNI context area 7400 is distinct from the second VPNI context area 7500. Although two VPNI context areas 7400, 7500 are shown, other numbers, or cardinalities, of virtual private network context areas may be defined, or otherwise included, in the VPNI system 7000.

A respective context area, or VPNI context area, such as the first VPNI context area 7400 or the second VPNI context area 7500, defines, or includes, a corresponding VPNI context area network, subnet, or segment (context area network) (not expressly shown in FIG. 7). In some implementations, a respective VPNI context area network includes a VPNI control-plane network, a VPNI data-plane network, or both.

A respective VPNI context area, or the corresponding VPNI context area network, is assigned, allocated, or associated with, one or more defined IP addresses. The IP addresses assigned to, allocated to, or associated with, the respective VPNI context area networks may be expressed, such as using Classless Inter-Domain Routing (CIDR) notation, as an IP address, such as the first, or lowest, address of for the respective context area network, followed by a forward-slash character (/), or another distinguishable character or symbol, followed by a value, such as an integer value, indicating a bit-length for identifying the respective range of IP addresses. In some implementations, the IP addresses assigned to, allocated to, or associated with, respective context area networks are assigned, allocated, or otherwise organized, hierarchically. For example, bit-length for identifying the respective range of IP addresses may be relatively high, such as twenty-four (/24), for a relatively low-level context area network, such as a level-one context area network, indicating a relatively narrow range of available IP addresses, and may be relatively low, such as nine (/9), for a relatively high-level context area network, such as a level-four context area network, indicating a relatively broad range of IP addresses.

The IP addresses assigned to, allocated to, or associated with, a respective VPNI context area include one or more shared IP addresses.

As used herein, the term "shared IP address" indicates an IP address that is, or may be, shared, such as concurrently, by zero or more VPN servers that, respectively, implement, operate, or include, one or more interfaces to a VPNI context area network, such as a VPNI context area control-plane network or a VPNI context area data-plane network, in a VPNI context area. For simplicity, a shared IP address may be described as assigned, allocated, or associated with, a corresponding VPNI context area or one or more VPNI context area networks, such as a VPNI context area control-plane network, a VPNI context area data-plane network, or both, implemented in the corresponding VPNI context area, except as is expressly described herein or as is otherwise clear from context.

A multi-hierarchical-context area network includes multiple concurrent distinct hierarchical-context area networks, wherein a respective hierarchical-context area network is associated with a respective, distinct, defined organizing characteristic. For example, a multi-hierarchical-context area network may include a first hierarchical-context area network and a second hierarchical-context area network, wherein the defined organizing characteristic for the first hierarchical-context area network is geographic, or geopolitical, location and the defined organizing characteristic for the second hierarchical-context area network is service type. In a multi-hierarchical-context area network, a respective VPN server 7410, 7510 may be included in a first context area network of a first context area of the first VPNI context level of the first hierarchical-context area network and, concurrently, may be included in a second context area network of a second context area of the first VPNI context level of the second hierarchical-context area network. In some implementations, in a multi-hierarchical-context area network, a respective VPN server 7410, 7510 may be included in a first context area network of a first context area of the first VPNI context level of the first hierarchical-context area network and, concurrently, may be included in a second context area network of a second context area of another VPNI context level, such as the fourth VPNI context level, of the second hierarchical-context area network.

In some implementations, a multi-hierarchical-context area network may include a first hierarchical-context area network nested in a second hierarchical-context area network. For example, a level-one VPNI context area in a first VPNI context level of the first hierarchical-context area network may be concurrent with a level-four VPNI context area in a fourth VPNI context level of the second hierarchical-context area network.

The VPNI administration server 7100 is a computing device, which may be similar to the computing device 1000 shown in FIG. 1 or to one or more of the computing and communications devices 2300, 2410, 2420, 2510, 2520, 2530 as shown in FIG. 2, except as is described herein or as is otherwise clear from context.

The VPNI administration server 7100 includes, implements, executes, or operates one or more components 7110, such as software applications, or programs, including a hierarchical-context area network manager component 7110 (network manager or management component for managing the hierarchical-context area network). Although one VPNI administration server 7100 is shown, the VPNI system 7000 may include multiple VPNI administration servers.

The VPNI application programming interface device 7200 is a computing device, which may be similar to the computing device 1000 shown in FIG. 1 or to one or more of the computing and communications devices 2300, 2410, 2420, 2510, 2520, 2530 as shown in FIG. 2, except as is described herein or as is otherwise clear from context.

The VPNI-API device 7200 includes, implements, executes, or operates one or more components 7210, such as software applications, or programs, including an application programming interface.

The VPNI control device 7300, or control infrastructure device, is a computing device, which may be similar to the computing device 1000 shown in FIG. 1 or to one or more of the computing and communications devices 2300, 2410, 2420, 2510, 2520, 2530 as shown in FIG. 2, except as is described herein or as is otherwise clear from context.

Although the VPNI control device 7300 is shown as a single block, the VPNI system 7000 may include multiple VPNI control devices. Although not expressly shown in FIG. 7, the VPNI control device 7300 includes, implements, executes, or operates one or more software applications, or programs for operating or controlling one or more aspects of the VPNI system 7000. Although shown separately, in some implementations, the VPNI control device 7300 may be implemented by, or included in, the VPNI administration server 7100.

The VPN servers, such as the VPN servers 7410, 7510, implemented by, operated by, or included in, the hierarchical-context area network include respective interfaces to one or more of the VPNI context area networks of the hierarchical-context area network in accordance with the organizing characteristic of the hierarchical-context area network. The VPN servers, such as the VPN servers 7410, 7510, included in a respective VPNI context area network include a respective interface, such as a virtual Ethernet device, or interface pair, that is assigned, allocated, configured with, or associated with, an IP address assigned to, allocated to, or associated with, the respective VPNI context area network, such that the IP address is a shared, such as concurrently shared, IP address among the VPN servers 7410, 7510, that implement, operate, or include, a respective interface to the respective VPNI context area network.

As shown, the first VPNI context area 7400 includes four VPN servers 7410. Other numbers, or cardinalities, of VPN servers may be used.

As shown, the second VPNI context area 7500 includes four VPN servers 7510. Other numbers, or cardinalities, of VPN servers may be used.

A respective VPN server 7410, 7510 is a computing device, which may be similar to the computing device 1000 shown in FIG. 1 or to one or more of the computing and communications devices 2300, 2410, 2420, 2510, 2520, 2530 as shown in FIG. 2, except as is described herein or as is otherwise clear from context. One or more of the VPN servers 7410, 7510 may be a virtual server. A respective VPN server 7410, 7510 includes, implements, executes, or operates one or more components 7420, 7520, such as network interfaces, software applications, or programs, including a VPN server network controller component.

The VPN server network controller component receives, reads, obtains, collects, discovers, or otherwise accesses, and maintains, stores, records, or otherwise saves, virtual private network infrastructure system configuration data about one or more of the other components of the virtual private network infrastructure system 7000, such as virtual private network infrastructure system configuration data about one or more of the other VPN servers 7410, 7510, such as the VPN servers 7410, 7510 that are VPNI peers of the VPN server 7410, 7510. In some implementations, the VPN server network controller component of a virtual private network server 7410, 7510 may obtain the virtual private network infrastructure system configuration data, or a portion thereof, by polling.

The user device 7600 is a computing device, which may be similar to the computing device 1000 shown in FIG. 1 or to one or more of the computing and communications devices 2300, 2410, 2420, 2510, 2520, 2530 as shown in FIG. 2, except as is described herein or as is otherwise clear from context. The user device 7600 includes, implements, executes, or operates one or more components, such as network interfaces, software applications, or programs, including a VPN client component 7610.

The network 7700 may be, or may include, a local area network (LAN), a wide area network (WAN), a virtual private network (VPN), a mobile or cellular telephone network, the Internet, or any other means of electronic communication. The network 7700 may be similar to a network 2100, 2400, 2500 shown in FIG. 2, except as is described herein or as is otherwise clear from context.

For simplicity, the VPNI administration server 7100, the hierarchical-context area network manager component 7110, the VPNI-API device 7200, the application programming interface component 7210, the VPNI control device 7300, the first VPNI context area 7400, the second VPNI context area 7500, and the VPN servers 7410, 7510, and the VPN server network controller components 7420, 7520, may be referred to as components of the VPNI system 7000. In some implementations, the VPN client component 7610 of the user device 7600 may be referred to as a component of the VPNI system 7000.

The VPNI system 7000 is an autonomous system (AS). Respective components of the VPNI system 7000 may electronically communicate with other components of the VPNI system 7000, one or more external devices (not shown), the user device 7600, or a combination thereof, via the network 7700. The user device 7600 may electronically communicate with one or more of the components of the VPNI system 7000, one or more external devices (not shown), or a combination thereof, via the network 7700.

The VPN client component 7610 of, in, or at, the user device 7600 may electronically communicate with the user device 7600 internally to the user device 7600, such as via an operating system, or a component thereof, of the user device 7600. The VPN client component 7610 of, in, or at, the user device 7600 operatively connects the user device 7600 to the VPNI system 7000 such that the user device 7600 uses the VPNI system 7000 as a virtual private network for electronic communication with one or more external systems or devices (not shown), with one or more of the components of the VPNI system 7000, or with one or more external systems or devices (not shown) and with one or more of the components of the VPNI system 7000.

A respective VPN server 7410, 7510 may be a virtual private network ingress, or entry, node of the virtual private network connection, which may be a point-to-point connection, or tunnel, between the VPN client component 7610 of the user device 7600 and the VPNI system 7000.

As used herein, the term "node" indicates a VPNI context area in the VPNI network, a corresponding VPNI context area network, or a VPN server therein, that is assigned, allocated, or associated with, an IP address in the VPNI network, such as an IP address that uniquely identifies the VPN server in the VPNI network or a shared IP address that uniquely identifies the VPNI context area or the corresponding VPNI context area network in the VPNI network, except as is expressly described herein or as is otherwise clear from context.

A respective VPN server 7410, 7510 may be a virtual private network egress, or exit, node (point of egress) for the virtual private network connection, or tunnel, between the VPN client component 7610 of the user device 7600 and the VPNI system 7000, or for communicating one or more protocol data units sent by, or sent to, the VPN client component 7610 of the user device 7600 and the VPNI system 7000.

For example, the VPN client component 7610 of, in, or at, the user device 7600 may establish a VPN tunnel with the VPNI system 7000 via a first VPN server 7410 or 7510, wherein the first VPN server 7410 or 7510 is the ingress, or entry, node of the virtual private network connection, or tunnel; the user device 7600 may send, or transmit, electronic communications data, such as a protocol data unit, such as a packet, to an external system, or device, via the VPN tunnel such that the first VPN server 7410, as the ingress, or entry, node of the virtual private network connection, or tunnel, receives, or otherwise accesses, the protocol data unit and sends, transmits, or otherwise makes available, the protocol data unit, or a portion thereof, such as a payload or content portion, to a second VPN server 7510 or 7410, as the egress, or exit, node (point of egress) of the virtual private network connection, or tunnel, which sends, or transmits, the protocol data unit, or a portion thereof, to the external system, or device.

The hierarchical-context area network manager component 7110 maintains, such as receives, stores, manages, modifies, updates, deletes, or archives, data, such as a registry, about the components and structure of the VPNI system 7000. For example, the hierarchical-context area network manager component 7110 maintains address data for the respective VPN servers 7410, 7510, such as physical address, or other geographical or geopolitical location, data, IP address data, MAC address data, or one or more thereof. The physical address data may include data indicating a location, such as a building, a room, a rack, a row, or a bin, a street address, a city, a country, a region, a continent, a planet, or the like. The IP address data may include one or more IP addresses internal to the VPNI system 7000, or a portion thereof. The IP address data may include one or more IP addresses external to the VPNI system 7000. The hierarchical-context area network manager component 7110 may maintain security data, such as encryption keys, for one or more of the components of the VPNI system 7000. The hierarchical-context area network manager component 7110 may maintain capability or feature data, indicating one or more capabilities of, or features supported or provided by, one or more of the components of the VPNI system 7000. The hierarchical-context area network manager component 7110 may maintain system access control data for controlling access to one or more portions of the VPNI system 7000, one or more functions of the VPNI system 7000, or a combination, such as on a per-user basis, a per-device basis, a per-group, such as user group, or device group, basis, or a combination thereof. The hierarchical-context area network manager component 7110 may maintain system traffic control data for controlling the routing of one or more protocol data units to one or more portions of the VPNI system 7000, such as on a per-user basis, a per-device basis, a per-group, such as user group, or device group, basis, or a combination thereof.

The hierarchical-context area network manager component 7110 may maintain connection data indicating operative connections, such as network connections, between respective components of the VPNI system 7000. The hierarchical-context area network manager component 7110 may allocate, or assign, one or more IP addresses, internal to the VPNI system 7000, to one or more components of the VPNI system 7000. The hierarchical-context area network manager component 7110 may monitor one or more of the components of the VPNI system 7000, which may include sending, transmitting, or otherwise making available, such as periodically, such as by polling, one or more messages or signals requesting monitoring data from one or more of the components of the VPNI system 7000.

The application programming interface component 7210 aspects of the VPNI system 7000, such as electronic communications between the VPN servers 7410, 7510 and the VPNI administration server 7100 may be implemented using the application programming interface component 7210.

The VPNI control device 7300 may include hardware components, software components, or a combination thereof, that implement one or more aspects of the VPNI system 7000, or one or more portions thereof.

Figure 8:
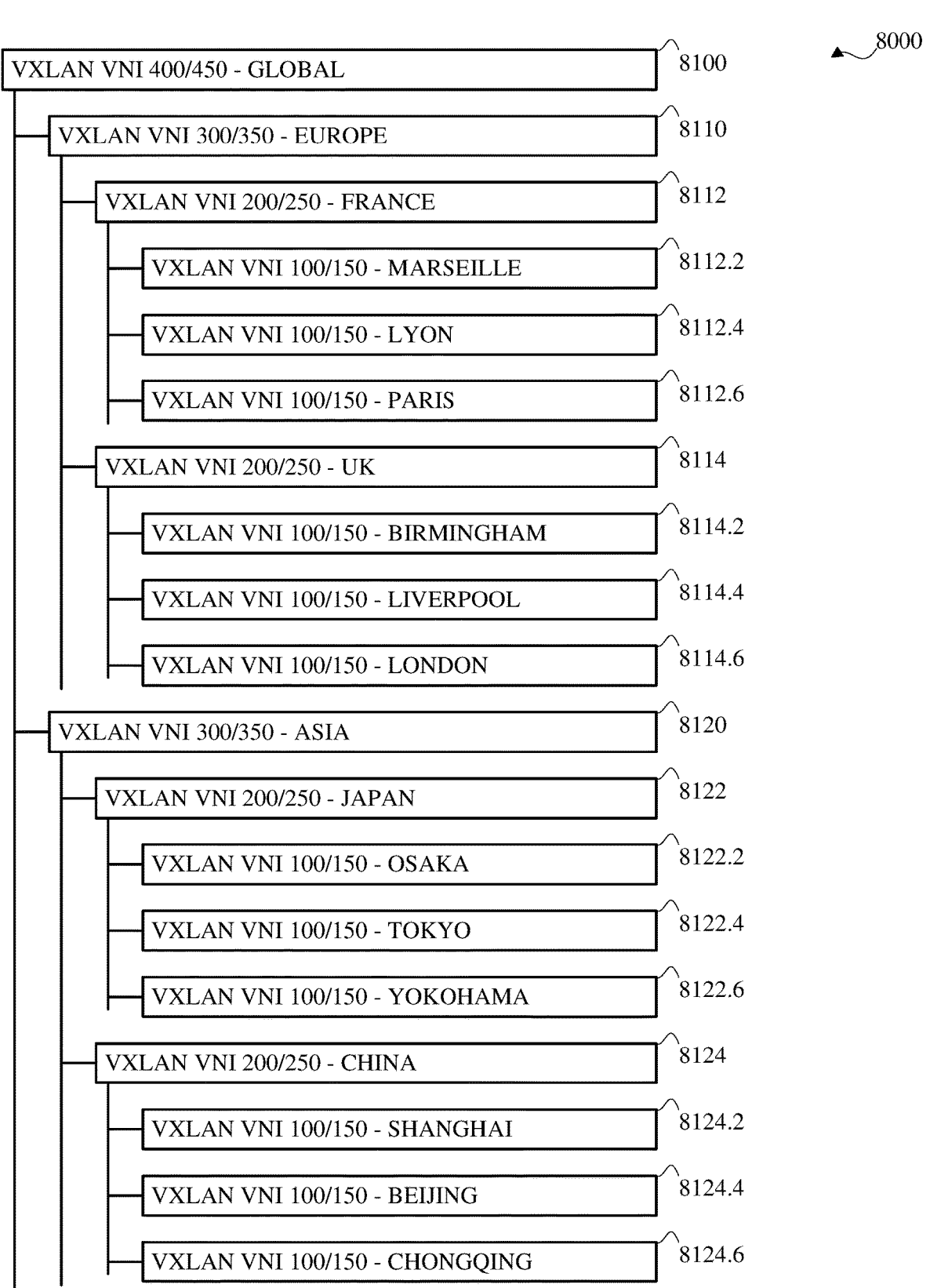
FIG. 8 is a diagram of an example of a portion of a hierarchical-context area network of a virtual private network infrastructure system

FIG. 8 is a diagram of an example of a portion of a hierarchical-context area network 8000 of a virtual private network infrastructure system. The portion of the hierarchical-context area network 8000 includes a hierarchy of VPNI context levels, which may be similar to the hierarchy of VPNI context levels 6000 shown in FIG. 6, except as is described herein or as is otherwise clear from context. The defined organizing characteristic for the portion of the hierarchical-context area network 8000 is geographic, or geopolitical, location or area.

The portion of the hierarchical-context area network 8000 includes a level-four VPNI context area 8100 in a level-four VPNI context level, which is a highest, widest, top, or maximum, context level, such as the fourth context level 6400 shown in FIG. 6, wherein a level-four VPNI context area network, which may include a level-four VPNI context area control-plane network, a level-four VPNI context area data-plane network, or both, is implemented.

The level-four VPNI context area control-plane network is a control plane virtual extensible local area network (VXLAN), or segment, which is a layer two (L2), data link layer, such as open system interconnection model data link layer, overlay network (1-to-N), or tunnel, identified, and identifiable, using a segment identifier, or VXLAN network identifier that has the value 400 (VNI 400), that encapsulates layer two (L2) protocol data units, such as Ethernet, or medium access control, frames, addressed using MAC addresses, in VXLAN protocol data units, such as a VXLAN frames, and transports the VXLAN frames via a stateless tunnel in a layer three (L3) IP network (underlay network), such as the network 7700 shown in FIG. 7. The level-four VPNI context area control-plane network implements a layer three (L3), IP layer, such as open system interconnection model (OSI) IP layer, overlay network in the layer two (L2) network, wherein layer three (L3) protocol data units, such as IP packets, addressed using IP addresses, which include respective layer two (L2) protocol data units, such as Ethernet, or medium access control, frames, addressed using MAC addresses, wherein the level-four VPNI context area control-plane network encapsulates the layer three (L3) protocol data units in layer two (L2) protocol data units, such as Ethernet, or medium access control (MAC), frames, addressed using MAC addresses, of the layer two (L2) overlay network. The VXLAN frames respectively include an outer Ethernet header addressed using MAC addresses, an outer IP header addressed using IP addresses, an outer header for a layer four (L4), transport layer, such as open system interconnection model transport layer, protocol data unit header, such as user datagram protocol (UDP) datagram header, including source port data, destination port data, or both, a VXLAN header that indicates the VXLAN segment identifier, the header of the respective layer two (L2) protocol data unit, addressed using MAC addresses, and the payload of the respective layer two (L2) protocol data unit. Although described with respect to the VXLAN protocol, another network virtualization protocol or technology may be used.

The level-four VPNI context area data-plane network is a data plane VXLAN, subnet, or segment, which is a layer two (L2), data link layer, such as open system interconnection model data link layer, overlay network (1-to-N), or tunnel, identified, and identifiable, using a segment identifier, or VXLAN network identifier that has the value 450 (VNI 450), that encapsulates layer two (L2) protocol data units, such as Ethernet, or medium access control, frames, addressed using MAC addresses, in VXLAN protocol data units, such as a VXLAN frames, and transports the VXLAN frames via a stateless tunnel in a layer three (L3) IP network (underlay network), such as the network 7700 shown in FIG. 7. The VXLAN frames respectively include an outer Ethernet header addressed using MAC addresses, an outer IP header addressed using IP addresses, an outer header for a layer four (L4), transport layer, such as open system interconnection model transport layer, protocol data unit header, such as user datagram protocol (UDP) datagram header, including source port data, destination port data, or both, a VXLAN header that indicates the VXLAN segment identifier, the header of the respective layer two (L2) protocol data unit, addressed using MAC addresses, and the payload of the respective layer two (L2) protocol data unit. Although described with respect to the VXLAN protocol, another network virtualization protocol or technology may be used.

The level-four VPNI context area network, including the level-four VPNI context area control-plane network, the level-four VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the level-four VPNI context area network may be the shared IP address.

A communication and computing device, such as a VPN server (source VPN server), such as one of the VPN servers 7410, 7510 shown in FIG. 7, in the level-four VPNI context area 8100 may implement, operate, or include, a VXLAN tunnel end point, or interface, (VXLAN interface or VTEP) to the level-four VPNI context area data-plane network (VNI 450), a VXLAN tunnel end point, or interface, to the level-four VPNI context area control-plane network (VNI 400), or both. A VXLAN interface is a switching local end point for electronic communication via a VXLAN.

To communicate with another computing and communications device, such as another VPN server (destination VPN server) in the level-four VPNI context area control-plane network (VNI 400), the source VPN server sends, via the level-four VPNI context area control-plane network VXLAN interface of the source VPN server (source control-plane VXLAN interface), a layer three (L3) protocol data unit, such as an IP packet, addressed to the IP address of the destination VPN server, encapsulated in a layer two (L2) protocol data unit, such as an Ethernet, or medium access control, frame, addressed to the MAC address of the destination VPN server, and encapsulated in a VXLAN protocol data unit, such as a VXLAN frame. To encapsulate the layer two (L2) protocol data unit in the VXLAN protocol data unit, the source VXLAN interface to the level-four VPNI context area control-plane network obtains, identifies, or looks up, a VXLAN network identifier associated with the MAC address of the destination VPN server. The source VXLAN interface to the level-four VPNI context area control-plane network determines whether the MAC address of the destination VPN server is included in the level-four VPNI context area control-plane network (VNI 400). The source VXLAN interface to the level-four VPNI context area control-plane network determines that the MAC address of the destination VPN server is included in the level-four VPNI context area control-plane network (VNI 400) and the source VXLAN interface to the level-four VPNI context area control-plane network determines whether data associating, or mapping, the MAC address of the destination VPN server to a VXLAN interface to the level-four VPNI context area control-plane network of the destination VPN server (destination VXLAN interface) is available. The data associating, or mapping, the MAC address of the destination VPN server to the destination VXLAN interface to the level-four VPNI context area control-plane network may be available and the source VXLAN interface encapsulates the MAC frame, such as with a header including an outer MAC address, an outer IP header, and a VXLAN header to obtain an IP packet. The source control-plane VXLAN interface transmits, sends, or forwards, the IP packet, including the MAC frame, to the destination VXLAN interface to the level-four VPNI context area control-plane network via the level-four VPNI context area control-plane network (VNI 400).

To communicate with another computing and communications device, such as another VPN server, (destination VPN server) in the level-four VPNI context area data-plane network (VNI 450), the source VPN server sends, via the level-four VPNI context area data-plane network VXLAN interface of the source VPN server (source data-plane VXLAN interface), an Ethernet, or MAC, frame addressed to the MAC address of the destination VPN server. The source VXLAN interface to the level-four VPNI context area data-plane network obtains, identifies, or looks up, a VXLAN network identifier associated with the MAC address of the destination VPN server. The source VXLAN interface to the level-four VPNI context area data-plane network determines whether the MAC address of the destination VPN server is included in the level-four VPNI context area data-plane network (VNI 450). The source VXLAN interface to the level-four VPNI context area data-plane network determines that the MAC address of the destination VPN server is included in the level-four VPNI context area data-plane network (VNI 450) and the source VXLAN interface to the level-four VPNI context area data-plane network determines whether data associating, or mapping, the MAC address of the destination VPN server to a VXLAN interface to the level-four VPNI context area data-plane network of the destination VPN server (destination VXLAN interface) is available. The data associating, or mapping, the MAC address of the destination VPN server to the destination VXLAN interface to the level-four VPNI context area data-plane network may be available and the source VXLAN interface encapsulates the MAC frame, such as with a header including an outer MAC address, an outer IP header, and a VXLAN header to obtain an IP packet. The source data-plane VXLAN interface transmits, sends, or forwards, the IP packet, including the MAC frame, to the destination VXLAN interface to the level-four VPNI context area data-plane network via the level-four VPNI context area data-plane network (VNI 450).

The destination VXLAN interface to the level-four VPNI context area data-plane network obtains, reads, or receives, the IP packet, including the MAC frame, via the level-four VPNI context area data-plane network (VNI 450). The destination VXLAN interface to the level-four VPNI context area data-plane network determines whether the VXLAN network identifier indicated in the VXLAN header is valid. The destination VXLAN interface to the level-four VPNI context area data-plane network may determine that the VXLAN network identifier indicated in the VXLAN header is valid and may determine whether a network interface having the destination MAC address from the MAC frame encapsulated in the IP packet is available on the destination VPN server implementing the destination VXLAN interface to the level-four VPNI context area data-plane network. The destination VXLAN interface to the level-four VPNI context area data-plane network may determine that network interface allocated the destination MAC address from the MAC frame encapsulated in the IP packet is available on the destination VPN server, may extract, unpack, or de-encapsulate, the MAC frame, and output, or send, the MAC frame to the network interface allocated the destination MAC address.

The value of the geographic, or geopolitical, location associated with the level-four VPNI context area 8100, the level-four VPNI context area data-plane network (VNI 450), and the level-four control-plane VPNI context area network (VNI 400), is global, worldwide, planet wide, or the Earth.

The portion of the hierarchical-context area network 8000 includes, in a level-three VPNI context level, such as the third context level 6300 (level-three) shown in FIG. 6, and within the level-four VPNI context area 8100, a first level-three VPNI context area 8110, wherein a first level-three VPNI context area network, including a first level-three VPNI context area control-plane network (VNI 300), a first level-three VPNI context area data-plane network (VNI 350), or both, is implemented. The value of the geographic, or geopolitical, location associated with the first level-three VPNI context area 8110, the first level-three VPNI context area data-plane network, and the first level-three VPNI context area control-plane network, is Europe.

The first level-three VPNI context area network, including the first level-three VPNI context area control-plane network, the first level-three VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the first level-three VPNI context area network may be the shared IP address.

The defined range of IP addresses allocated to, associated with, or assigned to, the first level-three VPNI context area network may be a subset of the defined range of IP addresses allocated to, associated with, or assigned to, the level-four VPNI context area network. For example, the defined range of IP addresses allocated to, associated with, or assigned to, the level-four VPNI context area network may be indicated or expressed using an IP address and a bit-length indicating a relatively broad range of IP addresses, such as nine (/9), and the defined range of IP addresses allocated to, associated with, or assigned to, the first level-three VPNI context area network may be indicated or expressed using the IP address and a bit-length indicating a relatively narrow range of IP addresses, such as sixteen (/16).

A communication and computing device, such as a VPN server (source VPN server), such as the VPN servers 7410, 7510 shown in FIG. 7, in the first level-three VPNI context area data-plane network implements, operates, or includes, a VXLAN tunnel end point, or interface, to the first level-three VPNI context area data-plane network.

A communication and computing device, such as a VPN server (source VPN server), such as the VPN servers 7410, 7510 shown in FIG. 7, in the first level-three VPNI context area control-plane network implements, operates, or includes, a VXLAN tunnel end point, or interface, to the first level-three VPNI context area control-plane network.

The portion of the hierarchical-context area network 8000 includes, in a level-two VPNI context level, such as the second VPNI context level 6200 (level-two) shown in FIG.

6, and within the first level-three VPNI context area 8110, a first level-two VPNI context area 8112, wherein a first level-two VPNI context area network including a first level-two VPNI context area control-plane network, a first level-two VPNI context area data-plane network, or both, is implemented. The value of the geographic, or geopolitical, location associated with the first level-two VPNI context area 8112, the first level-two VPNI context area control-plane network, and the first level-two VPNI context area data-plane network is France.

The first level-two VPNI context area network, including the first level-two VPNI context area control-plane network, the first level-two VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the first level-two VPNI context area network may be the shared IP address.

The defined range of IP addresses allocated to, associated with, or assigned to, the first level-two VPNI context area network may be a subset of the defined range of IP addresses allocated to, associated with, or assigned to, the first level-three VPNI context area network. For example, the defined range of IP addresses allocated to, associated with, or assigned to, the first level-three VPNI context area network may be indicated or expressed using an IP address and a bit-length indicating a relatively broad range of IP addresses, such as sixteen (/16), and the defined range of IP addresses allocated to, associated with, or assigned to, the first level-two VPNI context area network may be indicated or expressed using the IP address and a bit-length indicating a relatively narrow range of IP addresses, such as twenty (/20).

The first level-two VPNI context area control-plane network is a VXLAN associated with a VXLAN Network Identifier (VNI) that has the value 200 (VNI 200). A communication and computing device, such as a VPN server (source VPN server), such as the VPN servers 7410, 7510 shown in FIG. 7, in the first level-two VPNI context area control-plane network implements, operates, or includes, a VXLAN tunnel end point, or interface, to the first level-two VPNI context area control-plane network.

The first level-two VPNI context area data-plane network is a VXLAN associated with a VXLAN Network Identifier (VNI) that has the value 250 (VNI 250). A communication and computing device, such as a VPN server (source VPN server), such as the VPN servers 7410, 7510 shown in FIG. 7, in the first level-two VPNI context area data-plane network implements, operates, or includes, a VXLAN tunnel end point, or interface, to the first level-two VPNI context area data-plane network.

The portion of the hierarchical-context area network 8000 includes, in a level-one VPNI context level, such as the first VPNI context level 6100 (level-one) shown in FIG. 6, and within the first level-two VPNI context area 8112, a first level-one VPNI context area 8112.2, wherein a first level-one VPNI context area network including a first level-one VPNI context area control-plane network, a first level-one VPNI context area data-plane network, or both, is implemented. The value of the geographic, or geopolitical, location associated with the first level-one VPNI context area 8112.2, the first level-one VPNI context area control-plane network, and the first level-one VPNI context area data-plane network, is Marseille.

The first level-one VPNI context area network, including the first level-one VPNI context area control-plane network, the first level-one VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the first level-one VPNI context area network may be the shared IP address.

The defined range of IP addresses allocated to, associated with, or assigned to, the first level-one VPNI context area network may be a subset of the defined range of IP addresses allocated to, associated with, or assigned to, the first level-two VPNI context area network. For example, the defined range of IP addresses allocated to, associated with, or assigned to, the first level-two VPNI context area network may be indicated or expressed using an IP address and a bit-length indicating a relatively broad range of IP addresses, such as twenty (/20), and the defined range of IP addresses allocated to, associated with, or assigned to, the first level-one VPNI context area network may be indicated or expressed using the IP address and a bit-length indicating a relatively narrow range of IP addresses, such as twenty-four (/24).

The first level-one VPNI context area control-plane network is a VXLAN associated with a VXLAN Network Identifier (VNI) that has the value 100 (VNI 100). A communication and computing device, such as a VPN server (source VPN server), such as the VPN servers 7410, 7510 shown in FIG. 7, in the first level-one VPNI context area control-plane network implements, operates, or includes, a VXLAN tunnel end point, or interface, to the first level-one VPNI context area control-plane network.

The first level-one VPNI context area data-plane network is a VXLAN associated with a VXLAN Network Identifier (VNI) that has the value 150 (VNI 150).

A communication and computing device, such as a VPN server (source VPN server), such as the VPN servers 7410, 7510 shown in FIG. 7, in the first level-one VPNI context area data-plane network implements, operates, or includes, a VXLAN tunnel end point, or interface, to the first level-one VPNI context area data-plane network.

The portion of the hierarchical-context area network 8000 includes, in the level-one VPNI context level, and within the first level-two VPNI context area 8112, a second level-one VPNI context area 8112.4, wherein a second level-one VPNI context area network including a second level-one VPNI context area control-plane network, a second level-one VPNI context area data-plane network, or both, is implemented. The value of the geographic, or geopolitical, location associated with the second level-one VPNI context area 8112.4, the second level-one VPNI context area control-plane network, and the second level-one VPNI context area data-plane network is Lyon.

The second level-one VPNI context area network, including the second level-one VPNI context area control-plane network, the second level-one VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the second level-one VPNI context area network may be the shared IP address.

The defined range of IP addresses allocated to, associated with, or assigned to, the second level-one VPNI context area network may be a subset of the defined range of IP addresses allocated to, associated with, or assigned to, the first level-two VPNI context area network. For example, the defined range of IP addresses allocated to, associated with, or assigned to, the first level-two VPNI context area network may be indicated or expressed using an IP address and a bit-length indicating a relatively broad range of IP addresses, such as twenty (/20), and the defined range of IP addresses allocated to, associated with, or assigned to, the second level-one VPNI context area network may be indicated or expressed using the IP address and a bit-length indicating a relatively narrow range of IP addresses, such as twenty-four (/24).

The second level-one VPNI context area control-plane network is a VXLAN associated with a VXLAN Network Identifier (VNI) that has the value 100 (VNI 100). A communication and computing device, such as a VPN server (source VPN server), such as the VPN servers 7410, 7510 shown in FIG. 7, in the second level-one VPNI context area control-plane network implements, operates, or includes, a VXLAN tunnel end point, or interface, to the second level-one VPNI context area control-plane network.

The second level-one VPNI context area data-plane network is a VXLAN associated with a VXLAN Network Identifier (VNI) that has the value 150 (VNI 150). A communication and computing device, such as a VPN server (source VPN server), such as the VPN servers 7410, 7510 shown in FIG. 7, in the second level-one VPNI context area data-plane network implements, operates, or includes, a VXLAN tunnel end point, or interface, to the second level-one VPNI context area data-plane network.

The portion of the hierarchical-context area network 8000 includes, in the level-one VPNI context level, and within the first level-two VPNI context area 8112, a third level-one VPNI context area 8112.6, wherein a third level-one VPNI context area network including a third level-one VPNI context area control-plane network, a third level-one VPNI context area data-plane network, or both, is implemented. The value of the geographic, or geopolitical, location associated with the third level-one VPNI context area 8112.6, the third level-one VPNI context area control-plane network, and the third level-one VPNI context area data-plane network is Paris.

The third level-one VPNI context area network, including the third level-one VPNI context area control-plane network, the third level-one VPNI context area data-plane network, or both, is allocated, associated with, or assigned, a defined range of addresses (not expressly shown), including one or more shared IP addresses. For example, the last, or highest, IP address in the defined range of IP addresses allocated to, associated with, or assigned to, the third level-one VPNI context area network may be the shared IP address.

The defined range of IP addresses allocated to, associated with, or assigned to, the third level-one VPNI context area network may be a subset of the defined range of IP addresses allocated to, associated with, or assigned to, the first level-two VPNI context area network. For example, the defined range of IP addresses allocated to, associated with, or assigned to, the first level-two VPNI context area network may be indicated or expressed using an IP address and a bit-length indicating a relatively broad range of IP addresses, such as twenty (/20), and the defined range of IP addresses allocated to, associated with, or assigned to, the third level-one VPNI context area network may be indicated or expressed using the IP address and a bit-length indicating a relatively narrow range of IP addresses, such as twenty-four (/24).

The third level-one VPNI context area control-plane network is a VXLAN associated with a VXLAN Network Identifier (VNI) that has the value 100 (VNI 100). A communication and computing device, such as a VPN server (source VPN server), such as the VPN servers 7410, 7510 shown in FIG. 7, in the third level-one VPNI context area control-plane network implements, operates, or includes, a VXLAN tunnel end point, or interface, to the third level-one VPNI context area control-plane network.

The third level-one VPNI context area data-plane network is a VXLAN associated with a VXLAN Network Identifier (VNI) that has the value 150 (VNI 150). A communication and computing device, such as a VPN server (source VPN server), such as the VPN servers 7410, 7510 shown in FIG. 7, in the third level-one VPNI context area data-plane network implements, operates, or includes, a VXLAN tunnel end point, or interface, to the third level-one VPNI context area data-plane network.

The portion of the hierarchical-context area network 8000 includes, in the level-two VPNI context level, and within the first level-three VPNI context area 8110, a second level-two VPNI context area 8114, wherein a second level-two VPNI context area network including a second level-two VPNI context area control-plane network, a second level-two VPNI context area data-plane network, or both, is implemented. The value of the geographic, or geopolitical, location associated with the second level-two VPNI context area 8114, the second level-two VPNI context area control-plane network, and the second level-two VPNI context area data-plane network, is the United Kingdom (UK).

The second level-two VPNI context area network, including the second level-two VPNI context area control-plane network, the second level-two VPNI context area data-plane network, or both, is allocated, associated with, or assigned, a defined range of addresses (not expressly shown), including one or more shared IP addresses. For example, the last, or highest, IP address in the defined range of IP addresses allocated to, associated with, or assigned to, the second level-two VPNI context area network may be the shared IP address.

The defined range of IP addresses allocated to, associated with, or assigned to, the second level-two VPNI context area network may be a subset of the defined range of IP addresses allocated to, associated with, or assigned to, the first level-three VPNI context area network. For example, the defined range of IP addresses allocated to, associated with, or assigned to, the first level-three VPNI context area network may be indicated or expressed using an IP address and a bit-length indicating a relatively broad range of IP addresses, such as sixteen (/16), and the defined range of IP addresses allocated to, associated with, or assigned to, the second level-two VPNI context area network may be indicated or expressed using the IP address and a bit-length indicating a relatively narrow range of IP addresses, such as twenty (/20).

The second level-two VPNI context area control-plane network is a VXLAN associated with a VXLAN Network Identifier that has the value 200 (VNI 200). A communication and computing device, such as a VPN server (source VPN server), such as the VPN servers 7410, 7510 shown in FIG. 7, in the second level-two VPNI context area control-plane network implements, operates, or includes, a VXLAN tunnel end point, or interface, to the second level-two VPNI context area control-plane network.

The second level-two VPNI context area data-plane network is a VXLAN associated with a VXLAN Network Identifier that has the value 250 (VNI 250). A communication and computing device, such as a VPN server (source VPN server), such as the VPN servers 7410, 7510 shown in FIG. 7, in the second level-two VPNI context area data-plane network implements, operates, or includes, a VXLAN tunnel end point, or interface, to the second level-two VPNI context area data-plane network.

The portion of the hierarchical-context area network 8000 includes, in the level-one VPNI context level, and within the second level-two VPNI context area 8114, a fourth level-one VPNI context area 8114.2, wherein a fourth level-one VPNI context area network including a fourth level-one VPNI context area control-plane network, a fourth level-one VPNI context area data-plane network, or both, is implemented. The value of the geographic, or geopolitical, location associated with the fourth level-one VPNI context area 8114.2, the fourth level-one VPNI context area control-plane network, and the fourth level-one VPNI context area data-plane network is Birmingham.

The fourth level-one VPNI context area network, including the fourth level-one VPNI context area control-plane network, the fourth level-one VPNI context area data-plane network, or both, is allocated, associated with, or assigned, a defined range of addresses (not expressly shown), including one or more shared IP addresses. For example, the last, or highest, IP address in the defined range of IP addresses allocated to, associated with, or assigned to, the fourth level-one VPNI context area network may be the shared IP address.

The defined range of IP addresses allocated to, associated with, or assigned to, the fourth level-one VPNI context area network may be a subset of the defined range of IP addresses allocated to, associated with, or assigned to, the second level-two VPNI context area network. For example, the defined range of IP addresses allocated to, associated with, or assigned to, the second level-two VPNI context area network may be indicated or expressed using an IP address and a bit-length indicating a relatively broad range of IP addresses, such as twenty (/20), and the defined range of IP addresses allocated to, associated with, or assigned to, the fourth level-one VPNI context area network may be indicated or expressed using the IP address and a bit-length indicating a relatively narrow range of IP addresses, such as twenty-four (/24).

The fourth level-one VPNI context area control-plane network is a VXLAN associated with a VXLAN Network Identifier (VNI) that has the value 100 (VNI 100). A communication and computing device, such as a VPN server (source VPN server), such as the VPN servers 7410, 7510 shown in FIG. 7, in the fourth level-one VPNI context area control-plane network implements, operates, or includes, a VXLAN tunnel end point, or interface, to the fourth level-one VPNI context area control-plane network.

The fourth level-one VPNI context area data-plane network is a VXLAN associated with a VXLAN Network Identifier (VNI) that has the value 150 (VNI 150). A communication and computing device, such as a VPN server (source VPN server), such as the VPN servers 7410, 7510 shown in FIG. 7, in the fourth level-one VPNI context area data-plane network implements, operates, or includes, a VXLAN tunnel end point, or interface, to the fourth level-one VPNI context area data-plane network.

The portion of the hierarchical-context area network 8000 includes, in the level-one VPNI context level, and within the second level-two VPNI context area 8114, a fifth level-one VPNI context area 8114.4, wherein a fifth level-one VPNI context area network including a fifth level-one VPNI context area control-plane network, a fifth level-one VPNI context area data-plane network, or both, is implemented.

The value of the geographic, or geopolitical, location associated with the fifth level-one VPNI context area 8114.4, the fifth level-one VPNI context area control-plane network, and the fifth level-one VPNI context area data-plane network is Liverpool.

The fifth level-one VPNI context area network, including the fifth level-one VPNI context area control-plane network, the fifth level-one VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the fifth level-one VPNI context area network may be the shared IP address.

The defined range of IP addresses allocated to, associated with, or assigned to, the fifth level-one VPNI context area network may be a subset of the defined range of IP addresses allocated to, associated with, or assigned to, the second level-two VPNI context area network. For example, the defined range of IP addresses allocated to, associated with, or assigned to, the second level-two VPNI context area network may be indicated or expressed using an IP address and a bit-length indicating a relatively broad range of IP addresses, such as twenty (/20), and the defined range of IP addresses allocated to, associated with, or assigned to, the fifth level-one VPNI context area network may be indicated or expressed using the IP address and a bit-length indicating a relatively narrow range of IP addresses, such as twenty-four (/24).

The fifth level-one VPNI context area control-plane network is a VXLAN associated with a VXLAN Network Identifier (VNI) that has the value 100 (VNI 100). A communication and computing device, such as a VPN server (source VPN server), such as the VPN servers 7410, 7510 shown in FIG. 7, in the fifth level-one VPNI context area control-plane network implements, operates, or includes, a VXLAN tunnel end point, or interface, to the fifth level-one VPNI context area control-plane network.

The fifth level-one VPNI context area data-plane network is a VXLAN associated with a VXLAN Network Identifier (VNI) that has the value 150 (VNI 150). A communication and computing device, such as a VPN server (source VPN server), such as the VPN servers 7410, 7510 shown in FIG. 7, in the fifth level-one VPNI context area data-plane network implements, operates, or includes, a VXLAN tunnel end point, or interface, to the fifth level-one VPNI context area data-plane network.

The portion of the hierarchical-context area network 8000 includes, in the level-one VPNI context level, and within the second level-two VPNI context area 8114, a sixth level-one VPNI context area 8114.6, wherein a sixth level-one VPNI context area network including a sixth level-one VPNI context area control-plane network, a sixth level-one VPNI context area data-plane network, or both, is implemented. The value of the geographic, or geopolitical, location associated with the sixth level-one VPNI context area 8114.6, the sixth level-one VPNI context area control-plane network, and the sixth level-one VPNI context area data-plane network is London.

The sixth level-one VPNI context area network, including the sixth level-one VPNI context area control-plane network, the sixth level-one VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the sixth level-one VPNI context area network may be the shared IP address.

The defined range of IP addresses allocated to, associated with, or assigned to, the sixth level-one VPNI context area network may be a subset of the defined range of IP addresses allocated to, associated with, or assigned to, the second level-two VPNI context area network. For example, the defined range of IP addresses allocated to, associated with, or assigned to, the second level-two VPNI context area network may be indicated or expressed using an IP address and a bit-length indicating a relatively broad range of IP addresses, such as twenty (/20), and the defined range of IP addresses allocated to, associated with, or assigned to, the sixth level-one VPNI context area network may be indicated or expressed using the IP address and a bit-length indicating a relatively narrow range of IP addresses, such as twenty-four (/24).

The sixth level-one VPNI context area control-plane network is a VXLAN associated with a VXLAN Network Identifier (VNI) that has the value 100 (VNI 100). A communication and computing device, such as a VPN server (source VPN server), such as the VPN servers 7410, 7510 shown in FIG. 7, in the sixth level-one VPNI context area control-plane network implements, operates, or includes, a VXLAN tunnel end point, or interface, to the sixth level-one VPNI context area control-plane network.

The sixth level-one VPNI context area control-plane network is a VXLAN associated with a VXLAN Network Identifier (VNI) that has the value 100 (VNI 100). A communication and computing device, such as a VPN server (source VPN server), such as the VPN servers 7410, 7510 shown in FIG. 7, in the sixth level-one VPNI context area control-plane network implements, operates, or includes, a VXLAN tunnel end point, or interface, to the sixth level-one VPNI context area control-plane network.

The portion of the hierarchical-context area network 8000 includes, in the level-three VPNI context level, and within the level-four VPNI context area 8100, a second level-three VPNI context area 8120, wherein a second level-three VPNI context area control-plane network including a second level-three VPNI context area control-plane network (VNI 300), a second level-three VPNI context area data-plane network (VNI 350), or both, is implemented. The value of the geographic, or geopolitical, location associated with the second level-three VPNI context area 8120, the second level-three VPNI context area control-plane network, and the second level-three VPNI context area data-plane network, is Asia.

The second level-three VPNI context area network, including the second level-three VPNI context area control-plane network, the second level-three VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the second level-three VPNI context area network may be the shared IP address.

The defined range of IP addresses allocated to, associated with, or assigned to, the second level-three VPNI context area network may be a subset of the defined range of IP addresses allocated to, associated with, or assigned to, the level-four VPNI context area network. For example, the defined range of IP addresses allocated to, associated with, or assigned to, the level-four VPNI context area network may be indicated or expressed using an IP address and a bit-length indicating a relatively broad range of IP addresses, such as nine (/9), and the defined range of IP addresses allocated to, associated with, or assigned to, the second level-three VPNI context area network may be indicated or expressed using the IP address and a bit-length indicating a relatively narrow range of IP addresses, such as sixteen (/16).

The second level-three VPNI context area control-plane network is a VXLAN associated with a VXLAN Network Identifier (VNI) that has the value 300 (VNI 300). A communication and computing device, such as a VPN server (source VPN server), such as the VPN servers 7410, 7510 shown in FIG. 7, in the second level-three VPNI context area control-plane network implements, operates, or includes, a VXLAN tunnel end point, or interface, to the second level-three VPNI context area control-plane network.

The second level-three VPNI context area data-plane network is a VXLAN associated with a VXLAN Network Identifier (VNI) that has the value 350 (VNI 350). A communication and computing device, such as a VPN server (source VPN server), such as the VPN servers 7410, 7510 shown in FIG. 7, in the second level-three VPNI context area data-plane network implements, operates, or includes, a VXLAN tunnel end point, or interface, to the second level-three VPNI context area data-plane network.

The portion of the hierarchical-context area network 8000 includes, in the level-two VPNI context level, such as the second VPNI context level 6200 (level-two) shown in FIG. 6, and within the second level-three VPNI context area 8120, a third level-two VPNI context area 8122, wherein a third level-two VPNI context area network including a third level-two VPNI context area control-plane network, a third level-two VPNI context area data-plane network, or both, is implemented. The value of the geographic, or geopolitical, location associated with the third level-two VPNI context area 8122, the third level-two VPNI context area control-plane network, and the third level-two VPNI context area data-plane network is Japan.

The third level-two VPNI context area network, including the third level-two VPNI context area control-plane network, the third level-two VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the third level-two VPNI context area network may be the shared IP address.

The defined range of IP addresses allocated to, associated with, or assigned to, the third level-two VPNI context area network may be a subset of the defined range of IP addresses allocated to, associated with, or assigned to, the second level-three VPNI context area network. For example, the defined range of IP addresses allocated to, associated with, or assigned to, the second level-three VPNI context area network may be indicated or expressed using an IP address and a bit-length indicating a relatively broad range of IP addresses, such as sixteen (/16), and the defined range of IP addresses allocated to, associated with, or assigned to, the third level-two VPNI context area network may be indicated or expressed using the IP address and a bit-length indicating a relatively narrow range of IP addresses, such as twenty (/20).

The third level-two VPNI context area control-plane network is a VXLAN associated with a VXLAN Network Identifier that has the value 200 (VNI 200). A communication and computing device, such as a VPN server (source VPN server), such as the VPN servers 7410, 7510 shown in FIG. 7, in the third level-two VPNI context area control-plane network implements, operates, or includes, a VXLAN tunnel end point, or interface, to the third level-two VPNI context area control-plane network.

The third level-two VPNI context area data-plane network is a VXLAN associated with a VXLAN Network Identifier that has the value 250 (VNI 250). A communication and computing device, such as a VPN server (source VPN server), such as the VPN servers 7410, 7510 shown in FIG. 7, in the third level-two VPNI context area data-plane network implements, operates, or includes, a VXLAN tunnel end point, or interface, to the third level-two VPNI context area data-plane network.

The portion of the hierarchical-context area network 8000 includes, in the level-one VPNI context level, and within the third level-two VPNI context area 8122, a seventh level-one VPNI context area 8122.2, wherein a seventh level-one VPNI context area network including a seventh level-one VPNI context area control-plane network, a seventh level-one VPNI context area data-plane network, or both, is implemented. The value of the geographic, or geopolitical, location associated with the seventh level-one VPNI context area 8122.2, the seventh level-one VPNI context area control-plane network, and the seventh level-one VPNI context area data-plane network, is Osaka.

The seventh level-one VPNI context area network, including the seventh level-one VPNI context area control-plane network, the seventh level-one VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the seventh level-one VPNI context area network may be the shared IP address.

The defined range of IP addresses allocated to, associated with, or assigned to, the seventh level-one VPNI context area network may be a subset of the defined range of IP addresses allocated to, associated with, or assigned to, the third level-two VPNI context area network. For example, the defined range of IP addresses allocated to, associated with, or assigned to, the third level-two VPNI context area network may be indicated or expressed using an IP address and a bit-length indicating a relatively broad range of IP addresses, such as twenty (/20), and the defined range of IP addresses allocated to, associated with, or assigned to, the seventh level-one VPNI context area network may be indicated or expressed using the IP address and a bit-length indicating a relatively narrow range of IP addresses, such as twenty-four (/24).

The seventh level-one VPNI context area control-plane network is a VXLAN associated with a VXLAN Network Identifier (VNI) that has the value 100 (VNI 100). A communication and computing device, such as a VPN server (source VPN server), such as the VPN servers 7410, 7510 shown in FIG. 7, in the seventh level-one VPNI context area control-plane network implements, operates, or includes, a VXLAN tunnel end point, or interface, to the seventh level-one VPNI context area control-plane network.

The seventh level-one VPNI context area data-plane network is a VXLAN associated with a VXLAN Network Identifier (VNI) that has the value 150 (VNI 150). A communication and computing device, such as a VPN server (source VPN server), such as the VPN servers 7410, 7510 shown in FIG. 7, in the seventh level-one VPNI context area data-plane network implements, operates, or includes, a VXLAN tunnel end point, or interface, to the seventh level-one VPNI context area data-plane network.

The portion of the hierarchical-context area network 8000 includes, in the level-one VPNI context level, and within the third level-two VPNI context area 8122, an eighth level-one VPNI context area 8122.4, wherein an eighth level-one VPNI context area network including an eighth level-one VPNI context area control-plane network, an eighth level-one VPNI context area data-plane network, or both, is implemented. The value of the geographic, or geopolitical, location associated with the eighth level-one VPNI context area 8122.4, the eighth level-one VPNI context area control-plane network, and the eighth level-one VPNI context area data-plane network, is Tokyo.

The eighth level-one VPNI context area network, including the eighth level-one VPNI context area control-plane network, the eighth level-one VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the eighth level-one VPNI context area network may be the shared IP address.

The defined range of IP addresses allocated to, associated with, or assigned to, the eighth level-one VPNI context area network may be a subset of the defined range of IP addresses allocated to, associated with, or assigned to, the third level-two VPNI context area network. For example, the defined range of IP addresses allocated to, associated with, or assigned to, the third level-two VPNI context area network may be indicated or expressed using an IP address and a bit-length indicating a relatively broad range of IP addresses, such as twenty (/20), and the defined range of IP addresses allocated to, associated with, or assigned to, the eighth level-one VPNI context area network may be indicated or expressed using the IP address and a bit-length indicating a relatively narrow range of IP addresses, such as twenty-four (/24).

The eighth level-one VPNI context area control-plane network is a VXLAN associated with a VXLAN Network Identifier (VNI) that has the value 100 (VNI 100). A communication and computing device, such as a VPN server (source VPN server), such as the VPN servers 7410, 7510 shown in FIG. 7, in the eighth level-one VPNI context area control-plane network implements, operates, or includes, a VXLAN tunnel end point, or interface, to the eighth level-one VPNI context area control-plane network.

The eighth level-one VPNI context area data-plane network is a VXLAN associated with a VXLAN Network Identifier (VNI) that has the value 150 (VNI 150). A communication and computing device, such as a VPN server (source VPN server), such as the VPN servers 7410, 7510 shown in FIG. 7, in the eighth level-one VPNI context area data-plane network implements, operates, or includes, a VXLAN tunnel end point, or interface, to the eighth level-one VPNI context area data-plane network.

The portion of the hierarchical-context area network 8000 includes, in the level-one VPNI context level, and within the third level-two VPNI context area 8122, a ninth level-one VPNI context area 8122.6, wherein a ninth level-one VPNI context area network including a ninth level-one VPNI context area control-plane network, a ninth level-one VPNI context area data-plane network, or both, is implemented. The value of the geographic, or geopolitical, location associated with the ninth level-one VPNI context area 8122.6, the ninth level-one VPNI context area control-plane network, and the ninth level-one VPNI context area data-plane network, is Yokohama.

The ninth level-one VPNI context area network, including the ninth level-one VPNI context area control-plane network, the ninth level-one VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the ninth level-one VPNI context area network may be the shared IP address.

The defined range of IP addresses allocated to, associated with, or assigned to, the ninth level-one VPNI context area network may be a subset of the defined range of IP addresses allocated to, associated with, or assigned to, the third level-two VPNI context area network. For example, the defined range of IP addresses allocated to, associated with, or assigned to, the third level-two VPNI context area network may be indicated or expressed using an IP address and a bit-length indicating a relatively broad range of IP addresses, such as twenty (/20), and the defined range of IP addresses allocated to, associated with, or assigned to, the ninth level-one VPNI context area network may be indicated or expressed using the IP address and a bit-length indicating a relatively narrow range of IP addresses, such as twenty-four (/24).

The ninth level-one VPNI context area control-plane network is a VXLAN associated with a VXLAN Network Identifier (VNI) that has the value 100 (VNI 100). A communication and computing device, such as a VPN server (source VPN server), such as the VPN servers 7410, 7510 shown in FIG. 7, in the ninth level-one VPNI context area control-plane network implements, operates, or includes, a VXLAN tunnel end point, or interface, to the ninth level-one VPNI context area control-plane network.

The ninth level-one VPNI context area data-plane network is a VXLAN associated with a VXLAN Network Identifier (VNI) that has the value 150 (VNI 150). A communication and computing device, such as a VPN server (source VPN server), such as the VPN servers 7410, 7510 shown in FIG. 7, in the ninth level-one VPNI context area data-plane network implements, operates, or includes, a VXLAN tunnel end point, or interface, to the ninth level-one VPNI context area data-plane network.

The portion of the hierarchical-context area network 8000 includes, in the level-two VPNI context level, such as the second VPNI context level 6200 (level-two) shown in FIG. 6, and within the second level-three VPNI context area 8120, a fourth level-two VPNI context area 8124, wherein a fourth level-two VPNI context area network including a fourth level-two VPNI context area control-plane network, a fourth level-two VPNI context area data-plane network, or both, is implemented. The value of the geographic, or geopolitical, location associated with the fourth level-two VPNI context area 8124, the fourth level-two VPNI context area control-plane network, and the fourth level-two VPNI context area data-plane network, is China.

The fourth level-two VPNI context area network, including the fourth level-two VPNI context area control-plane network, the fourth level-two VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the fourth level-two VPNI context area network may be the shared IP address.

The defined range of IP addresses allocated to, associated with, or assigned to, the fourth level-two VPNI context area network may be a subset of the defined range of IP addresses allocated to, associated with, or assigned to, the second level-three VPNI context area network. For example, the defined range of IP addresses allocated to, associated with, or assigned to, the second level-three VPNI context area network may be indicated or expressed using an IP address and a bit-length indicating a relatively broad range of IP addresses, such as sixteen (/16), and the defined range of IP addresses allocated to, associated with, or assigned to, the fourth level-two VPNI context area network may be indicated or expressed using the IP address and a bit-length indicating a relatively narrow range of IP addresses, such as twenty (/20).

The fourth level-two VPNI context area control-plane network is a VXLAN associated with a VXLAN Network Identifier that has the value 200 (VNI 200). A communication and computing device, such as a VPN server (source VPN server), such as the VPN servers 7410, 7510 shown in FIG. 7, in the fourth level-two VPNI context area control-plane network implements, operates, or includes, a VXLAN tunnel end point, or interface, to the fourth level-two VPNI context area control-plane network.

The fourth level-two VPNI context area data-plane network is a VXLAN associated with a VXLAN Network Identifier that has the value 250 (VNI 250). A communication and computing device, such as a VPN server (source VPN server), such as the VPN servers 7410, 7510 shown in FIG. 7, in the fourth level-two VPNI context area data-plane network implements, operates, or includes, a VXLAN tunnel end point, or interface, to the fourth level-two VPNI context area data-plane network.

The portion of the hierarchical-context area network 8000 includes, in the level-one VPNI context level, and within the fourth level-two VPNI context area 8124, a tenth level-one VPNI context area 8124.2, wherein a tenth level-one VPNI context area network including a tenth level-one VPNI context area control-plane network, a tenth level-one VPNI context area data-plane network, or both, is implemented. The value of the geographic, or geopolitical, location associated with the tenth level-one VPNI context area 8124.2, the tenth level-one VPNI context area control-plane network, and the tenth level-one VPNI context area data-plane network, is Shanghai.

The tenth level-one VPNI context area network, including the tenth level-one VPNI context area control-plane network, the tenth level-one VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the tenth level-one VPNI context area network may be the shared IP address.

The defined range of IP addresses allocated to, associated with, or assigned to, the tenth level-one VPNI context area network may be a subset of the defined range of IP addresses allocated to, associated with, or assigned to, the fourth level-two VPNI context area network. For example, the defined range of IP addresses allocated to, associated with, or assigned to, the fourth level-two VPNI context area network may be indicated or expressed using an IP address and a bit-length indicating a relatively broad range of IP addresses, such as twenty (/20), and the defined range of IP addresses allocated to, associated with, or assigned to, the tenth level-one VPNI context area network may be indicated or expressed using the IP address and a bit-length indicating a relatively narrow range of IP addresses, such as twenty-four (/24).

The tenth level-one VPNI context area control-plane network is a VXLAN associated with a VXLAN Network Identifier (VNI) that has the value 100 (VNI 100). A communication and computing device, such as a VPN server (source VPN server), such as the VPN servers 7410, 7510 shown in FIG. 7, in the tenth level-one VPNI context area control-plane network implements, operates, or includes, a VXLAN tunnel end point, or interface, to the tenth level-one VPNI context area control-plane network.

The tenth level-one VPNI context area data-plane network is a VXLAN associated with a VXLAN Network Identifier (VNI) that has the value 150 (VNI 150). A communication and computing device, such as a VPN server (source VPN server), such as the VPN servers 7410, 7510 shown in FIG. 7, in the tenth level-one VPNI context area data-plane network implements, operates, or includes, a VXLAN tunnel end point, or interface, to the tenth level-one VPNI context area data-plane network.

The portion of the hierarchical-context area network 8000 includes, in the level-one VPNI context level, and within the fourth level-two VPNI context area 8124, a twelfth level-one VPNI context area 8124.6, wherein a twelfth level-one VPNI context area network including a twelfth level-one VPNI context area control-plane network, a twelfth level-one VPNI context area data-plane network, or both, is implemented. The value of the geographic, or geopolitical, location associated with the eleventh level-one VPNI context area 8124.4, and the eleventh level-one VPNI context area control-plane network, and the eleventh level-one VPNI context area data-plane network, is Beijing.

The twelfth level-one VPNI context area network, including the twelfth level-one VPNI context area control-plane network, the twelfth level-one VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the twelfth level-one VPNI context area network may be the shared IP address.

The defined range of IP addresses allocated to, associated with, or assigned to, the twelfth level-one VPNI context area network may be a subset of the defined range of IP addresses allocated to, associated with, or assigned to, the fourth level-two VPNI context area network. For example, the defined range of IP addresses allocated to, associated with, or assigned to, the fourth level-two VPNI context area network may be indicated or expressed using an IP address and a bit-length indicating a relatively broad range of IP addresses, such as twenty (/20), and the defined range of IP addresses allocated to, associated with, or assigned to, the twelfth level-one VPNI context area network may be indicated or expressed using the IP address and a bit-length indicating a relatively narrow range of IP addresses, such as twenty-four (/24).

The eleventh level-one VPNI context area control-plane network is a VXLAN associated with a VXLAN Network Identifier (VNI) that has the value 100 (VNI 100). A communication and computing device, such as a VPN server (source VPN server), such as the VPN servers 7410, 7510 shown in FIG. 7, in the eleventh level-one VPNI context area control-plane network implements, operates, or includes, a VXLAN tunnel end point, or interface, to the eleventh level-one VPNI context area control-plane network.

The eleventh level-one VPNI context area data-plane network is a VXLAN associated with a VXLAN Network Identifier (VNI) that has the value 150 (VNI 150). A communication and computing device, such as a VPN server (source VPN server), such as the VPN servers 7410, 7510 shown in FIG. 7, in the eleventh level-one VPNI context area data-plane network implements, operates, or includes, a VXLAN tunnel end point, or interface, to the eleventh level-one VPNI context area data-plane network.

The portion of the hierarchical-context area network 8000 includes, in the level-one VPNI context level, and within the fourth level-two VPNI context area 8124, an eleventh level-one VPNI context area 8124.4, wherein an eleventh level-one VPNI context area network including an eleventh level-one VPNI context area control-plane network, an eleventh level-one VPNI context area data-plane network, or both, is implemented. The value of the geographic, or geopolitical, location associated with the twelfth level-one VPNI context area 8124.6, the twelfth level-one VPNI context area control-plane network, and the twelfth level-one VPNI context area data-plane network, is Chongqing.

The eleventh level-one VPNI context area network, including the eleventh level-one VPNI context area control-plane network, the eleventh level-one VPNI context area data-plane network, or both, is allocated, associated with, or assigned, a defined range of IP addresses (not expressly shown), including one or more shared IP addresses. For example, the last, or highest, IP address in the defined range of IP addresses allocated to, associated with, or assigned to, the eleventh level-one VPNI context area network may be the shared IP address.

The defined range of IP addresses allocated to, associated with, or assigned to, the eleventh level-one VPNI context area network may be a subset of the defined range of IP addresses allocated to, associated with, or assigned to, the fourth level-two VPNI context area network. For example, the defined range of IP addresses allocated to, associated with, or assigned to, the fourth level-two VPNI context area network may be indicated or expressed using an IP address and a bit-length indicating a relatively broad range of IP addresses, such as twenty (/20), and the defined range of IP addresses allocated to, associated with, or assigned to, the eleventh level-one VPNI context area network may be indicated or expressed using the IP address and a bit-length indicating a relatively narrow range of IP addresses, such as twenty-four (/24).

The twelfth level-one VPNI context area control-plane network is a VXLAN associated with a VXLAN Network Identifier (VNI) that has the value 100 (VNI 100). A communication and computing device, such as a VPN server (source VPN server), such as the VPN servers 7410, 7510 shown in FIG. 7, in the twelfth level-one VPNI context area control-plane network implements, operates, or includes, a VXLAN tunnel end point, or interface, to the twelfth level-one VPNI context area control-plane network.

The twelfth level-one VPNI context area data-plane network is a VXLAN associated with a VXLAN Network Identifier (VNI) that has the value 150 (VNI 150). A communication and computing device, such as a VPN server (source VPN server), such as the VPN servers 7410, 7510 shown in FIG. 7, in the twelfth level-one VPNI context area data-plane network implements, operates, or includes, a VXLAN tunnel end point, or interface, to the twelfth level-one VPNI context area data-plane network.

Although the VXLAN Network Identifier values are associated with multiple networks, the corresponding VPNI context area networks are, respectively, distinct, or separate.

Figure 9:
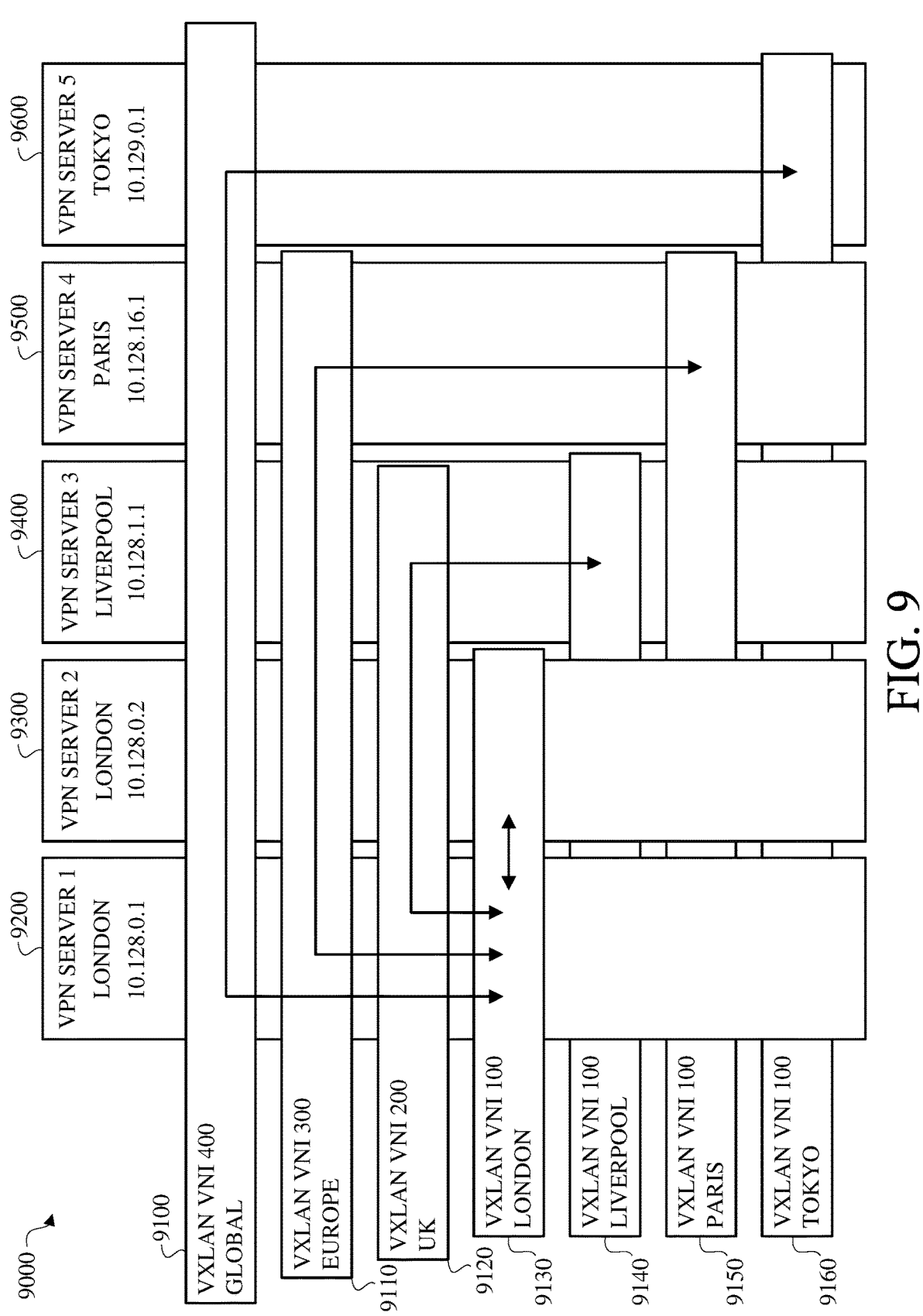
FIG. 9 is a diagram of an example of a portion of a virtual private network infrastructure system.

FIG. 9 is a diagram of an example of a portion of a virtual private network infrastructure system 9000. The portion of the VPNI system 9000 may be implemented in a hierarchical-context area network, such as partially shown in the portion of the hierarchical-context area network 8000 shown in FIG. 8.

The VPNI system 9000 includes a hierarchy of VPNI context levels, such as the hierarchy of VPNI context levels 6000 shown in FIG. 6, which includes a first VPNI context level (level-one) within a second VPNI context level (level-two) within a third VPNI context level (level-three) within a fourth VPNI context level (level-four).

The fourth VPNI context level (level-four) includes a level-four VPNI context area 9100, such as the level-four VPNI context area 8100 shown in FIG. 8, including a level-four VPNI context area data-plane network (not expressly shown) that has a VXLAN Network Identifier that has the value 450 (VNI 450) that is allocated, associated with, or assigned, an IP address range 10.128.0.0-10.255.255.255, which may be expressed using a netmask corresponding to the routing prefix 10.128.0.1/9, and a level-four VPNI context area control-plane network (not expressly shown) that has a VXLAN Network Identifier that has the value 400 (VNI 400) is allocated, associated with, or assigned, an IP address range 10.128.0.0-10.255.255.255, which may be expressed using a netmask corresponding to a routing prefix having the value 10.128.0.1/9. The level-four VPNI context area 9100 represents the Earth (global).

The third VPNI context level (level-three) includes a first level-three VPNI context area 9110, such as the level-three VPNI context area 8110 shown in FIG. 8, including a first level-three VPNI context area data-plane network (not expressly shown) that has a VXLAN Network Identifier that has the value 350 (VNI 350) that is allocated, associated with, or assigned, an IP address range 10.128.0.0-10.128.255.255, which may be expressed using a netmask corresponding to a routing prefix having the value 10.128.0.1/16, and a first level-three VPNI context area control-plane network (not expressly shown) that has a VXLAN Network Identifier that has the value 300 (VNI 300) that is allocated, associated with, or assigned, an IP address range 10.128.0.0-10.128.255.255, which may be expressed using a netmask corresponding to a routing prefix having the value 10.128.0.1/16. The first level-three VPNI context area 9110 represents Europe.

The third VPNI context level includes a second level-three VPNI context area (not expressly shown), such as the level-three VPNI context area 8120 shown in FIG. 8, including a second level-three VPNI context area data-plane network (not expressly shown) that has a VXLAN Network Identifier that has the value 350 (VNI 350) that is allocated, associated with, or assigned, an IP address range 10.129.0.0-10.129.255.255, which may be expressed using a netmask corresponding to a routing prefix having the value 10.129.0.1/16, and a second level-three VPNI context area control-plane network (not expressly shown) that has a VXLAN Network Identifier that has the value 300 (VNI 300) that is allocated, associated with, or assigned, an IP address range 10.129.0.0-10.129.255.255, which may be expressed using a netmask corresponding to a routing prefix having the value 10.129.0.1/16. The second level-three VPNI context area network (not expressly shown) represents Asia.

The second VPNI context level (level-two) includes a first level-two VPNI context area 9120, such as the level-two VPNI context area 8114 shown in FIG. 8, including a first level-two VPNI context area data-plane network (not expressly shown) that has a VXLAN Network Identifier that has the value 250 (VNI 250) that is allocated, associated with, or assigned, an IP address range 10.128.0.0-10.128.15.255, which may be expressed using a netmask corresponding to a routing prefix having the value 10.128.0.1/20, and a first level-two VPNI context area control-plane network (not expressly shown) that has a VXLAN Network Identifier that has the value 200 (VNI 200) that is allocated, associated with, or assigned, an IP address range 10.128.0.0-10.128.15.255, which may be expressed using a netmask corresponding to a routing prefix having the value 10.128.0.1/20. The first level-two VPNI context area 9120 represents the UK.

The second VPNI context level (level-two) includes a second level-two VPNI context area (not expressly shown), such as the first level-two VPNI context area 8112 shown in FIG. 8, including second level-two VPNI context area data-plane network (not expressly shown) that has a VXLAN Network Identifier that has the value 250 (VNI 250) that is allocated, associated with, or assigned, an IP address range 10.128.16.0-10.128.31.255, which may be expressed using a netmask corresponding to a routing prefix having the value 10.128.16.1/20, and a second level-two VPNI context area control-plane network (not expressly shown) that has a VXLAN Network Identifier that has the value 200 (VNI 200) that is allocated, associated with, or assigned, an IP address range 10.128.16.0-10.128.31.255, which may be expressed using a netmask corresponding to a routing prefix having the value 10.128.16.1/20. The second level-two VPNI context area network (not expressly shown) represents France.

The second VPNI context level (level-two) includes a third level-two VPNI context area (not expressly shown), such as the third level-two VPNI context area 8122 shown in FIG. 8, including a third level-two VPNI context area data-plane network (not expressly shown) that has a VXLAN Network Identifier that has the value 250 (VNI 250) that is allocated, associated with, or assigned, an IP address range 10.129.0.0-10.129.15.255, which may be expressed using a netmask corresponding to a routing prefix having the value 10.129.0.1/20, and a third level-two VPNI context area control-plane network (not expressly shown) that has a VXLAN Network Identifier that has the value 200 (VNI 200) that is allocated, associated with, or assigned, an IP address range 10.129.0.0-10.129.15.255, which may be expressed using a netmask, or a corresponding routing prefix having the value 10.129.0.1/20. The third level-two VPNI context area network (not expressly shown) represents Japan.

The first VPNI context level (level-one) includes a first level-one VPNI context area 9130, such as the level-one VPNI context area 8114.6 shown in FIG. 8, including a first level-one VPNI context area data-plane network (not expressly shown) that has a VXLAN Network Identifier that has the value 150 (VNI 150), that is allocated, associated with, or assigned, an IP address range 10.128.0.0-10.128.0.255, which may be expressed using a netmask corresponding to a routing prefix having the value 10.128.0.1/24, and a first level-one VPNI context area control-plane network (not expressly shown) that has a VXLAN Network Identifier that has the value 100 (VNI 100), that is allocated, associated with, or assigned, an IP address range 10.128.0.0-10.128.0.255, which may be expressed using a netmask corresponding to a routing prefix having the value 10.128.0.1/24. The first level-one VPNI context area 9130 represents London.

The first VPNI context level (level-one) includes a second level-one VPNI context area 9140, such as the level-one VPNI context area 8114.4 shown in FIG. 8, including a second level-one VPNI context area data-plane network (not expressly shown) that has a VXLAN Network Identifier that has the value 150 (VNI 150), that is allocated, associated with, or assigned, an IP address range 10.128.1.0-10.128.1.255, which may be expressed using a netmask corresponding to a routing prefix having the value 10.128.1.1/24, and a second level-one VPNI context area control-plane network (not expressly shown) that has a VXLAN Network Identifier that has the value 100 (VNI 100), that is allocated, associated with, or assigned, an IP address range 10.128.1.0-10.128.1.255, which may be expressed using a netmask corresponding to a routing prefix having the value 10.128.1.1/24. The second level-one VPNI context area 9140 represents Liverpool.

The first VPNI context level (level-one) includes a third level-one VPNI context area 9150, such as the level-one VPNI context area 8112.6 shown in FIG. 8, including a third level-one VPNI context area data-plane network (not expressly shown) that has a VXLAN Network Identifier that has the value 150 (VNI 150), that is allocated, associated with, or assigned, an IP address range 10.128.16.0-10.128.16.255, which may be expressed using a netmask corresponding to a routing prefix having the value 10.128.16.1/24, and a third level-one VPNI context area control-plane network (not expressly shown) that has a VXLAN Network Identifier that has the value 100 (VNI 100), that is allocated, associated with, or assigned, an IP address range 10.128.16.0-10.128.16.255, which may be expressed using a netmask corresponding to a routing prefix having the value 10.128.16.1/24. The third level-one VPNI context area 9150 represents Paris.

The first VPNI context level (level-one) includes a fourth level-one VPNI context area 9160, such as the level-one VPNI context area 8122.4 shown in FIG. 8, including a fourth level-one VPNI context area data-plane network (not expressly shown) that has a VXLAN Network Identifier that has the value 150 (VNI 150), that is allocated, associated with, or assigned, an IP address range 10.129.0.0-10.129.0.255, which may be expressed using a netmask corresponding to a routing prefix having the value 10.129.0.1/24, and a fourth level-one VPNI context area control-plane network (not expressly shown) that has a VXLAN Network Identifier that has the value 100 (VNI 100), that is allocated, associated with, or assigned, an IP address range 10.129.0.0-10.129.0.255, which may be expressed using a netmask corresponding to a routing prefix having the value 10.129.0.1/24. The fourth level-one VPNI context area 9160 represents Tokyo.

The first level-one VPNI context area 9130 and the second level-one VPNI context area 9140 are hierarchically within the first level-two VPNI context area 9120, which is hierarchically within the first level-three VPNI context area 9110, which is hierarchically within the level-four VPNI context area 9100.

The third level-one VPNI context area 9150 is hierarchically within the second level-two VPNI context area (not expressly shown), which is hierarchically within the first level-three VPNI context area 9110, which is hierarchically within the level-four VPNI context area 9100.

The fourth level-one VPNI context area 9160 is hierarchically within the third level-two VPNI context area (not expressly shown), which is hierarchically within the second level-three VPNI context area (not expressly shown), which is hierarchically within the level-four VPNI context area 9100.

The VPNI system 9000 includes a first VPN server 9200 (VPN Server 1), such as one of the VPN servers 7410, 7510 shown in FIG. 7, a second VPN server 9300 (VPN Server 2), such as one of the VPN servers 7410, 7510 shown in FIG. 7, a third VPN server 9400 (VPN Server 3), such as one of the VPN servers 7410, 7510 shown in FIG. 7, a fourth VPN server 9500 (VPN Server 4), such as one of the VPN servers 7410, 7510 shown in FIG. 7, and a fifth VPN server 9600 (VPN Server 5), such as one of the VPN servers 7410, 7510 shown in FIG. 7.

The first VPN server 9200 is physically located in London, England. The first VPN server 9200 has the IP address 10.128.0.1 in the hierarchical-context area network of the VPNI system 9000.

The first VPN server 9200 includes a VXLAN interface to the level-one VPNI context area data-plane network in the first level-one VPNI context area 9130, and a VXLAN interface to the level-one VPNI context area control-plane network in the first level-one VPNI context area 9130.

The first VPN server 9200 includes a VXLAN interface to the level-two VPNI context area control-plane network in the first level-two VPNI context area 9120 and a VXLAN interface to the level-two VPNI context area data-plane network in the first level-two VPNI context area 9120.

The first VPN server 9200 includes a VXLAN interface to the level-three VPNI context area control-plane network in the first level-three VPNI context area 9110 and a VXLAN interface to the level-three VPNI context area data-plane network in the first level-three VPNI context area 9110.

The first VPN server 9200 includes a VXLAN interface to the level-four VPNI context area control-plane network in the level-four VPNI context area 9100 and a VXLAN interface to the level-four VPNI context area data-plane network in the level-four VPNI context area 9100.

A VXLAN interface to a VXLAN network in the second level-one VPNI context area 9140 is absent, or omitted, from the first VPN server 9200. A VXLAN interface to a VXLAN network in the third level-one VPNI context area 9150 is absent, or omitted, from the first VPN server 9200. A VXLAN interface to a VXLAN network in the fourth level-one VPNI context area 9160 is absent, or omitted, from the first VPN server 9200. A VXLAN interface to a VXLAN network in the second level-two VPNI context area is absent, or omitted, from the first VPN server 9200. A VXLAN interface to a VXLAN network in the third level-two VPNI context area is absent, or omitted, from the first VPN server 9200. A VXLAN interface to a VXLAN network in the second level-three VPNI context area is absent, or omitted, from the first VPN server 9200.

The second VPN server 9300 is physically located in London, England. The second VPN server 9300 has the IP address 10.128.0.2 in the hierarchical-context area network of the VPNI system 9000.

The second VPN server 9300 includes a VXLAN interface to the level-one VPNI context area data-plane network in the first level-one VPNI context area 9130, and a VXLAN interface to the level-one VPNI context area control-plane network in the first level-one VPNI context area 9130.

The second VPN server 9300 includes a VXLAN interface to the level-two VPNI context area control-plane network in the first level-two VPNI context area 9120 and a VXLAN interface to the level-two VPNI context area data-plane network in the first level-two VPNI context area 9120.

The second VPN server 9300 includes a VXLAN interface to the level-three VPNI context area control-plane network in the first level-three VPNI context area 9110 and a VXLAN interface to the level-three VPNI context area data-plane network in the first level-three VPNI context area 9110.

The second VPN server 9300 includes a VXLAN interface to the level-four VPNI context area control-plane network in the level-four VPNI context area 9100 and a VXLAN interface to the level-four VPNI context area data-plane network in the level-four VPNI context area 9100.

A VXLAN interface to a VXLAN network in the second level-one VPNI context area 9140 is absent, or omitted, from the second VPN server 9300. A VXLAN interface to a VXLAN network in the third level-one VPNI context area 9150 is absent, or omitted, from the second VPN server 9300. A VXLAN interface to a VXLAN network in the fourth level-one VPNI context area 9160 is absent, or omitted, from the second VPN server 9300. A VXLAN interface to a VXLAN network in the second level-two VPNI context area is absent, or omitted, from the second VPN server 9300. A VXLAN interface to a VXLAN network in the third level-two VPNI context area is absent, or omitted, from the second VPN server 9300. A VXLAN interface to a VXLAN network in the second level-three VPNI context area is absent, or omitted, from the second VPN server 9300.

The third VPN server 9400 is physically located in Liverpool, England. The third VPN server 9400 has the IP address 10.128.1.1 in the hierarchical-context area network of the VPNI system 9000.

The third VPN server 9400 includes a VXLAN interface to the level-one VPNI context area data-plane network in the second level-one VPNI context area 9140, and a VXLAN interface to the level-one VPNI context area control-plane network in the second level-one VPNI context area 9140.

The third VPN server 9400 includes a VXLAN interface to the level-two VPNI context area control-plane network in the first level-two VPNI context area 9120 and a VXLAN interface to the level-two VPNI context area data-plane network in the first level-two VPNI context area 9120.

The third VPN server 9400 includes a VXLAN interface to the level-three VPNI context area control-plane network in the first level-three VPNI context area 9110 and a VXLAN interface to the level-three VPNI context area data-plane network in the first level-three VPNI context area 9110.

The third VPN server 9400 includes a VXLAN interface to the level-four VPNI context area control-plane network in the level-four VPNI context area 9100 and a VXLAN interface to the level-four VPNI context area data-plane network in the level-four VPNI context area 9100.

A VXLAN interface to a VXLAN network in the first level-one VPNI context area 9130 is absent, or omitted, from the third VPN server 9400. A VXLAN interface to a VXLAN network in the third level-one VPNI context area 9150 is absent, or omitted, from the third VPN server 9400. A VXLAN interface to a VXLAN network in the fourth level-one VPNI context area 9160 is absent, or omitted, from the third VPN server 9400. A VXLAN interface to a VXLAN network in the second level-two VPNI context area is absent, or omitted, from the third VPN server 9400. A VXLAN interface to a VXLAN network in the third level-two VPNI context area is absent, or omitted, from the third VPN server 9400. A VXLAN interface to a VXLAN network in the second level-three VPNI context area is absent, or omitted, from the third VPN server 9400.

The fourth VPN server 9500 is physically located in Paris, France. The fourth VPN server 9500 has the IP address 10.128.16.1 in the hierarchical-context area network of the VPNI system 9000.

The fourth VPN server 9500 includes a VXLAN interface to the level-one VPNI context area data-plane network in the third level-one VPNI context area 9150, and a VXLAN interface to the level-one VPNI context area control-plane network in the third level-one VPNI context area 9150.

The fourth VPN server 9500 includes a VXLAN interface to the level-two VPNI context area control-plane network in the second level-two VPNI context area network (not expressly shown) and a VXLAN interface to the level-two VPNI context area data-plane network in the second level-two VPNI context area network (not expressly shown).

The fourth VPN server 9500 includes a VXLAN interface to the level-three VPNI context area control-plane network in the first level-three VPNI context area 9110 and a VXLAN interface to the level-three VPNI context area data-plane network in the first level-three VPNI context area 9110.

The fourth VPN server 9500 includes a VXLAN interface to the level-four VPNI context area control-plane network in the level-four VPNI context area 9100 and a VXLAN interface to the level-four VPNI context area data-plane network in the level-four VPNI context area 9100.

A VXLAN interface to a VXLAN network in the first level-one VPNI context area 9130 is absent, or omitted, from the fourth VPN server 9500. A VXLAN interface to a VXLAN network in the second level-one VPNI context area 9140 is absent, or omitted, from the fourth VPN server 9500. A VXLAN interface to a VXLAN network in the fourth level-one VPNI context area 9160 is absent, or omitted, from the fourth VPN server 9500. A VXLAN interface to a VXLAN network in the first level-two VPNI context area 9120 is absent, or omitted, from the fourth VPN server 9500. A VXLAN interface to a VXLAN network in the third level-two VPNI context area is absent, or omitted, from the fourth VPN server 9500. A VXLAN interface to a VXLAN network in the second level-three VPNI context area is absent, or omitted, from the fourth VPN server 9500.

The fifth VPN server 9600 is physically located in Tokyo, Japan. The fifth VPN server 9600 has the IP address 10.129.0.1 in the hierarchical-context area network of the VPNI system 9000.

The fifth VPN server 9600 includes a VXLAN interface to the level-one VPNI context area data-plane network in the fourth level-one VPNI context area 9160, and a VXLAN interface to the level-one VPNI context area control-plane network in the fourth level-one VPNI context area 9160.

The fifth VPN server 9600 includes a VXLAN interface to the level-two VPNI context area control-plane network in the third level-two VPNI context area network (not expressly shown) and a VXLAN interface to the level-two VPNI context area data-plane network in the third level-two VPNI context area network (not expressly shown).

The fifth VPN server 9600 includes a VXLAN interface to the level-three VPNI context area control-plane network in the second level-three VPNI context area (not expressly shown) and a VXLAN interface to the level-three VPNI context area data-plane network in the second level-three VPNI context area (not expressly shown).

The fifth VPN server 9600 includes a VXLAN interface to the level-four VPNI context area control-plane network in the level-four VPNI context area 9100 and a VXLAN interface to the level-four VPNI context area data-plane network in the level-four VPNI context area 9100.

A VXLAN interface to a VXLAN network in the first level-one VPNI context area 9130 is absent, or omitted, from the fifth VPN server 9600. A VXLAN interface to a VXLAN network in the second level-one VPNI context area 9140 is absent, or omitted, from the fifth VPN server 9600. A VXLAN interface to a VXLAN network in the third level-one VPNI context area 9150 is absent, or omitted, from the fifth VPN server 9600. A VXLAN interface to a VXLAN network in the first level-two VPNI context area 9120 is absent, or omitted, from the fifth VPN server 9600. A VXLAN interface to a VXLAN network in the second level-two VPNI context area is absent, or omitted, from the fifth VPN server 9600. A VXLAN interface to a VXLAN network in the first level-three VPNI context area 9110 is absent, or omitted, from the fifth VPN server 9600.

Communications among components of a VPNI system that implements a hierarchical-context area network as a virtual private network infrastructure network, such as the VPN servers 9200, 9300, 9400, 9500, 9600, of the VPNI system 9000, may be unavailable, or inaccessible, via the VPNI network, other than among components of the VPNI system that are current, or active, VPNI peers, or neighbors, in the VPNI system (VPNI peers).

A VPNI peer is a component, such as a VPN server, of the VPNI system that is an active encrypted layered tunneling protocol VPN (ELTPVPN) peer and an active border gateway protocol (BGP) neighbor with another component of the VPNI system, such as another VPN server, and that has layer 2 (L2) virtual private network routing prefixes for the other component. To be VPNI peers, the components establish, activate, or enable, each other as current, or active, VPNI peers, or neighbors, in the VPNI system (VPNI peers). VPNI peers may exchange data, such as one or more protocol data units, using a data plane network as described herein. An example of peering for establishing, activating, or enabling, components of a VPNI system that implements a hierarchical-context area network as a virtual private network infrastructure network as current, or active, VPNI peers, or neighbors, in the VPN system is shown in FIGS. 15-19.

Although not shown in FIG. 9, the components of a VPNI system, such as the VPN servers 9200, 9300, 9400, 9500, 9600, of the VPNI system 9000, may communicate with other components of the VPNI system, such as other VPN servers 9200, 9300, 9400, 9500, 9600, via a network, other than the VPNI network, such as the Internet, which may be inefficient, insecure, slow, or a combination thereof, relative to communicating via the VPNI network as described herein. Communicating using a network other than the VPNI network includes transporting at least one protocol data unit using a communications path wherein at least a portion of the communications path omits, or excludes, using the VPNI network.

A VPN server 9200, 9300, 9400, 9500, 9600, in a VPNI context area 9100, 9110, 9120, 9130, 9140, 9150, 9160, may communicate with another VPN server 9200, 9300, 9400, 9500, 9600, in the VPNI context area 9100, 9110, 9120, 9130, 9140, 9150, 9160, efficiently, securely, and quickly, relative to communications via a network, such as the Internet, other than, or in the absence of using, the VPNI network.

The first VPN server 9200 may electronically communicate with the second VPN server 9300 via the first level-one VPNI context area network in the first level-one VPNI context area 9130 as indicated by the directional line between the first VPN server 9200 and the second VPN server 9300.

The first VPN server 9200 may electronically communicate with the third VPN server 9400 via the first level-two VPNI context area network in the first level-two VPNI context area 9120 as indicated by the directional line between the first VPN server 9200 and the third VPN server 9400.

The first VPN server 9200 may electronically communicate with the fourth VPN server 9500 via the first level-three VPNI context area network in the first level-three VPNI context area 9110 as indicated by the directional line between the first VPN server 9200 and the fourth VPN server 9500.

The first VPN server 9200 may electronically communicate with the fifth VPN server 9600 via the level-four VPNI context area network in the first level-four VPNI context area 9100 as indicated by the directional line between the first VPN server 9200 and the fifth VPN server 9600.

FIGS. 10-14 show an example of a network communications configuration of a VPN server in a virtual private network infrastructure system that implements a hierarchical-context area network as a virtual private network infrastructure network. For simplicity, FIGS. 10-14 are shown and described with respect to the first VPN server 9200 shown in FIG. 9. For simplicity, FIGS. 10-14 are shown and described with respect to the hierarchy of VPNI context levels 6000, including the first VPNI context level 6100 (level-one), the second VPNI context level 6200 (level-two), the third VPNI context level 6300 (level-three), and the fourth VPNI context level 6400 (level-four), show in FIG. 6.

As shown in FIGS. 10-14, the network communications configuration of the VPN server implements, or includes, one or more non-transmitting virtual network interfaces. A non-transmitting virtual network interface has an assigned, or allocated, IP address associated with a network connection. A non-transmitting virtual network interface routes protocol data units and omits transmitting the protocol data units.

As shown in FIGS. 10-14, the network communications configuration of the VPN server implements, or includes, one or more virtual Ethernet (VETH) devices, or interfaces, defined in combination wherein a first virtual Ethernet device from the pair may be defined in a first network namespace, a second virtual Ethernet device from the pair may be defined in a second network namespace, such that packets transmitted by one of the virtual ethernet devices from the pair are automatically received by the other virtual ethernet device from the pair.

As shown in FIGS. 10-14, the network communications configuration of the VPN server implements, or includes, one or more defined network namespaces. A network namespace (NETNS) isolates system resources associated with networking by operating a distinct network stack including routing and network devices, or interfaces.

As shown in FIGS. 10-14, the network communications configuration of the VPN server implements, or includes, one or more bridge interfaces. A bridge interface is a network communications interface device that aggregates multiple networks, or network segments, to implement a combined network at the data link layer (L2).

As shown in FIGS. 10-14, the network communications configuration of the VPN server implements, or includes, one or more virtual routers that implement a routing protocol, such as an interior gateway protocol (IGP), such as the open shortest path first (OSPF) IP (internet layer) routing interior gateway protocol, which organizes a respective interior gateway protocol network into defined areas that are identified by a respective identifier (ROUTER-ID or interior gateway protocol identifier) which may be thirty-two bit (32-bit) values that may be expressed using dot-decimal notation. An interior gateway protocol network includes a core or backbone area of the interior gateway protocol network, which may use the interior gateway protocol router identifier zero, or 0.0.0.0. A router, or virtual router, which implements an interior gateway protocol (an interior gateway protocol router) may obtain, store, manage, or otherwise process, link state data from devices, such as routers, in a respective network and may generate a topology map of the network, which may be represented and stored as a routing table.

As shown in FIGS. 10-14, the network communications configuration of the VPN server implements, or includes, one or more virtual private network interfaces, such as ELTPVPN interfaces. Encrypted layered tunneling protocol VPN (ELTPVPN) is an encrypted virtual private network protocol that encrypts and encapsulates IP packets (network layer, OSI-L3, TCP/IP-L2) in UDP datagrams (transport layer, OSI-L3, TCP/IP L3). An ELTPVPN interface is a local, network namespace specific, end point of an ELTPVPN protocol VPN tunnel, associated with an IP address specific to the tunnel (tunnel IP address). A UDP port is allocated to, associated with, or assigned to, a respective ELTPVPN interfaces. An ELTPVPN neighbor, or peer, is a network device, such as a router, for which the server has data associating a valid security key (of the peer) with at least one allowed tunnel source IP address, wherein an allowed tunnel source IP address is a netmask for which datagrams should be routed via the ELTPVPN tunnel. The server dynamically maintains an external IP address for the ELTPVPN neighbor for addressing the UDP datagrams.

As shown in FIGS. 10-14, the network communications configuration of the VPN server implements, or includes, one or more BGP routers. A BGP router is a router that implements the BGP to exchange routing and reachability information within an autonomous system using TCP transport protocol. A BGP neighbor, or peer, is a network device, or interface, such as a router, with which the server has an active BGP TCP connection, or session, for exchanging routing data.

As shown in FIGS. 10-14, the network communications configuration of the VPN server implements, or includes, one or more socket files. A socket file is a memory based intra-device inter-process communication end point represented, in the operating system, as a file, which may use TCP or UDP transport protocols.

As shown in FIGS. 10-14, the network communications configuration of the VPN server implements, or includes, one or more services implemented in the server that manage the network configuration of the server including managing ELTPVPN neighbors, BGP neighbors, and routing data. For example, the server may implement a device and application control (DAC) service that implements an interface for routing modification requests. A service may be implemented using a corresponding socket file.

As shown in FIGS. 10-14, the network communications configuration of the VPN server implements, or includes, a VPN server network controller, for a network wherein control of the forwarding of network packets via a data plane (L2) is separate from routing via a control plane (L3). A network controller is a network management component of the server that implements and controls network configuration within the server, which may include implementing a control-plane to data-plane interface.

Transport Layer Security (TLS) is a cryptographic protocol that implements communications security over a computer network.

Figure 10:
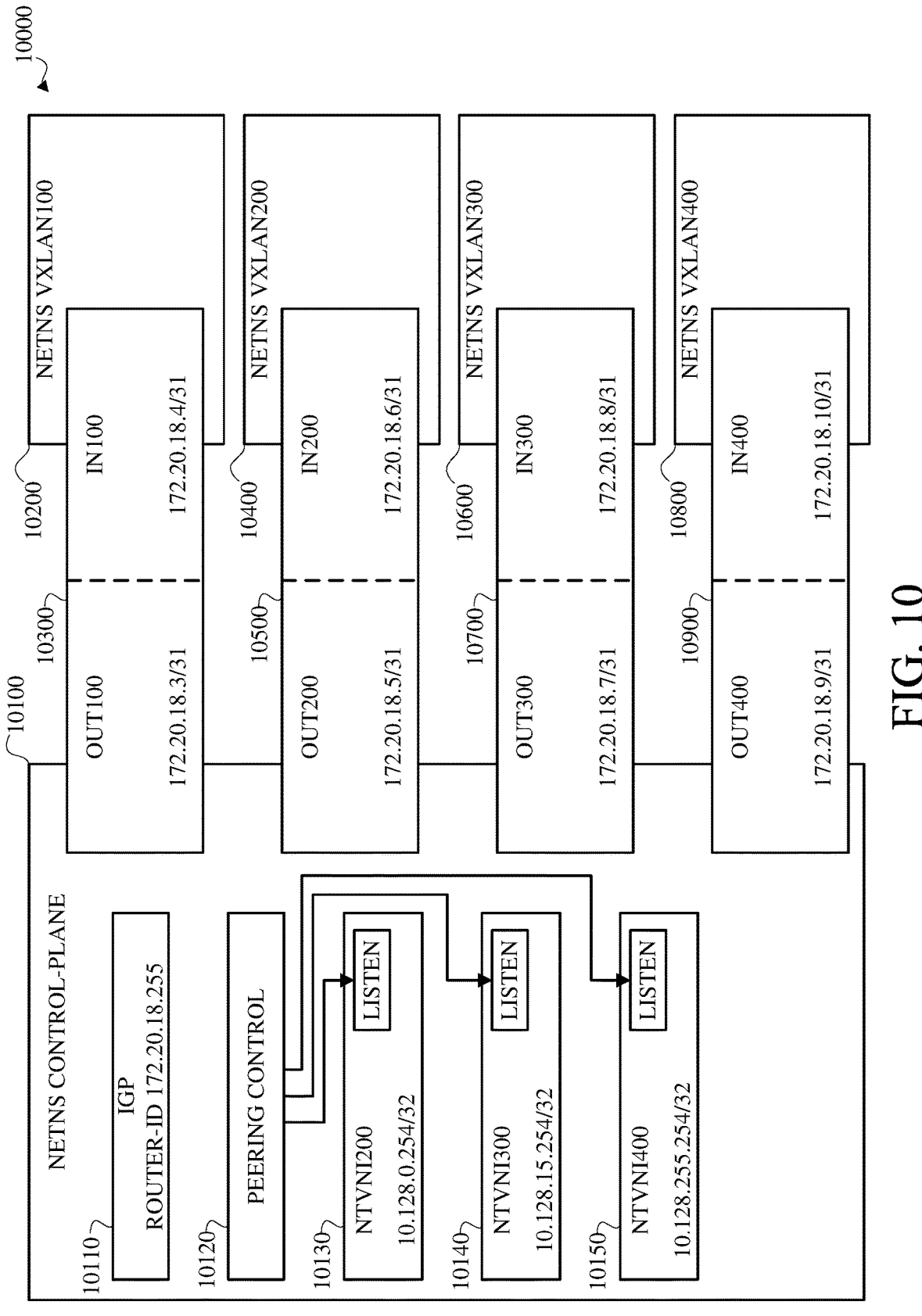
FIG. 10 is a diagram of a first portion of the network communications configuration of the VPN server.

FIG. 10 is a diagram of a first portion of the network communications configuration 10000 of the VPN server. The components of the VPN server shown in the first portion of the network communications configuration 10000 are included in, or implemented by, the VPN server.

The first portion of the network communications configuration 10000 includes a defined control plane network namespace 10100 (NETNS CONTROL-PLANE). The defined control plane network namespace 10100 includes a first interior gateway protocol router (10110). The interior gateway protocol router identifier of the first interior gateway protocol router 10110 has the value 172.20.18.255.

The defined control plane network namespace 10100 includes, or implements, a peering control service 10120. The peering control service 10120 generates, creates, or otherwise obtains, outgoing peering messages and sends, transmits, or otherwise makes available, the outgoing peering messages via a network, such as a VXLAN, such as a control-plane VXLAN. The peering control service 10120 receives, reads, obtains, or otherwise accesses, incoming peering messages via a network, such as a VXLAN, such as a control-plane VXLAN. Peering messages include messages sent or received for peering, peer discovery, or establishing a connection or relationship between VPN servers.

The defined control plane network namespace 10100 includes, or implements, a first non-transmitting virtual network interface 10130 (NTVNI200) that has one or more assigned, or allocated, IP addresses, such as an address in the range defined, or described, by the routing prefix 10.128.0.254/32, which establishes, with respect to the control-plane VXLAN, or segment, corresponding to the second VPNI context level (level-two), that the VPN server is assigned, or allocated, the IP address, or addresses, such that the first non-transmitting virtual network interface 10130 listens for, or receives, protocol data units addressed to the IP address, or addresses. The first non-transmitting virtual network interface 10130 may send, transmit, or otherwise make available, data, such as one or more protocol data units, received by the first non-transmitting virtual network interface 10130 to peering control service 10120.

The defined control plane network namespace 10100 includes, or implements, a second non-transmitting virtual network interface 10140 (NTVNI300) that has one or more assigned, or allocated, IP addresses, such as an address in the range defined, or described, by the routing prefix 10.128.15.254/32, which establishes, with respect to the control-plane VXLAN, or segment, corresponding to the third VPNI context level (level-three), that the VPN server is assigned, or allocated, the IP address, or addresses, such that the second non-transmitting virtual network interface 10140 listens for, or receives, protocol data units addressed to the IP address, or addresses. The second non-transmitting virtual network interface 10140 may send, transmit, or otherwise make available, data, such as one or more protocol data units, received by the second non-transmitting virtual network interface 10140 to peering control service 10120.

The defined control plane network namespace 10100 includes, or implements, a third non-transmitting virtual network interface 10150 (NTVNI400) that has one or more assigned, or allocated, IP addresses, such as an address in the range defined, or described, by the routing prefix 10.128.255.254/32, which establishes, with respect to the control-plane VXLAN, or segment, corresponding to the fourth VPNI context level (level-four), that the VPN server is assigned, or allocated, the IP address, or addresses, such that the third non-transmitting virtual network interface 10150 listens for, or receives, protocol data units addressed to the IP address, or addresses. The third non-transmitting virtual network interface 10150 may send, transmit, or otherwise make available, data, such as one or more protocol data units, received by the third non-transmitting virtual network interface 10150 to peering control service 10120.

The first portion of the network communications configuration 10000 includes a first defined VXLAN network namespace 10200 (NETNS VXLAN100) corresponding to the first VPNI context level (level-one).

The first portion of the network communications configuration 10000 includes a first virtual Ethernet device 10300, or interface pair, for electronic communication between the defined control plane network namespace 10100 and the first defined VXLAN network namespace 10200. The first virtual Ethernet device 10300 includes an interface (OUT100) to the defined control plane network namespace 10100. The interface (OUT100) to the defined control plane network namespace 10100 is associated with an interior gateway protocol session that is allocated, or assigned, interior gateway protocol identifiers, such as in the range defined, or described, by the routing prefix 172.20.18.3/31. The first virtual Ethernet device 10300 includes an interface (IN100) to the first defined VXLAN network namespace 10200. The interface (IN100) to the first defined VXLAN network namespace 10200 is associated with an interior gateway protocol session that is allocated, or assigned, interior gateway protocol identifiers, such as in the range defined, or described, by the routing prefix 172.20.18.4/31.

The first portion of the network communications configuration 10000 includes a second defined VXLAN network namespace 10400 (NETNS VXLAN200) corresponding to the second VPNI context level (level-two).

The first portion of the network communications configuration 10000 includes a second virtual Ethernet device 10500, or interface pair, for electronic communication between the defined control plane network namespace 10100 and the second defined VXLAN network namespace 10400. The second virtual Ethernet device 10500 includes an interface (OUT200) to the defined control plane network namespace 10100. The interface (OUT200) to the defined control plane network namespace 10100 is associated with an interior gateway protocol session that is allocated, or assigned, interior gateway protocol identifiers, such as in the range defined, or described, by the routing prefix 172.20.18.5/31. The second virtual Ethernet device 10500 includes an interface (IN200) to the second defined VXLAN network namespace 10400. The interface (IN200) to the second defined VXLAN network namespace 10400 is associated with an interior gateway protocol session that is allocated, or assigned, interior gateway protocol identifiers, such as in the range defined, or described, by the routing prefix 172.20.18.6/31.

The first portion of the network communications configuration 10000 includes a third defined VXLAN network namespace 10600 (NETNS VXLAN300) corresponding to the third VPNI context level (level-three).

The first portion of the network communications configuration 10000 includes a third virtual Ethernet device 10700, or interface pair, for electronic communication between the defined control plane network namespace 10100 and the third defined VXLAN network namespace 10600. The third virtual Ethernet device 10700 includes an interface (OUT300) to the defined control plane network namespace 10100. The interface (OUT300) to the defined control plane network namespace 10100 is associated with an interior gateway protocol session that is allocated, or assigned, interior gateway protocol identifiers, such as in the range defined, or described, by the routing prefix 172.20.18.7/31. The third virtual Ethernet device 10700 includes an interface (IN300) to the third defined VXLAN network namespace 10600. The interface (IN300) to the third defined VXLAN network namespace 10600 is associated with an interior gateway protocol session that is allocated, or assigned, interior gateway protocol identifiers, such as in the range defined, or described, by the routing prefix 172.20.18.8/31.

The first portion of the network communications configuration 10000 includes a fourth defined VXLAN network namespace 10800 (NETNS VXLAN400) corresponding to a fourth VPNI context level (level-four), such as the fourth VPNI context level 6400 shown in FIG. 6.

The first portion of the network communications configuration 10000 includes a fourth virtual Ethernet device 10900, or interface pair, for electronic communication between the defined control plane network namespace 10100 and the fourth defined VXLAN network namespace 10800. The fourth virtual Ethernet device 10900 includes an interface (OUT400) to the defined control plane network namespace 10100. The interface (OUT400) to the defined control plane network namespace 10100 is associated with an interior gateway protocol session that is allocated, or assigned, interior gateway protocol identifiers, such as in the range defined, or described, by the routing prefix 172.20.18.9/31. The fourth virtual Ethernet device 10900 includes an interface (IN400) to the fourth defined VXLAN network namespace 10800 The interface (IN400) to the fourth defined VXLAN network namespace 10800 is associated with an interior gateway protocol session that is allocated, or assigned, interior gateway protocol identifiers, such as in the range defined, or described, by the routing prefix 172.20.18.10/31.

Figure 11:
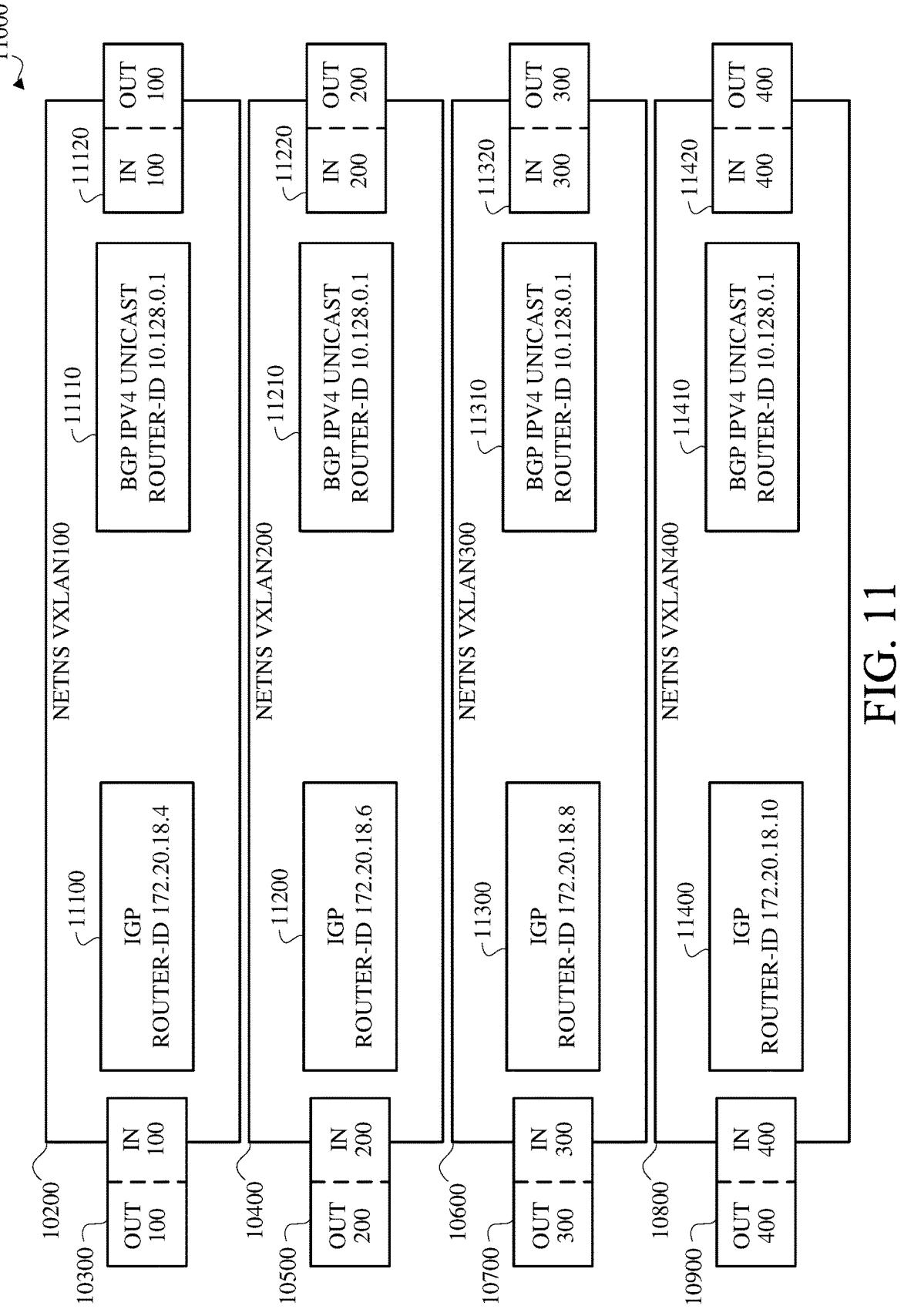
FIG. 11 is a diagram of a second portion of the network communications configuration of the VPN server.

FIG. 11 is a diagram of a second portion of the network communications configuration 11000 of the VPN server. The components of the VPN server shown in the second portion of the network communications configuration 11000 are included in, or implemented by, the VPN server.

The second portion of the network communications configuration 11000 includes the first defined VXLAN network namespace 10200 (NETNS VXLAN100) as shown in FIG. 10. The first defined VXLAN network namespace 10200 includes the first virtual Ethernet device 10300 as shown in FIG. 10. The first defined VXLAN network namespace 10200 includes a second interior gateway protocol router (11100). The interior gateway protocol router identifier of the second interior gateway protocol router 11100 has the value 172.20.18.4. The first defined VXLAN network namespace 10200 includes a first BGP IPv4 Unicast router 11110. The first BGP IPv4 Unicast router 11110 is assigned, associated with, or allocated the router identifier (router-ID) 10.128.0.1. The first defined VXLAN network namespace 10200 includes a fifth virtual Ethernet device 11120. The fifth virtual Ethernet device 11120 includes an interface (IN100) to the first defined VXLAN network namespace 10200 and an interface (OUT100) out.

The second portion of the network communications configuration 11000 includes the second defined VXLAN network namespace 10400 (NETNS VXLAN200) as shown in FIG. 10. The second defined VXLAN network namespace 10400 includes the second virtual Ethernet device 10500 as shown in FIG. 10. The second defined VXLAN network namespace 10400 includes a third interior gateway protocol router (11200). The interior gateway protocol router identifier of the third interior gateway protocol router 11200 has the value 172.20.18.6. The second defined VXLAN network namespace 10400 includes a second BGP IPv4 Unicast router 11210. The second BGP IPV4 Unicast router 11210 is assigned, associated with, or allocated the router identifier (router-ID) 10.128.0.1. The second defined VXLAN network namespace 10400 includes a sixth virtual Ethernet device 11220. The sixth virtual Ethernet device 11220 includes an interface (IN200) to the second defined VXLAN network namespace 10400 and an interface (OUT200) out.

The second portion of the network communications configuration 11000 includes the third defined VXLAN network namespace 10600 (NETNS VXLAN300) as shown in FIG. 10. The third defined VXLAN network namespace 10600 includes the third virtual Ethernet device 10700 as shown in FIG. 10. The third defined VXLAN network namespace 10600 includes a fourth interior gateway protocol router (11300). The interior gateway protocol router identifier of the fourth interior gateway protocol router 11300 has the value 172.20.18.6. The third defined VXLAN network namespace 10600 includes a third BGP IPv4 Unicast router 11310. The third BGP IPv4 Unicast router 11310 is assigned, associated with, or allocated the router identifier (router-ID) 10.128.0.1. The third defined VXLAN network namespace 10600 includes a seventh virtual Ethernet device 11320. The seventh virtual Ethernet device 11320 includes an interface (IN300) to the third defined VXLAN network namespace 10600 and an interface (OUT300) out.

The second portion of the network communications configuration 11000 includes the fourth defined VXLAN network namespace 10800 (NETNS VXLAN400) as shown in FIG. 10. The fourth defined VXLAN network namespace 10800 includes the fourth virtual Ethernet device 10900 as shown in FIG. 10. The fourth defined VXLAN network namespace 10800 includes a fifth interior gateway protocol router (11400). The interior gateway protocol router identifier of the fifth interior gateway protocol router 11400 has the value 172.20.18.8. The fourth defined VXLAN network namespace 10800 includes a fourth BGP IPv4 Unicast router 11410. The fourth BGP IPv4 Unicast router 11410 is assigned, associated with, or allocated the router identifier (router-ID) 10.128.0.1. The fourth defined VXLAN network namespace 10800 includes an eighth virtual Ethernet device 11420. The eighth virtual Ethernet device 11420 includes an interface (IN400) to the fourth defined VXLAN network namespace 10800 and an interface (OUT400) out.

Figure 12:
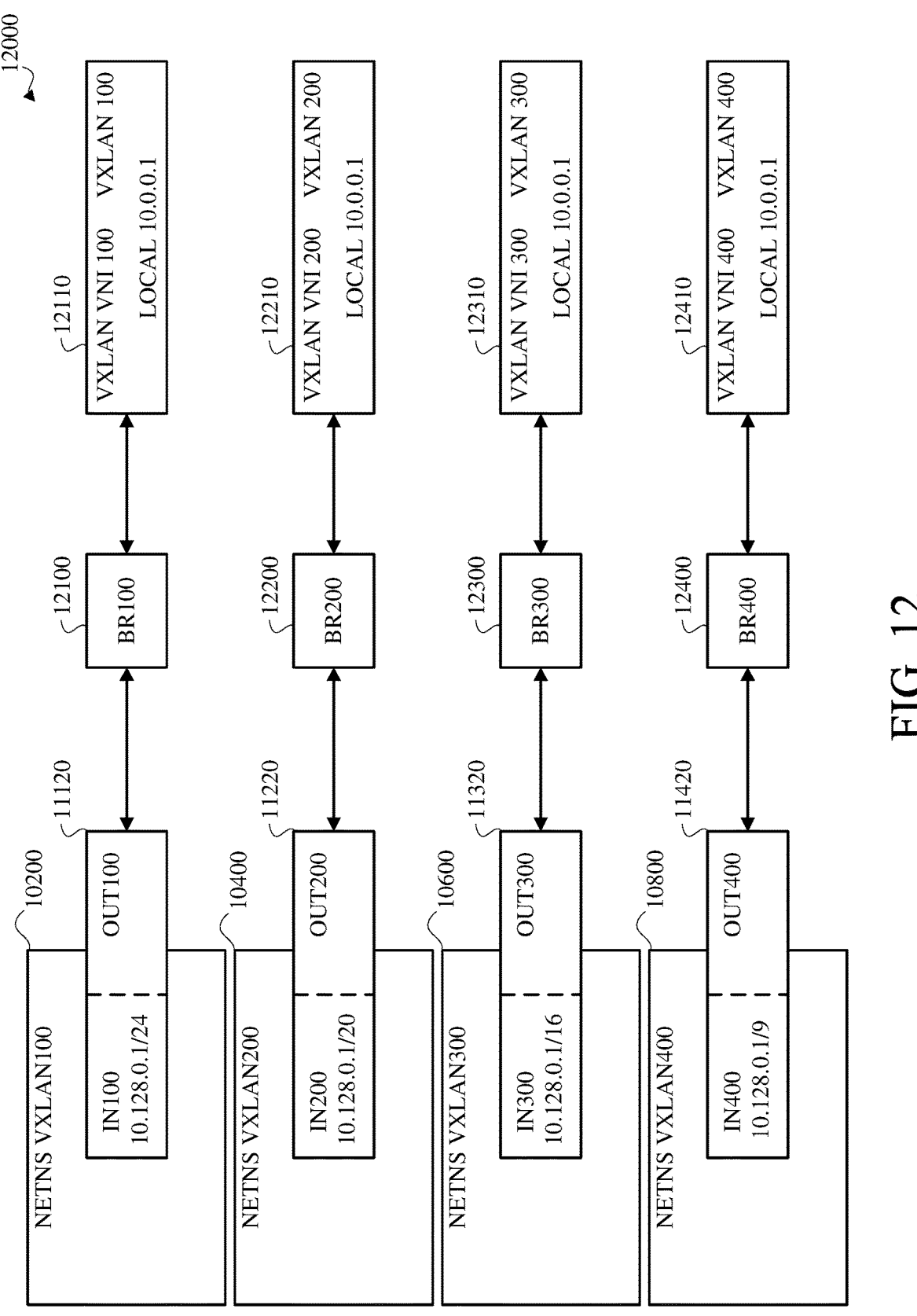
FIG. 12 is a diagram of a third portion of the network communications configuration of the VPN server.

FIG. 12 is a diagram of a third portion of the network communications configuration 12000 of the VPN server. The components of the VPN server shown in the third portion of the network communications configuration 12000 are included in, or implemented by, the VPN server.

The third portion of the network communications configuration 12000 includes the first defined VXLAN network namespace 10200 (NETNS VXLAN100) and the fifth virtual Ethernet device 11120 as shown in FIG. 10 and FIG. 11. The third portion of the network communications configuration 12000 includes a first bridge interface 12100. The third portion of the network communications configuration 12000 includes a first VXLAN interface 12110 (VXLAN 100) to a first control-plane VXLAN that has the VNI 100. The fifth virtual Ethernet device 11120 includes an interface (IN100) to the first defined VXLAN network namespace 10200. The interface (IN100) to the first defined VXLAN network namespace 10200 has an IP address in a defined range of IP addresses, such as in the range defined, or described, by the routing prefix 10.128.0.1/24, for receiving protocol data units, such as IP packets. The fifth virtual Ethernet device 11120 includes and an interface (OUT100) to the first bridge interface 12100. The first bridge interface 12100 routes, or forwards, protocol data units, such as packets, between the fifth virtual Ethernet device 11120 and the first VXLAN interface 12110. The first VXLAN interface 12110 has a local IP address of 10.0.0.1 and operates as a virtual router.

The third portion of the network communications configuration 12000 includes the second defined VXLAN network namespace 10400 (NETNS VXLAN200) and the sixth virtual Ethernet device 11220 as shown in FIG. 10 and FIG. 11. The third portion of the network communications configuration 12000 includes a second bridge interface 12200. The third portion of the network communications configuration 12000 includes a second VXLAN interface 12210 (VXLAN 200) to a second control-plane VXLAN that has the VNI 200. The sixth virtual Ethernet device 11220 includes an interface (IN200) to the second defined VXLAN network namespace 10400. The interface (IN1200) to the second defined VXLAN network namespace 10400 has an IP address in a defined range of IP addresses, such as in the range defined, or described, by the routing prefix 10.128.0.1/20, for receiving protocol data units, such as IP packets. The sixth virtual Ethernet device 11220 includes an interface (OUT200) to the second bridge interface 12200. The second bridge interface 12200 routes, or forwards, protocol data units, such as packets, between the sixth virtual Ethernet device 11220 and the second VXLAN interface 12210. The second VXLAN interface 12210 has a local IP address of 10.0.0.1 and operates as a virtual router.

The third portion of the network communications configuration 12000 includes the third defined VXLAN network namespace 10600 (NETNS VXLAN300) and the seventh virtual Ethernet device 11320 as shown in FIG. 10 and FIG. 11. The third portion of the network communications configuration 12000 includes a third bridge interface 12300. The third portion of the network communications configuration 12000 includes a third VXLAN interface 12310 (VXLAN 300) to a third control-plane VXLAN that has the VNI 300. The seventh virtual Ethernet device 11320 includes an interface (IN300) to the third defined VXLAN network namespace 10600. The interface (IN300) to the third defined VXLAN network namespace 10600 has an IP address in a defined range of IP addresses, such as in the range defined, or described, by the routing prefix 10.128.0.1/16, for receiving protocol data units, such as IP packets. The seventh virtual Ethernet device 11320 includes an interface (OUT300) to the third bridge interface 12300. The third bridge interface 12300 routes, or forwards, protocol data units, such as packets, between the seventh virtual Ethernet device 11320 and the third VXLAN interface 12310. The third VXLAN interface 12310 has a local IP address of 10.0.0.1 and operates as a virtual router.

The third portion of the network communications configuration 12000 includes the fourth defined VXLAN network namespace 10800 (NETNS VXLAN400) and the eighth virtual Ethernet device 11420 as shown in FIG. 10 and FIG. 11. The third portion of the network communications configuration 12000 includes a fourth bridge interface 12400. The third portion of the network communications configuration 12000 includes a fourth VXLAN interface 12410 (VXLAN 400) to a fourth control-plane VXLAN that has the VNI 400. The eighth virtual Ethernet device 11420 includes an interface (IN400) to the fourth defined VXLAN network namespace 10800. The interface (IN400) to the fourth defined VXLAN network namespace 10800 has an IP address in a defined range of IP addresses, such as in the range defined, or described, by the routing prefix 10.128.0.1/9, for receiving protocol data units, such as IP packets. The eighth virtual Ethernet device 11420 includes an interface (OUT400) to the fourth bridge interface 12400. The fourth bridge interface 12400 routes, or forwards, protocol data units, such as packets, between the eighth virtual Ethernet device 11420 and the fourth VXLAN interface 12410. The fourth VXLAN interface 12410 has a local IP address of 10.0.0.1 and operates as a virtual router.

In some implementations, one or more of the network interfaces, such as the first VXLAN interface 12110, the second VXLAN interface 12210, the third VXLAN interface 12310, or the fourth VXLAN interface 12410, may be disabled, disconnected, or otherwise unavailable, and communications via the corresponding network may be unavailable or inaccessible. Communication via network interfaces, and corresponding networks, other than the disabled network interface, or interfaces, is available. For example, the first VXLAN interface 12110 may be disabled such that communication, such as the transmission, reception, or both, of protocol data units, via the first control-plane VXLAN is unavailable.

Figure 13:
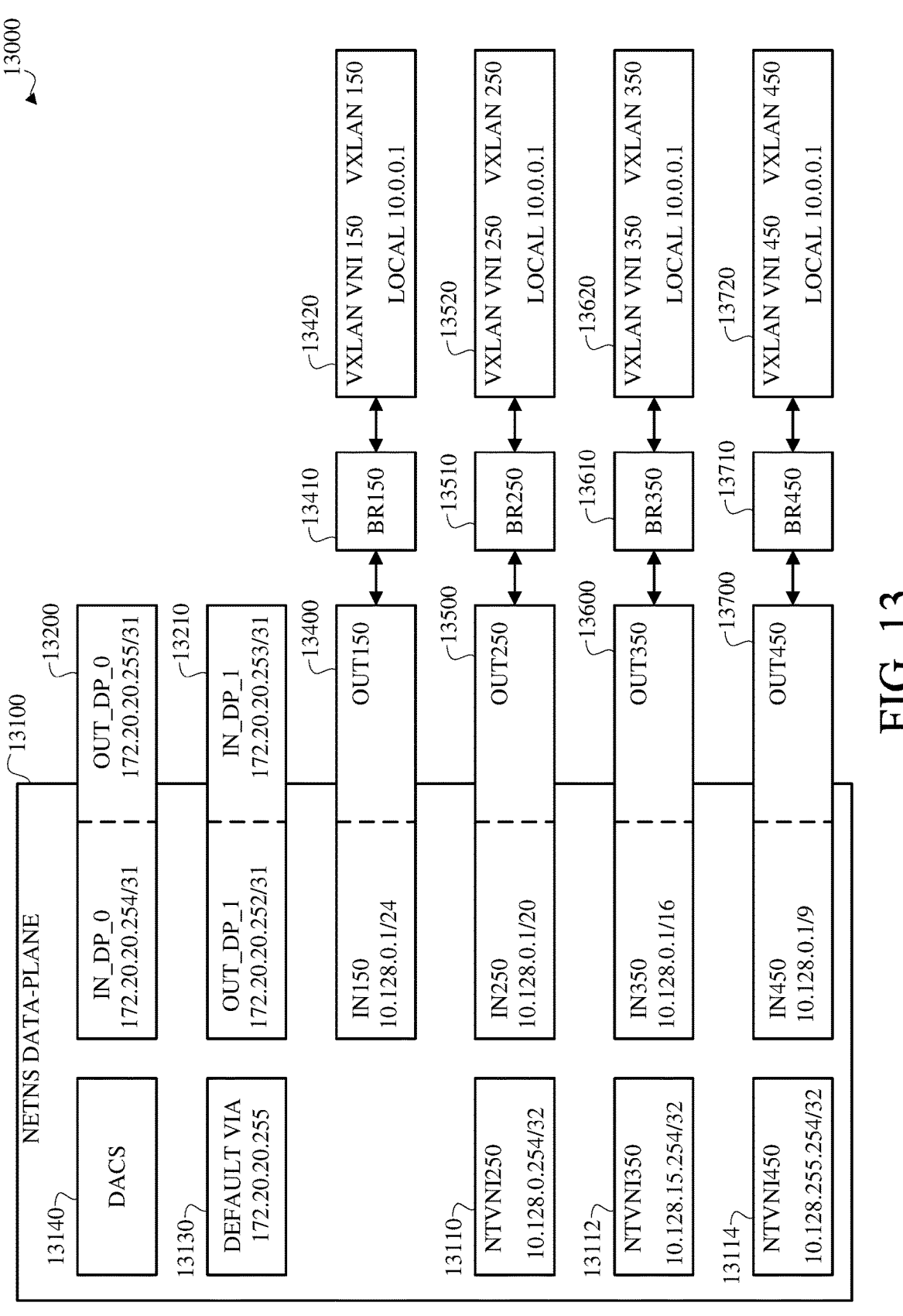
FIG. 13 is a diagram of a fourth portion of the network communications configuration of the VPN server.

FIG. 13 is a diagram of a fourth portion of the network communications configuration 13000 of the VPN server. The components of the VPN server shown in the fourth portion of the network communications configuration 13000 are included in, or implemented by, the VPN server.

The fourth portion of the network communications configuration 13000 includes a defined data-plane network namespace 13100 (NETNS DATA-PLANE). The defined data-plane network namespace 13100 includes, or implements, a fourth non-transmitting virtual network interface 13110 (NTVNI250) that has one or more assigned, or allocated, IP addresses, such as in the range defined, or described, by the routing prefix 10.128.0.254/32, which establishes, with respect to the data-plane VXLAN, or segment, corresponding to the second VPNI context level (level-two), that the VPN server is assigned, or allocated, the IP address, or addresses.

The defined data-plane network namespace 13100 includes, or implements, a fifth non-transmitting virtual network interface 13112 (NTVNI350) that has one or more assigned, or allocated, IP addresses, such as in the range defined, or described, by the routing prefix 10.128.15.254/32, which establishes, with respect to the data-plane VXLAN, or segment, corresponding to the third VPNI context level (level-three), that the VPN server is assigned, or allocated, the IP address, or addresses.

The defined data-plane network namespace 13100 includes, or implements, a third non-transmitting virtual network interface 13114 (NTVNI450) that has one or more assigned, or allocated, IP addresses, such as in the range defined, or described, by the routing prefix 10.128.255.254/32, which establishes, with respect to the data-plane VXLAN, or segment, corresponding to the fourth VPNI context level (level-four), that the VPN server is assigned, or allocated, the IP address, or addresses.

The defined data-plane network namespace 13100 includes, or implements, a default route (13130), or packet forwarding rule, indicating an IP address, such as 172.20.20.255, for forwarding packets in the absence of other routing data, such as another defined route or next-hop.

The defined data-plane network namespace 13100 includes, or implements, a device and application control service (DACS) 13140. The device and application control service 13140 communicates with, such as sends protocol data units, receives protocol data units, or both, a connected client device and with the VPN server network controller to implement, or perform, egress reconfiguration.

The defined data-plane network namespace 13100 includes, or implements, a ninth virtual Ethernet device 13200, or interface pair, for electronic communication between the defined data-plane (DP) network namespace 13100 and a component of the server that has a connection to the Internet. The ninth virtual Ethernet device 13200 includes an in interface (IN_DP_0) to the defined data-plane network namespace 13100. The in interface (IN_DP_0) has an IP address, such as in the range defined, or described, by the routing prefix 172.20.20.254/31. The ninth virtual Ethernet device 13200 includes an out interface (OUT_DP_0) to the component of the server that has a connection to the Internet. The out interface (OUT_DP_0) has an IP address, such as in the range defined, or described, by the routing prefix 172.20.20.255/31.

The defined data-plane network namespace 13100 includes, or implements, a tenth virtual Ethernet device 13210, or interface pair, for electronic communication between the defined data-plane network namespace 13100 and a component of the server that has a connection to the Internet. The tenth virtual Ethernet device 13210 includes an in interface (IN_DP_1) to the defined data-plane network namespace 13100. The in interface (IN_DP_1) has an IP address, such as in the range defined, or described, by the routing prefix 172.20.20.253/31. The tenth virtual Ethernet device 13210 includes an out interface (OUT_DP_1) to the component of the server that has a connection to the Internet. The out interface (OUT_DP_1) has an IP address, such as in the range defined, or described, by the routing prefix 172.20.20.252/31.

The defined data-plane network namespace 13100 includes, or implements, an eleventh virtual Ethernet device 13400, or interface pair, for electronic communication between the defined data-plane network namespace 13100 and a sixth VXLAN interface 13420 via a sixth bridge interface 13410. The eleventh virtual Ethernet device 13400 includes an interface (IN150) to the defined data-plane network namespace 13100. The eleventh virtual Ethernet device 13400 includes an interface (OUT150) to the sixth VXLAN interface 13420 via the sixth bridge interface 13410. The fourth portion of the network communications configuration 13000 includes the sixth bridge interface 13410 (BR150). The fourth portion of the network communications configuration 13000 includes the sixth VXLAN interface 13420 (VXLAN 150) to a sixth VXLAN that has the VNI 150. The sixth VXLAN interface 13420 has a local IP address of 10.0.0.1.

The defined data-plane network namespace 13100 includes, or implements, a twelfth virtual Ethernet device 13500, or interface pair, for electronic communication between the defined data-plane network namespace 13100 and a seventh VXLAN interface 13520 via a seventh bridge interface 13510. The twelfth virtual Ethernet device 13500 includes an interface (IN250) to the defined data-plane network namespace 13100. The twelfth virtual Ethernet device 13500 includes an interface (OUT250) to the seventh VXLAN interface 13520 via the seventh bridge interface 13510. The fourth portion of the network communications configuration 13000 includes the seventh bridge interface 13510 (BR250). The fourth portion of the network communications configuration 13000 includes the seventh VXLAN interface 13520 (VXLAN 250) to a seventh VXLAN that has the VNI 250. The seventh VXLAN interface 13520 has a local IP address of 10.0.0.1.

The defined data-plane network namespace 13100 includes, or implements, a thirteenth virtual Ethernet device 13600, or interface pair, for electronic communication between the defined data-plane network namespace 13100 and an eighth data-plane VXLAN interface 13620 via an eighth bridge interface 13610. The thirteenth virtual Ethernet device 13600 includes an interface (IN350) to the defined data-plane network namespace 13100. The thirteenth virtual Ethernet device 13600 includes an interface (OUT350) to the eighth data-plane VXLAN interface 13620 via the eighth bridge interface 13610. The fourth portion of the network communications configuration 13000 includes the eighth bridge interface 13610 (BR350). The fourth portion of the network communications configuration 13000 includes the eighth data-plane VXLAN interface 13620 (VXLAN 350) to an eighth VXLAN that has the VNI 350. The eighth data-plane VXLAN interface 13620 has a local IP address of 10.0.0.1.

The defined data-plane network namespace 13100 includes, or implements, a fourteenth virtual Ethernet device 13700, or interface pair, for electronic communication between the defined data-plane network namespace 13100 and a ninth VXLAN interface 13720 via a ninth bridge interface 13710. The fourteenth virtual Ethernet device 13700 includes an interface (IN450) to the defined data-plane network namespace 13100. The fourteenth virtual Ethernet device 13700 includes an interface (OUT450) to the ninth VXLAN interface 13720 via the ninth bridge interface 13710. The fourth portion of the network communications configuration 13000 includes the ninth bridge interface 13710 (BR450). The fourth portion of the network communications configuration 13000 includes the ninth VXLAN interface 13720 (VXLAN 450) to a ninth VXLAN that has the VNI 450. The ninth VXLAN interface 13720 has a local IP address of 10.0.0.1.

In some implementations, one or more of the network interfaces, such as the sixth VXLAN interface 13420, the seventh VXLAN interface 13520, the eighth VXLAN interface 13620, or the ninth VXLAN interface 13720, may be disabled, disconnected, or otherwise unavailable, and communications via the corresponding network may be unavailable or inaccessible. Communication via network interfaces, and corresponding networks, other than the disabled network interface, or interfaces, is available. For example, the first VXLAN interface 12110 shown in FIG. 12 may be disabled such that communication, such as the transmission, reception, or both, of protocol data units, via the first control-plane VXLAN is unavailable, including discovery, peering, or both for the VPN server via the first control-plane VXLAN, and communication via the sixth VXLAN interface 13420 to the first data-plane VXLAN may be available.

In an example, for electronic communication between the defined data-plane network namespace 13100 and one or more of the VXLAN interfaces, such as the sixth VXLAN interface 13420, the seventh VXLAN interface 13520, the eighth VXLAN interface 13620, or the ninth VXLAN interface 13720, the ninth virtual Ethernet device 13200 may receive data, such as one or more protocol data units, such as packets, from another virtual Ethernet device of the defined data-plane network namespace 13100, such as the eleventh virtual Ethernet device 13400, the twelfth virtual Ethernet device 13500, the thirteenth virtual Ethernet device 13600, or the fourteenth virtual Ethernet device 13700, via the in interface (IN_DP_0) of the ninth virtual Ethernet device 13200. The ninth virtual Ethernet device 13200 may send, transmit, or otherwise make available, via the out interface (OUT_DP_0) thereof, the data to the component of the server that has the connection to the Internet for transmission via the Internet, or another external network, such as to an external device.

In an example, for electronic communication between the defined data-plane network namespace 13100 and one or more of the VXLAN interfaces, such as the sixth VXLAN interface 13420, the seventh VXLAN interface 13520, the eighth VXLAN interface 13620, or the ninth VXLAN interface 13720, the tenth virtual Ethernet device 13210 may receive data, such as one or more protocol data units, such as packets, via the in interface (IN_DP_1) thereof, from the component of the server that has the connection to the Internet, such as from an external device via the Internet. The tenth virtual Ethernet device 13210 may send, transmit, or otherwise make available, via the out interface (OUT_DP_1) thereof, the data to another virtual Ethernet device of the defined data-plane network namespace 13100, such as the eleventh virtual Ethernet device 13400, the twelfth virtual Ethernet device 13500, the thirteenth virtual Ethernet device 13600, or the fourteenth virtual Ethernet device 13700, which may send, transmit, or otherwise make available, the data to the corresponding VXLAN interfaces, such as the sixth VXLAN interface 13420, the seventh VXLAN interface 13520, the eighth VXLAN interface 13620, or the ninth VXLAN interface 13720.

Figure 14:
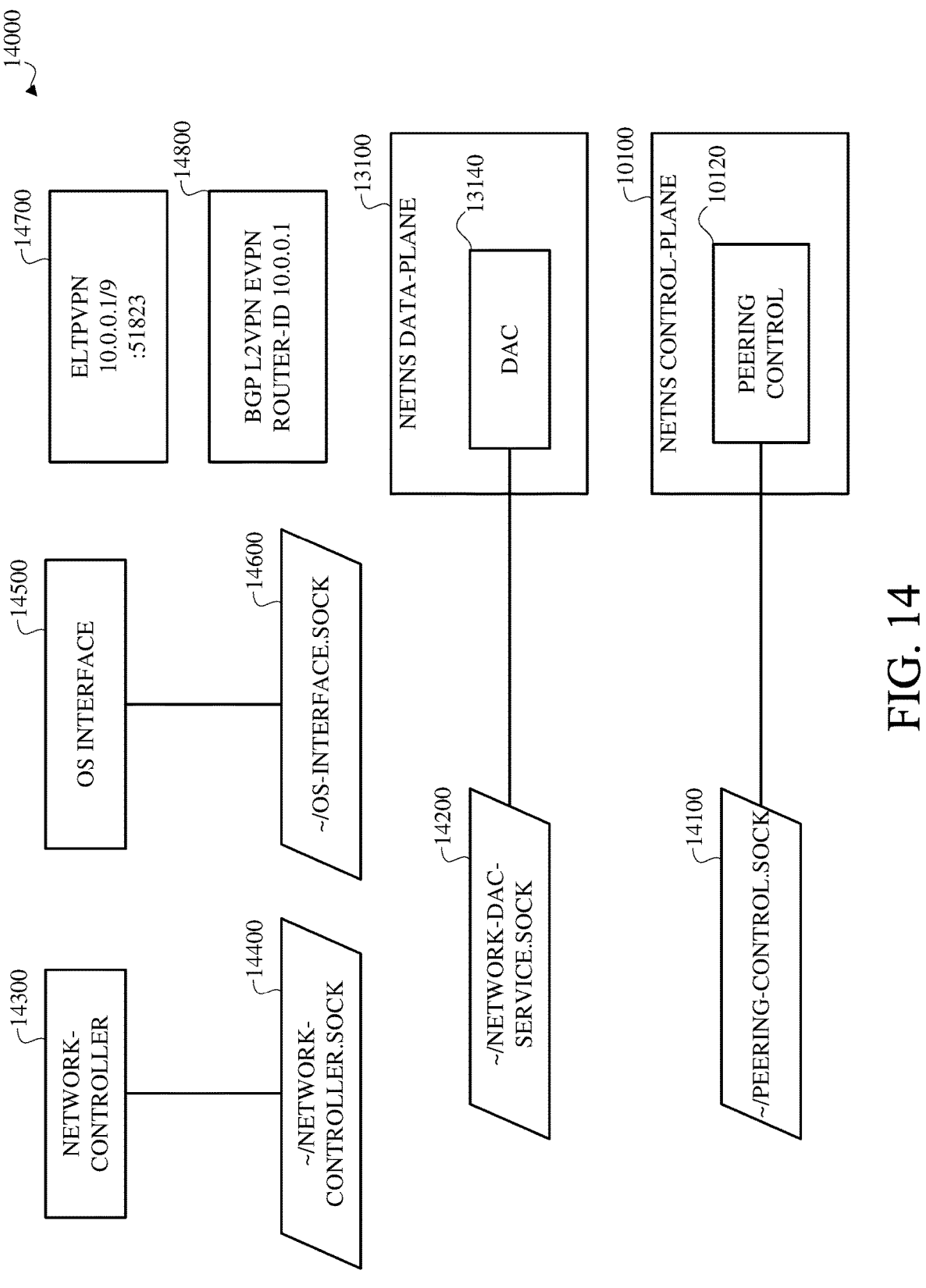
FIG. 14 is a diagram of a fifth portion of the network communications configuration of the VPN server.

FIG. 14 is a diagram of a fifth portion of the network communications configuration 14000 of the VPN server. The components of the VPN server shown in the fifth portion of the network communications configuration 14000 are included in, or implemented by, the VPN server.

The fifth portion of the network communications configuration 14000 includes the defined control plane network namespace 10100 (NETNS CONTROL-PLANE) including the peering control service 10120 as shown in FIG. 10. The fifth portion of the network communications configuration 14000 includes a first socket file 14100 corresponding to the peering control service 10120.

The fifth portion of the network communications configuration 14000 includes the defined data-plane network namespace 13100 (NETNS DATA-PLANE) including the device and application control service 13140 that implements the device and application control service as shown in FIG. 13. The fifth portion of the network communications configuration 14000 includes a second socket file 14200 corresponding to the device and application control service 13140.

The fifth portion of the network communications configuration 14000 includes a VPN server network controller 14300, corresponding to a third socket file 14400.

The fifth portion of the network communications configuration 14000 includes a VPN server network communications configuration operating system interface (OS interface) service 14500, that implements a service for interfacing with the operating system of the VPN server for network communications configuration, corresponding to a fourth socket file 14600.

The fifth portion of the network communications configuration 14000 includes a virtual private network interface

14700, such as an ELTPVPN interface, which has a size as expressed, or defined, by a defined range of IP addresses, such as in the range defined, or described, by the routing prefix 10.0.0.1/9, and has a defined port, or port offset, such as 51823.

The fifth portion of the network communications configuration 14000 includes a BGP router 14800 that implements a data link layer (L2) virtual private network Ethernet virtual private network and has the router identification (router-ID) value 10.0.0.1.

FIGS. 15-19 show a flow diagram of an example of a method of peering for establishing, activating, or enabling, VPN servers as current, or active, virtual private network infrastructure neighbors, or peers, in a virtual private network infrastructure system that implements a hierarchical-context area network as a virtual private network infrastructure network.

The peering shown in FIGS. 15-19 includes an admin device 15010, such as an administrative user device, which may be a computing device, such as the computing device 1000 shown in FIG. 1, or a computing and communications device, such as one or more of the computing and communications devices 2300, 2410, 2420, 2510, 2520, 2530 shown in FIG. 2.

The peering shown in FIGS. 15-19 includes a hierarchical-context area network manager 15020, or management device, of the VPNI system, which may be a computing device, such as the computing device 1000 shown in FIG. 1, a computing and communications device, such as one or more of the computing and communications devices 2300, 2410, 2420, 2510, 2520, 2530 shown in FIG. 2, a VPNI administration server, such as the VPNI administration server 7100 shown in FIG. 7, or a component thereof, such as a hierarchical-context area network manager, such as the hierarchical-context area network manager component 7110 shown in FIG. 7.

The peering shown in FIGS. 15-19 includes a first VPN server 15030 of the VPNI system, such as one of the VPN servers 7410, 7510 shown in FIG. 7, one of the VPN servers 9200, 9300, 9400, 9500, 9600 shown in FIG. 9, or the VPN server shown in FIGS. 10-14. The first VPN server 15030 has an assigned, or allocated, IP address, such as a private IP address. The first VPN server 15030 includes a control-plane VXLAN interface to a first level-one VXLAN, a data-plane VXLAN interface to the first level-one VXLAN, a control-plane VXLAN interface to a first level-two VXLAN, a data-plane VXLAN interface to the first level-two VXLAN, a control-plane VXLAN interface to a first level-three VXLAN, a data-plane VXLAN interface to the first level-three VXLAN, a control-plane VXLAN interface to a level-four VXLAN, and a data-plane VXLAN interface to the level-four VXLAN.

For simplicity, the first VPN server 15030 is described, similar to the first VPN server 9200 shown in FIG. 9, as having the private IP address 10.128.0.1, and including a control-plane VXLAN interface to the first level-one VXLAN, such as the first level-one VXLAN in the first level-one VPNI context area 9130 shown in FIG. 9, having the VNI 100, a data-plane VXLAN interface to the first level-one VXLAN having the VNI 150, a control-plane VXLAN interface to the first level-two VXLAN, such as the first level-two VXLAN in the first level-two VPNI context area 9120 shown in FIG. 9, having the VNI 200, a data-plane VXLAN interface to the first level-two VXLAN having the VNI 250, a control-plane VXLAN interface to a level-three VXLAN, such as the level-three VXLAN in the level-three VPNI context area 9110 shown in FIG. 9, having the VNI 300, a data-plane VXLAN interface to the level-three VXLAN having the VNI 350, a control-plane VXLAN interface to a level-four VXLAN, such as the level-four VXLAN in the level-four VPNI context area 9100 shown in FIG. 9, having the VNI 400, and a data-plane VXLAN interface to the level-four VXLAN having the VNI 450.

The peering shown in FIGS. 15-19 includes a second VPN server 15040 of the VPNI system, such as one of the VPN servers 7410, 7510 shown in FIG. 7, one of the VPN servers 9200, 9300, 9400, 9500, 9600 shown in FIG. 9, or the VPN server shown in FIGS. 10-14.

In a first example, the second VPN server 15040 is described, similar to the third VPN server 9400 shown in FIG. 9, as having a private IP address, such as 10.128.1.1, and including a control-plane VXLAN interface to a second level-one VXLAN, such as the second level-one VXLAN in the second level-one VPNI context area 9140 shown in FIG. 9, having the VNI 100, a data-plane VXLAN interface to the second level-one VXLAN having the VNI 150, a control-plane VXLAN interface to the first level-two VXLAN, a data-plane VXLAN interface to the first level-two VXLAN having the VNI 250, a control-plane VXLAN interface to the first level-three VXLAN, a data-plane VXLAN interface to the first level-three VXLAN having the VNI 350, a control-plane VXLAN interface to the level-four VXLAN, and a data-plane VXLAN interface to the level-four VXLAN having the VNI 450.

In a second example, the second VPN server 15040 is described, similar to the second VPN server 9300 shown in FIG. 9, as having a private IP address, such as 10.128.0.2, and including a control-plane VXLAN interface to the first level-one VXLAN, such as the first level-one VXLAN in the first level-one VXLAN context area 9130 shown in FIG. 9, having the VNI 100, a data-plane VXLAN interface to the first level-one VXLAN having the VNI 150, a control-plane VXLAN interface to the first level-two VXLAN, a data-plane VXLAN interface to the first level-two VXLAN having the VNI 250, a control-plane VXLAN interface to the first level-three VXLAN, a data-plane VXLAN interface to the first level-three VXLAN having the VNI 350, a control-plane VXLAN interface to the level-four VXLAN, and a data-plane VXLAN interface to the first level-four VXLAN having the VNI 450.

The peering shown in FIGS. 15-19 includes a third VPN server 15050 of the VPNI system, such as one of the VPN servers 7410, 7510 shown in FIG. 7, one of the VPN servers 9200, 9300, 9400, 9500, 9600 shown in FIG. 9, or the VPN server shown in FIGS. 10-14.

In the first example, the third VPN server 15050 is described, similar to the fifth VPN server 9600 shown in FIG. 9, as having a private IP address, such as 10.129.0.1, and including a control-plane VXLAN interface to a third level-one VXLAN, such as the fourth level-one VXLAN in the fourth level-one VPNI context area 9160 shown in FIG. 9, having the VNI 100, a data-plane VXLAN interface to the third level-one VXLAN having the VNI 150, a control-plane VXLAN interface to a second level-two VXLAN having the VNI 200, a data-plane VXLAN interface to the second level-two VXLAN having the VNI 250, a control-plane VXLAN interface to a second level-three VXLAN having the VNI 300, a data-plane VXLAN interface to the second level-three VXLAN having the VNI 350, a control-plane VXLAN interface to the level-four VXLAN, and a data-plane VXLAN interface to the level-four VXLAN having the VNI 450.

In the second example, the third VPN server 15050 is described, similar to the third VPN server 9400 shown in FIG. 9, as having a private IP address, such as 10.128.1.1, and including a control-plane VXLAN interface to the second level-one VXLAN, such as the second level-one VXLAN in the second level-one VPNI context area 9140 shown in FIG. 9, having the VNI 100, a data-plane VXLAN interface to the second level-one VXLAN having the VNI 150, a control-plane VXLAN interface to the first level-two VXLAN, a data-plane VXLAN interface to the first level-two VXLAN having the VNI 250, a control-plane VXLAN interface to the first level-three VXLAN, a data-plane VXLAN interface to the first level-three VXLAN having the VNI 350, a control-plane VXLAN interface to the level-four VXLAN, and a data-plane VXLAN interface to the level-four VXLAN having the VNI 450.

For simplicity, the example shown in FIGS. 15-19 is described with reference to the example of a virtual private network infrastructure system 9000 shown in FIG. 9; however, the first VPN server 15030, the second VPN server 15040, the third VPN server 15050, or a combination thereof, may be in other VPNI context areas in the virtual private network infrastructure system.

Figure 15:
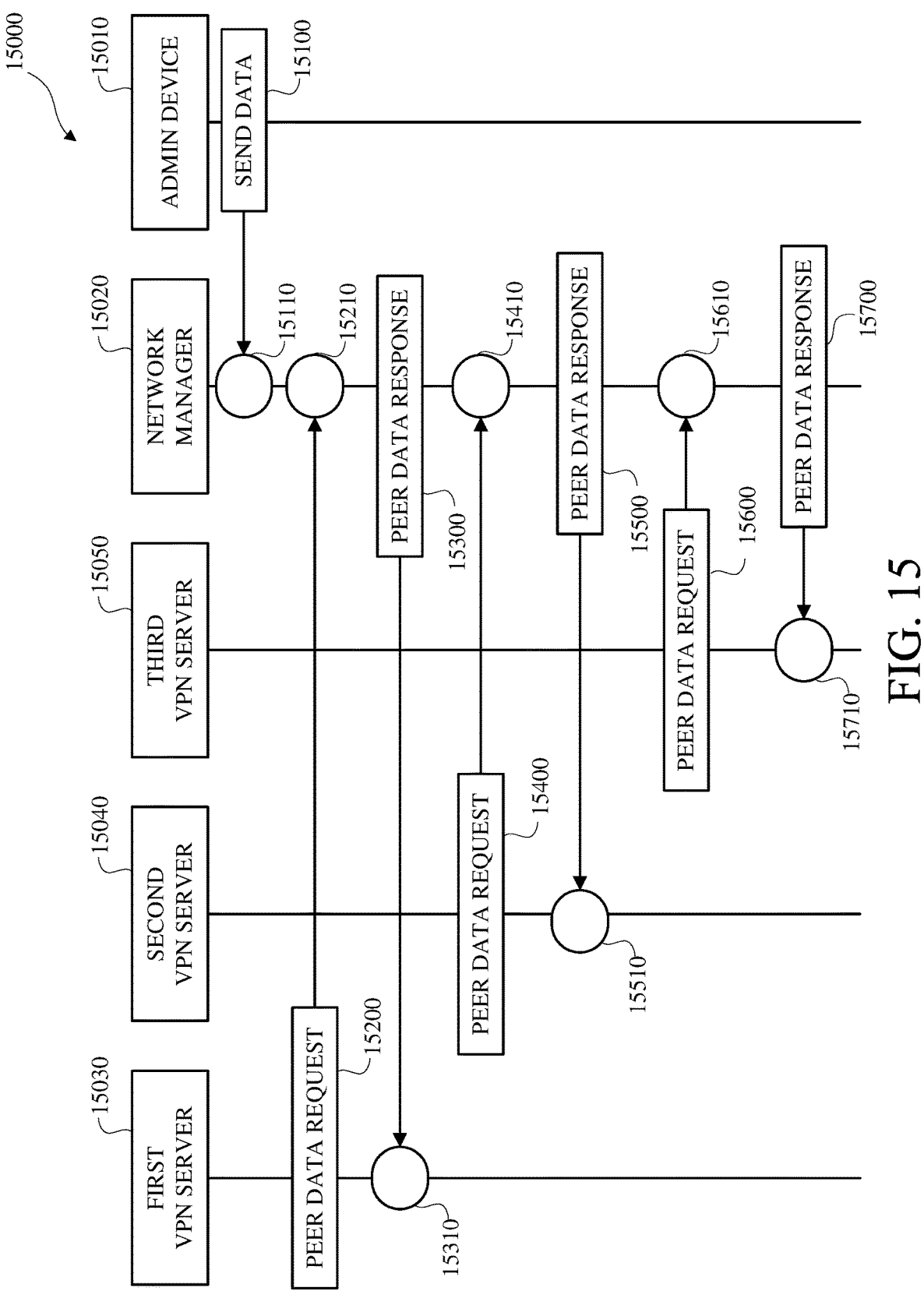
FIG. 15 is a flow diagram of a first portion of the example of the method of peering for establishing, activating, or enabling, VPN servers as current, or active, virtual private network infrastructure neighbors, or peers, in a virtual private network infrastructure system that implements a hierarchical-context area network as a virtual private network infrastructure network.

FIG. 15 is a flow diagram of a first portion of the example of the method of peering 15000 for establishing, activating, or enabling, VPN servers as current, or active, virtual private network infrastructure neighbors, or peers, in a virtual private network infrastructure system that implements a hierarchical-context area network as a virtual private network infrastructure network.

The first portion of the example of the method of peering 15000 includes the admin device 15010 sending, transmitting, or otherwise making available, VPN server configuration data (at 15100) to the hierarchical-context area network manager 15020 of the VPNI system.

The VPN server configuration data includes VPN server configuration data for the first VPN server 15030. The VPN server configuration data for the first VPN server 15030 includes data indicating a private IP address, such as 10.128.0.1, that is allocated to, associated with, or assigned to, the first VPN server 15030 in the VPNI system that implements the hierarchical-context area network as the VPNI network. The VPN server configuration data for the first VPN server 15030 includes one or more security, or cryptography, such as encryption, description or both, keys, or key pairs, or a public key thereof, allocated to, associated with, or assigned to, the first VPN server 15030. The VPN server configuration data for the first VPN server 15030 includes peering data designated, defined, or configured, for the first VPN server 15030, including peering data indicating that the second VPN server 15040 is designated, or defined, as a VPNI peer, or neighbor, of the first VPN server 15030 in the VPNI network.

The VPN server configuration data includes VPN server configuration data for the second VPN server 15040. The VPN server configuration data for the second VPN server 15040 includes data indicating a private IP address, such as 10.128.1.1, that is allocated to, associated with, or assigned to, the second VPN server 15040 in the VPNI system that implements the hierarchical-context area network as the VPNI network. The VPN server configuration data for the second VPN server 15040 includes one or more security, or cryptography, such as encryption, description or both, keys, or key pairs, or a public key thereof, allocated to, associated with, or assigned to, the second VPN server 15040. The VPN server configuration data for the second VPN server 15040 includes peering data designated, defined, or configured, for the second VPN server 15040, including peering data indicating that the first VPN server 15030 is a designated, or defined, as a VPNI peer, or neighbor, of the second VPN server 15040 in the VPNI network. The VPN server configuration data for the second VPN server 15040 includes peering data designated, defined, or configured, for the second VPN server 15040, including peering data indicating that the third VPN server 15050 is a designated, or defined, VPNI peer, or neighbor, of the second VPN server 15040 in the VPNI network.

The VPN server configuration data includes VPN server configuration data for the third VPN server 15050. The VPN server configuration data for the third VPN server 15050 includes data indicating that a private IP address, such as 10.129.0.1, that is allocated to, associated with, or assigned to, the third VPN server 15050 in the VPNI system that implements the hierarchical-context area network as the VPNI network. The VPN server configuration data for the third VPN server 15050 includes one or more security, or cryptography, such as encryption, description or both, keys, or key pairs, or a public key thereof, allocated to, associated with, or assigned to, the third VPN server 15050. The VPN server configuration data for the third VPN server 15050 includes peering data, designated, defined, or configured, for the third VPN server 15050, including peering data indicating that the second VPN server 15040 is a designated, or defined, VPNI peer, or neighbor, of the third VPN server 15050 in the VPNI network.

The VPN server configuration data omits data indicating that the first VPN server 15030 and the third VPN server 15050 are designated, or defined, as VPNI peers, or neighbors, of each other.

The hierarchical-context area network manager 15020 receives, reads, obtains, or otherwise accesses, the VPN server configuration data (at 15110). The hierarchical-context area network manager 15020 stores, records, or otherwise saves, the VPN server configuration data subsequent to receiving the VPN server configuration data (at 15110). In some implementations, the VPN server configuration data is stored in volatile computer memory, which may be deleted or erased in accordance with restarting or resetting the network manager.

Subsequent to the hierarchical-context area network manager 15020 accessing the VPN server configuration data (at 15110), the first VPN server 15030 generates, writes, or otherwise obtains, a first peering data request indicating a request for peering data, such as BGP data, identifying one or more VPN servers in the VPNI network as VPNI peers, or neighbors, designated, or defined, for the first VPN server 15030, and sends, transmits, or otherwise makes available, the first peering data request, or request for peering data, to the hierarchical-context area network manager 15020 (at 15200). For example, the first VPN server 15030 may send the first peering data request to the hierarchical-context area network manager 15020 via the Internet. The first peering data request indicates, or includes, the private IP address allocated, associated with, or assigned to, the first VPN server 15030 as the source of the first peering data request.

Although not shown expressly in FIG. 15, the first VPN server 15030 may generate and send the first peering data request (at 15200), in response to detecting, or identifying, an event, such as an event detected in accordance with initiation or startup of the first VPN server 15030, an event detected in accordance with establishing a virtual private network connection, or tunnel, between the first VPN server 15030 and an end user device (not shown), an event detected in accordance with a defined period, or timer, an event detected in accordance with receiving a request, or other electronic communication, from an end user device (not shown), such as a request to configure one or more VPN servers, other than the first VPN server 15030, as an egress, or exit, node, point of egress, next-hop, default route, or default gateway, for the end user device, or a request to access, or electronically communicate with, a third-party, or external, device (target device) that is accessible, or more efficiently accessible, by a VPN server, other than the first VPN server 15030, wherein the target device is inaccessible, on inefficiently accessible, by the first VPN server 15030, or another event or combination of events.

The hierarchical-context area network manager 15020 receives, reads, obtains, or otherwise accesses, the first peering data request (at 15210). Subsequent to obtaining the first peering data request, the hierarchical-context area network manager 15020 obtains, reads, or otherwise accesses, the designated, defined, described, or configured, VPNI peer, or neighbor, data for the first VPN server 15030 from the previously stored VPN server configuration data for the first VPN server 15030, indicating that the second VPN server 15040 is designated, defined, described, or configured, as a VPNI peer, or neighbor, of the first VPN server 15030.

The hierarchical-context area network manager 15020 generates, writes, or otherwise obtains, a first peering data response including the peering data for the first VPN server 15030 (first peering data), including the private IP address and the public encryption key allocated, associated with, or assigned to, the second VPN server 15040, and sends, transmits, or otherwise makes available, the first peering data response to the first VPN server 15030 (at 15300).

The first VPN server 15030 obtains, receives, or otherwise accesses, the first peering data response including the first peering data (at 15310). Although not shown separately in FIG. 15, the first VPN server 15030 may store, record, or otherwise save the first peering data.

Subsequent to the hierarchical-context area network manager 15020 storing the VPN server configuration data (at 15110), the second VPN server 15040 generates, writes, or otherwise obtains, a second peering data request indicating a request for peering data, such as BGP data, and sends, transmits, or otherwise makes available, the second peering data request to the hierarchical-context area network manager 15020 (at 15400). For example, the second VPN server 15040 may send the second peering data request to the hierarchical-context area network manager 15020 via the Internet. The second peering data request indicates, or includes, the private IP address allocated, associated with, or assigned to, the second VPN server 15040 as the source of the second peering data request.

Although not shown expressly in FIG. 15, the second VPN server 15040 may generate and send the second peering data request (at 15400), in response to detecting, or identifying, an event, such as an event detected in accordance with initiation or startup of the second VPN server 15040, an event detected in accordance with establishing a virtual private network connection, or tunnel, between the second VPN server 15040 and an end user device (not shown), an event detected in accordance with a defined period, or timer, an event detected in accordance with receiving a request from an end user device (not shown), such as a request to configure one or more VPN servers, other than the second VPN server 15040, as an egress, or exit, node, point of egress, next-hop, default route, or default gateway, for the end user device, or a request to access, or electronically communicate with, a third-party, or external, device (target device) that is accessible, or more efficiently accessible, by a VPN server, other than the second VPN server 15040, wherein the target device is inaccessible, on inefficiently accessible, by the second VPN server 15040, or another event or combination of events.

The hierarchical-context area network manager 15020 receives, reads, obtains, or otherwise accesses, the second peering data request (at 15410). Subsequent to receiving the second peering data request, the hierarchical-context area network manager 15020 obtains, reads, or otherwise accesses, the peering data designated, defined, described, or configured, for the second VPN server 15040 from the previously stored VPN server configuration data for the second VPN server 15040, indicating that the first VPN server 15030 is designated, defined, described, or configured, as a VPNI peer, or neighbor, of the second VPN server 15040 and that the third VPN server 15050 is designated, defined, described, or configured, as a VPNI peer, or neighbor, of the second VPN server 15040.

The hierarchical-context area network manager 15020 generates, writes, or otherwise obtains, a second peering data response including the peering data for the second VPN server 15040 (second peering data), including the private IP address and the public encryption key allocated, associated with, or assigned to, the first VPN server 15030 and the private IP address and the public encryption key allocated, associated with, or assigned to, the third VPN server 15050, and sends, transmits, or otherwise makes available, the second peering data response to the second VPN server 15040 (at 15500).

The second VPN server 15040 obtains, receives, or otherwise accesses, the second peering data response including the second peering data (at 15510). Although not shown separately in FIG. 15, the second VPN server 15040 may store, record, or otherwise save the second peering data.

Subsequent to the hierarchical-context area network manager 15020 storing the VPN server configuration data (at 15110), the third VPN server 15050 generates, writes, or otherwise obtains, a third peering data request indicating a request for peering data, such as BGP data, and sends, transmits, or otherwise makes available, the third peering data request to the hierarchical-context area network manager 15020 (at 15600). For example, the third VPN server 15050 may send the third peering data request to the hierarchical-context area network manager 15020 via the Internet. The third peering data request indicates, or includes, the private IP address allocated, associated with, or assigned to, the third VPN server 15050 as the source of the third peering data request.

Although not shown expressly in FIG. 15, the third VPN server 15050 may generate and send the third peering data request (at 15600), in response to detecting, or identifying, an event, such as an event detected in accordance with initiation or startup of the third VPN server 15050, an event detected in accordance with establishing a virtual private network connection, or tunnel, between the third VPN server 15050 and an end user device (not shown), an event detected in accordance with a defined period, or timer, an event detected in accordance with receiving a request from an end user device (not shown), such as a request to configure one or more VPN servers, other than the third VPN server 15050, as an egress, or exit, node, point of egress, next-hop, default route, or default gateway, for the end user device, or a request to access, or electronically communicate with, a third-party, or external, device (target device) that is accessible, or more efficiently accessible, by a VPN server, other than the third VPN server 15050, wherein the target device is inaccessible, on inefficiently accessible, by the third VPN server 15050, or another event or combination of events.

The hierarchical-context area network manager 15020 receives, reads, obtains, or otherwise accesses, the third peering data request (at 15610). Subsequent to obtaining the third peering data request, the hierarchical-context area network manager 15020 obtains, reads, or otherwise accesses, the peering data designated, defined, described, or configured, for the third VPN server 15050 from the previously stored VPN server configuration data for the third VPN server 15050, indicating that the second VPN server 15040 is designated, defined, described, or configured, as a VPNI peer, or neighbor, of the third VPN server 15050.

The hierarchical-context area network manager 15020 generates, writes, or otherwise obtains, a third peering data response including the peering data for the third VPN server 15050 (third peering data), including the private IP address and the public encryption key allocated, associated with, or assigned to, the second VPN server 15040, and sends, transmits, or otherwise makes available, the third peering data response to the third VPN server 15050 (at 15700).

The third VPN server 15050 obtains, receives, or otherwise accesses, the third peering data response including the third peering data (at 15710). Although not shown separately in FIG. 15, the third VPN server 15050 may store, record, or otherwise save the third peering data.

Although the first peering data request is shown above the second peering data request, and the second peering data request is shown above the third peering data request, the peering data requests may be in another order, concurrent, or partially concurrent.

Figure 16:
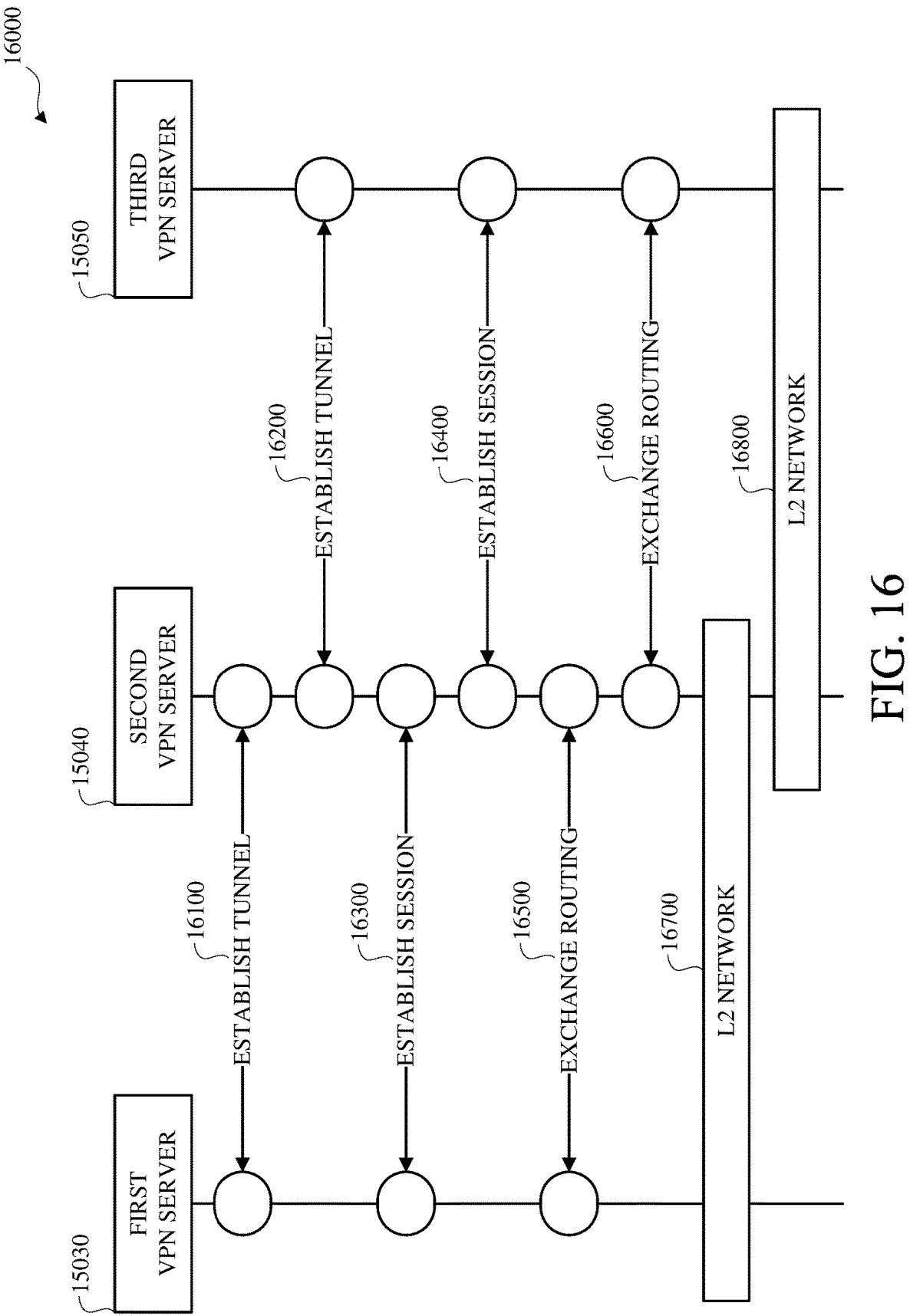
FIG. 16 is a flow diagram of a second portion of the example of the method of peering for establishing, activating, or enabling, VPN servers as current, or active, virtual private network infrastructure neighbors, or peers, in a virtual private network infrastructure system that implements a hierarchical-context area network as a virtual private network infrastructure network.

FIG. 16 is a flow diagram of a second portion of the example of the method of peering 16000 for establishing, activating, or enabling, VPN servers as current, or active, virtual private network infrastructure neighbors, or peers, in a virtual private network infrastructure system that implements a hierarchical-context area network as a virtual private network infrastructure network. The admin device 15010 and the hierarchical-context area network manager 15020 shown in FIG. 15 are omitted from FIG. 16 for simplicity.

The second portion of the example of the method of peering 16000 includes the first VPN server 15030 and the second VPN server 15040 establishing a first tunnel (at 16100), such as an encrypted VPN tunnel established using the encrypted layered tunneling protocol, which may be stateless and connectionless. For example, an ELTPVPN interface, such as the ELTPVPN interface 14700 shown in FIG. 14, implemented at the first VPN server 15030 may establish the first tunnel (at 16100) with an ELTPVPN interface, such as the ELTPVPN interface 14700 shown in FIG. 14, implemented at the second VPN server 15040, such as via the Internet, or via another network (not shown).

The first VPN server 15030 and the second VPN server 15040 establish the first tunnel (at 16100) subsequent to the first VPN server 15030 obtaining the first peering data response (at 15310) and the second VPN server 15040 obtaining the second peering data response (at 15510).

Although not shown expressly in FIG. 16, the first VPN server 15030 and the second VPN server 15040 may establish the first tunnel (at 16100), in response to the first VPN server 15030, the second VPN server 15040, or both, detecting, or identifying, an event, such as an event detected in accordance with initiation or startup of the third VPN server 15050. In another example, the first VPN server 15030 may initiate establishing the first tunnel in response to obtaining the first peering data response (at 15310). In another example, the first VPN server 15030 may initiate establishing the first tunnel in response to receiving a request, or other electronic communication, from an end user device (not shown), such as a request to configure one or more VPN servers, other than the first VPN server 15030, as an egress, or exit, node, point of egress, next-hop, default route, or default gateway, for the end user device, or a request to access, or electronically communicate with, a third-party, or external, device (target device) that is accessible, or more efficiently accessible, by a VPN server, other than the first VPN server 15030, wherein the target device is inaccessible, on inefficiently accessible, by the first VPN server 15030, or another event or combination of events.

Establishing the first tunnel (at 16100) includes the first VPN server 15030, or a component thereof, such as the ELTPVPN interface of the first VPN server 15030, generating, writing, or otherwise obtaining, and storing, recording, or otherwise saving, peer data identifying the second VPN server 15040 as a ELTPVPN neighbor, or peer, with respect to the first tunnel.

Establishing the first tunnel (at 16100) includes the second VPN server 15040, or a component thereof, such as the ELTPVPN interface of the second VPN server 15040, generating, writing, or otherwise obtaining, and storing, recording, or otherwise saving, peer data identifying the first VPN server 15030 as a ELTPVPN neighbor, or peer, with respect to the first tunnel.

The second portion of the example of the method of peering 16000 includes the second VPN server 15040 and the third VPN server 15050 establishing a second tunnel (at 16200), such as an encrypted VPN tunnel established using the encrypted layered tunneling protocol. For example, an ELTPVPN interface, such as the ELTPVPN interface 14700 shown in FIG. 14, implemented at the second VPN server 15040 may establish the second tunnel (at 16200) with an ELTPVPN interface, such as the ELTPVPN interface 14700 shown in FIG. 14, implemented at the third VPN server 15050, such as via the Internet, or via another network (not shown).

The second VPN server 15040 and the third VPN server 15050 establish the second tunnel (at 16200) subsequent to the second VPN server 15040 obtaining the second peering data response (at 15510) and the third VPN server 15050 obtaining the third peering data response (at 15710).

Although not shown expressly in FIG. 16, the second VPN server 15040 and the third VPN server 15050 may establish the second tunnel (at 16200), in response to the second VPN server 15040, the third VPN server 15050, or both, detecting, or identifying, an event. For example, the second VPN server 15040 may initiate establishing the second tunnel in response to obtaining the second peering data response (at 15510). In another example, the second VPN server 15040 may initiate establishing the second tunnel in response to establishing the first tunnel (at 16100).

Establishing the second tunnel (at 16200) includes the second VPN server 15040, or a component thereof, such as the ELTPVPN interface of the second VPN server 15040, generating, writing, or otherwise obtaining, and storing, recording, or otherwise saving, peer data identifying the third VPN server 15050 as a ELTPVPN neighbor, or peer, with respect to the second tunnel.

Establishing the second tunnel (at 16200) includes the third VPN server 15050, or a component thereof, such as the ELTPVPN interface of the third VPN server 15050, generating, writing, or otherwise obtaining, and storing, recording, or otherwise saving, peer data identifying the second VPN server 15040 as a ELTPVPN neighbor, or peer, with respect to the second tunnel.

Although shown below establishing the first tunnel (at 16100) in FIG. 16, establishing the second tunnel (at 16200) may be performed concurrently with, partially concurrently with, or prior to, establishing the first tunnel (at 16100).

The second portion of the example of the method of peering 16000 includes, subsequent to establishing the first tunnel (at 16100), the first VPN server 15030 and the second VPN server 15040 establishing a first session (at 16300), such as a BGP session between the first VPN server 15030 and the second VPN server 15040, using the first tunnel (established at 16100). For example, a service, such as a VPN server network communications configuration operating system interface service, such as the VPN server network communications configuration operating system interface (OS interface) service 14500 shown in FIG. 14, implemented at the first VPN server 15030 may configure BGP neighbor information for a component of the first VPN server 15030 that implements BGP (the BGP component) to establish the first session (at 16300) with the second VPN server 15040. The first VPN server 15030 and the second VPN server 15040 establish the first session (at 16300) in response to establishing the first tunnel (at 16100).

Establishing the first session (at 16300) includes the first VPN server 15030, or a component thereof, such as the VPN server network communications configuration operating system interface service of the first VPN server 15030 or the BGP component of the first VPN server 15030, generating, writing, or otherwise obtaining, and storing, recording, or otherwise saving, peer data identifying the second VPN server 15040 as a BGP neighbor, or peer, with respect to the first session.

Establishing the first session (at 16300) includes the second VPN server 15040, or a component thereof, such as the VPN server network communications configuration operating system interface service of the second VPN server 15040, or the BGP component of the second VPN server 15040, generating, writing, or otherwise obtaining, and storing, recording, or otherwise saving, peer data identifying the first VPN server 15030 as a BGP neighbor, or peer, with respect to the first session.

The second portion of the example of the method of peering 16000 includes, subsequent to establishing the second tunnel (at 16200), the second VPN server 15040 and the third VPN server 15050 establishing a second session (at 16400), such as a BGP session between the second VPN server 15040 and the third VPN server 15050, using the second tunnel (established at 16200). For example, a service, such as a VPN server network communications configuration operating system interface service, such as the VPN server network communications configuration operating system interface (OS interface) service 14500 shown in FIG. 14, implemented at the second VPN server 15040 may configure BGP neighbor information for a component of the second VPN server 15040, such as a component of the second VPN server 15040 that implements BGP, to establish the second session (at 16400) with third VPN server 15050. The second VPN server 15040 and the third VPN server 15050 establish the second session (at 16400) in response to establishing the second tunnel (at 16200).

Establishing the second session (at 16400) includes the second VPN server 15040, or a component thereof, such as the VPN server network communications configuration operating system interface service of the second VPN server 15040, or the BGP component of the second VPN server 15040, generating, writing, or otherwise obtaining, and storing, recording, or otherwise saving, peer data identifying the third VPN server 15050 as a BGP neighbor, or peer, with respect to the second session.

Establishing the second session (at 16400) includes the third VPN server 15050, or a component thereof, such as the VPN server network communications configuration operating system interface service of the third VPN server 15050, or the BGP component of the third VPN server 15050, generating, writing, or otherwise obtaining, and storing, recording, or otherwise saving, peer data identifying the second VPN server 15040 as a BGP neighbor, or peer, with respect to the second session.

Although shown below establishing the first session (at 16300) in FIG. 16, establishing the second session (at 16400) may be performed concurrently with, partially concurrently with, or prior to, establishing the first session (at 16300).

The second portion of the example of the method of peering 16000 includes, subsequent to establishing the first session (at 16300), the first VPN server 15030 and the second VPN server 15040 exchanging first routing data (at 16500) using the first session (established at 16300). The first routing data may include layer two (L2), or data-link layer, virtual private network routing prefixes. The first routing data may include VNIs, MAC addresses, IP addresses, IP ports of VXLAN interfaces, cryptographic keys, or a combination thereof. For example, the first VPN server 15030 may send the VNI, or VNI value, VNI 100, for the first level-one VXLAN, one or more corresponding MAC addresses of the control-plane VXLAN interface to the first level-one VXLAN of the first VPN server 15030, one or more IP addresses of the control-plane VXLAN interface to the first level-one VXLAN of the first VPN server 15030, IP ports of the control-plane VXLAN interface to the first level-one VXLAN of the first VPN server 15030, and one or more cryptographic keys, such as public keys, of the first VPN server 15030. The first VPN server 15030 and the second VPN server 15040 exchange the first routing data (at 16500) in response to establishing the first session (at 16300).

Exchanging the first routing data (at 16500) includes the first VPN server 15030, or a component thereof, such as the VPN server network communications configuration operating system interface service of the first VPN server 15030, or the BGP component of the first VPN server 15030, obtaining first routing data, or a first portion of the first routing data, from the second VPN server 15040, and the second VPN server 15040, or a component thereof, such as the VPN server network communications configuration operating system interface service of the second VPN server 15040, or the BGP component of the second VPN server 15040, obtaining second routing data, or a second portion of the first routing data, from the first VPN server 15030. For example, the first VPN server 15030, or a component thereof, such as the VPN server network communications configuration operating system interface service of the first VPN server 15030, or the BGP component of the first VPN server 15030, may send, transmit, or otherwise make available, a first portion of the first routing data to the second VPN server 15040, the second VPN server 15040, or a component thereof, such as the VPN server network communications configuration operating system interface service of the second VPN server 15040, or the BGP component of the second VPN server 15040, may receive, access, or otherwise obtain the first portion of the first routing data and may send, transmit, or otherwise make available, a second portion of the first routing data to the first VPN server 15030, or a component thereof, such as the VPN server network communications configuration operating system interface service of the first VPN server 15030, or the BGP component of the first VPN server 15030, which may receive, access, or otherwise obtain the second portion of the first routing data.

Exchanging the first routing data (at 16500) includes the first VPN server 15030, or a component thereof, such as the VPN server network communications configuration operating system interface service of the first VPN server 15030, or the BGP component of the first VPN server 15030, storing, recording, or otherwise saving, the second portion of the first routing data.

Exchanging the first routing data (at 16500) includes the second VPN server 15040, or a component thereof, such as the VPN server network communications configuration operating system interface service of the second VPN server 15040, or the BGP component of the second VPN server 15040, storing, recording, or otherwise saving, the first portion of the first routing data.

The second portion of the example of the method of peering 16000 includes, subsequent to establishing the second session (at 16400), the second VPN server 15040 and the third VPN server 15050 exchanging second routing data (at 16600) using the second session (established at 16400). The second routing data may include layer two (L2), or data-link layer, virtual private network routing prefixes. The second routing data may include VNIs, MAC addresses, IP addresses, IP ports of VXLAN interfaces, cryptographic keys, or a combination thereof. The second VPN server 15040 and the third VPN server 15050 exchange the second routing data (at 16600) in response to establishing the second session (at 16400).

For example, the second VPN server 15040, or a component thereof, such as the VPN server network communications configuration operating system interface service of the second VPN server 15040, or the BGP component of the second VPN server 15040, may send, transmit, or otherwise make available, a first portion of the second routing data to the third VPN server 15050, or a component thereof, such as the VPN server network communications configuration operating system interface service of the third VPN server 15050, or the BGP component of the third VPN server 15050, may receive, access, or otherwise obtain the first portion of the second routing data and may send, transmit, or otherwise make available, a second portion of the second routing data to the second VPN server 15040, or a component thereof, such as the VPN server network communications configuration operating system interface service of the second VPN server 15040, or the BGP component of the second VPN server 15040, which may receive, access, or otherwise obtain the second portion of the second routing data.

Exchanging the second routing data (at 16600) includes the second VPN server 15040, or a component thereof, such as the VPN server network communications configuration operating system interface service of the second VPN server 15040, or the BGP component of the second VPN server 15040, storing, recording, or otherwise saving, the second portion of the second routing data.

Exchanging the second routing data (at 16600) includes the third VPN server 15050, or a component thereof, such as the VPN server network communications configuration operating system interface service of the third VPN server 15050, or the BGP component of the third VPN server 15050, storing, recording, or otherwise saving, the first portion of the second routing data.

Although shown below exchanging the first routing data (at 16500) in FIG. 16, exchanging the second routing data (at 16600) may be performed concurrently with, partially concurrently with, or prior to, exchanging the first routing data (at 16500).

The second portion of the example of the method of peering 16000 shows a first layer two (L2), or data-link layer, VXLAN network (shown at 16700) between the first VPN server 15030 and the second VPN server 15040, established, or built, by establishing the first tunnel (at 16100), establishing the first session (at 16300), and exchanging the first routing data (at 16500). Establishing the first layer two (L2) VXLAN network (shown at 16700) includes creating a virtual switch for switching, or routing, protocol data units between the first VPN server 15030 and the second VPN server 15040.

Subsequent to establishing the first layer two (L2) VXLAN network (shown at 16700), the first VPN server 15030 and the second VPN server 15040 are active virtual private network infrastructure peers in the data-plane VXLAN of the first level-two VXLAN, such as the first level-two VXLAN in the first level-two VXLAN context area 9120 shown in FIG. 9, having the VNI 250. For example, the first layer two (L2) VXLAN network may be, or include, the first level-two data-plane VXLAN having the VNI 250.

The second portion of the example of the method of peering 16000 shows a second layer two (L2), or data-link layer, VXLAN network (shown at 16800) between the second VPN server 15040 and the third VPN server 15050, established, or built, by establishing the second tunnel (at 16200), establishing the second session (at 16400), and exchanging the second routing data (at 16600).

Subsequent to establishing the second layer two (L2) VXLAN network (shown at 16800), the second VPN server 15040 and the third VPN server 15050 are active virtual private network infrastructure peers in the data-plane VXLAN of the first level-four VXLAN, such as the first level-four VXLAN in the first level-four VXLAN context area 9100 shown in FIG. 9, having the VNI 450. For example, the second layer two (L2) VXLAN network may be, or include, the first level-four data-plane VXLAN having the VNI 450.

Figure 17:
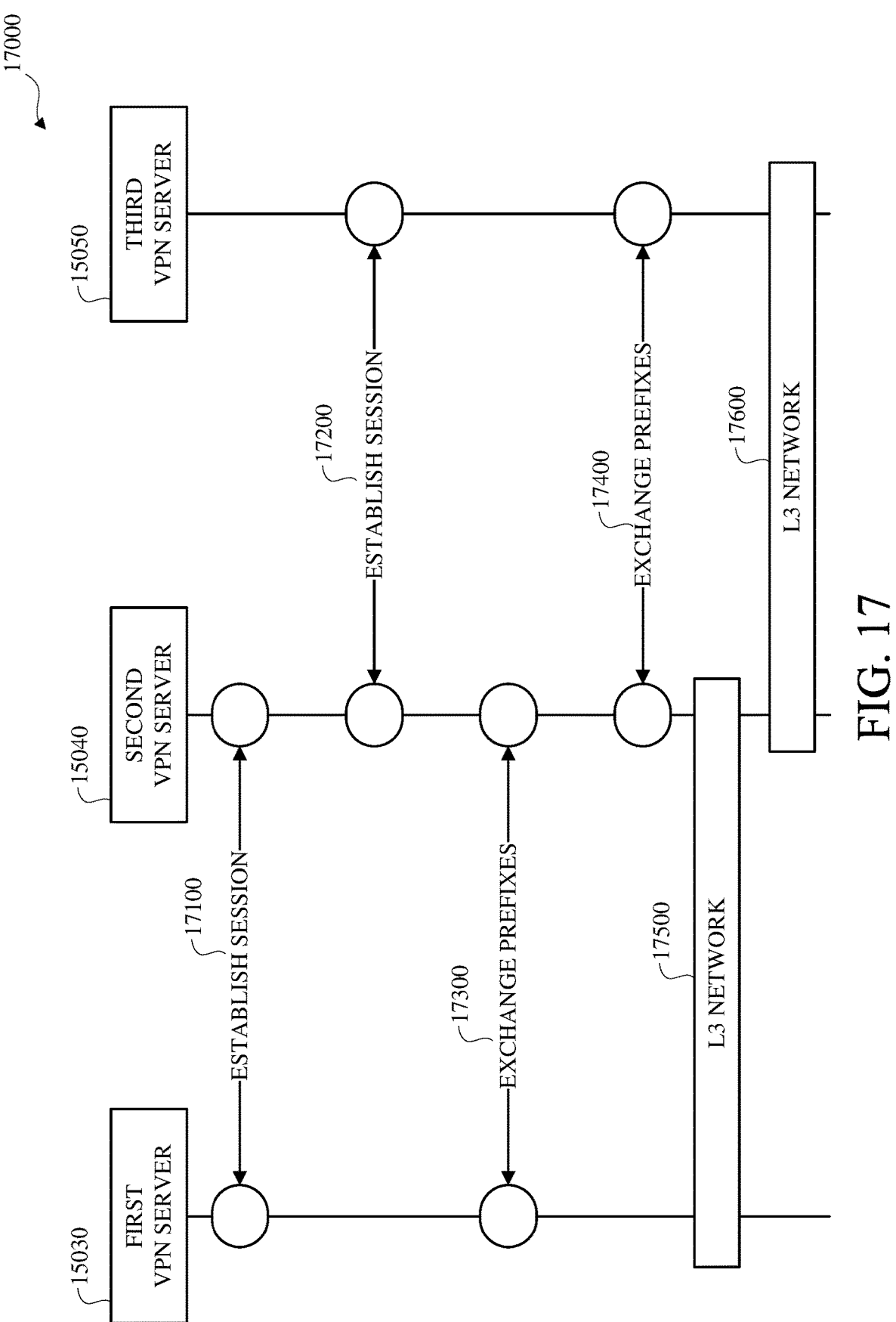
FIG. 17 is a flow diagram of a third portion of the example of the method of peering for establishing, activating, or enabling, VPN servers as current, or active, virtual private network infrastructure neighbors, or peers, in a virtual private network infrastructure system that implements a hierarchical-context area network as a virtual private network infrastructure network.

FIG. 17 is a flow diagram of a third portion of the example of the method of peering 17000 for establishing, activating, or enabling, VPN servers as current, or active, virtual private network infrastructure neighbors, or peers, in a virtual private network infrastructure system that implements a hierarchical-context area network as a virtual private network infrastructure network. The admin device 15010 and the hierarchical-context area network manager 15020 shown in FIG. 15 are omitted from FIG. 17 for simplicity.

The third portion of the example of the method of peering 17000 includes, subsequent to establishing the first layer two (L2), or data-link layer, VXLAN network (shown at 16700 in FIG. 16), the first VPN server 15030 and the second VPN server 15040 establishing a third session (at 17100), such as a BGP session, between the first VPN server 15030 and the second VPN server 15040, using the first layer two (L2), or data-link layer, VXLAN network (established as shown at 16700 in FIG. 16). For example, the first VPN server 15030, or a component thereof, such as the VPN server network communications configuration operating system interface service of the first VPN server 15030, or the BGP component, or another BGP component, of the first VPN server 15030, may establish the third session (at 17100) with a corresponding component of the second VPN server 15040.

The first VPN server 15030 and the second VPN server 15040 establish the third session (at 17100) in response to establishing the first layer two (L2), or data-link layer, VXLAN network (shown at 16700 in FIG. 16).

Establishing the third session (at 17100) includes the first VPN server 15030, or a component thereof, such as the VPN server network communications configuration operating system interface service of the first VPN server 15030, or the BGP component, or another BGP component, of the first VPN server 15030, generating, writing, or otherwise obtaining, and storing, recording, or otherwise saving, peer data identifying the second VPN server 15040 as a BGP neighbor, or peer, with respect to the third session.

Establishing the third session (at 17100) includes the second VPN server 15040, or a component thereof, such as the VPN server network communications configuration operating system interface service of the second VPN server 15040, or the BGP component, or another BGP component, of the second VPN server 15040, generating, writing, or otherwise obtaining, and storing, recording, or otherwise saving, peer data identifying the first VPN server 15030 as a BGP neighbor, or peer, with respect to the third session.

The third portion of the example of the method of peering 17000 includes, subsequent to establishing the second layer two (L2), or data-link layer, VXLAN network (shown at 16800 in FIG. 16), the second VPN server 15040 and the third VPN server 15050 establishing a fourth session (at 17200), such as a BGP session between the second VPN server 15040 and the third VPN server 15050, using the second layer two (L2), or data-link layer, VXLAN network (established as shown at 16800 in FIG. 16). For example, the second VPN server 15040, or a component thereof, such as the VPN server network communications configuration operating system interface service of the second VPN server 15040, or the BGP component of the second VPN server 15040, may establish the fourth session (at 17200) with a corresponding component of the third VPN server 15050. The second VPN server 15040 and the third VPN server 15050 establish the fourth session (at 17200) in response to establishing the second layer two (L2), or data-link layer, VXLAN network (shown at 16800 in FIG. 16).

Establishing the fourth session (at 17200) includes the second VPN server 15040, or a component thereof, such as the VPN server network communications configuration operating system interface service of the second VPN server 15040, or the BGP component of the second VPN server 15040, generating, writing, or otherwise obtaining, and storing, recording, or otherwise saving, peer data identifying the third VPN server 15050 as a BGP neighbor, or peer, with respect to the fourth session.

Establishing the fourth session (at 17200) includes the third VPN server 15050, or a component thereof, such as the VPN server network communications configuration operating system interface service of the third VPN server 15050, or the BGP component, or another BGP component, of the third VPN server 15050, generating, writing, or otherwise obtaining, and storing, recording, or otherwise saving, peer data identifying the second VPN server 15040 as a BGP neighbor, or peer, with respect to the fourth session.

Although shown below establishing the third session (at 17100), establishing a fourth session (at 17200) may be performed concurrently with, partially concurrently with, or prior to, establishing the third session (at 17100).

The third portion of the example of the method of peering 17000 includes, subsequent to establishing the third session (at 17100), the first VPN server 15030 and the second VPN server 15040 exchanging first layer-three (L3), or IP layer, network prefix data (at 17300) using the third session (established at 17100). The first layer-three (L3), or IP layer, network prefix data may include routing data, such as redistributed routes of neighbors, which may include IPv4 unicast routes. The first layer-three (L3), or IP layer, network prefix data may include physical address information, such as street address, of the respective VPN servers. The first VPN server 15030 and the second VPN server 15040 exchange the first layer-three (L3), or IP layer, network prefix data (at 17300) in response to establishing the third session (at 17100).

For example, the first VPN server 15030, or a component thereof, such as the VPN server network communications configuration operating system interface service of the first VPN server 15030, or the BGP component, or another BGP component, of the first VPN server 15030, may send, transmit, or otherwise make available, a first portion of the first layer-three (L3), or IP layer, network prefix data to the second VPN server 15040, the second VPN server 15040, or a component thereof, such as the VPN server network communications configuration operating system interface service of the second VPN server 15040, or the BGP component, or another BGP component, of the second VPN server 15040, may receive, access, or otherwise obtain the first portion of the first layer-three (L3), or IP layer, network prefix data and may send, transmit, or otherwise make available, a second portion of the first layer-three (L3), or IP layer, network prefix data to the first VPN server 15030, or a component thereof, such as the VPN server network communications configuration operating system interface service of the first VPN server 15030, or the BGP component, or another BGP component, of the first VPN server 15030, which may receive, access, or otherwise obtain the second portion of the first layer-three (L3), or IP layer, network prefix data.

Exchanging the layer-three (L3), or IP layer, network prefix data (at 17300) includes the first VPN server 15030, or a component thereof, such as the VPN server network communications configuration operating system interface service of the first VPN server 15030, or the BGP component, or another BGP component, of the first VPN server 15030, storing, recording, or otherwise saving, the second portion of the first layer-three (L3), or IP layer, network prefix data.

Exchanging the layer-three (L3), or IP layer, network prefix data (at 17300) includes the second VPN server 15040, or a component thereof, such as the VPN server network communications configuration operating system interface service of the second VPN server 15040, or the BGP component of the second VPN server 15040, storing, recording, or otherwise saving, the first portion of the first layer-three (L3), or IP layer, network prefix data.

The third portion of the example of the method of peering 17000 includes, subsequent to establishing the fourth session (at 17200), the second VPN server 15040 and the third VPN server 15050 exchanging second layer-three (L3), or IP layer, network prefix data (at 17400) using the fourth session (established at 17200). The second layer-three (L3), or IP layer, network prefix data may include routing data, such as redistributed routes of neighbors, which may include IPv4 unicast routes. The first layer-three (L3), or IP layer, network prefix data may include physical address information, such as street address, of the respective VPN servers. The second VPN server 15040 and the third VPN server 15050 exchange the second layer-three (L3), or IP layer, network prefix data (at 17400) in response to establishing the fourth session (at 17200).

For example, the second VPN server 15040, or a component thereof, such as the VPN server network communications configuration operating system interface service of the second VPN server 15040, or the BGP component of the second VPN server 15040, may send, transmit, or otherwise make available, a first portion of the second layer-three (L3), or IP layer, network prefix data to the third VPN server 15050, the third VPN server 15050, or a component thereof, such as the VPN server network communications configuration operating system interface service of the third VPN server 15050, or the BGP component of the third VPN server 15050, may receive, access, or otherwise obtain the first portion of the second layer-three (L3), or IP layer, network prefix data and may send, transmit, or otherwise make available, a second portion of the second layer-three (L3), or IP layer, network prefix data to the second VPN server 15040, which may receive, access, or otherwise obtain the second portion of the second layer-three (L3), or IP layer, network prefix data.

Exchanging the second layer-three (L3), or IP layer, network prefix data (at 17400) includes the second VPN server 15040, or a component thereof, such as the VPN server network communications configuration operating system interface service of the second VPN server 15040, or the BGP component of the second VPN server 15040, storing, recording, or otherwise saving, the second portion of the second layer-three (L3), or IP layer, network prefix data.

Exchanging the second layer-three (L3), or IP layer, network prefix data (at 17400) includes the third VPN server 15050, or a component thereof, such as the VPN server network communications configuration operating system interface service of the third VPN server 15050, or the BGP component of the third VPN server 15050, storing, recording, or otherwise saving, the first portion of the second layer-three (L3), or IP layer, network prefix data.

Although shown below exchanging the layer-three (L3), or IP layer, network prefix data (at 17300), exchanging the second layer-three (L3), or IP layer, network prefix data (at 17400) may be performed concurrently with, partially concurrently with, or prior to, exchanging the layer-three (L3), or IP layer, network prefix data (at 17300).

The third portion of the example of the method of peering 17000 shows a first layer-three (L3), or IP layer, control-plane VXLAN network (shown at 17500) between the first VPN server 15030 and the second VPN server 15040, established, or built, using the layer two (L2) VXLAN network (shown at 16700 in FIG. 16), by establishing the third session (at 17100), and exchanging first layer-three (L3), or IP layer, network prefix data (at 17300). For example, the first layer three (L3) VXLAN network may be, or include, the first level-two control-plane VXLAN having the VNI 200.

The third portion of the example of the method of peering 17000 shows a second layer-three (L3), or IP layer, control-plane VXLAN network (shown at 17600) between the second VPN server 15040 and the third VPN server 15050, established, or built, using the layer two (L2) VXLAN network (shown at 16800 in FIG. 16), by establishing the fourth session (at 17200) and exchanging second layer-three (L3), or IP layer, network prefix data (at 17400). For example, the second layer three (L3) VXLAN network may be, or include, the first level-four control-plane VXLAN having the VNI 400.

Subsequent to establishing the first layer three (L3) VXLAN network (shown at 17500), the first VPN server 15030 and the second VPN server 15040 are active virtual private network infrastructure peers in the control-plane VXLAN of the first level-two VXLAN, such as the first level-two VXLAN in the first level-two VXLAN context area 9120 shown in FIG. 9, having the VNI 250.

Subsequent to establishing first layer three (L3) VXLAN network (shown at 17500), the second VPN server 15040 and the third VPN server 15050 are active virtual private network infrastructure peers in the control-plane VXLAN of the first level-four VXLAN, such as the first level-four VXLAN in the first level-four VXLAN context area 9100 shown in FIG. 9, having the VNI 450.

Figure 18:
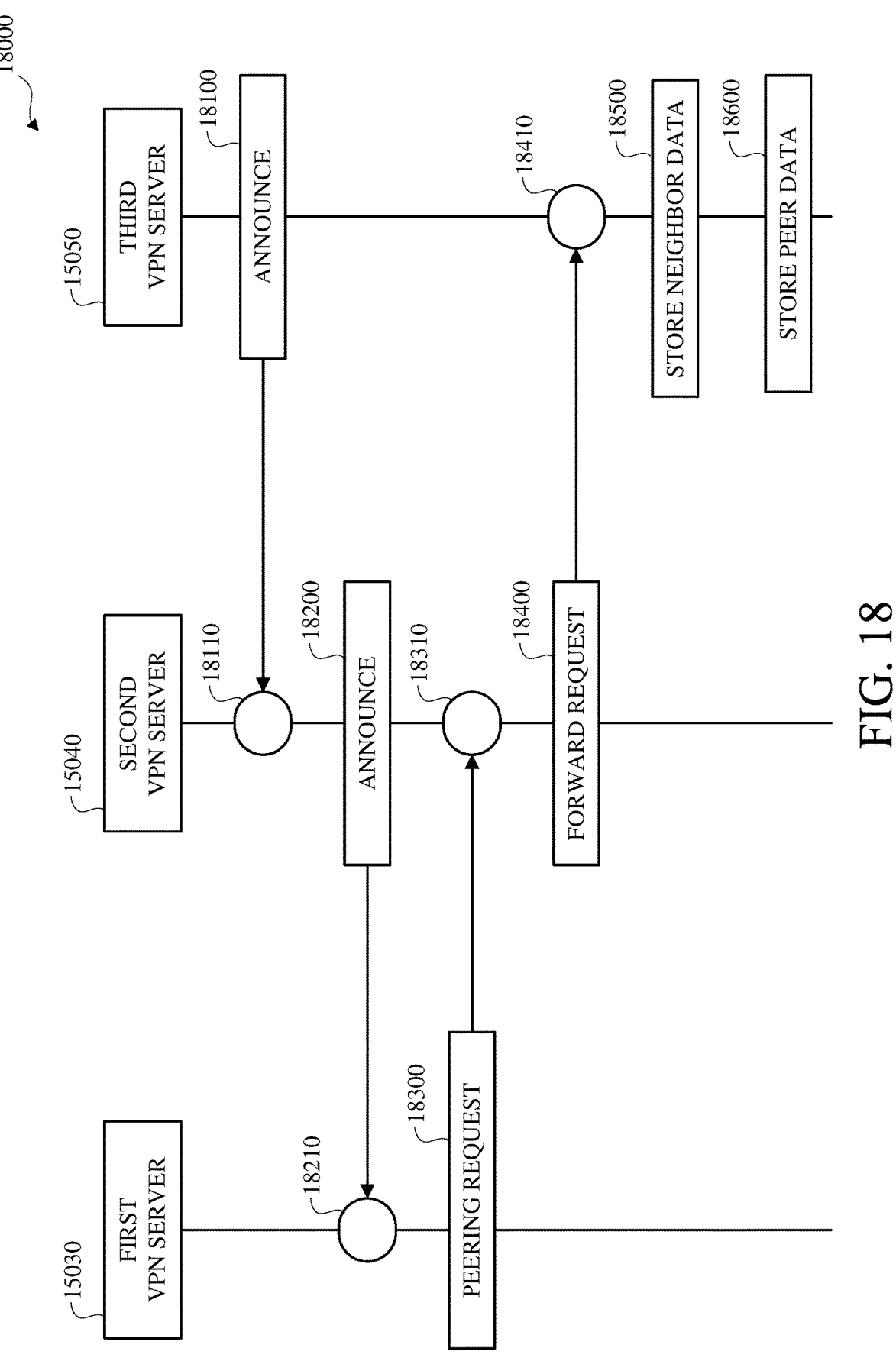
FIG. 18 is a flow diagram of a fourth portion of the example of the method of peering for establishing, activating, or enabling, VPN servers as current, or active, virtual private network infrastructure neighbors, or peers, in a virtual private network infrastructure system that implements a hierarchical-context area network as a virtual private network infrastructure network.

FIG. 18 is a flow diagram of a fourth portion of the example of the method of peering 18000 for establishing, activating, or enabling, VPN servers as current, or active, virtual private network infrastructure neighbors, or peers, in a virtual private network infrastructure system that implements a hierarchical-context area network as a virtual private network infrastructure network. The admin device 15010 and the hierarchical-context area network manager 15020 shown in FIG. 15 are omitted from FIG. 18 for simplicity.

The fourth portion of the example of the method of peering 18000 includes, subsequent to establishing, or building, the first layer-three (L3), or IP layer, control-plane VXLAN network (shown at 17500 in FIG. 17), the third VPN server 15050 sending, transmitting, or otherwise making available, first announcement data to the second VPN server 15040 (at 18100), such as via the first layer-three (L3), or IP layer, control-plane VXLAN network (shown at 17500 in FIG. 17) IPv4 unicast layer. The first announcement data includes the IP address allocated to, associated with, or assigned to, the third VPN server 15050, which may be a shared IP address allocated to, associated with, or assigned to, the third level-one VXLAN, such as 10.129.0.255.

For example, subsequent to establishing, or building, the first layer-three (L3), or IP layer, control-plane VXLAN network (shown at 17500 in FIG. 17), the third VPN server 15050, or a component thereof, such as the VPN server network communications configuration operating system interface service of the third VPN server 15050, or the BGP component of the third VPN server 15050, may send, transmit, or otherwise make available, the first announcement data in response to detecting, or identifying, an event, such as an event detected in accordance with establishing, or building, the first layer-three (L3), or IP layer, control-plane VXLAN network (shown at 17500 in FIG. 17), an event detected in accordance with a defined period, or timer, or another event or combination of events.

The fourth portion of the example of the method of peering 18000 includes, subsequent to the third VPN server 15050 sending, transmitting, or otherwise making available, first announcement data (at 18100), the second VPN server 15040 receiving, obtaining, or otherwise accessing, the first announcement data (at 18110). The second VPN server 15040 may store, record, or otherwise save, the first announcement data.

The fourth portion of the example of the method of peering 18000 includes, subsequent to the second VPN server 15040 receiving, obtaining, or otherwise accessing, the first announcement data (at 18110), the second VPN server 15040 sending, transmitting, or otherwise making available, second announcement data to the first VPN server 15030 (at 18200). The second announcement data includes data, such as routing data, indicating that the second VPN server 15040 is a next-hop for transmitting, transferring, or routing, protocol data units to the third VPN server 15050 in accordance with the IP address 10.129.0.255 included in the first announcement data.

The fourth portion of the example of the method of peering 18000 includes, subsequent to the second VPN server 15040 sending, transmitting, or otherwise making available, second announcement data to the first VPN server 15030 (at 18200), the first VPN server 15030 receiving, obtaining, or otherwise accessing, the second announcement data (at 18210). The first VPN server 15030 may store, record, or otherwise save, the second announcement data.

The fourth portion of the example of the method of peering 18000 includes, subsequent to the first VPN server 15030 receiving, obtaining, or otherwise accessing, the second announcement data (at 18210), the first VPN server 15030 sending, transmitting, or otherwise making available, a peering request to the second VPN server 15040 (at 18300). The peering request (peering request data) includes a request to identify, or configure, the third VPN server 15050 as a VPNI peer, or neighbor, of the first VPN server 15030, which may be referred to as establishing a peer relationship between the first VPN server 15030 and the third VPN server 15050. The peering request (request to establish a peer relationship between the first VPN server 15030 and the third VPN server 15050) includes the public cryptographic key of the first VPN server 15030 and the private IP address of the first VPN server 15030. The first VPN server 15030 sends, transmits, or otherwise makes available, the peering request to the second VPN server 15040 as the next-hop for the third VPN server 15050. The first VPN server 15030 sends, transmits, or otherwise makes available, the peering request to the second VPN server 15040 in response to detecting, or identifying, an event, such as an event detected in accordance with receiving a request, or other electronic communication, from an end user device (not shown), such as a request (egress reconfiguration request) to configure one or more VPN servers, other than the first VPN server 15030, as an egress, or exit, node, point of egress, next-hop, default route, or default gateway, for the end user device, or a request to access, or electronically communicate with, a third-party, or external, device (target device) that is accessible, or more efficiently accessible, by a VPN server, other than the first VPN server 15030, wherein the target device is inaccessible, on inefficiently accessible, by the first VPN server 15030, or another event or combination of events.

The fourth portion of the example of the method of peering 18000 includes, subsequent to the first VPN server 15030 sending, transmitting, or otherwise making available, the peering request to the second VPN server 15040 (at 18300), the second VPN server 15040 receiving, obtaining, or otherwise accessing, the peering request from the first VPN server 15030 (at 18310). The second VPN server 15040 may store, record, or otherwise save, the peering request.

The fourth portion of the example of the method of peering 18000 includes, subsequent to the second VPN server 15040 receiving, obtaining, or otherwise accessing, the peering request from the first VPN server 15030 (at 18310), the second VPN server 15040 forwarding, such as sending, transmitting, or otherwise making available, the peering request (forwarded peering request) to the third VPN server 15050 (at 18400).

The fourth portion of the example of the method of peering 18000 includes, subsequent to the second VPN server 15040 forwarding, such as sending, transmitting, or otherwise making available, the forwarded peering request to the third VPN server 15050 (at 18400), the third VPN server 15050 receiving, obtaining, or otherwise accessing, the forwarded peering request from the second VPN server 15040 (at 18410). The second VPN server 15040 may store, record, or otherwise save, the peering request.

The fourth portion of the example of the method of peering 18000 includes, subsequent to the third VPN server 15050 receiving, obtaining, or otherwise accessing, the forwarded peering request from the second VPN server 15040 (at 18410), the third VPN server 15050 generating, writing, or otherwise obtaining, and storing, recording, or otherwise saving, peer data identifying the first VPN server 15030 as a VPNI peer, or neighbor, in the VPNI network (at 18500), with respect to the encrypted layered tunneling protocol.

The fourth portion of the example of the method of peering 18000 includes, subsequent to the third VPN server 15050 receiving, obtaining, or otherwise accessing, the forwarded peering request from the second VPN server 15040 (at 18410), the third VPN server 15050 generating, writing, or otherwise obtaining, and storing, recording, or otherwise saving, peer data identifying the first VPN server 15030 as a VPNI peer, or neighbor, in the VPNI network (at 18600), with respect to the border gateway protocol.

For example, the peer data identifying the first VPN server 15030 as a VPNI peer, or neighbor, in the VPNI network may include the public cryptographic key of the first VPN server 15030 and the private IP address of the first VPN server obtained from the peering request.

Figure 19:
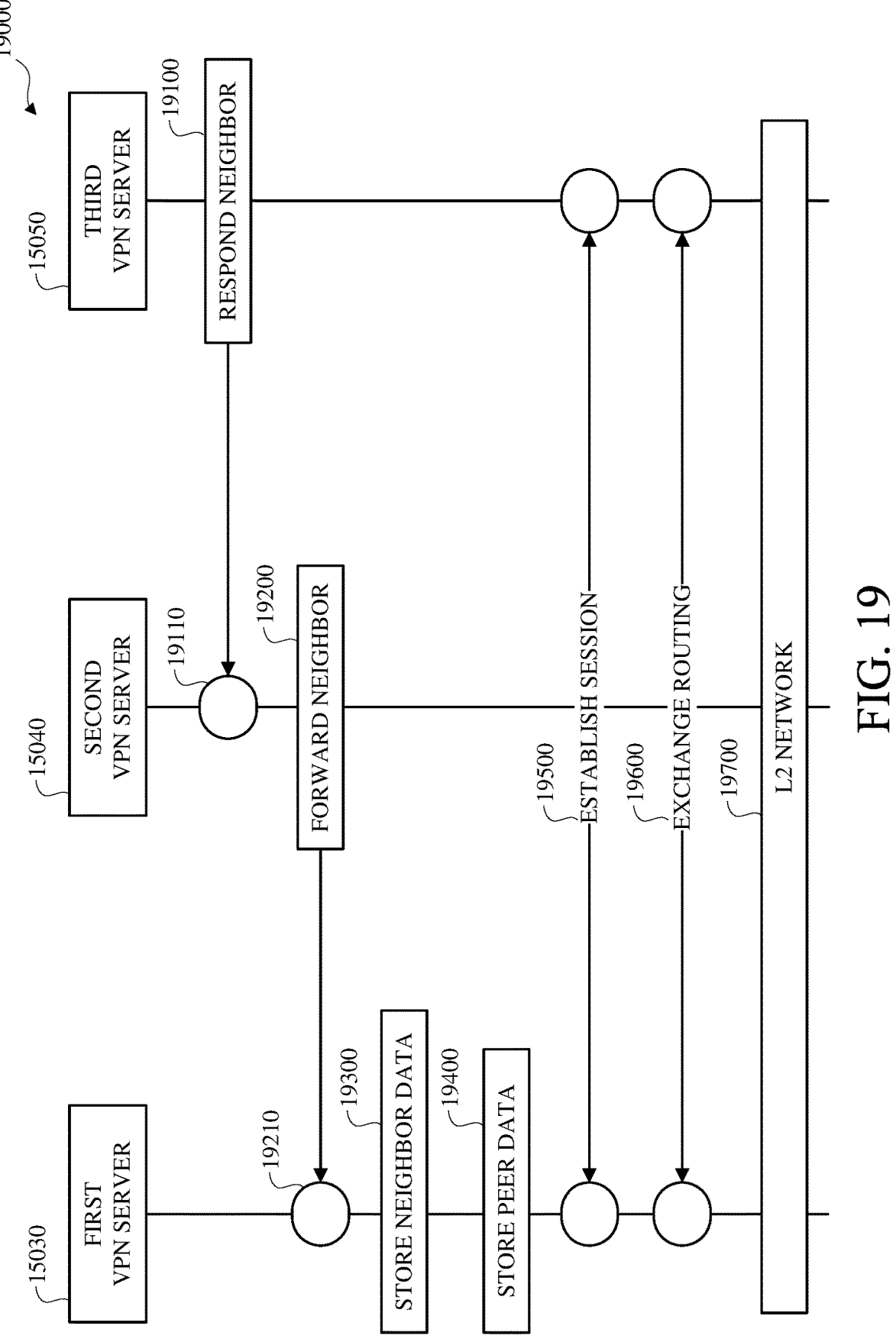
FIG. 19 is a flow diagram of a fifth portion of the example of the method of peering for establishing, activating, or enabling, VPN servers as current, or active, virtual private network infrastructure neighbors, or peers, in a virtual private network infrastructure system that implements a hierarchical-context area network as a virtual private network infrastructure network.

FIG. 19 is a flow diagram of a fifth portion of the example of the method of peering 19000 for establishing, activating, or enabling, VPN servers as current, or active, virtual private network infrastructure neighbors, or peers, in a virtual private network infrastructure system that implements a hierarchical-context area network as a virtual private network infrastructure network. The admin device 15010 and the hierarchical-context area network manager 15020 shown in FIG. 15 are omitted from FIG. 19 for simplicity.

The fifth portion of the example of the method of peering 19000 includes the third VPN server 15050 generating, writing, or otherwise obtaining, and sending, transmitting, or otherwise making available, peering response data to the second VPN server 15040 (at 19100). The peering response data includes the public cryptographic key of the third VPN server 15050 and the private IP address of the third VPN server 15050. The peering response data is addressed to the first VPN server 15030, as the destination address, and sent to the second VPN server 15040 as the next-hop, or relay, for routing protocol data units between the third VPN server 15050 and the first VPN server 15030.

The fifth portion of the example of the method of peering 19000 includes the second VPN server receiving, reading, obtaining, or otherwise accessing, the peering response data (at 19110) from the third VPN server 15050.

The fifth portion of the example of the method of peering 19000 includes the second VPN server 15040 forwarding, such as sending, transmitting, or otherwise making available, the peering response data (forwarded peering response data) to the first VPN server 15030 (at 19200).

The fifth portion of the example of the method of peering 19000 includes the first VPN server 15030 receiving, reading, obtaining, or otherwise accessing, the forwarded peering response data from the second VPN server 15040 (at 19210).

The fifth portion of the example of the method of peering 19000 includes, subsequent to the first VPN server 15030 receiving, obtaining, or otherwise accessing, the forwarded peering response data from the second VPN server 15040 (at 19210), the first VPN server 15030 generating, writing, or otherwise obtaining, and storing, recording, or otherwise saving, peer data identifying the third VPN server 15050 as a VPNI peer, or neighbor, in the VPNI network (at 19300), with respect to the encrypted layered tunneling protocol.

The fifth portion of the example of the method of peering 19000 includes, subsequent to the first VPN server 15030 receiving, obtaining, or otherwise accessing, the forwarded peering response data from the second VPN server 15040 (at 19210), the first VPN server 15030 generating, writing, or otherwise obtaining, and storing, recording, or otherwise saving, peer data identifying the third VPN server 15050 as a VPNI peer, or neighbor, in the VPNI network (at 19400), with respect to the border gateway protocol.

The fifth portion of the example of the method of peering 19000 includes, subsequent to the first VPN server 15030 receiving, obtaining, or otherwise accessing, the forwarded peering response data from the second VPN server 15040 (at 19210), the first VPN server 15030 and the third VPN server 15050 establishing a fifth session (at 19500), such as a BGP session, between the first VPN server 15030 and the third VPN server 15050, using the first layer-three (L3), or IP layer, control-plane VXLAN network (shown at 17500 in FIG. 17).

For example, the first VPN server 15030, or a component thereof, such as the VPN server network communications configuration operating system interface service of the first VPN server 15030, or the BGP component, or another BGP component, of the first VPN server 15030, may establish the fifth session (at 19500) with a corresponding component of the third VPN server 15050.

Establishing the fifth session (at 19500) includes the first VPN server 15030, or a component thereof, such as the VPN server network communications configuration operating system interface service of the first VPN server 15030, or the BGP component, of the first VPN server 15030, generating, writing, or otherwise obtaining, and storing, recording, or otherwise saving, peer data identifying the third VPN server 15050 as a BGP neighbor, or peer, with respect to the fifth session.

Establishing the fifth session (at 19500) includes the third VPN server 15050, or a component thereof, such as the VPN server network communications configuration operating system interface service of the third VPN server 15050, or the BGP component, or another BGP component, of the third VPN server 15050, generating, writing, or otherwise obtaining, and storing, recording, or otherwise saving, peer data identifying the first VPN server 15030 as a BGP neighbor, or peer, with respect to the fifth session.

The fifth portion of the example of the method of peering 19000 includes, subsequent to establishing the fifth session (at 19500), the first VPN server 15030 and the third VPN server 15050 exchanging third routing data (at 19600) using the fifth session (established at 19500). The third routing data may include layer two (L2), or data-link layer, virtual private network routing prefixes. The third routing data may include VNIs, MAC addresses, IP addresses, IP ports of VXLAN interfaces, or a combination thereof. The first VPN server 15030 and the third VPN server 15050 exchange the third routing data (at 19600) in response to establishing the fifth session (at 19500).

For example, the first VPN server 15030, or a component thereof, such as the VPN server network communications configuration operating system interface service of the first VPN server 15030, or the BGP component, of the first VPN server 15030, may send, transmit, or otherwise make available, a first portion of the third routing data to the third VPN server 15050, the third VPN server 15050, or a component thereof, such as the VPN server network communications configuration operating system interface service of the third VPN server 15050, or the BGP component of the third VPN server 15050, may receive, access, or otherwise obtain the first portion of the third routing data and may send, transmit, or otherwise make available, a second portion of the third routing data to the first VPN server 15030, which may receive, access, or otherwise obtain the second portion of the third routing data.

Exchanging the third routing data (at 19600) includes the first VPN server 15030, or a component thereof, such as the VPN server network communications configuration operating system interface service of the first VPN server 15030, or the BGP component, of the first VPN server 15030, storing, recording, or otherwise saving, the second portion of the third routing data.

Exchanging the third routing data (at 19600) includes the third VPN server 15050, or a component thereof, such as the VPN server network communications configuration operating system interface service of the third VPN server 15050, or the BGP component, of the third VPN server 15050, storing, recording, or otherwise saving, the first portion of the third routing data.

The fifth portion of the example of the method of peering 19000 shows a third layer-two (L2), or data-link layer, data-plane VXLAN network (shown at 19700) between the first VPN server 15030 and the third VPN server 15050, established, or built, by establishing the fifth session (at 19500) and exchanging the third routing data (at 19600).

Subsequent to establishing the third layer two (L2) VXLAN network (shown at 19700), the first VPN server 15030 and the third VPN server 15050 are active virtual private network infrastructure peers in the data-plane VXLAN of the first level-four VXLAN, such as the first level-four VXLAN in the first level-four VXLAN context area 9100 shown in FIG. 9, having the VNI 450. For example, the third layer two (L2) VXLAN network may be, or include, the first level-four data-plane VXLAN having the VNI 450.

Figure 20:
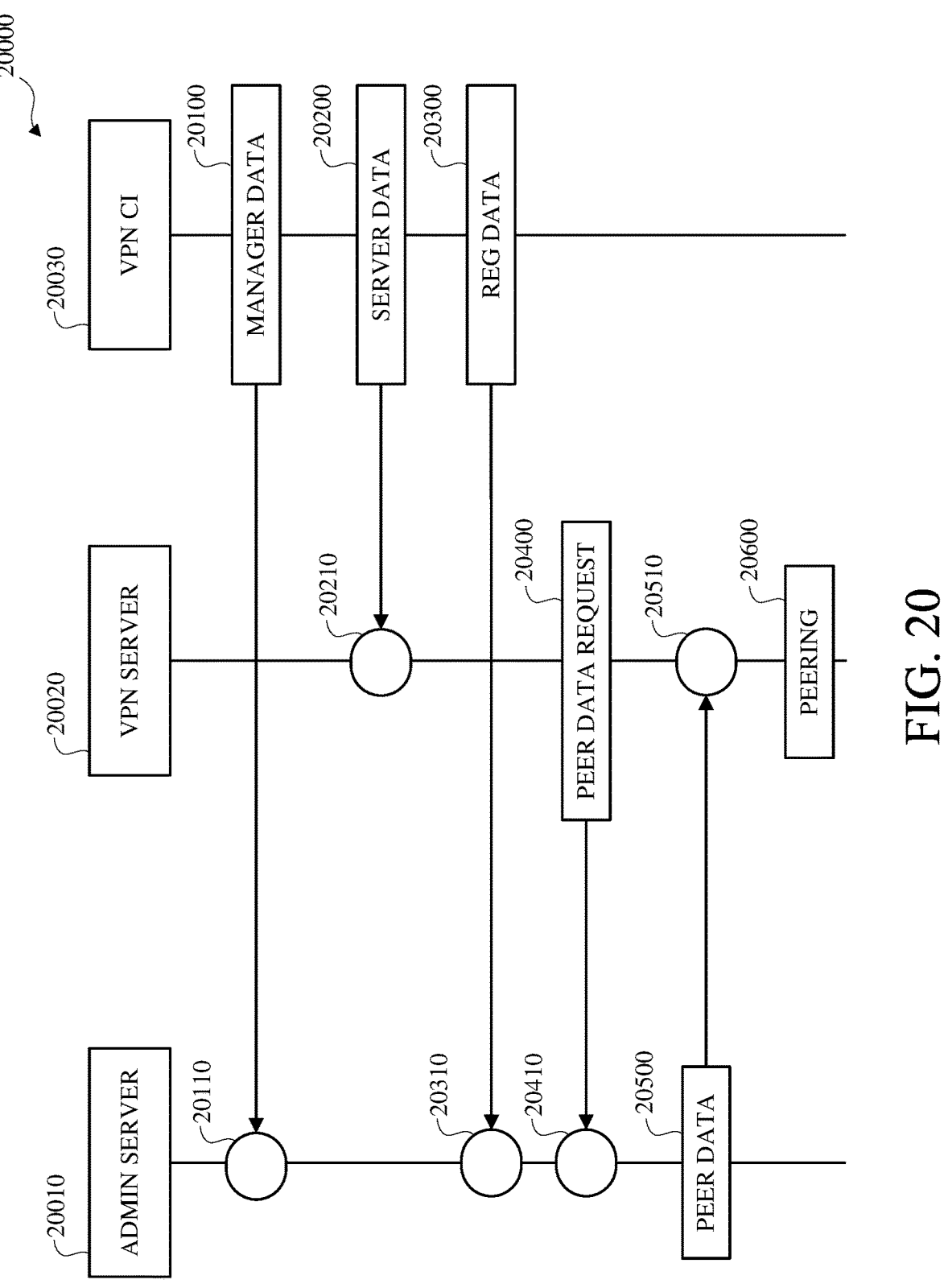
FIG. 20 is a flow diagram of an example of a method of implementing a hierarchical-context area network of a virtual private network infrastructure system.

FIG. 20 is a flow diagram of an example of a method of implementing a hierarchical-context area network of a virtual private network infrastructure system 20000.

Implementing, or operating, a hierarchical-context area network of a VPNI system 20000 may include implementing, or operating, a VPNI administration server 20010 (ADMIN SERVER), such as the VPNI administration server 7100 shown in FIG. 7, or a component thereof, such as a hierarchical-context area network manager, such as the hierarchical-context area network manager component 7110 shown in FIG. 7 or the hierarchical-context area network manager 15020 shown in FIGS. 15-19.

Implementing, or operating, a hierarchical-context area network of a VPNI system 20000 may include implementing, or operating, a VPN server 20020 (VPN SERVER), such as one of the VPN servers 7410, 7510 shown in FIG. 7, one of the VPN servers 9200, 9300, 9400, 9500, 9600, shown in FIG. 9, a VPN server implementing the network communications configuration 10000 shown in FIGS. 10-14, or one of the VPN servers 15030, 15040, 15050 shown in FIGS. 15-19.

Implementing, or operating, a hierarchical-context area network of a VPNI system 20000 may include implementing, or operating, a virtual private network control infrastructure device 20030 (VPN CI), such as the VPNI control device 7300 shown in FIG. 7.

The virtual private network control infrastructure device 20030, or a component thereof, sends, transmits, or otherwise makes available, hierarchical-context area network manager configuration data (at 20100) (MANAGER DATA) to the VPNI administration server 20010, which may include software for implementing the hierarchical-context area network manager.

The VPNI administration server 20010 receives, reads, obtains, or otherwise accesses, the hierarchical-context area network manager configuration data (at 20110) from the virtual private network control infrastructure device 20030. The VPNI administration server 20010 stores, records, or otherwise saves, the hierarchical-context area network manager configuration data, or one or more portions thereof. In some implementations, the VPNI administration server 20010 installs, configures, instantiates, operates, or a combination thereof, the hierarchical-context area network manager in accordance with the hierarchical-context area network manager configuration data.

The virtual private network control infrastructure device 20030, or a component thereof, sends, transmits, or otherwise makes available, virtual private network server configuration data (at 20200) (SERVER DATA) to the VPN server 20020. The VPN server configuration data includes defined, such as automatically, such as pseudo-randomly, peering data, cryptographic key data, other registration data, or a combination thereof. The defined peering data identifies one or more VPN servers as defined, or designated, VPNI peers, or neighbors, for the VPN server 20020, in the hierarchical-context area network of the VPNI system 20000. The defined peering data may be identified, selected, determined, or otherwise obtained, manually, in accordance with one or more defined policies, or a combination thereof. For example, a defined number, or cardinality, of peers may be identified for a respective VPN server on a per-VXLAN basis.

In some implementations, the VPN server configuration data includes VPN server configuration data, which may include software, for implementing, configuring, instantiating, or otherwise operating, the VPN server 20020, or a component thereof, to the VPN server 20020.

For example, the VPN server configuration data may include virtual private network operating system configuration data, which may include software, for implementing, configuring, instantiating, or otherwise operating, the VPN server 20020.

In another example, the VPN server configuration data may include VPN server network controller configuration data, which may include software, for implementing, configuring, instantiating, or otherwise operating, a VPN server network controller component, such as one of the VPN server network controller components 7420, 7520 shown in FIG. 7, by, or at, the VPN server 20020.

The VPN server 20020 receives, reads, obtains, or otherwise accesses, the VPN server configuration data (at 20210). The VPN server 20020 stores, records, or otherwise saves, the VPN server configuration data, or one or more portions thereof.

In some implementations, the VPN server configuration data includes the VPN server configuration data, including the virtual private network operating system configuration data, and the VPN server 20020 installs, configures, instantiates, operates, or a combination thereof, the virtual private network operating system in accordance with the VPN server configuration data.

In some implementations, the VPN server configuration data includes the VPN server configuration data, including the VPN server network controller configuration data, and the VPN server 20020 installs, configures, instantiates, operates, or a combination thereof, the VPN server network controller in accordance with the VPN server configuration data.

The virtual private network control infrastructure device 20030, or a component thereof, sends, transmits, or otherwise makes available, VPN server registration data (at 20300) (REG DATA) to the VPNI administration server 20010, or to a component thereof, such as the hierarchical-context area network manager. The VPN server registration data indicates that the VPN server 20020 is included, connected, or active, in the hierarchical-context area network of the VPNI system 20000.

The VPNI administration server 20010 receives, reads, obtains, or otherwise accesses, the VPN server registration data (at 20310) from the virtual private network control infrastructure device 20030. The VPNI administration server stores, records, or otherwise saves, the VPN server registration data, or one or more portions thereof.

Subsequent to receiving, reading, obtaining, or otherwise accessing, the VPN server configuration data (at 20210), the VPN server 20020 generates, writes, or otherwise obtains, a peering data request (PEER DATA REQUEST), which may be similar to the first peering data request shown at 15200 in FIG. 15, except as is described herein or as is otherwise clear from context, indicating a request for peer, or neighbor, data, such as BGP neighbor data, and sends, transmits, or otherwise makes available, the peering data request (at 20400) to the VPNI administration server 20010, or the hierarchical-context area network manager thereof.

The VPNI administration server 20010, or the hierarchical-context area network manager thereof, receives, reads, obtains, or otherwise accesses, the peering data request (at 20410). In response to receiving, reading, obtaining, or otherwise accessing, the peering data request, VPNI administration server 20010, or the hierarchical-context area network manager thereof, generates, writes, or otherwise obtains, a peering data response including the peering data for the VPN server 20020, which may be similar to the first peering data response sent at 15300 in FIG. 15, except as is described herein or as is otherwise clear from context. The VPNI administration server 20010 sends, transmits, or otherwise makes available, the peering data response to the VPN server 20020 (at 20500).

The VPN server 20020 obtains, receives, or otherwise accesses, the peering data response (at 20510). The VPN server 20020 stores, records, or otherwise saves, the peering data response, or a portion thereof. The VPN server 20020 configures one or more VPN servers in the hierarchical-context area network of the VPNI system 20000 as a respective VPNI peer, or neighbor, VPN server (at 20600) (peering).

Sending the peering data request (at 20400), receiving the peering data request (at 20410), sending the peering data response (at 20500), receiving the peering data response (at 20510), and peering (at 20600), may be similar to the peering shown in FIGS. 15-19, except as is described herein or as is otherwise clear from context. Although not shown expressly in FIG. 20, sending the peering data request (at 20400), receiving the peering data request (at 20410), sending the peering data response (at 20500), receiving the peering data response (at 20510), and peering (at 20600), may be repeated, such as performed repeatedly, or iteratively, such as in accordance with a defined schedule or period.

Figure 21:
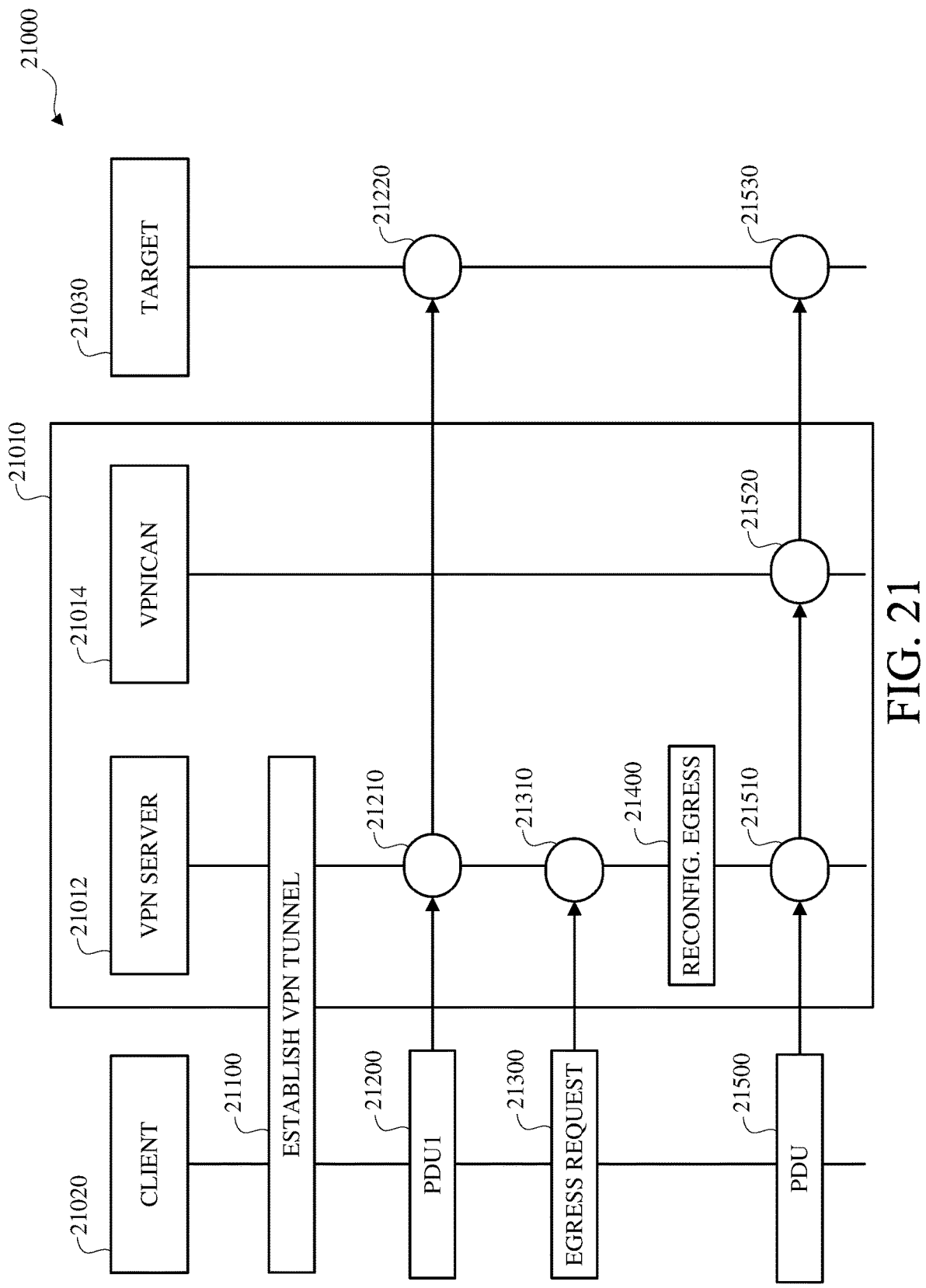
FIG. 21 is a flow diagram of an example of egress reconfiguration in a hierarchical-context area network of a virtual private network infrastructure system.

FIG. 21 is a flow diagram of an example of egress reconfiguration 21000 in a hierarchical-context area network of a virtual private network infrastructure system 21010. Egress reconfiguration 21000, or one or more portions thereof, is implemented by a virtual private network infrastructure system 21010, that implements a hierarchical-context area network as a virtual private network infrastructure network, such as the virtual private network infrastructure system 7000 shown in FIG. 7 or the virtual private network infrastructure system 9000 shown in FIG. 9.

As shown in FIG. 21, the VPNI system 21010 includes a first VPN server 21012, such as one of the VPN servers 7410, 7510 shown in FIG. 7, one of the VPN servers 9200, 9300, 9400, 9500, 9600, shown in FIG. 9, a VPN server implementing the network communications configuration 10000 shown in FIGS. 10-14, or one of the VPN servers 15030, 15040, 15050 shown in FIGS. 15-19.

The first VPN server 21012 is similar to the first VPN server 9200 shown in FIG. 9, except as is described herein or as is otherwise clear from context. For example, the first VPN server 21012 implements, includes, or operates, a network interface, such as a VXLAN interface, to a first VPNI context area network, such as the first level-one VPNI context area network in the first level-one VXLAN context area 9130 shown in FIG. 9, and a network interface, such as a VXLAN interface, to a second VPNI context area network, such as the level-four VPNI context area network in the level-four VPNI context area 9100 shown in FIG. 9.

The VPNI system 21010 includes a third VPNI context area network 21014, such as the fourth level-one VPNI context area network in the fourth level-one VPNI context area 9160 shown in FIG. 9. Although not expressly shown in FIG. 21, the VPNI system 21010 includes one or more VPN servers, such as the VPN servers 7410, 7510 shown in FIG. 7, the fifth VPN server 9600 shown in FIG. 9, a VPN server implementing the network communications configuration 10000 shown in FIGS. 10-14, or one of the VPN servers 15030, 15040, 15050 shown in FIGS. 15-19, that implement, include, or operate, a respective network interface, such as a VXLAN interface, to the third VPNI context area network 21014 and a respective network interface, such as a VXLAN interface, to the second VPNI context area network. For example, VPNI system 21010 may include a VPN server that is similar to the fifth VPN server 9600 shown in FIG. 9, except as is described herein or as is otherwise clear from context.

Other components of the VPNI system that implements a hierarchical-context area network as a VPNI network are omitted from FIG. 21 for simplicity.

A client device of a client system 21020, or a component thereof, such as a VPN client component, such as the VPN client component 7610 shown in FIG. 7, implemented, or operated, in, by, at, or on, the client device of the client system 21020 establishes, initiates, connects, or otherwise activates, a VPN tunnel, or connection, with the VPNI system using the first VPN server 21012 as the entry, or ingress, node, with respect to the VPN tunnel, (at 21100). Although not shown in FIG. 21 for simplicity, the client device of the client system 21020 may communicate with the first VPN server 21012 via an ISP system. The client device of the client system 21020 is a computing device, such as the computing device 1000 shown in FIG. 1, the computing and communications device 2300 shown in FIG. 2, or the user device 7600 shown in FIG. 7.

The client device of the client system 21020, or the component thereof, such as the VPN client component, generates, writes, or otherwise obtains, a first protocol data unit (PDU1) addressed to a target, external, or remote, system 21030 (at 21200), or a device or component thereof.

The client device of the client system 21020, or the component thereof, such as the VPN client component, sends, transmits, or otherwise makes available the first protocol data unit to the target system 21030 by sending the first protocol data unit via the VPN tunnel (at 21200). The target system 21030 is, or includes, one or more components, such as a target device, which are computing devices, such as the computing device 1000 shown in FIG. 1, or one or more of the computing and communications devices 2410, 2420 shown in FIG. 2. Sending the first protocol data unit to the target system 21030 is similar to the outbound portion 4000 of protocol data unit routing using a virtual private network as shown in FIG. 4, except as is described herein or as is otherwise clear from context. Some details of sending the first protocol data unit to the target system 21030 are omitted from FIG. 21 for simplicity.

The first VPN server 21012, as an ingress, or entry, node with respect to the VPN tunnel (established at 21100), receives, reads, obtains, or otherwise accesses, the first protocol data unit from the client device of the client system 21020 (at 21210).

The first VPN server 21012, as a current egress, or exit, node (point of egress) with respect to the VPN tunnel (established at 21100), sends, forwards, transmits, or otherwise makes available, the first protocol data unit to the target system 21030 (at 21210), such as via the Internet.

The target system 21030, or a component thereof, such as the target device, receives, reads, or otherwise accesses, the payload of the first protocol data unit (at 21220). Although not shown in FIG. 21, the target system 21030, or a component thereof, and the client device of the client system 21020, or the component thereof, such as the VPN client component, may exchange other protocol data units. In some implementations, generating, sending, forwarding, and receiving, the first protocol data unit (at 21200, 21210, 21220) may be omitted.

The client device of the client system 21020, or the component thereof, such as the VPN client component, generates, writes, or otherwise obtains, an egress reconfiguration request (at 21300).

The egress reconfiguration request includes a request to use one or more components of the VPNI system 21010, other than the ingress node, as the current point of egress with respect to electronic communications, such as the exchange of protocol data units, between the client system 21020 and one or more external targets, such as external systems, or devices, such as the target system 21030, or a device or component thereof, via the VPN tunnel (established at 21100). In some implementations, although the current point of egress is described as different from, distinct from, or other than, the ingress node, a VPN server may be the ingress node and the current point of egress. The current point of egress may be a node, or VPN server, of the VPNI system 21010 or a shared IP address that is, or may be, shared, such as concurrently, by zero or more VPN servers, or nodes, that, respectively, implement, operate, or include, one or more interfaces to a VPNI context area network, such as a VPNI context area control-plane network, a VPNI context area data-plane network, or both, in a VPNI context area of the hierarchical-context area network of the virtual private network infrastructure system 21010.

In some implementations, the egress reconfiguration request may include an address, such as an IP address, to use as the current point of egress.

In some implementations, the egress reconfiguration request may include, or indicate, a request to identify, or determine, the current point of egress. The request to identify, or determine, the current point of egress may include data, such as egress determination data, for identifying an IP address from the VPNI system 21010, such as from the VPNI network, to use as the current point of egress. For example, the egress determination data may include data identifying the target system 21030, or one or more components thereof, such as an IP address, a Uniform Resource Locator (URL), or both, assigned to, or associated with, the target system 21030. In another example, the egress determination data may include data identifying a geospatial location, such as a string indicating the name of a city, such as "Paris" or "Tokyo", corresponding to a respective VPNI context area.

The client device of the client system 21020, or the component thereof, such as the VPN client component, sends, transmits, or otherwise makes available, the egress reconfiguration request (at 21300) to the VPNI system 21010, or a component thereof, such as the first VPN server 21012, or a component thereof, such as the device and application control service (shown at 13140 in FIG. 13), via the VPN tunnel.

The first VPN server 21012 receives, reads, obtains, or otherwise accesses, the egress reconfiguration request (at 21310). Although not expressly shown in FIG. 21, in some implementations, the first VPN server 21012 may forward the egress reconfiguration request, or one or more portions thereof, to another component of the VPNI system 21010.

In response to receiving, reading, obtaining, or otherwise accessing, the egress reconfiguration request (at 21310), the first VPN server 21012, or another component of the VPNI system 21010, such as the VPNI administration server 7100, or a component thereof, such as the hierarchical-context area network manager component 7110, the VPNI-API device 7200, or a component thereof, such as the application programming interface component 7210, or the VPNI control device 7300, or a component thereof, shown in FIG. 7, reconfigures (at 21400) the current point of egress for the VPN tunnel.

Reconfiguring (at 21400) the current point of egress for the VPN tunnel includes identifying the shared IP address of the third VPNI context area network 21014 as the IP address of the current point of egress. In some implementations, identifying the shared IP address of the third VPNI context area network 21014 as the IP address of the current point of egress includes the first VPN server 21012, or another component of the VPNI system 21010, such as the VPNI administration server 7100, or a component thereof, such as the hierarchical-context area network manager component 7110, the VPNI-API device 7200, or a component thereof, such as the application programming interface component 7210, or the VPNI control device 7300, or a component thereof, shown in FIG. 7, determining that that peer data indicating an IP address from the virtual private network infrastructure network that is in accordance with, or satisfies, the egress determination data is absent from, unavailable at, or inaccessible by, the first VPN server 21012.

For example, the egress determination data may include the shared IP address of the third VPNI context area network 21014 and the VPNI system 21010, or a component thereof, such as the first VPN server 21012, or a component thereof, may determine (at 21400) that the third VPNI context area network 21014 is available to use as the current point of egress with respect to communications, such as the exchange of protocol data units, between the client system 21020 and the target system 21030, or a device or component thereof, via the VPN tunnel (established at 21100).

In another example, the organizing characteristic of the hierarchical-context area network may be geographic, geospatial, or geopolitical, such as shown in FIG. 8 or FIG. 9, the egress determination data may include the data identifying the target system 21030, the VPNI system 21010, or a component thereof, such as the first VPN server 21012, or a component thereof, may identify (at 21400) the third VPNI context area network 21014 in accordance with the egress determination data, and the VPNI system 21010, or a component thereof, such as the first VPN server 21012, or a component thereof, may determine (at 21400) that the third VPNI context area network 21014 is available to use as the current point of egress with respect to communications, such as the exchange of protocol data units, between the client system 21020 and the target system 21030, or a device or component thereof, via the VPN tunnel (established at 21100).

To identify (at 21400) the third VPNI context area network 21014 in accordance with the egress determination data, the VPNI system 21010, or a component thereof, such as the first VPN server 21012, or a component thereof, may identify a geographic, geospatial, or geopolitical, location, or area, associated with the target system 21030 based on the egress determination data, and the VPN system, or a component thereof, such as the first VPN server 21012, or a component thereof, identifies a VPNI context area network from the hierarchical-context area network in a VPNI context area that geographically, geospatially, or geopolitically, includes, or is relatively proximate to, the location, or area, associated with the target system 21030.

For example, the geographic, geospatial, or geopolitical, location, or area, associated with the target system 21030 may be Tokyo, Japan, and the third VPNI context area network 21014 may be a level-one VPNI context area network that corresponds geographically, geospatially, or geopolitically, with Tokyo, Japan.

In another example, the geographic, geospatial, or geopolitical, location, or area, associated with the target system 21030 may be Japan, wherein more specific geographic, geospatial, or geopolitical, data is unavailable, omitted, or absent, and the third VPNI context area network 21014 may be a level-two VPNI context area network that corresponds geographically, geospatially, or geopolitically, with Japan.

In another example, the geographic, geospatial, or geopolitical, location, or area, associated with the target system 21030 may be Asia, wherein more specific geographic, geospatial, or geopolitical, data is unavailable, omitted, or absent, and the third VPNI context area network 21014 may be a level-three VPNI context area network that corresponds geographically, geospatially, or geopolitically, with Asia.

In response to identifying (at 21400) the shared IP address of the third VPNI context area network 21014 as the IP address of the node to use as the current point of egress, the VPN system, or a component thereof, such as the first VPN server 21012, or a component thereof, configures, or otherwise establishes, (at 21400) the shared IP address of the third VPNI context area network 21014 as the IP address of the node to use as the current point of egress.

In some implementations, the first VPN server 21012, or a component thereof, and the third VPNI context area network 21014 are active, current, or established, peers prior to identifying (at 21400) the shared IP address of the third VPNI context area network 21014 as the IP address of the node to use as the current point of egress.

In some implementations, configuring the current point of egress (at 21400) includes establishing, activating, or enabling the first VPN server 21012, or a component thereof, and the third VPNI context area network 21014 as active, current, or established, peers, such as in response to identifying (at 21400) the shared IP address of the third VPNI context area network 21014 as the IP address of the node to use as the current point of egress, which may be similar to the peering shown in FIGS. 15-19, except as is described herein or as is otherwise clear from context.

Configuring the current point of egress (at 21400) includes the VPNI system 21010, or a component thereof, such as the first VPN server 21012, or a component thereof, storing, recording, or otherwise saving, egress configuration data indicating the current point of egress for the VPN tunnel. The egress configuration data includes the IP address of the current point of egress. In some implementations, the egress configuration data may include a MAC address for a component of the VPN system, such as a VPN server, associated with the IP address of the current point of egress. In some implementations, the egress configuration data may include a temporal location, indicating a time, date, or both, corresponding to configuring the current egress node (at 21400).

Although not shown expressly in FIG. 21, configuring the current point of egress (at 21400) may include the VPNI system 21010, or a component thereof, such as the first VPN server 21012, or a component thereof, notifying the client device of a client system 21020, or a component thereof, such as a VPN client component, of the configuration, such a via the VPN tunnel.

Subsequent to configuring (at 21400) the shared IP address of the third VPNI context area network 21014 as the IP address of the current point of egress, the client device of the client system 21020, or the component thereof, such as the VPN client component, generates (at 21500) a second protocol data unit addressed to the target system 21030, or a device or component thereof.

Subsequent to, such as in response to, generating the second protocol data unit (at 21500), the client device of the client system 21020, or the component thereof, such as the VPN client component, sends, transmits, or otherwise makes available, (at 21500) the second protocol data unit to the first VPN server 21012 via the VPN tunnel (established at 21100).

The first VPN server 21012, or a component thereof, receives, reads, obtains, or otherwise accesses, via the VPN tunnel, the second protocol data unit (at 21510).

The first VPN server 21012, or a component thereof, identifies the current point of egress associated with the VPN tunnel (at 21510), which is the third VPNI context area network 21014. The first VPN server 21012, or a component thereof, forwards (at 21510) the second protocol data unit to the current point of egress associated with the VPN tunnel, which is the third VPNI context area network 21014.

A second VPN server (not expressly shown) that includes, implements, or operates, a network interface, such as a VXLAN interface, to the third VPNI context area network 21014 receives, reads, obtains, or otherwise accesses, the second protocol data unit from the first VPN server 21012 (at 21520).

The second VPN server sends, transmits, or otherwise makes available, (at 21520) the second protocol data unit to the target system 21030, or a component thereof, such as via an external network, such as the Internet.

The target system 21030, or a component thereof, receives, reads, obtains, or otherwise accesses, the second protocol data unit (at 21530), via an external network, such as the Internet.

Figure 22:
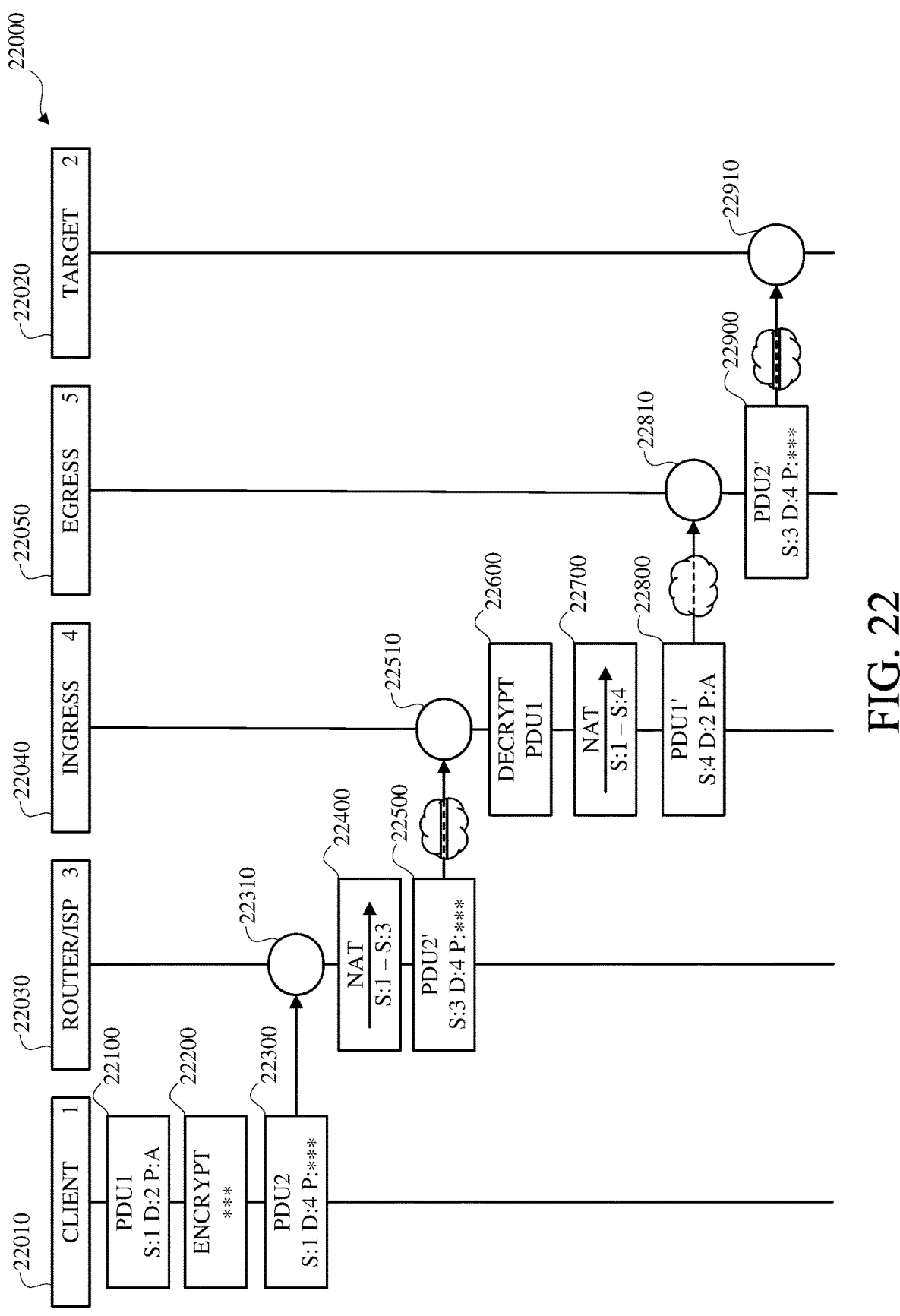
FIG. 22 is a flow diagram of an example of an outbound portion of protocol data unit routing using a virtual private network implemented by a virtual private network infrastructure system that implements a hierarchical-context area network as a virtual private network infrastructure network.
Figure 23:
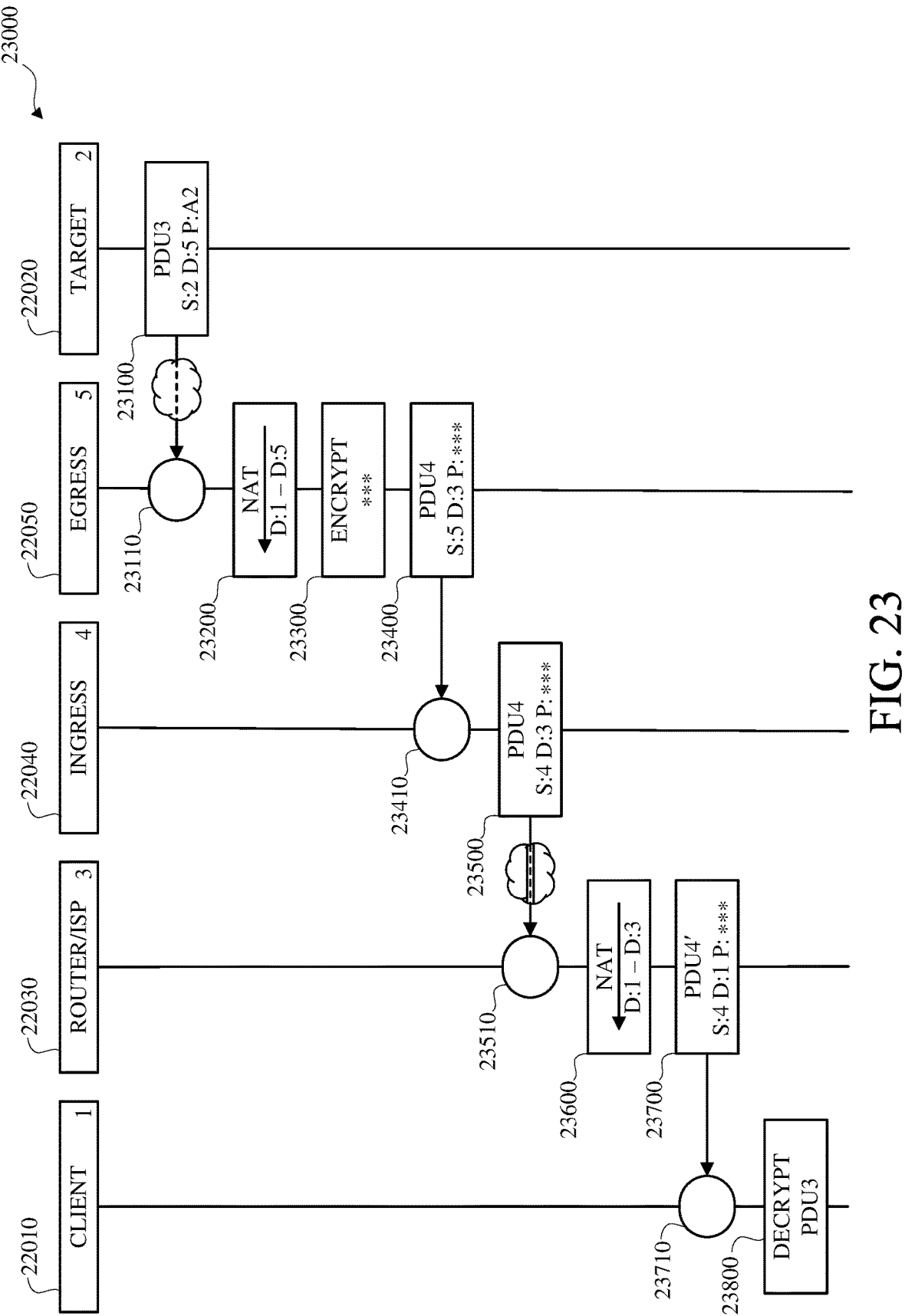
FIG. 23 is a flow diagram of an example of an inbound portion of protocol data unit routing using a virtual private network implemented by a virtual private network infrastructure system that implements a hierarchical-context area network as a virtual private network infrastructure network.

FIGS. 22-23 show a flow diagram of an example of protocol data unit routing using a virtual private network implemented by a virtual private network infrastructure system that implements a hierarchical-context area network as a virtual private network infrastructure network. Protocol data unit routing using a virtual private network implemented by a virtual private network infrastructure system that implements a hierarchical-context area network as a virtual private network infrastructure network includes an outbound portion shown in FIG. 22 and an inbound portion shown in FIG. 23. The protocol data unit routing shown in FIGS. 22-23 is similar to the protocol data unit routing shown in FIGS. 4-5, except as is described herein or as is otherwise clear from context. For example, the protocol data unit routing shown in FIGS. 22-23 includes using a virtual private network implemented by a virtual private network infrastructure system that implements a hierarchical-context area network as a virtual private network infrastructure network.

FIG. 22 is a flow diagram of an example of an outbound portion 22000 of protocol data unit routing using a virtual private network implemented by a virtual private network infrastructure system that implements a hierarchical-context area network as a virtual private network infrastructure network. The outbound portion 22000 of protocol data unit routing includes routing of one or more protocol data units between a client device of a client system 22010 and a target system 22020 via an ISP system 22030 including a router (ROUTER/ISP) using a virtual private network implements a hierarchical-context area network as a virtual private network infrastructure network including an ingress node 22040 and a current point of egress 22050.

The client device of the client system 22010 is a computing device, or a computing and communications device, such as the computing device 1000 shown in FIG. 1, or the computing and communications device 2300 shown in FIG. 2. The client device of the client system 22010 has, or is identifiable by, an assigned, or allocated, such as by the ISP system 22030, IP address, which is represented in FIG. 22 by the number one (1) for simplicity. The IP address associated with the client system 22010 (1) may be a private, or local, IP address. The client device of the client system 22010 is similar to the client device of the client system 3010 shown in FIG. 3, except as is described herein or as is otherwise clear from context. For example, the client device of the client system 22010 includes, implements, or operates, a VPN client component.

The target system 22020 is, or includes, one or more components, such as a target device, which are computing devices, or computing and communications devices, such as the computing device 1000 shown in FIG. 1, or one or more of the computing and communications devices 2410, 2420 shown in FIG. 2. The target system 22020, or a component thereof, has, or is identifiable by, an assigned, or allocated, IP address, which is represented in FIG. 22 by the number two (2) for simplicity. The IP address associated with the target system 22020 (2) may be a public, or globally unique, IP address. The target system 22020 is similar to the target system 3020 shown in FIG. 3, except as is described herein or as is otherwise clear from context.

The ISP system 22030 is, or includes, one or more components, which are computing devices, or computing and communications devices, such as the computing device

1000 shown in FIG. 1. The ISP system 22030 includes a router. A component of the ISP system 22030, such as the router, has, or is identifiable by, an assigned, or allocated, IP address, which is represented in FIG. 22 by the number three (3) for simplicity. The IP address associated with the ISP system 22030 (3) may be a public, or globally unique, IP address. The ISP system 22030 is similar to the ISP system 3030 shown in FIG. 3, except as is described herein or as is otherwise clear from context.

The ingress node 22040 is, or includes, one or more components, which are computing devices, or computing and communications devices, such as the computing device 1000 shown in FIG. 1, or one or more of the computing and communications devices 2300, 2410, 2420, 2510, 2520, 2530 shown in FIG. 2. A component of the ingress node 22040 is a VPN server (ingress VPN server) that has, or is identifiable by, an assigned, or allocated, IP address, which is represented in FIG. 22 by the number four (4) for simplicity.

Although not shown in FIGS. 22-23, the ingress node 22040, or a component thereof, includes an active interface to a first level-one VPNI context area data-plane network, such as a level-one VPNI context area data-plane network of the sixth level-one VPNI context area network 8114.6 shown in FIG. 8 or a level-one VPNI context area data-plane network of the first level-one VPNI context area network in the first level-one VXLAN context area 9130 shown in FIG. 9; and an active interface to a higher level, such as level-four, VPNI context area network, such as the VPNI context area network in the level-four VPNI context area 8100 shown in FIG. 8 or the VPNI context area network in the level-four VPNI context area 9100 shown in FIG. 9. Other interfaces of the ingress node 22040 are omitted for brevity.

The current point of egress 22050 is, or includes, one or more components, which are computing devices, or computing and communications devices, such as the computing device 1000 shown in FIG. 1, or one or more of the computing and communications devices 2300, 2410, 2420, 2510, 2520, 2530 shown in FIG. 2. The current point of egress 22050 includes one or more VPN servers (egress VPN server). The current point of egress 22050 has, or is identifiable by, an assigned, or allocated, shared IP address, which is represented in FIG. 22 by the number five (5) for simplicity.

Although not shown in FIGS. 22-23, the current point of egress 22050, or a component thereof, includes an active interface to a second level-one VPNI context area data-plane network, such as a level-one VPNI context area data-plane network of the eighth level-one VPNI context area network 8122.4 shown in FIG. 8 or a level-one VPNI context area data-plane network of the fourth level-one VPNI context area 9160 shown in FIG. 9; and an active interface to the higher level, such as level-four, VPNI context area network. Other interfaces of the current point of egress 22050 are omitted for brevity.

Although not shown in FIGS. 22-23, prior to the portions of protocol data unit routing shown in FIGS. 22-23, the client device of the client system 22010, or a component thereof, such as the VPN client component, establishes, operates, or otherwise obtains, an active VPN tunnel, or connection, with the ingress VPN server of the ingress node 22040, via the network connection implemented, operated, or otherwise provided, by the ISP system 22030.

Although not shown in FIGS. 22-23, prior to the portions of protocol data unit routing shown in FIGS. 22-23, the ingress node 22040, or a component thereof, and the current point of egress 22050, or a component thereof, establishes, activates, enables, operates, or otherwise obtains, the ingress node 22040 and the current point of egress 22050, or the component thereof, as current, or active, VPNI peers, or neighbors, in the virtual private network infrastructure system that implements a hierarchical-context area network as a virtual private network infrastructure network.

The client device of the client system 22010, or a component thereof, generates, writes, or otherwise obtains, a first protocol data unit (at 22100). The first protocol data unit (PDU1) includes source identification data identifying the client device of the client system 22010 as the source (S) of the first protocol data unit using, or including, the IP address of the client device of the client system 22010 (1) as a source IP address (S:1). In some implementations, the source identification data may include port data, such as a port identifier. The first protocol data unit includes destination identification data identifying the target system 22020, or a component thereof, as the destination (D) of the first protocol data unit using, or including, the IP address of the target system 22020 as a destination IP address (D:2). The first protocol data unit includes payload data (P) including data, which may be application layer data (A), communicated in, or by, the first protocol data unit (P:A). In some implementations, the destination identification data may include port data, such as a port identifier.

The client device of the client system 22010, or a component thereof, such as the VPN client component, generates, creates, or otherwise obtains, first encrypted data (* or encrypted first protocol data unit) by encrypting the first protocol data unit (at 22200). Encrypting the first protocol data unit may include encrypting the first protocol data unit using a cryptographic key, such as a public key of a cryptographic key pair of the ingress node 22040. A corresponding private key of the cryptographic key pair of the ingress node 22040 is accessible, available, or usable, by the ingress node 22040**, or one or more components thereof, and is otherwise unavailable, inaccessible, or unusable.

The client device of the client system 22010, or a component thereof, such as the VPN client component, generates, writes, or otherwise obtains, a second protocol data unit encapsulating the encrypted first protocol data unit (at 22300). The second protocol data unit (PDU2) includes source identification data identifying the client device of the client system 22010 as the source (S) of the second protocol data unit using, or including, the IP address of the client device of the client system 22010 (1) as a source IP address (S:1). In some implementations, the source identification data may include port data, such as a port identifier. The second protocol data unit includes destination identification data identifying the ingress VPN server of the ingress node 22040, or a component thereof, as the destination (D) of the second protocol data unit using, or including, the IP address of the ingress VPN server of the ingress node 22040 as a destination IP address (D:4). The second protocol data unit includes payload data (P) including the encrypted data (*), communicated in, or by, the second protocol data unit (P:*). In some implementations, the destination identification data may include port data, such as a port identifier. In some implementations, encryption (at 22200) may be omitted, and the first protocol data unit may be included, or encapsulated, as the payload in the second protocol data unit.

The client device of the client system 22010, or a component thereof, such as the VPN client component, sends, transmits, or otherwise makes available, the second protocol data unit to the ingress VPN server of the ingress node 22040, or a component thereof, by sending, transmitting, or otherwise making available, the second protocol data unit to the ISP system 22030, such as to the router, via the VPN tunnel (at 22300).

The ISP system 22030 receives, reads, or otherwise accesses, the second protocol data unit (at 22310).

The ISP system 22030, or a component thereof, implements, or performs, Network Address Translation (NAT) for the second protocol data unit (at 22400) to obtain a modified second protocol data unit, such as in response to receiving the second protocol data unit (at 22310). The ISP system 22030, or the component thereof that implements, or performs, Network Address Translation (NAT), stores, records, or otherwise saves, network address translation data including a pair, or tuple, of the IP address (1) of the client system (22010) and the IP address (4) of the ingress node 22040, or a component thereof, such as the ingress VPN server, which may include storing corresponding port data. The ISP system 22030, or the component thereof that implements, or performs, Network Address Translation (NAT), modifies, replaces, alters, or otherwise changes, the source IP address (S) of the second protocol data unit from the IP address (1) of the client system 22010 to the globally unique address (3) of the ISP system 22030.

Subsequent to performing outbound, or outgoing, Network Address Translation (at 22400), the ISP system 22030, or a component thereof, such as the router, sends, transmits, or otherwise makes available, the modified second protocol data unit (PDU2') to the ingress VPN server of the ingress node 22040 (at 22500), such as via the Internet.

The ingress node 22040, or a component thereof, such as the ingress VPN server, or a component thereof, receives, reads, obtains, or otherwise accesses, the modified second protocol data unit (at 22510).

The ingress node 22040, or a component thereof, such as the ingress VPN server, retrieves, extracts, or otherwise obtains the first protocol data unit (PDU1) by decrypting the payload (P:*) from the second protocol data unit (at 22600) using the private key of the cryptographic key pair of the ingress node 22040**.

The ingress node 22040, or a component thereof, such as the ingress VPN server, implements, or performs, outbound, or outgoing, Network Address Translation for the first protocol data unit (at 22700) to obtain a modified first protocol data unit, such as in response to obtaining the first protocol data unit. The ingress node 22040, or the component thereof, such as the ingress VPN server, that implements, or performs, Network Address Translation, stores, records, or otherwise saves, network address translation data including a pair, or tuple, of the IP address (1) of the client system (22010) and the IP address (2) of the target system 22020, which may include storing corresponding port data. The ingress node 22040, or the component thereof, such as the ingress VPN server, that implements, or performs, Network Address Translation, modifies, replaces, alters, or otherwise changes, the source IP address (S) of the first protocol data unit from the IP address (1) of the client system 22010 to the globally unique address (4) of the ingress VPN server of the ingress node 22040.

Subsequent to performing outbound, or outgoing, Network Address Translation (at 22700), the ingress node 22040, or a component thereof, such as the VPN server, sends, transmits, or otherwise makes available, the modified first protocol data unit (PDU1') to the current point of egress 22050 (at 22800).

The current point of egress 22050, or a component thereof, such as the egress VPN server, or a component thereof, receives, reads, obtains, or otherwise accesses, the modified first protocol data unit (PDU1') (at 22810).

The current point of egress 22050, or a component thereof, such as the egress VPN server, or a component thereof, sends, transmits, or otherwise makes available, the modified first protocol data unit (PDU1') to the target system 22020 (at 22900), such as via the Internet.

The target system 22020, or a component thereof, receives, reads, obtains, or otherwise accesses, the modified first protocol data unit (at 22810).

FIG. 23 is a flow diagram of an example of an inbound portion 23000 of protocol data unit routing using a virtual private network implemented by a virtual private network infrastructure system that implements a hierarchical-context area network as a virtual private network infrastructure network. The inbound, or incoming, portion 23000 of protocol data unit routing includes routing of one or more protocol data units to the client device of the client system 22010 from the target system 22020 via the ISP system 22030 including the router (ROUTER/ISP) using the virtual private network implements the hierarchical-context area network as the virtual private network infrastructure network including the ingress node 22040 and the current point of egress 22050.

Subsequent to receiving the modified first protocol data unit (shown at 22910 in FIG. 22), the target system 22020, or a component thereof, generates, writes, or otherwise obtains, a third protocol data unit (at 23100). The third protocol data unit includes source identification data identifying the target system 22020 as the source (S) of the third protocol data unit using, or including, the IP address of the target system 22020 (2) as a source IP address (S:2). In some implementations, the source identification data may include port data, such as a port identifier. The third protocol data unit includes destination identification data identifying the current point of egress 22050, or a component thereof, such as the egress VPN server, as the destination (D) of the third protocol data unit using, or including, the IP address of the current point of egress 22050, or a component thereof, such as the egress VPN server, as the destination IP address (D:5). The third protocol data unit includes payload data (P) including data, which may be application layer data (A2), communicated in, or by, the third protocol data unit (P:A2). In some implementations, the destination identification data may include port data, such as a port identifier. The target system 22020, or a component thereof, sends, transmits, or otherwise makes available, the third protocol data unit (PDU3) to the current point of egress 22050, or a component thereof, such as the egress VPN server, (at 23100), such as via the Internet.

The current point of egress 22050, or a component thereof, such as the egress VPN server, receives, reads, obtains, or otherwise accesses, the third protocol data unit (at 23110).

The current point of egress 22050, or a component thereof, such as the egress VPN server, implements, or performs, inbound, or incoming, Network Address Translation for the third protocol data unit (at 23200) to obtain a modified third protocol data unit, such as in response to obtaining the third protocol data unit. The current point of egress 22050, or the component thereof, such as the egress VPN server, that implements, or performs, inbound, or incoming, Network Address Translation, identifies, determines, or otherwise accesses, the IP address (1) of the client system (22010) from the network address translation data stored therein (such as shown at 22700 in FIG. 22) including the pair, or tuple, of the IP address (1) of the client system (22010) and the IP address (2) of the target system 22020, such as by using the source IP address from the third protocol data unit, which is the IP address (2) of the target system 22020, as an index value, which may include using port data. The current point of egress 22050, or the component thereof, such as the egress VPN server, that implements, or performs, inbound, or incoming, Network Address Translation, modifies, replaces, alters, or otherwise changes, the destination IP address (D) of the third protocol data unit from the globally unique address (5) of the egress VPN server of the current point of egress 22050 to the IP address (1) of the client system 22010.

The current point of egress 22050, or a component thereof, such as the egress VPN server, generates, creates, or otherwise obtains, second encrypted data (* or encrypted modified third protocol data unit) by encrypting the modified third protocol data unit (at 23300). Encrypting the modified third protocol data unit may include encrypting the modified third protocol data unit using a cryptographic key, such as a public key of a cryptographic key pair of the client system 22010. A corresponding private key of the cryptographic key pair of the client system 22010 is accessible, available, or usable, by the client system 22010**, or one or more components thereof, and is otherwise unavailable, inaccessible, or unusable.

The current point of egress 22050, or a component thereof, such as the VPN server, generates, writes, or otherwise obtains, a fourth protocol data unit encapsulating the encrypted modified third protocol data unit (at 23400). The fourth protocol data unit (PDU4) includes source identification data identifying the current point of egress 22050, or a component thereof, such as the egress VPN server, as the source (S) of the fourth protocol data unit using, or including, the IP address of the current point of egress 22050, or a component thereof, such as the egress VPN server, (5) as a source IP address (S:5). In some implementations, the source identification data may include port data, such as a port identifier. The fourth protocol data unit includes destination identification data identifying the ISP system 22030, or a component thereof, such as the router, as the destination (D) of the fourth protocol data unit using, or including, the IP address (3) of the ISP system 22030, or a component thereof, such as the router, as a destination IP address (D:3). The fourth protocol data unit includes payload data (P) including the encrypted data (*), communicated in, or by, the fourth protocol data unit (P:*). In some implementations, the destination identification data may include port data, such as a port identifier. In some implementations, encryption (at 23300) may be omitted, and the modified third protocol data unit may be included, or encapsulated, as the payload in the fourth protocol data unit.

The current point of egress 22050, or a component thereof, such as the egress VPN server, sends, transmits, or otherwise makes available, (at 23400) the fourth protocol data unit to the ingress node 22040, or a component thereof, such as the ingress VPN server, or a component thereof.

The ingress node 22040, or a component thereof, such as the ingress VPN server, or a component thereof, receives, reads, obtains, or otherwise accesses, the fourth protocol data unit (at 23410).

The ingress node 22040, or a component thereof, such as the ingress VPN server, or a component thereof, forwards, sends, transmits, or otherwise makes available, (at 23500) the fourth protocol data unit to the client device of the client system 22010, or a component thereof, such as the VPN client component, by sending, transmitting, or otherwise making available, the fourth protocol data unit to the ISP system 22030, such as to the router, via the VPN tunnel.

The ISP system 22030, or a component thereof, such as the router, receives, reads, obtains, or otherwise accesses, the fourth protocol data unit (at 23510).

Subsequent to receiving the fourth protocol data unit (at 23510), the ISP system 22030, or a component thereof, such as the router, performs inbound, or incoming, Network Address Translation for the fourth protocol data unit (at 23600). The ISP system 22030, or a component thereof, such as the router, identifies, determines, or otherwise obtains, the IP address of the client system 22010 (1) from the Network Address Translation data corresponding to the active connection between the client system 22010 and the target system 22020, including the pair, or tuple, associating, or mapping, the IP address of the client system 22010 (1) to the IP address of the target system (2). The ISP system 22030, or a component thereof, such as the router, modifies, replaces, alters, or otherwise changes, the destination IP address (D) of the fourth protocol data unit from the IP address of the ISP system 22030 (3) to the IP address of the client system 22010 (1).

Subsequent to modifying the fourth protocol data unit (at 23600), the ISP system 22030, or a component thereof, such as the router, sends, transmits, or otherwise makes available, the modified fourth protocol data unit (PDU4') to the client system 22010 (at 23700).

The client system 22010, or a component thereof, receives, reads, obtains, or otherwise accesses, the modified fourth protocol data unit (at 23710).

The client system 22010, or a component thereof, reads, extracts, or otherwise accesses, the payload data (*) from the modified fourth protocol data unit (at 23800). The client system 22010, or a component thereof, retrieves, extracts, or otherwise obtains, the third protocol data unit (PDU3) by decrypting the payload (P:*) from the modified fourth protocol data unit (at 23700) using the private key of the cryptographic key pair of the client system 22010. The client system 22010, or a component thereof, reads, extracts, or otherwise accesses, the payload data (A2) from the third protocol data unit (at 23800).

FIG. 24 is a flow diagram of an example of a method of automatic egress reconfiguration 24000 in a virtual private network infrastructure system 24010 that implements a hierarchical-context area network as a virtual private network infrastructure network. Automatic egress reconfiguration 24000, or one or more portions thereof, is implemented by a virtual private network infrastructure system 24010, that implements a hierarchical-context area network as a virtual private network infrastructure network, such as the virtual private network infrastructure system 7000 shown in FIG. 7 or the virtual private network infrastructure system 9000 shown in FIG. 9.

A client device of a client system 24020 (end user system), or a component thereof, such as a VPN client component implemented, or operated, in, by, at, or on, the client device of the client system 24020, such as the VPN client component 7610 shown in FIG. 7, establishes, activates, initiates, connects, enables, or otherwise uses, (at 24100) a VPN tunnel, or connection, with the VPNI system 24010 using a first VPN server 24012 of the VPNI system 24010 as the entry, or ingress, node. Although not shown in FIG. 24 for simplicity, the client device of the client system 24020 may communicate with the first VPN server 24012 via an ISP system. The client device of the client system 24020 is a computing device, such as the computing device

1000 shown in FIG. 1, the computing and communications device 2300 shown in FIG. 2, or the user device 7600 shown in FIG. 7.

Although not expressly shown in FIG. 24, the VPNI system 24010 includes, implements, defines, or operates, a high level VPNI context area, such as the level-four VPNI context area 9100 shown in FIG. 9, a first lower level VPNI context area, such as the first level-one VPNI context area 9130 shown in FIG. 9, within the high level VPNI context area, and a second lower level VPNI context area, such as the fourth level-one VPNI context area 9160 shown in FIG. 9, within the high level VPNI context area. The VPNI system 24010 includes, implements, defines, or operates, other VPNI context areas.

The first VPN server 24012 (VPNS1), is a VPN server, such as one of the VPN servers 7410, 7510 shown in FIG. 7, one of the VPN servers 9200, 9300, 9400, 9500, 9600, shown in FIG. 9, a VPN server implementing the network communications configuration 10000 shown in FIGS. 10-14, or one of the VPN servers 15030, 15040, 15050 shown in FIGS. 15-19.

The first VPN server 24012 is similar to the first VPN server 9200 shown in FIG. 9, except as is described herein or as is otherwise clear from context. The first VPN server 24012 is included in the first lower level VPNI context area. The first VPN server 24012 implements, includes, or operates, a network interface, such as a VXLAN interface, to a first VPNI context area network of the first lower level VPNI context area. The first VPN server 24012 implements, includes, or operates, a network interface, such as a VXLAN interface, to a second VPNI context area network of the high level VPNI context area.

The VPNI system includes a second VPN server (VPNS2), a third VPN server (VPNS3), and a fourth VPN server (VPNS4), such as the VPN servers 7410, 7510 shown in FIG. 7, a VPN server implementing the network communications configuration 10000 shown in FIGS. 10-14, or the VPN servers 15030, 15040, 15050 shown in FIGS. 15-19, that respectively implement, include, or operate, a respective network interface, such as a VXLAN interface, to a third VPNI context area network 24014 of the second lower level VPNI context area and a respective network interface, such as a VXLAN interface, to the second VPNI context area network of the high level VPNI context area. For example, the second VPN server (VPNS2), the third VPN server (VPNS3), and the fourth VPN server (VPNS4), may, respectively, be similar to the fifth VPN server 9600 shown in FIG. 9, except as is described herein or as is otherwise clear from context. Other components of the VPNI system that implements a hierarchical-context area network as a VPNI network are omitted from FIG. 24 for simplicity.

The client device of the client system 24020, or the component thereof, such as the VPN client component, communicates with one or more external, or remote, target systems, or devices, such as the target system 24030, or a device or component thereof, via the VPNI system 24010 via the VPN tunnel. The target system 24030 is, or includes, one or more components, such as a target device, which are computing devices, such as the computing device 1000 shown in FIG. 1, or one or more of the computing and communications devices 2410, 2420 shown in FIG. 2. The target system 24030 is external to the virtual private network infrastructure system 24010.

The client device of the client system 24020, or the component thereof, such as the VPN client component, or a component of the VPNI system 24010, establishes, activates, initiates, configures, or otherwise enables, (at 24100) egress reconfiguration (first egress reconfiguration), such as the egress reconfiguration shown in FIG. 21, for the VPN tunnel. For example, the client device of the client system 24020, or the component thereof, such as the VPN client component, may send an egress reconfiguration request to the ingress node, which is the first VPN server 24012.

Egress reconfiguration (at 24100) for the VPN tunnel includes identifying, activating, establishing, or configuring, the third VPNI context area network 24014 as a current point of egress for the VPN tunnel, such as with respect to electronic communication, such as the transfer, or exchange, of one or more protocol data units, between the client device of a client system 24020, or a component thereof, and the target system 24030, or a device or component thereof, via the VPNI system 24010 via the VPN tunnel.

Egress reconfiguration (at 24100) for the VPN tunnel includes peering, such as the peering shown in FIGS. 15-19, the ingress node, which is the first VPN server 24012, and the second VPN server (VPNS2) in the third VPNI context area network 24014. In some implementations, the second VPN server (VPNS2) may be a VPNI peer with the ingress node, which is the first VPN server 24012, prior to egress reconfiguration (at 24100) and peering may be omitted, for the second VPN server (VPNS2).

To establish the third VPNI context area network 24014 as the current point of egress for the VPN tunnel, the ingress node, which is the first VPN server 24012, stores, records, or otherwise saves, egress configuration data indicating the shared IP address of the third VPNI context area network 24014 as the IP address for the current point of egress for the VPN tunnel, and indicating a MAC address of the second VPN server (VPNS2).

Automatic egress reconfiguration 24000 includes enabling, or activating, automatic egress reconfiguration 24000 (at 24100), such as at the first VPN server 24012, which is the ingress VPN server. For example, the first VPN server 24012, which is the ingress VPN server, may enable, or active, automatic egress reconfiguration 24000 in response to an event, such as in response to receiving data, such as a protocol data unit, from the client device of the client system 24020, or the component thereof, such as the VPN client component, indicating a request to enable automatic egress reconfiguration 24000 for the VPN tunnel. In some implementations, the request to enable automatic egress reconfiguration 24000 for the VPN tunnel may include an automatic egress reconfiguration policy. In another example, automatic egress reconfiguration 24000 may be enabled for the VPN tunnel in accordance with an automatic egress reconfiguration policy defined in the VPNI system 24010.

The automatic egress reconfiguration policy may indicate, specify, define, or describe one or more parameters, one or more rules, or a combination thereof, for automatic egress reconfiguration. For example, the automatic egress reconfiguration policy may indicate a temporal period, span, or duration, for egress reconfiguration (defined automatic egress reconfiguration period), which may indicate a cardinality of seconds, a cardinality of minutes, or another period. In another example, the automatic egress reconfiguration policy may indicate, or identify, an automatic egress reconfiguration pool, or scope, which may identify, or may define, one or more rules for identifying, the components of the VPNI system, such as VPN servers, which may be available for use as a point of egress. In the example shown in FIG. 24, the automatic egress reconfiguration pool, or scope, is the available VPN servers in the third VPNI context area network 24014 (VPNS2, VPNS3, VPNS4). The automatic egress reconfiguration policy is associated with, such as applies to, a defined, or determinable, scope, such as an end user device, a defined set, or group, of end user devices, an end user account, a defined set, or group, of end user accounts, an end user type, or another identifiable scope.

In another example, the automatic egress reconfiguration pool, or scope, may include VPNI components in two or more VPNI context areas, which may be in a VPNI context level or in multiple VPNI context levels. For example, the automatic egress reconfiguration pool, or scope, may include VPNI components from a level-one context area, or a corresponding level-one context area network, a level-two context area, or a corresponding level-two context area network, a level-three context area, or a corresponding level-three context area network, the level-four context area, or a corresponding level-four context area network, two level-one context areas in a level-two context area, two level-one context areas in two level-two context areas in a level-three context area, two level-one context areas in two level-two context areas in two level-three context area, or another combination of VPNI context areas. In an example, the defined organizing characteristic for the hierarchy of VPNI context levels may be geographic, or geopolitical, location, such as the hierarchical-context area network 8000 shown in FIG. 8, and the automatic egress reconfiguration pool, or scope, may include VPNI components from a level-one context area to reconfigure the egress node among the VPN servers in a city, a level-two context area to reconfigure the egress node among the VPN servers in a country, a level-three context area to reconfigure the egress node among the VPN servers in a continent, the level-four context area to reconfigure the egress node among the VPN servers in the world.

Although the VPNI context area of the first VPN server 24012, which is the ingress VPN server, differs from the VPNI context area of the current point of egress in the example shown in FIG. 24, the egress node may be in the VPNI context area of the ingress node. In some implementations, the automatic egress reconfiguration pool, or scope, may include the ingress node. In some implementations, the first egress reconfiguration (at 24100) may be omitted and enabling automatic egress reconfiguration (at 24100) may include identifying one or more components of the VPNI in the VPNI context area of the first VPN server 24012, which is the ingress VPN server, as available egress nodes.

Although automatic egress reconfiguration 24000 is shown with respect to three VPN servers (VPNS2, VPNS3, VPNS4) in the VPNI context area network 24014, other numbers, or cardinalities, of VPN servers in a VPNI context area network may be used. In some implementations, one or more VPN server in a VPNI context area may be excluded, or omitted, from automatic egress reconfiguration 24000. For example, enabling automatic egress reconfiguration (at 24100) may include identifying a subset of the VPN servers in the VPNI context area for use in automatic egress reconfiguration 24000.

In some implementations, identifying the automatic egress reconfiguration pool, or scope, may include identifying the automatic egress reconfiguration pool, or scope, in accordance with one or more automatic egress reconfiguration pool identification parameters, or rules, other than with respect to VPNI context area. For example, the automatic egress reconfiguration policy may include an automatic egress reconfiguration pool identification parameter, or rule, that indicates a minimum resource availability, such as a minimum amount of available throughput, such that VPNI components that satisfy the minimum resource availability parameter, or rule may be included in the automatic egress reconfiguration pool, or scope and VPNI components that have less than the minimum amount of available throughput, or are otherwise inconsistent with one or more of the automatic egress reconfiguration pool identification parameters, may be omitted, or excluded, from the automatic egress reconfiguration pool, or scope.

In another example, the automatic egress reconfiguration policy may include an automatic egress reconfiguration pool identification parameter, or rule, which indicates a feature or capability, such that VPNI components that implement or provide the feature or capability may be included in the automatic egress reconfiguration pool, or scope and VPNI components that omit the feature or capability may be omitted, or excluded, from the automatic egress reconfiguration pool, or scope.

In another example, the automatic egress reconfiguration policy may include an automatic egress reconfiguration pool identification parameter, or rule, which indicates a VPN server type, such as gaming servers or streaming media servers, such that VPNI components of the VPN server type may be included in the automatic egress reconfiguration pool, or scope and other types of VPNI components may be omitted, or excluded, from the automatic egress reconfiguration pool, or scope.

In some implementations, activating automatic egress reconfiguration (at 24100) includes identifying a type of automatic egress reconfiguration. In the example shown in FIG. 24, the type of automatic egress reconfiguration is automatic egress reconfiguration by rotation, such as sequential rotation as shown, or pseudo-random rotation. Automatic egress reconfiguration by rotation includes automatically reconfiguring the current egress node by rotating, such as periodically, in response to one or more events, or both, among as defined set of available VPN servers. In the example shown in FIG. 24, the defined set of available VPN servers includes the VPN server in the third VPNI context area network 24014 (VPNS2, VPNS3, VPNS4). In some implementations, activating automatic egress reconfiguration (at 24100) includes starting a timer, in accordance with the defined temporal period, span, or duration, for egress reconfiguration. In some implementations, activating automatic egress reconfiguration (at 24100) includes storing, recording, or otherwise saving, temporal location, indicating a time, date, or both, corresponding to the egress reconfiguration (at 24100).

In some implementations, automatic egress reconfiguration 24000 may be configured for a defined subset of data communicated via the VPN tunnel, such as for a defined traffic flow.

Subsequent to enabling automatic egress reconfiguration (at 24100), the client device of the client system 24020, or the component thereof, such as the VPN client component, generates, writes, or otherwise obtains, (at 24200) a first protocol data unit (PDU1) addressed to the target system 24030, or a device or component thereof.

The client device of the client system 24020, or the component thereof, such as the VPN client component, sends, transmits, or otherwise makes available, (at 24200) the first protocol data unit (PDU1) to the target system 24030 by sending the first protocol data unit via the VPN tunnel. Sending the first protocol data unit to the target system 24030 is similar to the outbound portion 22000 of protocol data unit routing using a virtual private network as shown in FIG. 22, except as is described herein or as is otherwise clear from context. Some details of sending the first protocol data unit to the target system 24030 are omitted from FIG. 24 for simplicity.

The first VPN server 24012, as the ingress, or entry, node with respect to the VPN tunnel, receives, reads, obtains, or otherwise accesses, the first protocol data unit from the client device of the client system 24020 (at 24210).

In response to obtaining the first protocol data unit (PDU1) (at 24210), the first VPN server 24012, as the ingress, or entry, node with respect to the VPN tunnel, identifies, or determines, that the second VPN server (VPNS2) is the current egress node, or current point of egress.

In response to determining that the second VPN server (VPNS2) is the current egress node, the first VPN server 24012 sends, forwards, transmits, or otherwise makes available, (at 24210) the first protocol data unit (PDU1) to the current egress node, by sending the first protocol data unit (PDU1) to the second VPN server (VPNS2).

The second VPN server (VPNS2), in the third VPNI context area network 24014, receives, reads, obtains, or otherwise accesses, the first protocol data unit (PDU1) (at 24220).

The second VPN server (VPNS2), in the third VPNI context area network 24014, sends, forwards, transmits, or otherwise makes available, (at 24220) the first protocol data unit (PDU1) to the target system 24030, or a component thereof, such as the target device, such as via the Internet.

The target system 24030, or a component thereof, such as the target device, receives, reads, or otherwise accesses, the first protocol data unit (at 24230).

The target system 24030, or a component thereof, such as the target device, generates, writes, or otherwise obtains, (at 24300) a second protocol data unit (PDU2) addressed to the second VPN server (VPNS2), in the third VPNI context area network 24014.

The second VPN server (VPNS2), in the third VPNI context area network 24014, receives, reads, obtains, or otherwise accesses, the second protocol data unit (PDU2) (at 24310).

The second VPN server (VPNS2), in the third VPNI context area network 24014, sends, forwards, transmits, or otherwise makes available, the second protocol data unit (PDU2) to the first VPN server 24012 (at 24310).

The first VPN server 24012 receives, reads, obtains, or otherwise accesses, the second protocol data unit (PDU2) (at 24320).

The first VPN server 24012 sends, forwards, transmits, or otherwise makes available, the second protocol data unit (PDU2) to the client device of the client system 24020, or the component thereof, such as the VPN client component, (at 24320).

The client device of the client system 24020, or the component thereof, such as the VPN client component, receives, reads, obtains, or otherwise accesses, the second protocol data unit (PDU2) (at 24330).

Although not shown in FIG. 24, the target system 24030, or a component thereof, and the client device of the client system 24020, or the component thereof, such as the VPN client component, may exchange other protocol data units. In some implementations, communicating the first protocol data unit (PDU1) (at 24200-24230), communicating the second protocol data unit (PDU2) (at 24300-24330), or both, may be omitted.

Automatic egress reconfiguration 24000 includes automatic, such as in response to an event, on a periodic basis, or a combination thereof, egress reconfiguration (second egress reconfiguration) (at 24400), such as by changing, modifying, updating, or otherwise reconfiguring, the egress configuration data. The second egress reconfiguration (at 24400) is similar to the egress reconfiguration shown (at 21400) in FIG. 21, except as is described herein or as is otherwise clear from context. For example, the second egress reconfiguration (at 24400) may be responsive to the expiration of a timer, such as a timer started in conjunction with a previous, such as the most recent previous, reconfiguration of the egress node, or another periodic indicator.

The second egress reconfiguration (at 24400) includes identifying address data, such as a MAC address, for the third VPN server (VPNS3) as the address of the current egress node. In some implementations, identifying the address data for the third VPN server (VPNS3) as the address of the current egress node includes peering the first VPN server 24012 and the third VPN server (VPNS3), which may be similar to the peering shown in FIGS. 15-19, except as is described herein or as is otherwise clear from context. In some implementations, the first VPN server 24012 and the third VPN server (VPNS3) may be current, or active, VPNI peers prior to the second egress reconfiguration (at 24400).

In response to identifying (at 24400) the address of the third VPN server (VPNS3) as the address of current egress node, the VPN system, or a component thereof, such as the first VPN server 24012, or a component thereof, configures, or otherwise establishes, (at 24400) the address of the third VPN server (VPNS3) as the address of current egress node.

In some implementations, the second egress reconfiguration (at 24400) may include resetting, or restarting, the automatic egress reconfiguration timer, or otherwise maintaining data for periodic automatic egress reconfiguration.

Subsequent to the second egress reconfiguration (at 24400), the client device of the client system 24020, or the component thereof, such as the VPN client component, generates, writes, or otherwise obtains, (at 24500) a third protocol data unit (PDU3) addressed to the target system 24030, or a device or component thereof.

The client device of the client system 24020, or the component thereof, such as the VPN client component, sends, transmits, or otherwise makes available, (at 24500) the third protocol data unit (PDU3) to the target system 24030 by sending the third protocol data unit (PDU3) via the VPN tunnel. Sending the third protocol data unit (PDU3) to the target system 24030 is similar to the outbound portion 22000 of protocol data unit routing using a virtual private network as shown in FIG. 22, except as is described herein or as is otherwise clear from context. Some details of sending the third protocol data unit (PDU3) to the target system 24030 are omitted from FIG. 24 for simplicity.

The first VPN server 24012, as the ingress, or entry, node with respect to the VPN tunnel, receives, reads, obtains, or otherwise accesses, the third protocol data unit (PDU3) from the client device of the client system 24020 (at 24510).

In response to obtaining the third protocol data unit (PDU3) (at 24510), the first VPN server 24012, as the ingress, or entry, node with respect to the VPN tunnel, identifies, or determines, that the third VPN server (VPNS3) is the current egress node, or current point of egress.

In response to determining that the third VPN server (VPNS3) is the current egress node, the first VPN server 24012 sends, forwards, transmits, or otherwise makes available, (at 24510) the third protocol data unit (PDU3) to the current egress node, by sending the third protocol data unit (PDU3) to the third VPN server (VPNS3).

The third VPN server (VPNS3), in the third VPNI context area network 24014, receives, reads, obtains, or otherwise accesses, the third protocol data unit (PDU3) (at 24520).

The third VPN server (VPNS3), in the third VPNI context area network 24014, sends, forwards, transmits, or otherwise makes available, (at 24520) the third protocol data unit (PDU3) to the target system 24030, or a component thereof, such as the target device, such as via the Internet.

The target system 24030, or a component thereof, such as the target device, receives, reads, or otherwise accesses, the third protocol data unit (at 24530).

Although not shown in FIG. 24, the target system 24030, or a component thereof, and the client device of the client system 24020, or the component thereof, such as the VPN client component, may exchange other protocol data units. In some implementations, communicating the third protocol data unit (PDU3) (at 24500-24530) may be omitted.

Automatic egress reconfiguration 24000 includes automatic, such as in response to an event, on a periodic basis, or a combination thereof, egress reconfiguration (third egress reconfiguration) (at 24600), such as by changing, modifying, updating, or otherwise reconfiguring, the egress configuration data. The third egress reconfiguration (at 24600) is similar to the egress reconfiguration shown (at 21400) in FIG. 21, except as is described herein or as is otherwise clear from context. For example, the third egress reconfiguration (at 24600) may be responsive to the expiration of a timer, such as a timer started in conjunction with a previous, such as the most recent previous, reconfiguration of the egress node, or another periodic indicator.

The third egress reconfiguration (at 24600) includes identifying address data, such as a MAC address, for the fourth VPN server (VPNS4) as the address of the current egress node. In some implementations, identifying the address data for the fourth VPN server (VPNS4) as the address of the current egress node includes peering the first VPN server 24012 and the fourth VPN server (VPNS4), which may be similar to the peering shown in FIGS. 15-19, except as is described herein or as is otherwise clear from context. In some implementations, the first VPN server 24012 and the fourth VPN server (VPNS4) may be current, or active, VPNI peers prior to the third egress reconfiguration (at 24600).

In response to identifying (at 24600) the address of the fourth VPN server (VPNS4) as the address of current egress node, the VPN system, or a component thereof, such as the first VPN server 24012, or a component thereof, configures, or otherwise establishes, (at 24600) the address of the fourth VPN server (VPNS4) as the address of current egress node.

In some implementations, the third egress reconfiguration (at 24600) may include resetting, or restarting, the automatic egress reconfiguration timer, or otherwise maintaining data for periodic automatic egress reconfiguration.

Subsequent to the third egress reconfiguration (at 24600), the target system 24030, or a component thereof, such as the target device, generates, writes, or otherwise obtains, (at 24700) a fourth protocol data unit (PDU4) addressed to the third VPN server (VPNS3), in the third VPNI context area network 24014.

The third VPN server (VPNS3), in the third VPNI context area network 24014, receives, reads, obtains, or otherwise accesses, the fourth protocol data unit (PDU4) (at 24710).

The third VPN server (VPNS3), in the third VPNI context area network 24014, sends, forwards, transmits, or otherwise makes available, the fourth protocol data unit (PDU4) to the first VPN server 24012 (at 24710).

The first VPN server 24012 receives, reads, obtains, or otherwise accesses, the fourth protocol data unit (PDU4) (at 24720).

The first VPN server 24012 sends, forwards, transmits, or otherwise makes available, the fourth protocol data unit (PDU4) to the client device of the client system 24020, or the component thereof, such as the VPN client component, (at 24720).

The client device of the client system 24020, or the component thereof, such as the VPN client component, receives, reads, obtains, or otherwise accesses, the fourth protocol data unit (PDU4) (at 24730). In some implementations, communicating the fourth protocol data unit (PDU4) (at 24700-24730) may be omitted.

Subsequent to the third egress reconfiguration (at 24600), the client device of the client system 24020, or the component thereof, such as the VPN client component, generates, writes, or otherwise obtains, (at 24800) a fifth protocol data unit (PDU5) addressed to the target system 24030, or a device or component thereof.

The client device of the client system 24020, or the component thereof, such as the VPN client component, sends, transmits, or otherwise makes available, (at 24800) the fifth protocol data unit (PDU5) to the target system 24030 by sending the fifth protocol data unit (PDU5) via the VPN tunnel. Sending the fifth protocol data unit (PDU5) to the target system 24030 is similar to the outbound portion 22000 of protocol data unit routing using a virtual private network as shown in FIG. 22, except as is described herein or as is otherwise clear from context. Some details of sending the fifth protocol data unit (PDU5) to the target system 24030 are omitted from FIG. 24 for simplicity.

The first VPN server 24012, as the ingress, or entry, node with respect to the VPN tunnel, receives, reads, obtains, or otherwise accesses, the fifth protocol data unit (PDU5) from the client device of the client system 24020 (at 24810).

In response to obtaining the fifth protocol data unit (PDU5) (at 24810), the first VPN server 24012, as the ingress, or entry, node with respect to the VPN tunnel, identifies, or determines, that the fourth VPN server (VPNS4) is the current egress node.

In response to determining that the fourth VPN server (VPNS4) is the current egress node, the first VPN server 24012 sends, forwards, transmits, or otherwise makes available, (at 24810) the fifth protocol data unit (PDU5) to the current egress node, by sending the fifth protocol data unit (PDU5) to the fourth VPN server (VPNS4).

The fourth VPN server (VPNS4), in the third VPNI context area network 24014, receives, reads, obtains, or otherwise accesses, the fifth protocol data unit (PDU5) (at 24820).

The fourth VPN server (VPNS4), in the third VPNI context area network 24014, sends, forwards, transmits, or otherwise makes available, (at 24820) the fifth protocol data unit (PDU5) to the target system 24030, or a component thereof, such as the target device, such as via the Internet.

The target system 24030, or a component thereof, such as the target device, receives, reads, or otherwise accesses, the fifth protocol data unit (at 24830). In some implementations, communicating the fifth protocol data unit (PDU5) (at 24800-24830) may be omitted.

Although not expressly shown in FIG. 24, the automatic egress reconfiguration may be repeated, such as periodically. Although not expressly shown in FIG. 24, the automatic egress reconfiguration may be stopped, or discontinued, such as in response to a termination parameter, or rule, which may be indicated in the automatic egress reconfiguration policy, or may be otherwise configured, in response to a request to discontinue automatic egress reconfiguration, or in response to disconnection of the VPN tunnel.

Automatic egress reconfiguration 24000 may improve privacy, or security, such as by limiting, or preventing, tracking by systems or devices external to the VPNI system based on the IP addresses of packets sent by the VPNI system for the client system 24020.

FIG. 25 is a flow diagram of an example of a method of automatic egress randomization 25000 in a virtual private network infrastructure system 25010 that implements a hierarchical-context area network as a virtual private network infrastructure network. Automatic egress randomization 25000, or one or more portions thereof, is implemented by a virtual private network infrastructure system 25010, that implements a hierarchical-context area network as a virtual private network infrastructure network, such as the virtual private network infrastructure system 7000 shown in FIG. 7 or the virtual private network infrastructure system 9000 shown in FIG. 9.

A client device of a client system 25020 (end user system), or a component thereof, such as a VPN client component implemented, or operated, in, by, at, or on, the client device of the client system 25020, such as the VPN client component 7610 shown in FIG. 7, establishes, activates, initiates, connects, enables, or otherwise uses, (at 25100) a VPN tunnel, or connection, with the VPNI system 25010 using a first VPN server 25012 of the VPNI system 25010 as the entry, or ingress, node. Although not shown in FIG. 25 for simplicity, the client device of the client system 25020 may communicate with the first VPN server 25012 via an ISP system. The client device of the client system 25020 is a computing device, such as the computing device 1000 shown in FIG. 1, the computing and communications device 2300 shown in FIG. 2, or the user device 7600 shown in FIG. 7.

Although not expressly shown in FIG. 25, the VPNI system 25010 includes, implements, defines, or operates, a high level VPNI context area, such as the level-four VPNI context area 9100 shown in FIG. 9, a first lower level VPNI context area, such as the first level-one VPNI context area 9130 shown in FIG. 9, within the high level VPNI context area, and a second lower level VPNI context area, such as the fourth level-one VPNI context area 9160 shown in FIG. 9, within the high level VPNI context area. The VPNI system 25010 includes, implements, defines, or operates, other VPNI context areas.

The first VPN server 25012 (VPNS1), is a VPN server, such as one of the VPN servers 7410, 7510 shown in FIG. 7, one of the VPN servers 9200, 9300, 9400, 9500, 9600, shown in FIG. 9, a VPN server implementing the network communications configuration 10000 shown in FIGS. 10-14, or one of the VPN servers 15030, 15040, 15050 shown in FIGS. 15-19.

The first VPN server 25012 is included in the first lower level VPNI context area. The first VPN server 25012 implements, includes, or operates, a network interface, such as a VXLAN interface, to a first VPNI context area network of the first lower level VPNI context area. The first VPN server 25012 implements, includes, or operates, a network interface, such as a VXLAN interface, to a second VPNI context area network of the high level VPNI context area.

The VPNI system 25010 includes a second VPN server (VPNS2), a third VPN server (VPNS3), and a fourth VPN server (VPNS4), such as the VPN servers 7410, 7510 shown in FIG. 7, a VPN server implementing the network communications configuration 10000 shown in FIGS. 10-14, or the VPN servers 15030, 15040, 15050 shown in FIGS. 15-19, that respectively implement, include, or operate, a respective network interface, such as a VXLAN interface, to a third VPNI context area network 25014 of the second lower level VPNI context area and a respective network interface, such as a VXLAN interface, to the second VPNI context area network of the high level VPNI context area. For example, the second VPN server (VPNS2), the third VPN server (VPNS3), and the third VPN server (VPNS3), may, respectively, be similar to the fifth VPN server 9600 shown in FIG. 9, except as is described herein or as is otherwise clear from context. Other components of the VPNI system that implements a hierarchical-context area network as a VPNI network are omitted from FIG. 25 for simplicity.

The client device of the client system 25020, or the component thereof, such as the VPN client component, communicates with one or more external, or remote, target systems, or devices, such as the target system 25030, or a device or component thereof, via the VPNI system 25010 via the VPN tunnel. The target system 25030 is, or includes, one or more components, such as a target device, which are computing devices, such as the computing device 1000 shown in FIG. 1, or one or more of the computing and communications devices 2410, 2420 shown in FIG. 2. The target system 25030 is external to the virtual private network infrastructure system 25010.

The client device of the client system 25020, or the component thereof, such as the VPN client component, or a component of the VPNI system 25010, establishes, activates, initiates, configures, or otherwise enables, (at 25100) egress reconfiguration (first egress reconfiguration), such as the egress reconfiguration shown in FIG. 21, for the VPN tunnel. For example, the client device of the client system 25020, or the component thereof, such as the VPN client component, may send an egress reconfiguration request to the ingress node, which is the first VPN server 25012.

Egress reconfiguration (at 25100) for the VPN tunnel includes identifying, activating, establishing, or configuring, the third VPNI context area network 25014 as a current egress node for the VPN tunnel, such as with respect to electronic communication, such as the transfer, or exchange, of one or more protocol data units, between the client device of a client system 25020, or a component thereof, and the target system 25030, or a device or component thereof, via the VPNI system 25010 via the VPN tunnel.

Egress reconfiguration (at 25100) for the VPN tunnel includes peering, such as the peering shown in FIGS. 15-19, the ingress node, which is the first VPN server 25012, and the second VPN server (VPNS2) in the third VPNI context area network 25014. In some implementations, the second VPN server (VPNS2) may be a VPNI peer with the ingress node, which is the first VPN server 25012, prior to egress reconfiguration (at 25100) and peering may be omitted, for the second VPN server (VPNS2).

To establish the third VPNI context area network 25014 as the current egress node for the VPN tunnel, the ingress node, which is the first VPN server 25012, stores, records, or otherwise saves, egress configuration data indicating the shared IP address of the third VPNI context area network 25014 as the IP address for the current egress node for the VPN tunnel, and indicating a MAC address of the second VPN server (VPNS2).

Automatic egress randomization 25000 includes enabling, or activating, automatic egress randomization (at 25100), such as at the first VPN server 25012, which is the ingress VPN server. For example, the first VPN server

25012, which is the ingress VPN server, may enable, or active, automatic egress randomization 25000 in response to an event, such as in response to receiving data, such as one or more protocol data units, from the client device of the client system 25020, or the component thereof, such as the VPN client component, indicating a request to enable automatic egress randomization 25000 for the VPN tunnel. In some implementations, the request to enable automatic egress randomization 25000 for the VPN tunnel may include an automatic egress randomization policy. In another example, automatic egress randomization 25000 may be enabled for the VPN tunnel in accordance with an automatic egress randomization policy defined in the VPNI system 25010.

An automatic egress randomization policy may indicate, specify, define, or describe one or more parameters, one or more rules, or a combination thereof, for automatic egress randomization 25000. For example, an automatic egress randomization policy may indicate, or identify, an automatic egress reconfiguration pool, or scope, which may identify, or may define one or more rules for identifying the components of the VPNI system, such as VPN servers, which may be available for use as an egress node. In the example shown in FIG. 25, the automatic egress reconfiguration pool, or scope, is the available VPN servers in the third VPNI context area network 25014 (VPNS2, VPNS3, VPNS4). In some implementations, automatic egress randomization may be enabled, or configured, an a per-device, such as per-user device, basis. In some implementations, automatic egress randomization may be enabled, or configured, an a per-user, or per-user account, basis, which may include one or more devices associated with the user or user account.

In another example, the automatic egress reconfiguration pool, or scope, may include VPNI components in two or more VPNI context areas, which may be in a VPNI context level or in multiple VPNI context levels. For example, the automatic egress reconfiguration pool, or scope, may include VPNI components from a level-one context area, a level-two context area, a level-three context area, the level-four context area, two level-one context areas in a level-two context area, two level-one context areas in two level-two context areas in a level-three context area, two level-one context areas in two level-two context areas in two level-three context area, or another combination of VPNI context areas. In an example, the defined organizing characteristic for the hierarchy of VPNI context levels may be geographic, or geopolitical, location, such as the hierarchical-context area network 8000 shown in FIG. 8, and the automatic egress reconfiguration pool, or scope, may include VPNI components from a level-one context area to randomize the egress node among the VPN servers in a city, a level-two context area to randomize the egress node among the VPN servers in a country, a level-three context area to randomize the egress node among the VPN servers in a continent, the level-four context area to randomize the egress node among the VPN servers in the world.

Although the VPNI context area of the first VPN server 25012, as the ingress node, differs from the VPNI context area of the egress node in the example shown in FIG. 25, the egress node may be in the VPNI context area of the ingress node. In some implementations, the automatic egress reconfiguration pool, or scope, may include the ingress node. In some implementations, the first egress reconfiguration (at 25100) may be omitted and enabling automatic egress randomization (at 25100) may include identifying one or more components of the VPNI in the VPNI context area of the first VPN server (25012) as available egress nodes.

Although automatic egress randomization 25000 is shown with respect to three VPN servers (VPNS2, VPNS3, VPNS4) in the VPNI context area network 25014, other numbers, or cardinalities, of VPN servers in a VPNI context area network may be used. In some implementations, one or more VPN server in a VPNI context area may be excluded, or omitted, from automatic egress randomization 25000. For example, enabling automatic egress randomization (at 25100) may include identifying a subset of the VPN servers in the VPNI context area for use in automatic egress randomization 25000.

In some implementations, identifying the automatic egress reconfiguration pool, or scope, may be similar to identifying an auto automatic egress reconfiguration pool, or scope, as shown in FIG. 24, except as is described herein or as is otherwise clear from context.

Subsequent to enabling automatic egress randomization (at 25100), the client device of the client system 25020, or the component thereof, such as the VPN client component, generates, writes, or otherwise obtains, (at 25200) a first protocol data unit (PDU1) addressed to the target system 25030, or a device or component thereof.

The client device of the client system 25020, or the component thereof, such as the VPN client component, sends, transmits, or otherwise makes available, (at 25200) the first protocol data unit (PDU1) to the target system 25030 by sending the first protocol data unit via the VPN tunnel. Sending the first protocol data unit to the target system 25030 is similar to the outbound portion 22000 of protocol data unit routing using a virtual private network as shown in FIG. 22, except as is described herein or as is otherwise clear from context. Some details of sending the first protocol data unit to the target system 25030 are omitted from FIG. 25 for simplicity.

The first VPN server 25012, as the ingress, or entry, node with respect to the VPN tunnel, receives, reads, obtains, or otherwise accesses, the first protocol data unit from the client device of the client system 25020 (at 25210).

In response to obtaining the first protocol data unit (PDU1) (at 25210), the first VPN server 25012, as the ingress, or entry, node with respect to the VPN tunnel, identifies, or determines, that the second VPN server (VPNS2) is the current egress node.

In response to determining that the second VPN server (VPNS2) is the current egress node, the first VPN server 25012 sends, forwards, transmits, or otherwise makes available, (at 25210) the first protocol data unit (PDU1) to the current egress node, by sending the first protocol data unit (PDU1) to the second VPN server (VPNS2).

The second VPN server (VPNS2), in the third VPNI context area network 25014, receives, reads, obtains, or otherwise accesses, the first protocol data unit (PDU1) (at 25220).

In response to obtaining the first protocol data unit (PDU1) (at 25220), the second VPN server (VPNS2), in the third VPNI context area network 25014 identifies, or determines, (at 25300) that the target system 25030 is the destination of the first protocol data unit (PDU1), such as by reading, extracting, or otherwise accessing, the destination address from the first protocol data unit (PDU1). In some implementations, the first protocol data unit (PDU1) may be determined to be associated with a first protocol data unit flow, or sequence, such as based on the source address and the destination address of the first protocol data unit (PDU1).

In response to identifying the target system 25030 is the destination of the first protocol data unit (PDU1), the second VPN server (VPNS2), in the third VPNI context area network 25014 identifies, or determines, (at 25300) the available VPN servers in the third VPNI context area network 25014 (VPNS2, VPNS3, VPNS4) as an automatic egress randomization pool, or scope, for the VPN tunnel with respect to electronic communication, such as the transfer, or exchange, of one or more protocol data units, between the client device of a client system 25020, or a component thereof, and the target system 25030, or a device or component thereof, via the VPNI system 25010 via the VPN tunnel. In some implementations, the automatic egress randomization pool, or scope, may be identified for the first protocol data unit flow.

In response to identifying the third VPNI context area network 25014 as the automatic egress randomization pool, or scope, the second VPN server (VPNS2), in the third VPNI context area network 25014, identifies, or determines, (at 25300) one or more available communications paths, or data transport pathways, between the second VPN server (VPNS2), in the third VPNI context area network 25014, and the target system 25030, or a component thereof, such as the target device, using the VPN servers of the automatic egress randomization pool, which is the VPN servers (VPNS2, VPNS3, VPNS4) of the third VPNI context area network 25014, for transporting, or communicating, data, such as one or more protocol data units, between the client device of the client system 25020, or the component thereof, such as the VPN client component, and the target system 25030, or a component thereof, such as the target device.

For example, in the example shown in FIG. 25, identifying the available communications paths, or data transport pathways, includes identifying one or more available data transport pathway between the first VPN server 25012 and the target system 25030, or a component thereof, such as the target device, that includes using the second VPN server (VPNS2) as the current egress node for the first protocol data unit (PDU1), identifying one or more available data transport pathway between the first VPN server 25012 and the target system 25030, or a component thereof, such as the target device, that includes using the third VPN server (VPNS3) as the current egress node for the first protocol data unit (PDU1), and identifying one or more available data transport pathway between the first VPN server 25012 and the target system 25030, or a component thereof, such as the target device, that includes using the fourth VPN server (VPNS4) as the current egress node for the first protocol data unit (PDU1).

Identifying the available communications paths, or data transport pathways, may include identifying multiple available communications paths, or data transport pathways, having equal routing priority, such as using Equal-cost multi-path routing (ECMP), which includes next-hop local routing determination at the respective components of the VPNI system 25010 that route the respective protocol data unit.

Subsequent to identifying the available communications paths, or data transport pathways, (at 25300), the second VPN server (VPNS2), in the third VPNI context area network 25014, identifies, or determines, (at 25300), such as randomly, or pseudo-randomly, which may include using ECMP, a next-hop of an available communications path, or data transport pathway, from the available communications paths, or data transport pathways, as a current available data transport pathway for routing the first protocol data unit (PDU1) to the target system 25030, or a component thereof, such as the target device.

In the example shown in FIG. 25, the next-hop for the first protocol data unit (PDU1) is the target system 25030, or a component thereof, such as the target device. Although not shown in FIG. 25, the next hop may be another routing device external to the VPNI system 25010.

In response to determining the next hop, the second VPN server (VPNS2), in the third VPNI context area network 25014, sends, forwards, transmits, or otherwise makes available, (at 25300) the first protocol data unit (PDU1) to the to the target system 25030, or a component thereof, such as the target device, via the Internet. Sending the first protocol data unit (PDU1) to the to the target system 25030 (at 25300) includes using a public IP address of the second VPN server (VPNS2) as the source address in the first protocol data unit (PDU1).

The target system 25030, or a component thereof, such as the target device, receives, reads, or otherwise accesses, the first protocol data unit (at 25310).

Subsequent to enabling automatic egress randomization (at 25100), the client device of the client system 25020, or the component thereof, such as the VPN client component, generates, writes, or otherwise obtains, (at 25400) a second protocol data unit (PDU2) addressed to the target system 25030, or a device or component thereof.

The client device of the client system 25020, or the component thereof, such as the VPN client component, sends, transmits, or otherwise makes available, (at 25400) the second protocol data unit (PDU2) to the target system 25030 by sending the second protocol data unit via the VPN tunnel. Sending the second protocol data unit to the target system 25030 is similar to the outbound portion 22000 of protocol data unit routing using a virtual private network as shown in FIG. 22, except as is described herein or as is otherwise clear from context. Some details of sending the second protocol data unit to the target system 25030 are omitted from FIG. 25 for simplicity.

The first VPN server 25012, as the ingress, or entry, node with respect to the VPN tunnel, receives, reads, obtains, or otherwise accesses, the second protocol data unit from the client device of the client system 25020 (at 25410).

In response to obtaining the second protocol data unit (PDU2) (at 25410), the first VPN server 25012, as the ingress, or entry, node with respect to the VPN tunnel, identifies, or determines, that the second VPN server (VPNS2) is the current egress node.

In response to determining that the second VPN server (VPNS2) is the current egress node, the first VPN server 25012 sends, forwards, transmits, or otherwise makes available, (at 25410) the second protocol data unit (PDU2) to the current egress node, by sending the second protocol data unit (PDU2) to the second VPN server (VPNS2).

The second VPN server (VPNS2), in the third VPNI context area network 25014, receives, reads, obtains, or otherwise accesses, the second protocol data unit (PDU2) (at 25420).

In response to obtaining the second protocol data unit (PDU2) (at 25420), the second VPN server (VPNS2), in the third VPNI context area network 25014 identifies, or determines, (at 25500) that the target system 25030 is the destination of the second protocol data unit (PDU2), such as by reading, extracting, or otherwise accessing, the destination address from the second protocol data unit (PDU2). In some implementations, the second protocol data unit (PDU2) may be determined to be associated with a second protocol data unit flow, or sequence, such as based on the source address and the destination address of the second protocol data unit (PDU2).

In response to identifying the target system 25030 is the destination of the second protocol data unit (PDU2), the second VPN server (VPNS2), in the third VPNI context area network 25014 identifies, or determines, (at 25500) the available VPN servers in the third VPNI context area network 25014 (VPNS2, VPNS3, VPNS4) as an automatic egress randomization pool, or scope, for the VPN tunnel with respect to electronic communication, such as the transfer, or exchange, of one or more protocol data units, between the client device of a client system 25020, or a component thereof, and the target system 25030, or a device or component thereof, via the VPNI system 25010 via the VPN tunnel. In some implementations, the automatic egress randomization pool, or scope, may be identified for the second protocol data unit flow.

In response to identifying the third VPNI context area network 25014 as the automatic egress randomization pool, or scope, the second VPN server (VPNS2), in the third VPNI context area network 25014, identifies, or determines, (at 25500) one or more available communications paths, or data transport pathways, between the second VPN server (VPNS2), in the third VPNI context area network 25014, and the target system 25030, or a component thereof, such as the target device, using the VPN servers of the automatic egress randomization pool, which is the VPN servers (VPNS2, VPNS3, VPNS4) of the third VPNI context area network 25014, for transporting, or communicating, data, such as one or more protocol data units, between the client device of the client system 25020, or the component thereof, such as the VPN client component, and the target system 25030, or a component thereof, such as the target device.

For example, in the example shown in FIG. 25, identifying the available communications paths, or data transport pathways, includes identifying one or more available data transport pathway between the first VPN server 25012 and the target system 25030, or a component thereof, such as the target device, that includes using the second VPN server (VPNS2) as the current egress node for the second protocol data unit (PDU2), identifying one or more available data transport pathway between the first VPN server 25012 and the target system 25030, or a component thereof, such as the target device, that includes using the third VPN server (VPNS3) as the current egress node for the second protocol data unit (PDU2), and identifying one or more available data transport pathway between the first VPN server 25012 and the target system 25030, or a component thereof, such as the target device, that includes using the fourth VPN server (VPNS4) as the current egress node for the second protocol data unit (PDU2).

Identifying the available communications paths, or data transport pathways, may include identifying multiple available communications paths, or data transport pathways, having equal routing priority, such as using Equal-cost multi-path routing (ECMP), which includes next-hop local routing determination at the respective components of the VPNI system 25010 that route the respective protocol data unit.

Subsequent to identifying the available communications paths, or data transport pathways, (at 25500), the second VPN server (VPNS2), in the third VPNI context area network 25014, identifies, or determines, (at 25500), such as randomly, or pseudo-randomly, which may include using ECMP, a next-hop of an available communications path, or data transport pathway, from the available communications paths, or data transport pathways, for routing the second protocol data unit (PDU2) to the target system 25030, or a component thereof, such as the target device.

In the example shown in FIG. 25, the next-hop for the second protocol data unit (PDU2) is the third VPN server (VPNS3).

In response to determining the next-hop, the second VPN server (VPNS2), in the third VPNI context area network 25014, sends, forwards, transmits, or otherwise makes available, (at 25500) the second protocol data unit (PDU2) to the third VPN server (VPNS3) as the next-hop.

The third VPN server (VPNS3), or a component thereof, receives, reads, or otherwise accesses, the second protocol data unit (at 25510).

The third VPN server (VPNS3), or a component thereof, sends, forwards, transmits, or otherwise makes available, (at 25510) the second protocol data unit (PDU2) to the to the target system 25030, or a component thereof, such as the target device, via the Internet. Sending the second protocol data unit (PDU2) to the to the target system 25030 includes using a public IP address of the third VPN server (VPNS3) as the source address in the second protocol data unit (PDU2).

The target system 25030, or a component thereof, such as the target device, receives, reads, or otherwise accesses, the second protocol data unit (at 25520).

Subsequent to enabling automatic egress randomization (at 25100), the client device of the client system 25020, or the component thereof, such as the VPN client component, generates, writes, or otherwise obtains, (at 25600) a third protocol data unit (PDU3) addressed to the target system 25030, or a device or component thereof.

The client device of the client system 25020, or the component thereof, such as the VPN client component, sends, transmits, or otherwise makes available, (at 25600) the third protocol data unit (PDU3) to the target system 25030 by sending the third protocol data unit via the VPN tunnel. Sending the third protocol data unit to the target system 25030 is similar to the outbound portion 22000 of protocol data unit routing using a virtual private network as shown in FIG. 22, except as is described herein or as is otherwise clear from context. Some details of sending the third protocol data unit to the target system 25030 are omitted from FIG. 25 for simplicity.

The first VPN server 25012, as the ingress, or entry, node with respect to the VPN tunnel, receives, reads, obtains, or otherwise accesses, the third protocol data unit from the client device of the client system 25020 (at 25610).

In response to obtaining the third protocol data unit (PDU3) (at 25610), the first VPN server 25012, as the ingress, or entry, node with respect to the VPN tunnel, identifies, or determines, that the second VPN server (VPNS2) is the current egress node.

In response to determining that the second VPN server (VPNS2) is the current egress node, the first VPN server 25012 sends, forwards, transmits, or otherwise makes available, (at 25610) the third protocol data unit (PDU3) to the current egress node, by sending the third protocol data unit (PDU3) to the second VPN server (VPNS2).

The second VPN server (VPNS2), in the third VPNI context area network 25014, receives, reads, obtains, or otherwise accesses, the third protocol data unit (PDU3) (at 25620).

In response to obtaining the third protocol data unit (PDU3) (at 25620), the second VPN server (VPNS2), in the third VPNI context area network 25014 identifies, or determines, (at 25700) that the target system 25030 is the destination of the third protocol data unit (PDU3), such as by reading, extracting, or otherwise accessing, the destination address from the third protocol data unit (PDU3). In some implementations, the third protocol data unit (PDU3) may be determined to be associated with a third protocol data unit flow, or sequence, such as based on the source address and the destination address of the third protocol data unit (PDU3).

In response to identifying the target system 25030 is the destination of the third protocol data unit (PDU3), the second VPN server (VPNS2), in the third VPNI context area network 25014 identifies, or determines, (at 25700) the available VPN servers in the third VPNI context area network 25014 (VPNS2, VPNS3, VPNS4) as an automatic egress randomization pool, or scope, for the VPN tunnel with respect to electronic communication, such as the transfer, or exchange, of one or more protocol data units, between the client device of a client system 25020, or a component thereof, and the target system 25030, or a device or component thereof, via the VPNI system 25010 via the VPN tunnel. In some implementations, the automatic egress randomization pool, or scope, may be identified for the third protocol data unit flow.

In response to identifying the third VPNI context area network 25014 as the automatic egress randomization pool, or scope, the second VPN server (VPNS2), in the third VPNI context area network 25014, identifies, or determines, (at 25700) one or more available communications paths, or data transport pathways, between the second VPN server (VPNS2), in the third VPNI context area network 25014, and the target system 25030, or a component thereof, such as the target device, using the VPN servers of the automatic egress randomization pool, which is the VPN servers (VPNS2, VPNS3, VPNS4) of the third VPNI context area network 25014, for transporting, or communicating, data, such as one or more protocol data units, between the client device of the client system 25020, or the component thereof, such as the VPN client component, and the target system 25030, or a component thereof, such as the target device.

For example, in the example shown in FIG. 25, identifying the available communications paths, or data transport pathways, includes identifying one or more available data transport pathway between the first VPN server 25012 and the target system 25030, or a component thereof, such as the target device, that includes using the second VPN server (VPNS2) as the current egress node for the third protocol data unit (PDU3), identifying one or more available data transport pathway between the first VPN server 25012 and the target system 25030, or a component thereof, such as the target device, that includes using the third VPN server (VPNS3) as the current egress node for the third protocol data unit (PDU3), and identifying one or more available data transport pathway between the first VPN server 25012 and the target system 25030, or a component thereof, such as the target device, that includes using the fourth VPN server (VPNS4) as the current egress node for the third protocol data unit (PDU3).

Identifying the available communications paths, or data transport pathways, may include identifying multiple available communications paths, or data transport pathways, having equal routing priority, such as using Equal-cost multi-path routing (ECMP), which includes next-hop local routing determination at the respective components of the VPNI system 25010 that route the respective protocol data unit.

Subsequent to identifying the available communications paths, or data transport pathways, (at 25700), the second VPN server (VPNS2), in the third VPNI context area network 25014, identifies, or determines, (at 25700), such as randomly, or pseudo-randomly, which may include using ECMP, a next-hop of an available communications path, or data transport pathway, from the available communications paths, or data transport pathways, for routing the third protocol data unit (PDU3) to the target system 25030, or a component thereof, such as the target device.

In the example shown in FIG. 25, the next-hop for the third protocol data unit (PDU3) is the fourth VPN server (VPNS4).

In response to determining the next-hop, the second VPN server (VPNS2), in the third VPNI context area network 25014, sends, forwards, transmits, or otherwise makes available, (at 25700) the third protocol data unit (PDU3) to the fourth VPN server (VPNS4) as the next-hop.

The fourth VPN server (VPNS4), or a component thereof, receives, reads, or otherwise accesses, the third protocol data unit (at 25710).

The fourth VPN server (VPNS4), or a component thereof, sends, forwards, transmits, or otherwise makes available, (at 25710) the third protocol data unit (PDU3) to the to the target system 25030, or a component thereof, such as the target device, via the Internet. Sending the third protocol data unit (PDU3) to the to the target system 25030 includes using a public IP address of the fourth VPN server (VPNS4) as the source address in the third protocol data unit (PDU3).

The target system 25030, or a component thereof, such as the target device, receives, reads, or otherwise accesses, the third protocol data unit (at 25720).

In some implementations, egress reconfiguration, such as the egress reconfiguration 21000 shown in FIG. 21, the automatic egress reconfiguration 24000 shown in FIG. 24, or the automatic egress randomization 25000 shown in FIG. 25, includes egress reconfiguration in accordance with one or more routing, access, or traffic, control policies, or rules defined for the hierarchical-context area network.

Egress reconfiguration in accordance with one or more routing, access, or traffic, control policies, or rules includes identifying a current point of egress in accordance with one or more routing, access, or traffic, control policies, or rules. Identifying the current point of egress in accordance with the routing control policies includes identifying the routing control policies.

In some implementations, the routing control policies include account type-based routing control policies that define, or describe, rules for account type-based routing control. Account type-based routing control policies may include policies, or rules, for controlling the routing of protocol data units to, or from, an account, or a client device actively associated with an account, based on an account type associated with the account.

An account type may be a limited-tier account type wherein access to, such as routing via, VPN servers is limited, such as based on a defined geographic range from a location of the corresponding user device. For example, identifying a current point of egress in accordance with an account type-based routing control policy, or rule, for a limited-tier account may include identifying the current point of egress from components of the hierarchical-context area network that are within the defined geographic range from the ingress node of a VPN tunnel associated with the account. Components of the hierarchical-context area network outside the defined geographic range may be unavailable as a current point of egress for the account, or otherwise for routing protocol data units for the account. In another example, access to, such as routing via, VPN servers for a limited-tier account may be limited based on server load, such as wherein high load servers are accessible, such as for routing of protocol data units, to, or from, accounts having the limited account type and relatively low load servers are unavailable, or inaccessible, such as for routing of protocol data units, to, or from, accounts having the limited account type. In another example, access to, such as routing via, VPN servers for a limited-tier account may be limited based on manual allocation or designation.

In another example, an account type may be a basic-tier account type wherein access to, such as routing via, VPN servers includes the servers accessible by the first (limited-tier) account type and servers in other geographic areas, which may include optimal servers relative to the geographic location of the user device. For example, identifying a current point of egress in accordance with an account type-based routing control policy, or rule, for a basic-tier account may include identifying the current point of egress from components of the hierarchical-context area network that are within geographic areas inside or outside the defined geographic range from the ingress node of a VPN tunnel associated with the account, which may be based on optimization with respect to the geographic location of the user device.

In another example, a third account type may be a premium-tier account type wherein access to, such as routing via, VPN servers includes the servers accessible by the second (basic-tier) account type and includes access to services, such as threat protection services, mesh network services, dedicated credential services, and to relatively fast network access speeds using servers dedicated for the third (premium-tier) account type. For example, identifying a current point of egress in accordance with an account type-based routing control policy, or rule, for a premium-tier account may include identifying the current point of egress from components of the hierarchical-context area network that are within geographic areas inside or outside the defined geographic range from the ingress node of a VPN tunnel associated with the account, which may be based on optimization with respect to the geographic location of the user device, or VPN servers that implement respective services.

In another example, a fourth account type may be an enterprise-tier account type wherein access to, such as routing via, VPN servers, and services, including the servers and services accessible by the third (premium-tier) account type and to dedicated VPN infrastructure components for accessing defined target servers. For example, identifying a current point of egress in accordance with an account type-based routing control policy, or rule, for an enterprise-tier account may include identifying the current point of egress from components of the hierarchical-context area network that are within geographic areas inside or outside the defined geographic range from the ingress node of a VPN tunnel associated with the account, which may be based on optimization with respect to the geographic location of the user device, or VPN servers that implement respective services, or define, dedicated, VPN servers or components.

In some implementations, the routing control policies include organization structure-based routing control policies that define, or describe, rules for organization structure-based routing control. Organization structure-based routing control policies may include policies, or rules, for controlling the routing of protocol data units based on data defining, or describing, an organizational structure. Organization structure-based traffic control may be hierarchical. Organization structure-based traffic control may include a first tier of functionality, a second tier of functionality, a third tier of functionality, and a fourth tier of functionality, for example. Accounts may be associated with the first tier; the first tier and the second tier; the first tier, the second tier, and the third tier; or the first tier, the second tier, the third tier, and the fourth tier. The first tier may access, such as for routing of protocol data units, general functionality and data, such as email. The second tier may access, such as for routing of protocol data units, development resources. The third tier may access, such as for routing of protocol data units, management resources. The fourth tier may access, such as for routing of protocol data units, administrative resources. An ingress node may be identified based on tier.

In some implementations, the routing control policies include service-based routing control policies that define, or describe, rules for service-based routing control. Service-based routing control policies may be based on service type accessed, such as browsing, downloading, streaming, or gaming. Service-based routing control policies may include routing data flows to VPN servers optimized for the respective service. A VPN server optimized for gaming, which may be a relatively small subset of the available VPN servers, may have low latency and high-speed data transmission. A VPN server optimized for streaming, which may be a relatively small subset of the available VPN servers, may be optimized for connection reliability and high transmission speed. A VPN server optimized for downloading, which may be a relatively large subset of the available VPN servers, may be optimized for high transmission speed. The available VPN servers may be optimized for browsing.

In some implementations, the routing control policies include functionality-based routing control policies that define, or describe, rules for functionality-based routing control. Functionality-based routing control policies may include controlling resource availability, such as for routing of protocol data units, based on the scope of available functionality. For example, the third VPNI context level (level-three) may include a defined subset of the functionality, services, aspects thereof, or combinations thereof, available in, or from, the VPN system, having relatively high throughput, such as for downloading. In another example, the second VPNI context level (level-two) may include a defined subset of the functionality, services, aspects thereof, or combinations thereof, available in, or from, the VPN system, having relatively high throughput and enhanced connection reliability, such as for streaming. In another example, the first VPNI context level (level-one) may include a defined subset of the functionality, services, aspects thereof, or combinations thereof, available in, or from, the VPN system, having relatively high throughput, enhanced connection reliability, and low latency, such as for gaming.

In some implementations, the routing control policies include account grouping-based routing control policies that define, or describe, rules for account grouping-based routing control. For example, the fourth, highest, widest, or maximum, VPNI context level (level-four) may include the registered users with VPN service. The third VPNI context level (level-three) may include the registered users with the VPN service that granted permissions to each other for direct communication. The second VPNI context level (level-two) may include the registered users with the VPN service that are in direct communication with each other. The first VPNI context level (level-one) may include the registered users with the VPN service that are in direct communication with each other sending an amount of data larger than the predefined threshold.

Unless expressly stated, or otherwise clear from context, the terminology "computer," and variations or wordforms thereof, such as "computing device," "computing machine," "computing and communications device," and "computing unit," indicates a "computing device," such as the computing device 1000 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data, such as one or more protocol data units, in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts, shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "establish" and "instantiate," and variations or wordforms thereof, indicates an allocation of memory, processing resources, or a combination thereof, wherein the allocation of memory may include the storage of data in the allocated memory, and wherein the allocation of processing resources may include the allocation, operation, or both, of one or more threads, handles, processing cores, or a combination thereof.

Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
operating a hierarchical-context area network as a virtual private network infrastructure network, wherein the hierarchical-context area network includes a hierarchy of context areas, wherein:
the hierarchical-context area network includes:
a first context area network, wherein the first context area network is a level-one context area network corresponding to a first context level;
a second context area network, wherein the second context area network is a level-one context area network corresponding to the first context level; and
a third context area network, wherein the third context area network is a level-two context area network corresponding to a second context level that includes the first context level;

the first context area network is allocated, in the hierarchical-context area network, a first range of Internet Protocol addresses, wherein the first range of Internet Protocol addresses includes a first Internet Protocol address allocated as a first shared Internet Protocol address for the first context area network;
the first context area network includes a first virtual private network server having a second Internet Protocol address in the first range of Internet Protocol addresses, different from the first shared Internet Protocol address;
the second context area network is allocated, in the hierarchical-context area network, a second range of Internet Protocol addresses, wherein the second range of Internet Protocol addresses includes a third Internet Protocol address allocated as a second shared Internet Protocol address for the second context area network;
the second context area network includes a second virtual private network server having a fourth Internet Protocol address in the second range of Internet Protocol addresses, different from the second shared Internet Protocol address;
communication between the first virtual private network server and the second virtual private network server is unavailable via the first context area network;
communication between the first virtual private network server and the second virtual private network server is unavailable via the second context area network; and
communication between the first virtual private network server and the second virtual private network server is available via a data link layer network established between the first virtual private network server and the second virtual private network server via the third context area network.

2. The method of claim 1, wherein operating the hierarchical-context area network includes:
operating a hierarchical-context area network manager at a virtual private network infrastructure administration server for managing the hierarchical-context area network, the hierarchical-context area network manager configured in accordance with hierarchical-context area network manager configuration data obtained from a virtual private network control infrastructure device.

3. The method of claim 2, wherein operating the hierarchical-context area network includes:
operating a virtual private network operating system of the first virtual private network server, the virtual private network operating system configured in accordance with virtual private network server configuration data obtained from the virtual private network control infrastructure device.

4. The method of claim 3, wherein operating the hierarchical-context area network manager includes:
registering the first virtual private network server as a component of the hierarchical-context area network in accordance with virtual private network server registration data identifying the first virtual private network server obtained by the hierarchical-context area network manager from the virtual private network control infrastructure device.

5. The method of claim 4, wherein operating the virtual private network operating system includes:

sending, by the first virtual private network server, a peering data request, to the hierarchical-context area network manager.

6. The method of claim 5, wherein operating the hierarchical-context area network manager includes the hierarchical-context area network manager:

receiving the peering data request;

obtaining, responsive to the peering data request, peering data that identifies a second virtual private network server of the hierarchical-context area network as a peer of the first virtual private network server; and sending a peering data response indicating the peering data to the first virtual private network server.

7. The method of claim 6, wherein operating the virtual private network operating system includes:

receiving the peering data response; and configuring the second virtual private network server as a virtual private network infrastructure peer in the hierarchical-context area network.

8. A virtual private network infrastructure system, which includes at least one processor performing instructions stored in at least one memory, operating a hierarchical-context area network as a virtual private network infrastructure network, wherein the hierarchical-context area network includes a hierarchy of context areas, the virtual private network infrastructure system comprising:

a virtual private network infrastructure administration server;

virtual private network control infrastructure device; and a first virtual private network server, wherein:

the hierarchical-context area network includes:

a first context area network, wherein the first context area network is a level-one context area network corresponding to a first context level;

a second context area network, wherein the second context area network is a level-one context area network corresponding to the first context level; and a third context area network, wherein the third context area network is a level-two context area network corresponding to a second context level that includes the first context level;

the first context area network is allocated, in the hierarchical-context area network, a first range of Internet Protocol addresses, wherein the first range of Internet Protocol addresses includes a first Internet Protocol address allocated as a first shared Internet Protocol address for the first context area network;

the first context area network includes the first virtual private network server, the first virtual private network server having a second Internet Protocol address in the first range of Internet Protocol addresses, different from the first shared Internet Protocol address;

the second context area network is allocated, in the hierarchical-context area network, a second range of Internet Protocol addresses, wherein the second range of Internet Protocol addresses includes a third Internet Protocol address allocated as a second shared Internet Protocol address for the second context area network;

the second context area network includes a second virtual private network server having a fourth Internet Protocol address in the second range of Internet Protocol addresses, different from the second shared Internet Protocol address;

communication between the first virtual private network server and the second virtual private network server is unavailable via the first context area network;

communication between the first virtual private network server and the second virtual private network server is unavailable via the second context area network; and communication between the first virtual private network server and the second virtual private network server is available via a data link layer network established between the first virtual private network server and the second virtual private network server via the third context area network.

9. The virtual private network infrastructure system of claim 8, wherein operating the hierarchical-context area network includes:

the virtual private network infrastructure administration server operating a hierarchical-context area network manager for managing the hierarchical-context area network, the hierarchical-context area network manager configured in accordance with hierarchical-context area network manager configuration data obtained from the virtual private network control infrastructure device.

10. The virtual private network infrastructure system of claim 9, wherein operating the hierarchical-context area network includes:

the first virtual private network server operating a virtual private network operating system, the virtual private network operating system configured in accordance with virtual private network server configuration data obtained from the virtual private network control infrastructure device.

11. The virtual private network infrastructure system of claim 10, wherein operating the hierarchical-context area network includes:

the hierarchical-context area network manager registering the first virtual private network server as a component of the hierarchical-context area network in accordance with virtual private network server registration data identifying the first virtual private network server obtained by the hierarchical-context area network manager from the virtual private network control infrastructure device.

12. The virtual private network infrastructure system of claim 11, wherein operating the hierarchical-context area network includes:

the virtual private network operating system sending a peering data request to the hierarchical-context area network manager.

13. The virtual private network infrastructure system of claim 12, wherein operating the hierarchical-context area network includes the hierarchical-context area network manager:

receiving the peering data request;

obtaining, responsive to the peering data request, peering data that identifies the second virtual private network server as a peer of the first virtual private network server; and sending a peering data response indicating the peering data to the first virtual private network server.

14. The virtual private network infrastructure system of claim 13, wherein operating the hierarchical-context area network includes the virtual private network operating system:

receiving the peering data response; and configuring the second virtual private network server as a virtual private network infrastructure peer in the hierarchical-context area network.

15. A non-transitory computer-readable storage medium, comprising processor-executable instructions for operating, in response to the instructions, a hierarchical-context area network as a virtual private network infrastructure network, wherein the hierarchical-context area network includes a hierarchy of context areas, wherein:

the hierarchical-context area network includes:

a first context area network, wherein the first context area network is a level-one context area network corresponding to a first context level;

a second context area network, wherein the second context area network is a level-one context area network corresponding to the first context level; and a third context area network, wherein the third context area network is a level-two context area network corresponding to a second context level that includes the first context level;

the first context area network is allocated, in the hierarchical-context area network, a first range of Internet Protocol addresses, wherein the first range of Internet Protocol addresses includes a first Internet Protocol address allocated as a first shared Internet Protocol address for the first context area network;

the first context area network includes a first virtual private network server having a second Internet Protocol address in the first range of Internet Protocol addresses, different from the first shared Internet Protocol address;

the second context area network is allocated, in the hierarchical-context area network, a second range of Internet Protocol addresses, wherein the second range of Internet Protocol addresses includes a third Internet Protocol address allocated as a second shared Internet Protocol address for the second context area network;

the second context area network includes a second virtual private network server having a fourth Internet Protocol address in the second range of Internet Protocol addresses, different from the second shared Internet Protocol address;

communication between the first virtual private network server and the second virtual private network server is unavailable via the first context area network;

communication between the first virtual private network server and the second virtual private network server is unavailable via the second context area network; and communication between the first virtual private network server and the second virtual private network server is available via a data link layer network established between the first virtual private network server and the second virtual private network server via the third context area network.

16. The non-transitory computer-readable storage medium of claim 15, wherein operating the hierarchical-context area network includes:

operating a hierarchical-context area network manager at a virtual private network infrastructure administration server for managing the hierarchical-context area network, the hierarchical-context area network manager configured in accordance with hierarchical-context area network manager configuration data obtained from a virtual private network control infrastructure device.

17. The non-transitory computer-readable storage medium of claim 16, wherein operating the hierarchical-context area network includes:

operating a virtual private network operating system of the first virtual private network server, the virtual private network operating system configured in accordance with virtual private network server configuration data obtained from the virtual private network control infrastructure device.

18. The non-transitory computer-readable storage medium of claim 17, wherein operating the hierarchical-context area network manager includes:

registering the first virtual private network server as a component of the hierarchical-context area network in accordance with virtual private network server registration data identifying the first virtual private network server obtained by the hierarchical-context area network manager from the virtual private network control infrastructure device.

19. The non-transitory computer-readable storage medium of claim 18, wherein operating the virtual private network operating system includes:

sending, by the first virtual private network server, a peering data request, to the hierarchical-context area network manager.

20. The non-transitory computer-readable storage medium of claim 19, wherein:

operating the hierarchical-context area network manager includes the hierarchical-context area network manager:

receiving the peering data request;

obtaining, responsive to the peering data request, peering data that identifies a second virtual private network server of the hierarchical-context area network as a peer of the first virtual private network server; and sending a peering data response indicating the peering data to the first virtual private network server; and operating the virtual private network operating system includes:

receiving the peering data response; and configuring the second virtual private network server as a virtual private network infrastructure peer in the hierarchical-context area network.

* * * * *